United States Patent [19]

Busser et al.

[11] 4,379,332

[45] Apr. 5, 1983

[54] ELECTRONIC FUEL INJECTION CONTROL SYSTEM FOR AN INTERNAL COMBUSTION ENGINE

[75] Inventors: Darryl W. Busser, Southfield; Joseph P. Szafranski, West Bloomfield, both of Mich.

[73] Assignee: The Bendix Corporation, Southfield, Mich.

[21] Appl. No.: 945,988

[22] Filed: Sep. 25, 1978

[51] Int. Cl.³ .......................... F02B 3/12; F02D 5/02; G05B 15/02
[52] U.S. Cl. .............................. 364/431.05; 123/480; 123/486; 364/431.11
[58] Field of Search ............... 123/480, 486, 489; 364/431.05, 431.11, 431.12

[56] References Cited

U.S. PATENT DOCUMENTS

| | | | |
|---|---|---|---|
| 3,707,950 | 1/1973 | Schlimme | 123/357 |
| 3,713,427 | 12/1973 | Adler | 123/488 |
| 3,780,711 | 12/1973 | Lindberg | 123/487 |
| 3,816,717 | 6/1974 | Yoshida et al. | 364/431.05 |
| 3,835,819 | 12/1974 | Anderson, Jr. | 123/480 |
| 3,851,635 | 12/1974 | Murtin et al. | 123/478 |
| 3,858,561 | 1/1975 | Aono | 123/492 |
| 3,897,762 | 8/1975 | Jones et al. | 123/497 |
| 3,914,580 | 10/1975 | Watson et al. | 123/486 |
| 3,935,846 | 2/1976 | Zelenka | 123/487 |
| 3,948,237 | 4/1976 | Williams et al. | 123/488 |
| 3,960,120 | 6/1976 | Aono et al. | 123/487 |
| 3,969,614 | 7/1976 | Moyer et al. | 364/431.06 |
| 3,986,006 | 10/1976 | Kawai et al. | 364/431.05 |
| 4,019,478 | 4/1977 | Hobo et al. | 123/497 |
| 4,100,891 | 7/1978 | Williams | 123/487 |
| 4,116,169 | 9/1978 | Krupp et al. | 123/486 |
| 4,133,326 | 1/1979 | Cops et al. | 123/487 |
| 4,134,368 | 1/1979 | Hadley | 123/487 |
| 4,148,283 | 4/1979 | Harada et al. | 123/492 |
| 4,163,282 | 7/1979 | Yamada et al. | 364/431.06 |
| 4,176,629 | 12/1979 | Kawai et al. | 123/486 |

*Primary Examiner*—Felix D. Gruber
*Attorney, Agent, or Firm*—Russel C. Wells; Gaylord P. Haas

[57] ABSTRACT

An electronic fuel injection (EFI) control system (10) for an internal combustion engine. The EFI control system (10) is disclosed in conjunction with a compression ignition engine (12) where the parameters of fuel quantity (446) and injection timing (460) are controlled on the basis of a plurality of engine operating conditions. The parameter of fuel quantity (446) is obtained from a comparison of computed values of percent load fuel quantity (428) and full load fuel quantity (444) with the lesser of the two being selected. The percent load fuel quantity (428) has a proportional component (416) that is a function of actual engine speed (414) and commanded engine speed (412), and an integral component (426) that is related to cumulative speed error (422). The full load fuel quantity (444) is a function of actual engine speed (414) and manifold air density (436). The parameter of injection timing (460) is obtained from a summation of two computed quantities for injection advance. One quantity (452) is a function of actual engine speed (414) and the selected fuel quantity (446). The other quantity (456) is a function of air temperature (442). The system (10) includes the capability to trim fuel quantity (446) to compensate for variations in individual injector (42) and cylinder (16) characteristics.

37 Claims, 98 Drawing Figures

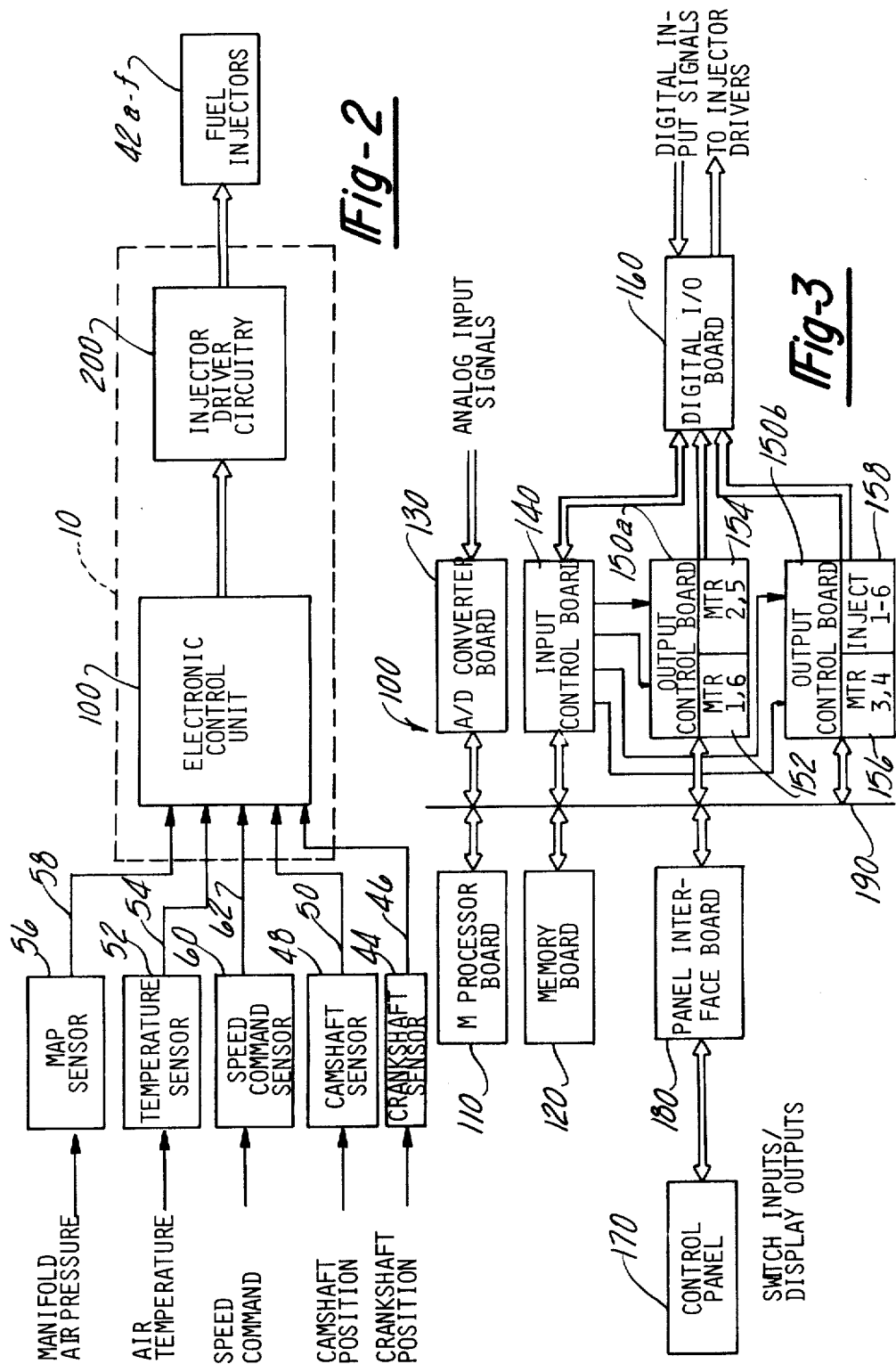

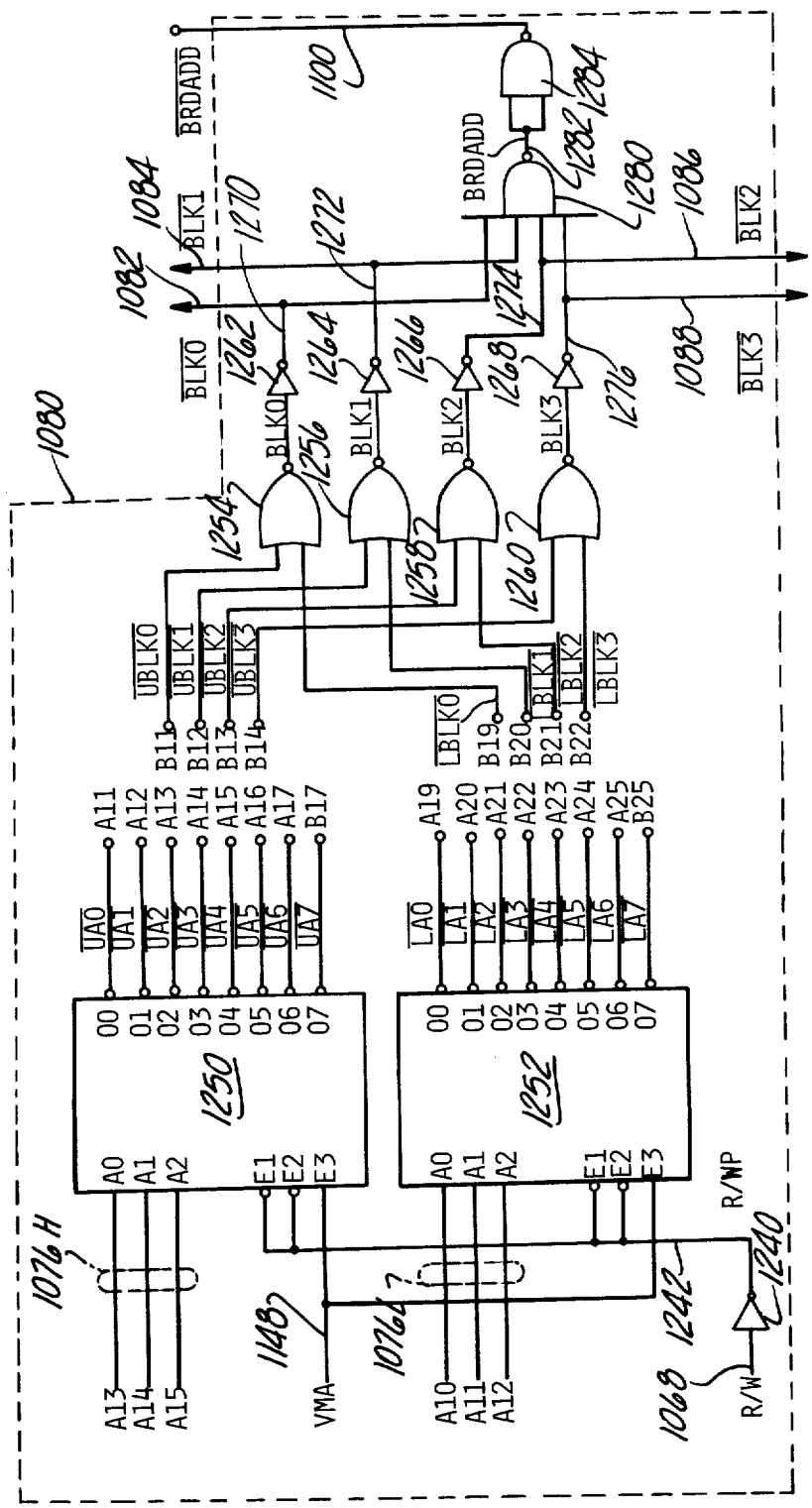

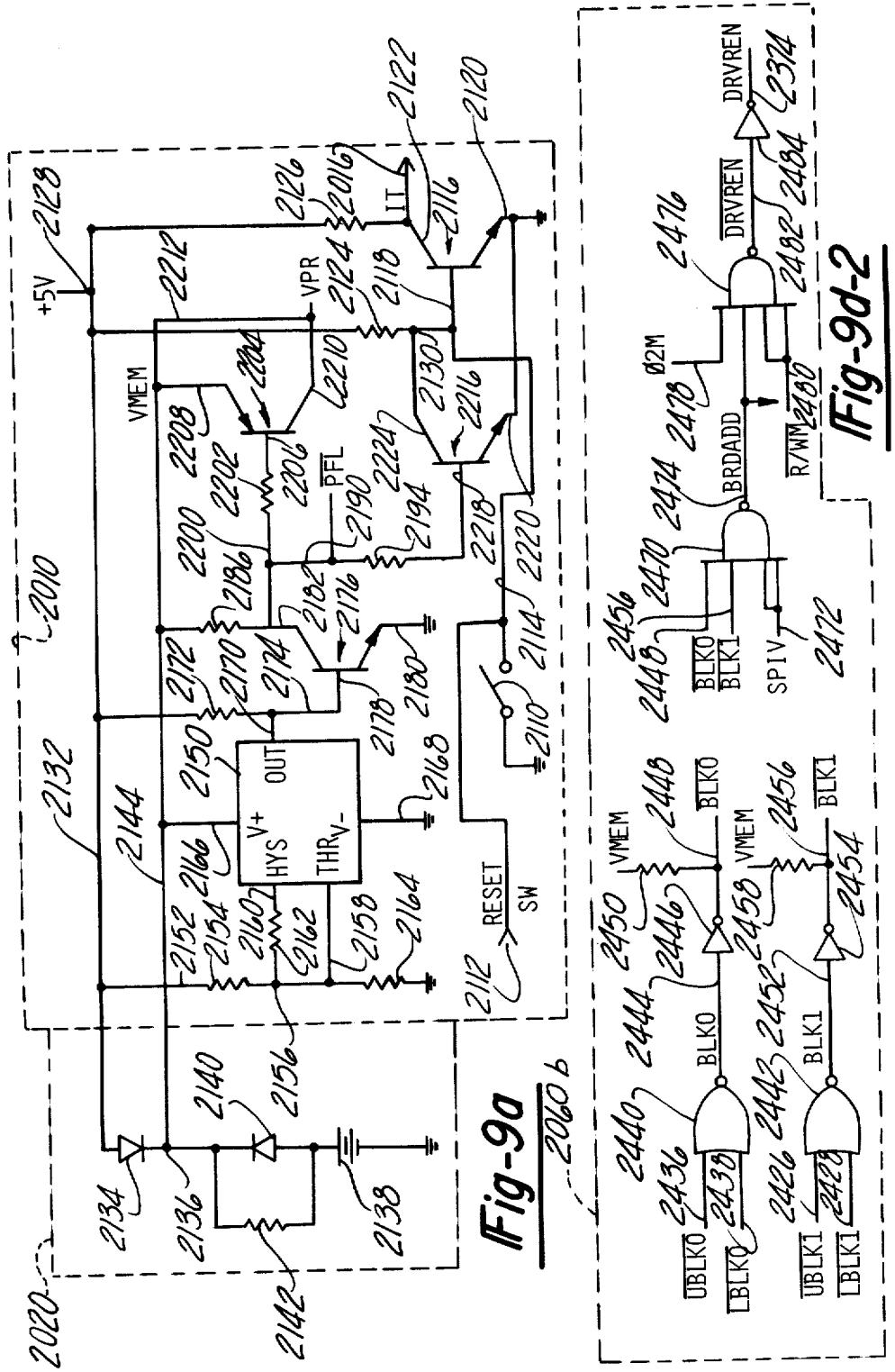

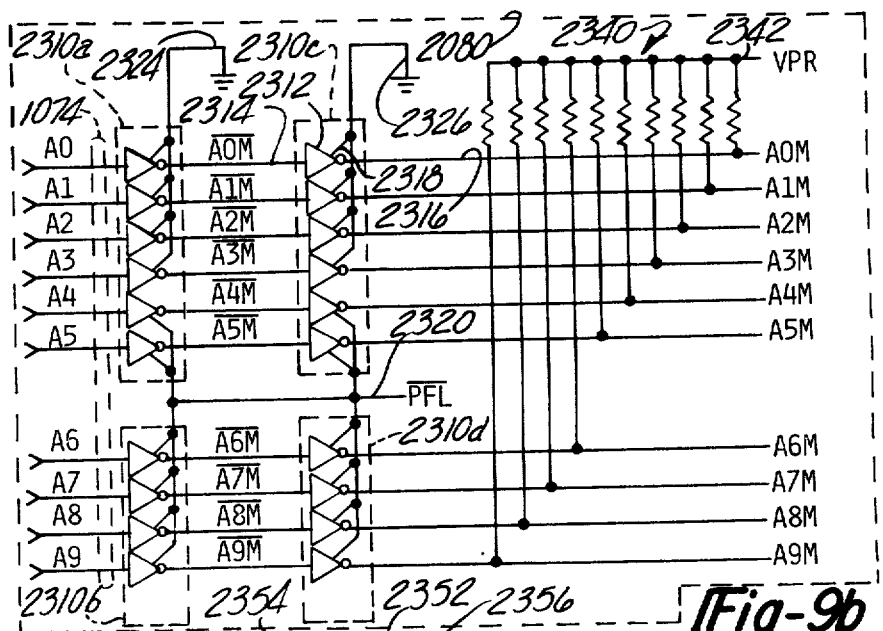
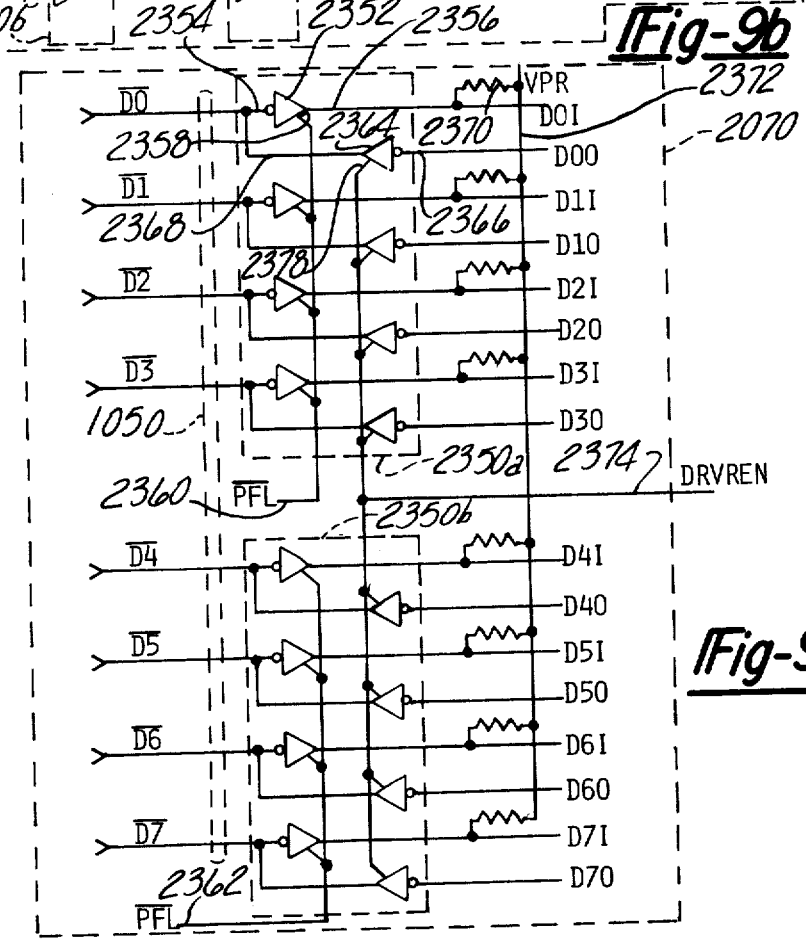

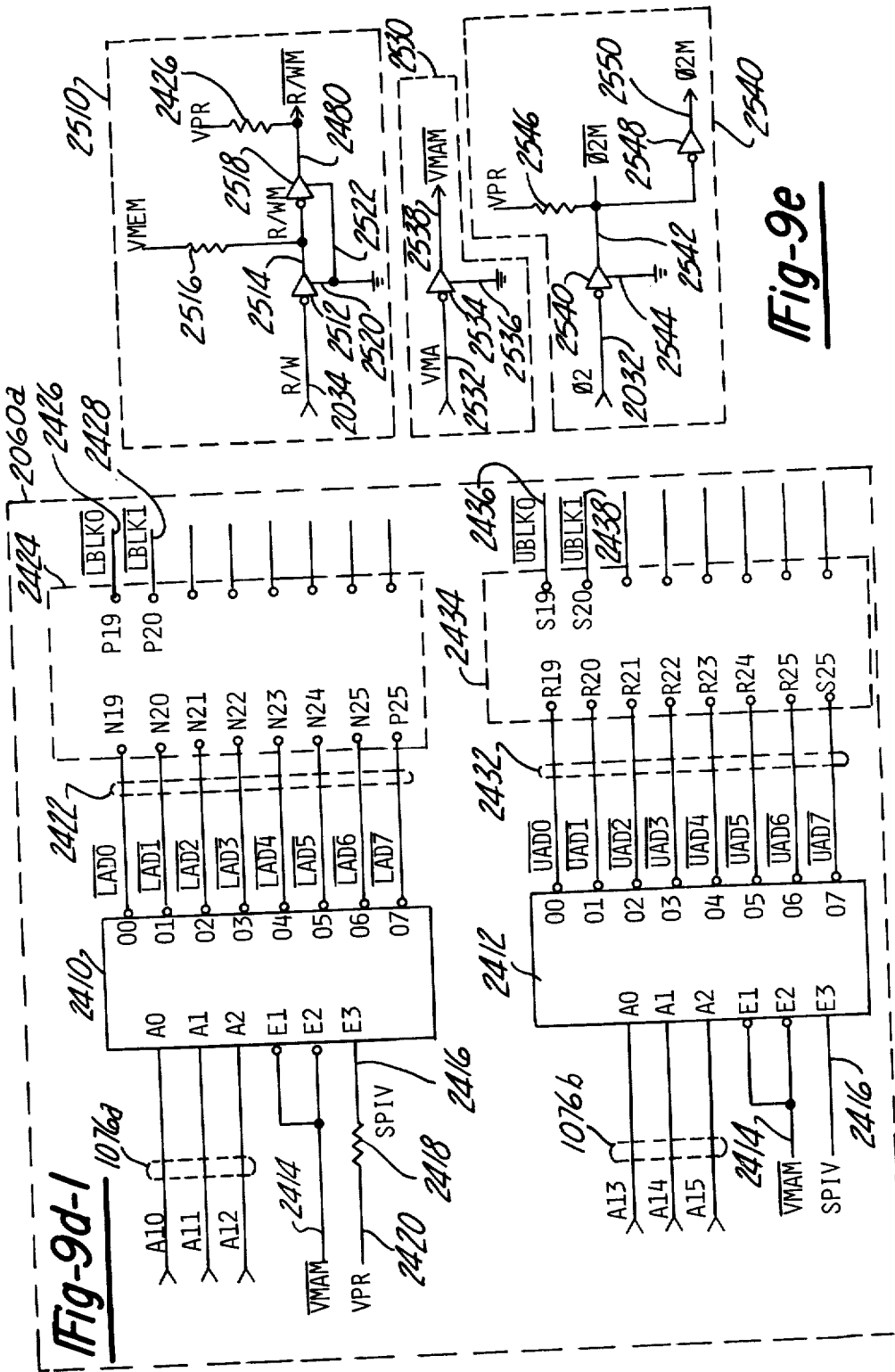

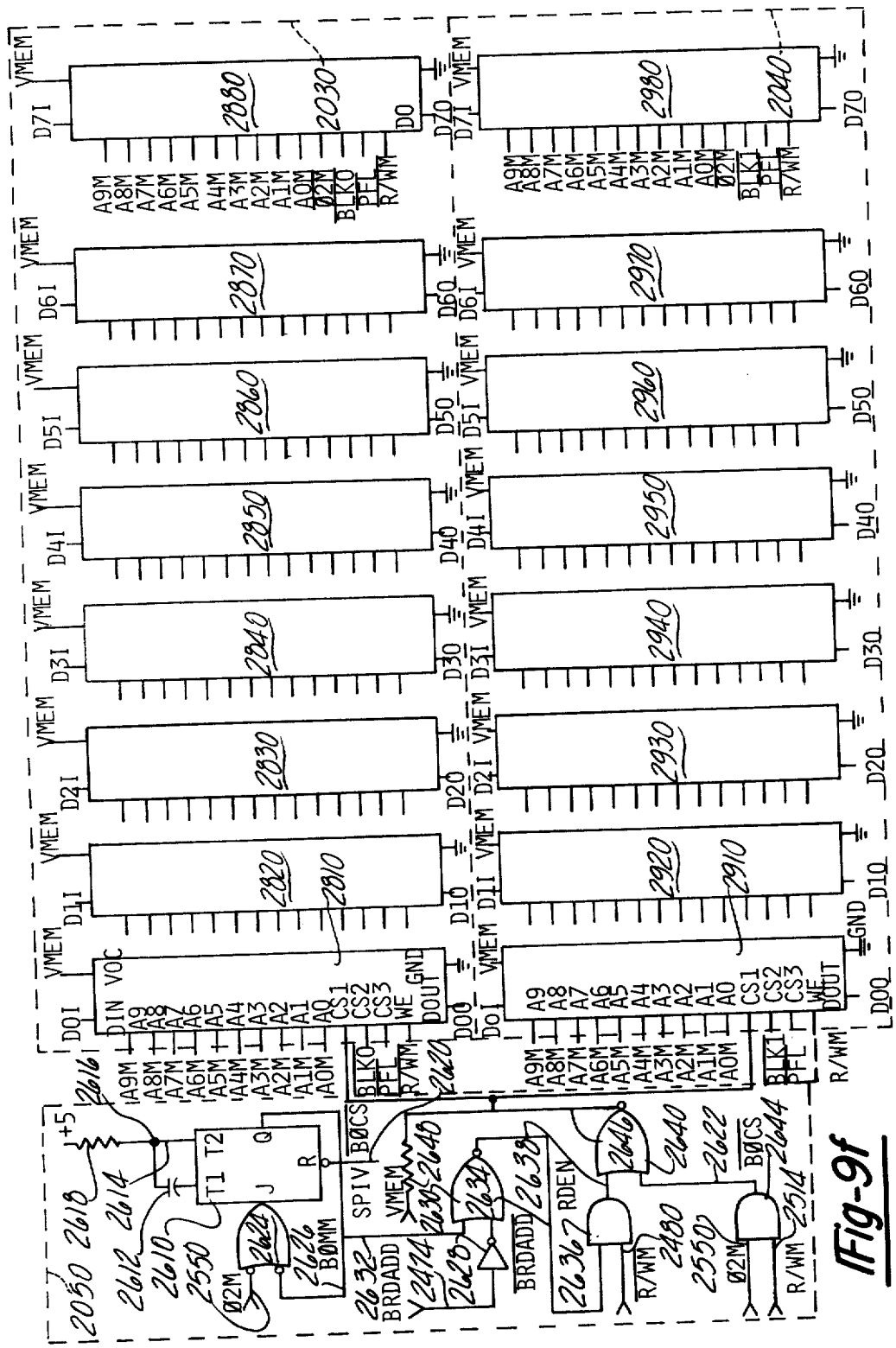

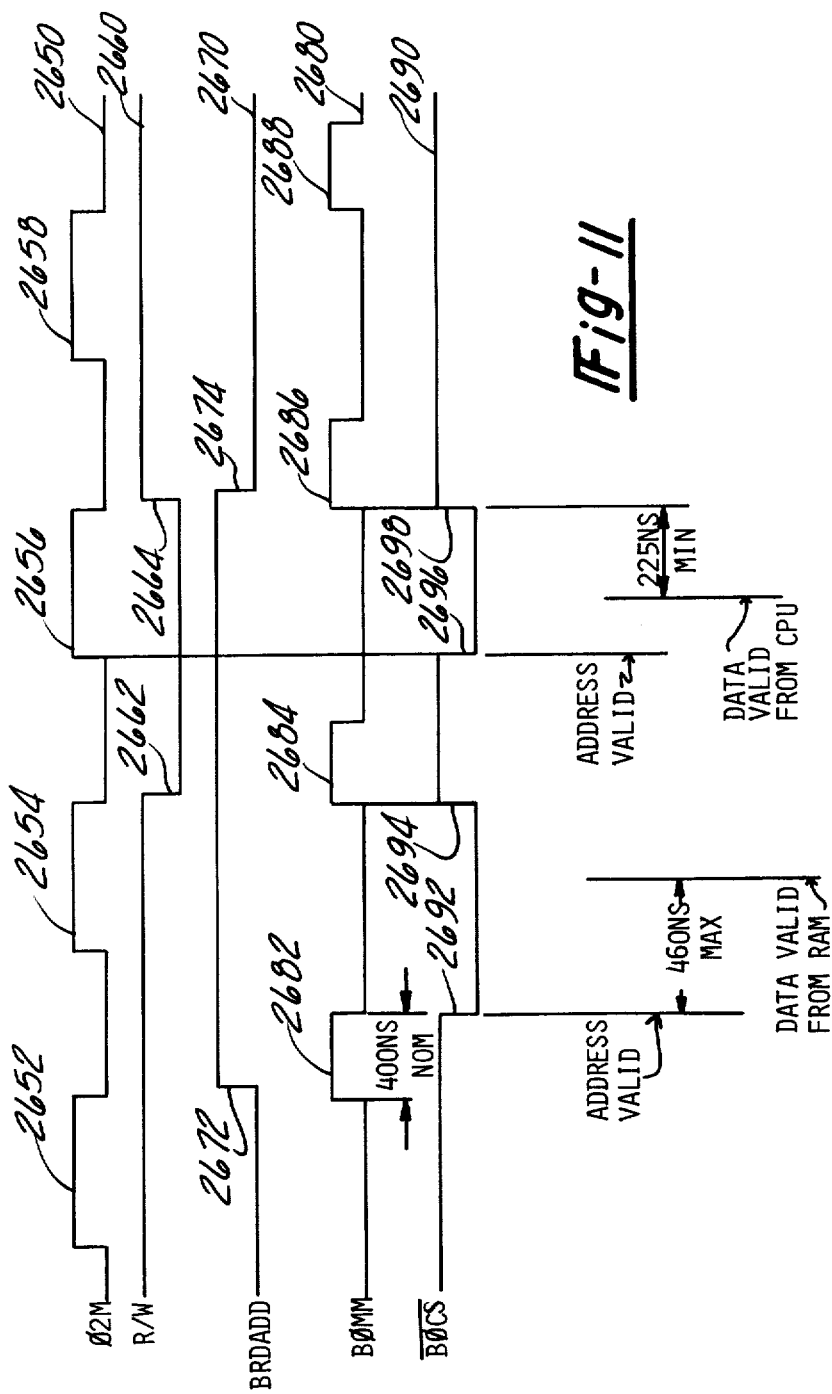

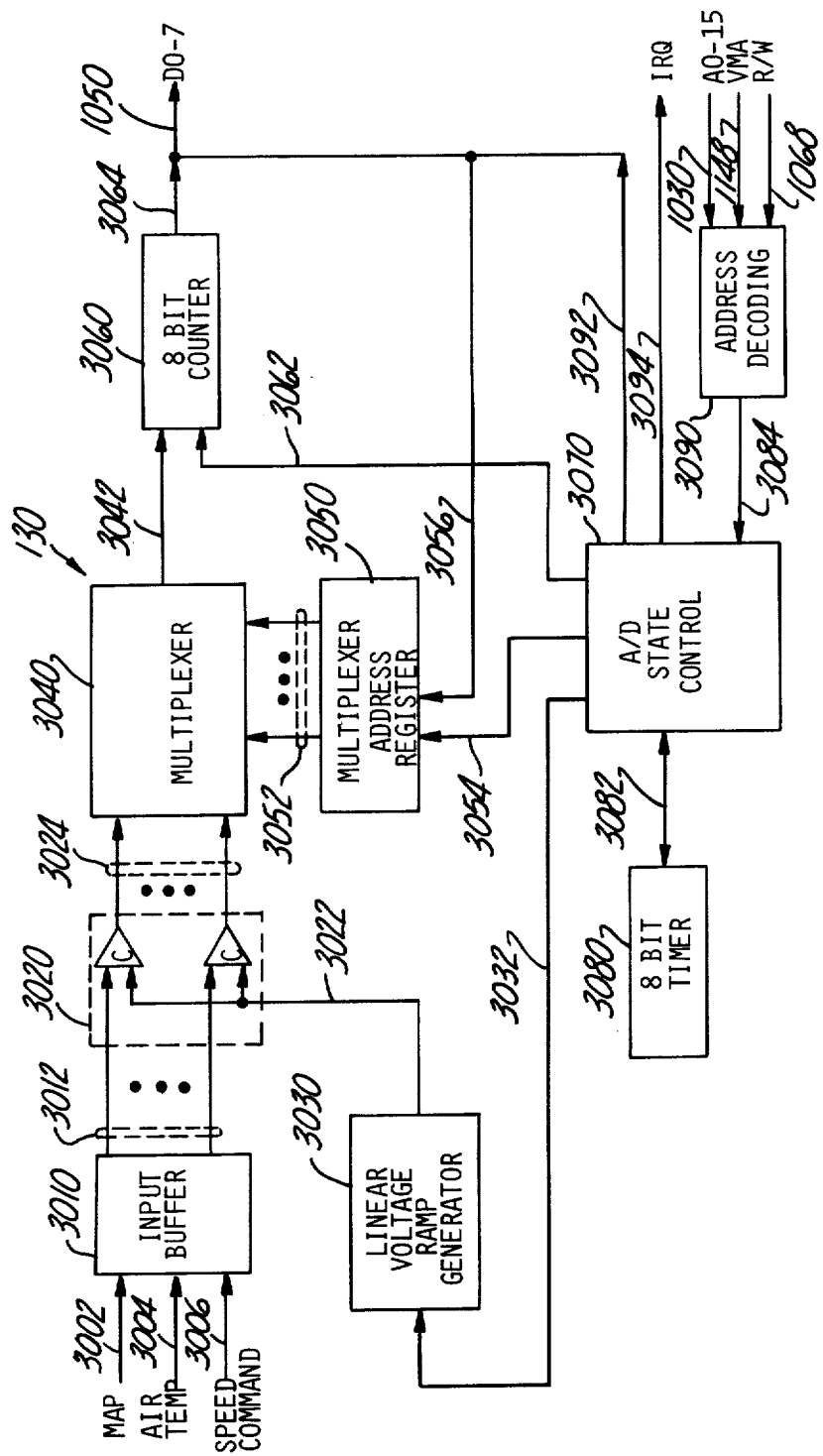

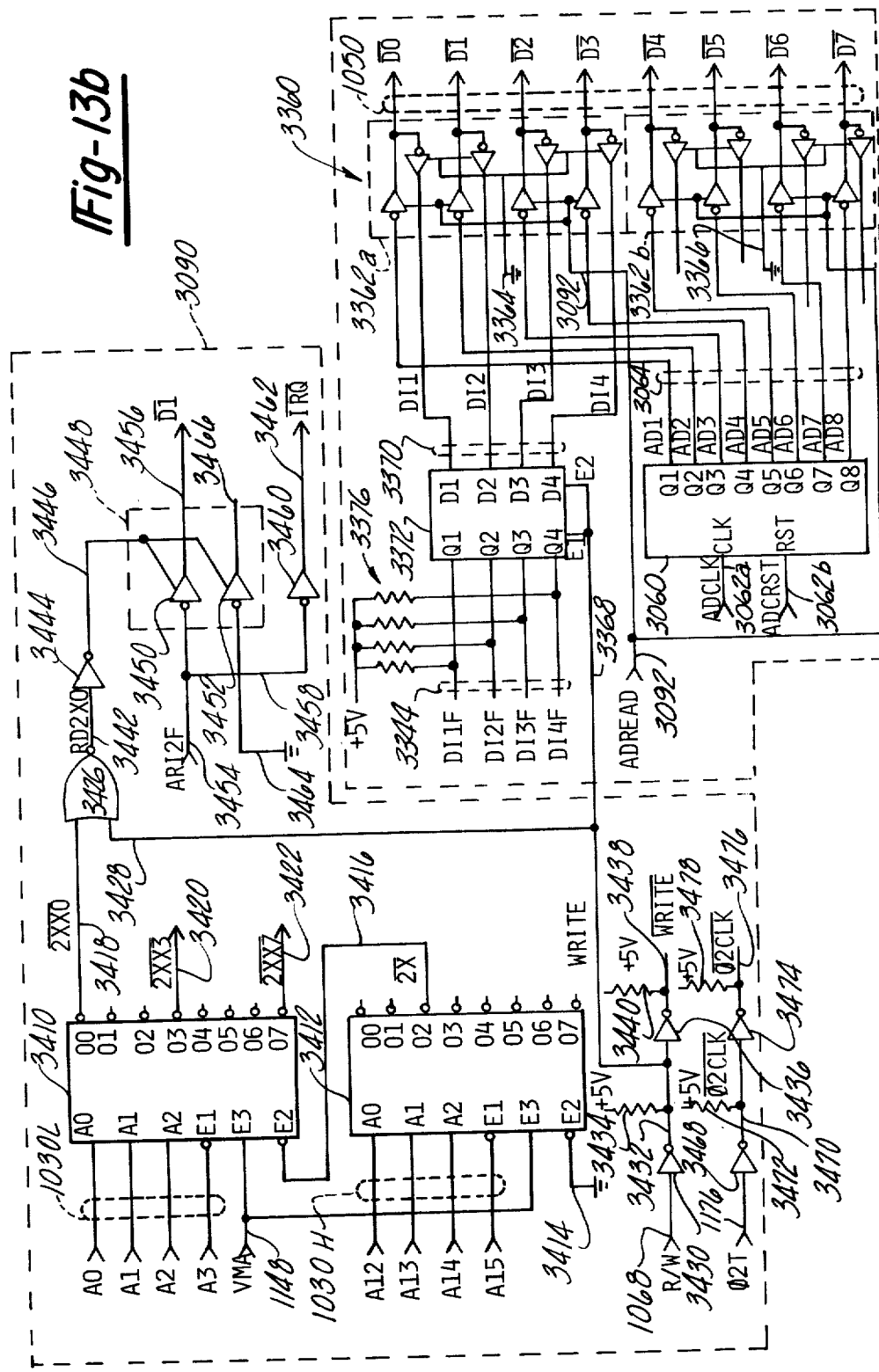

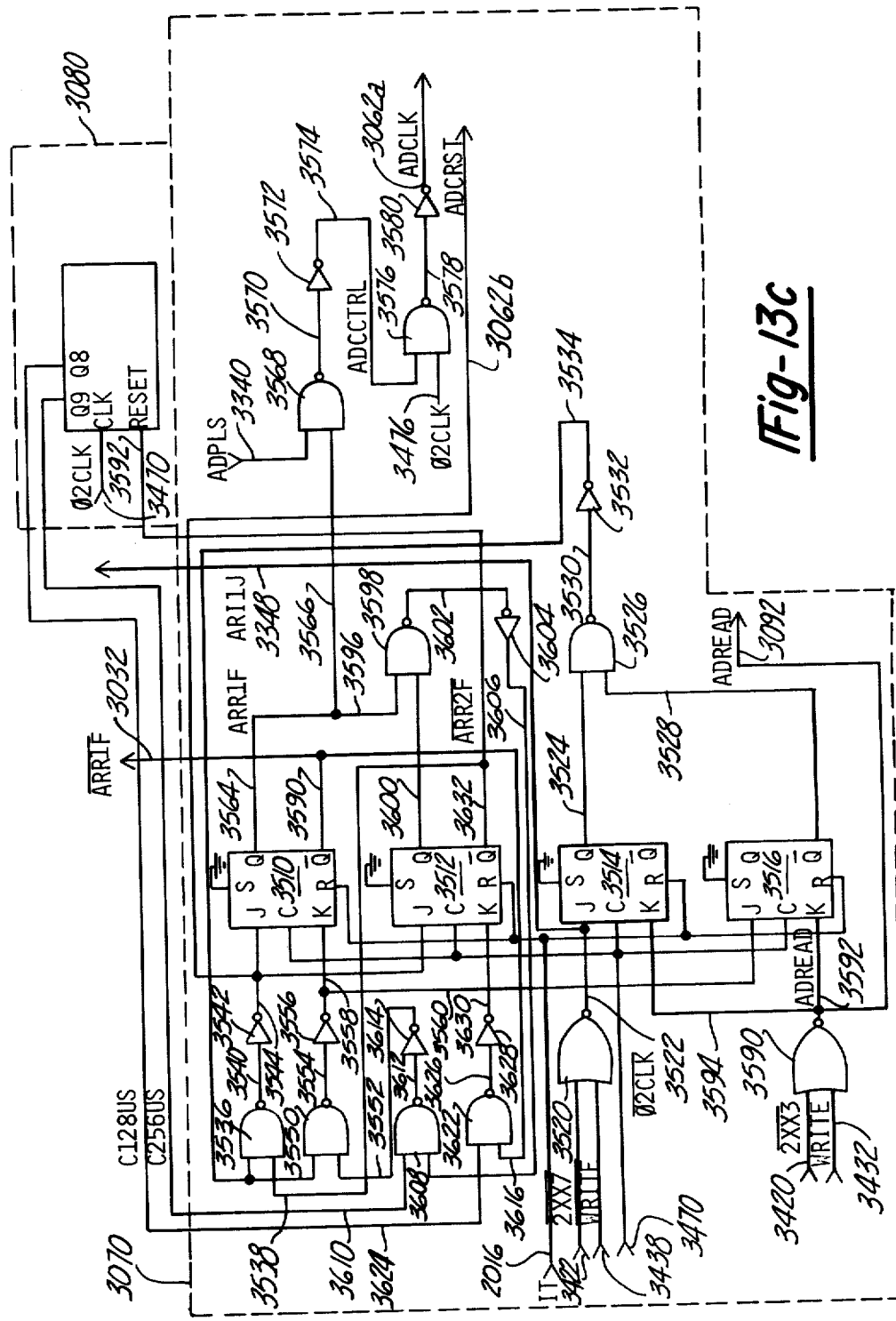

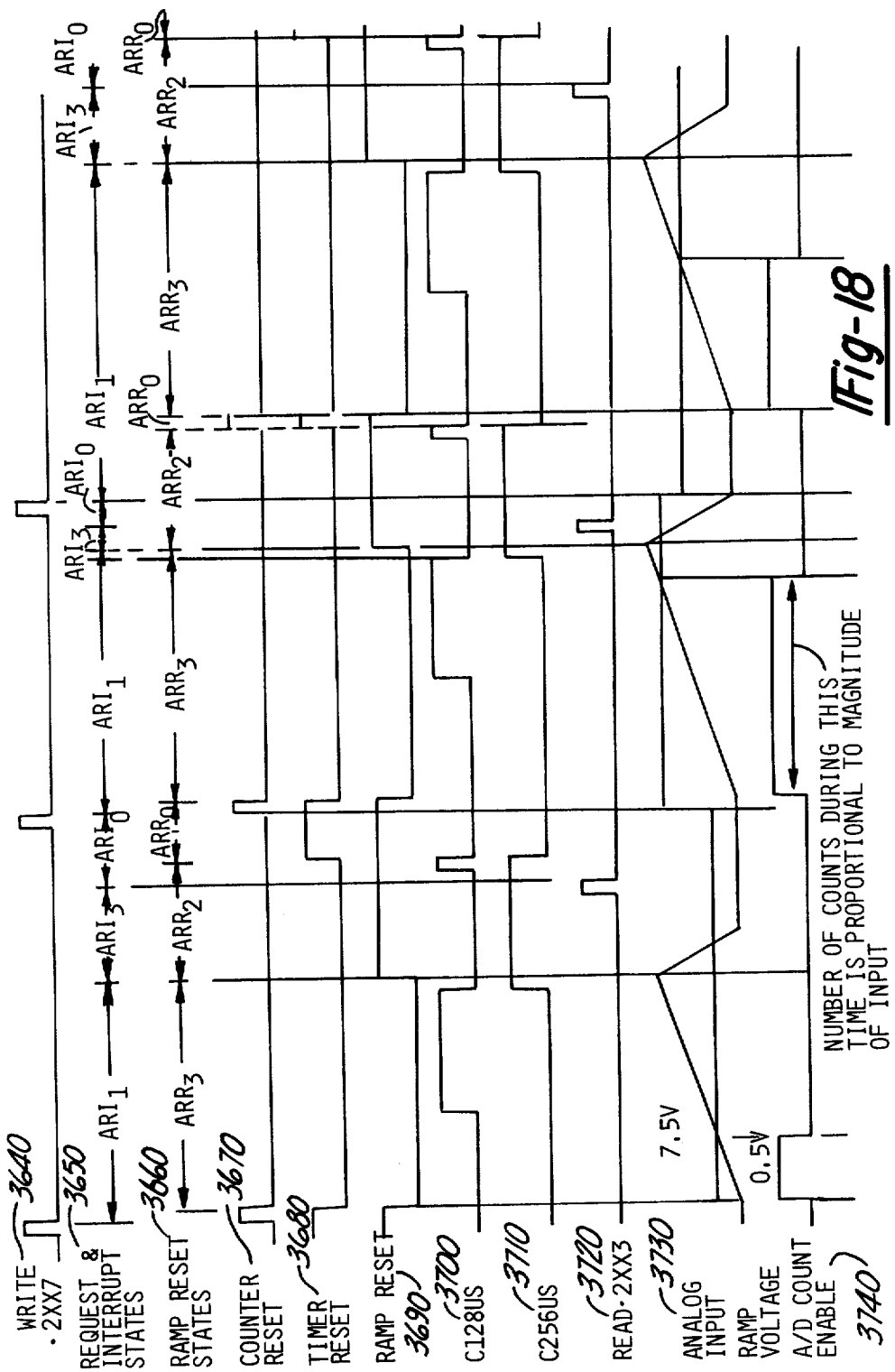

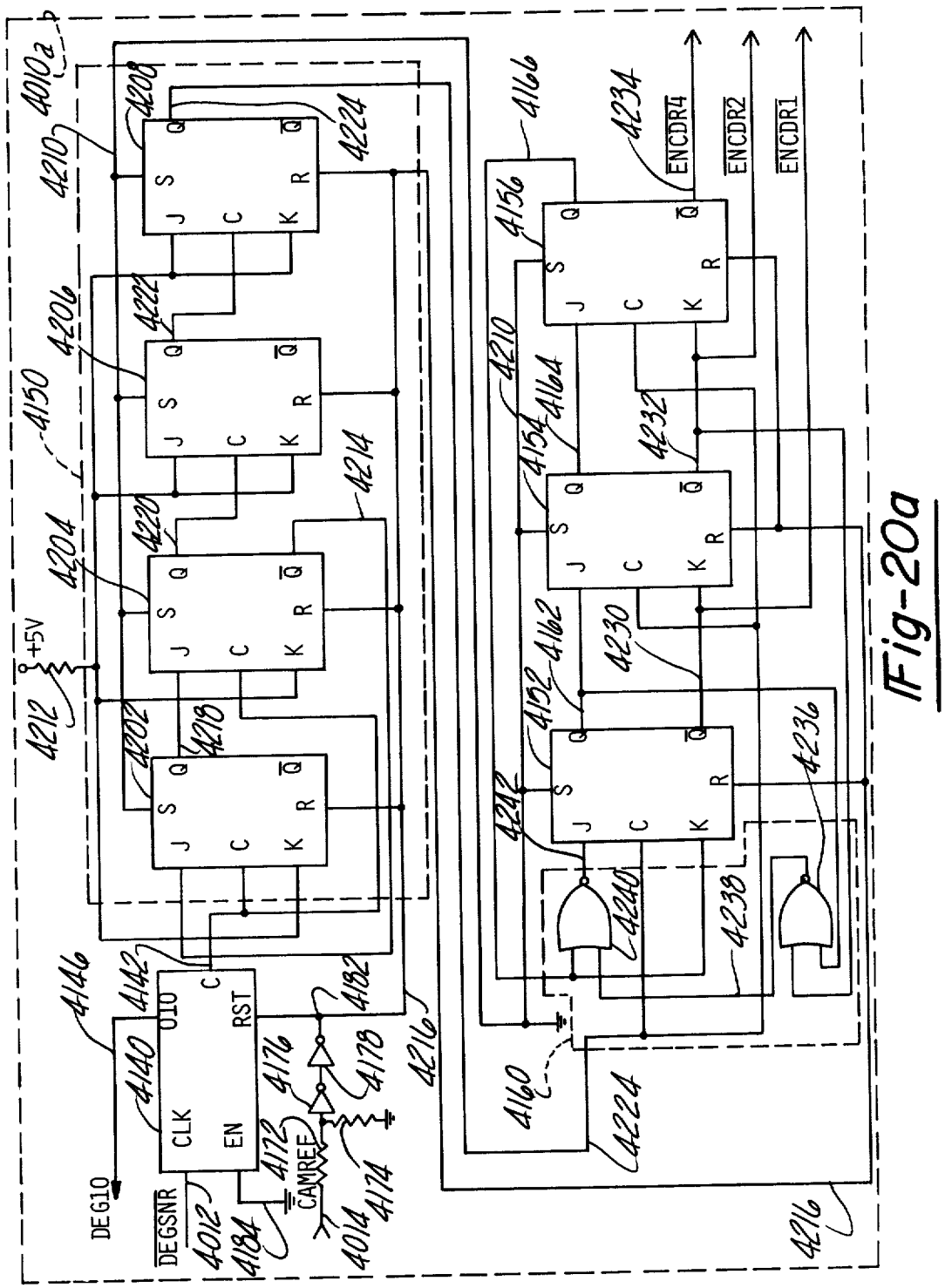

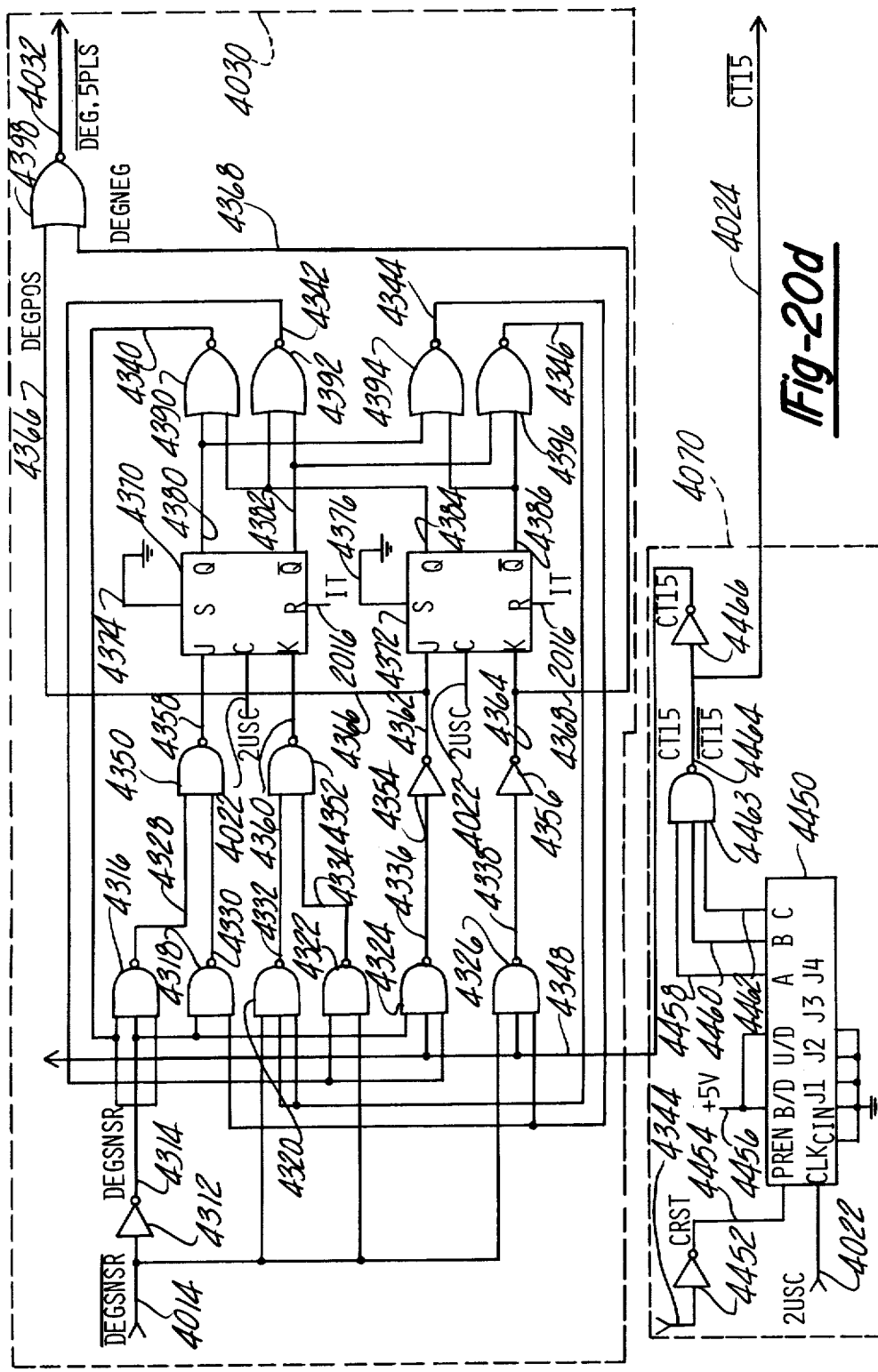

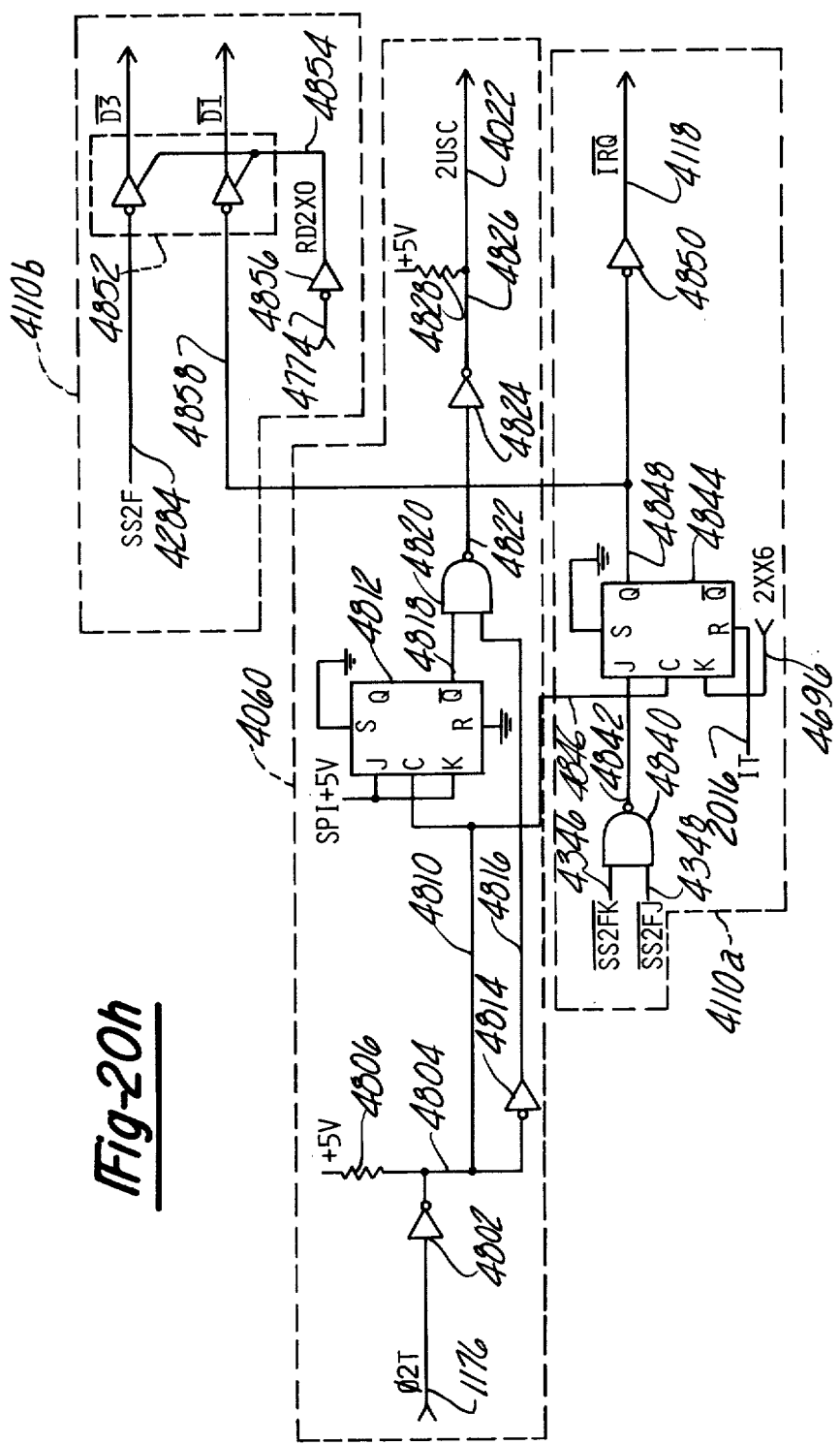

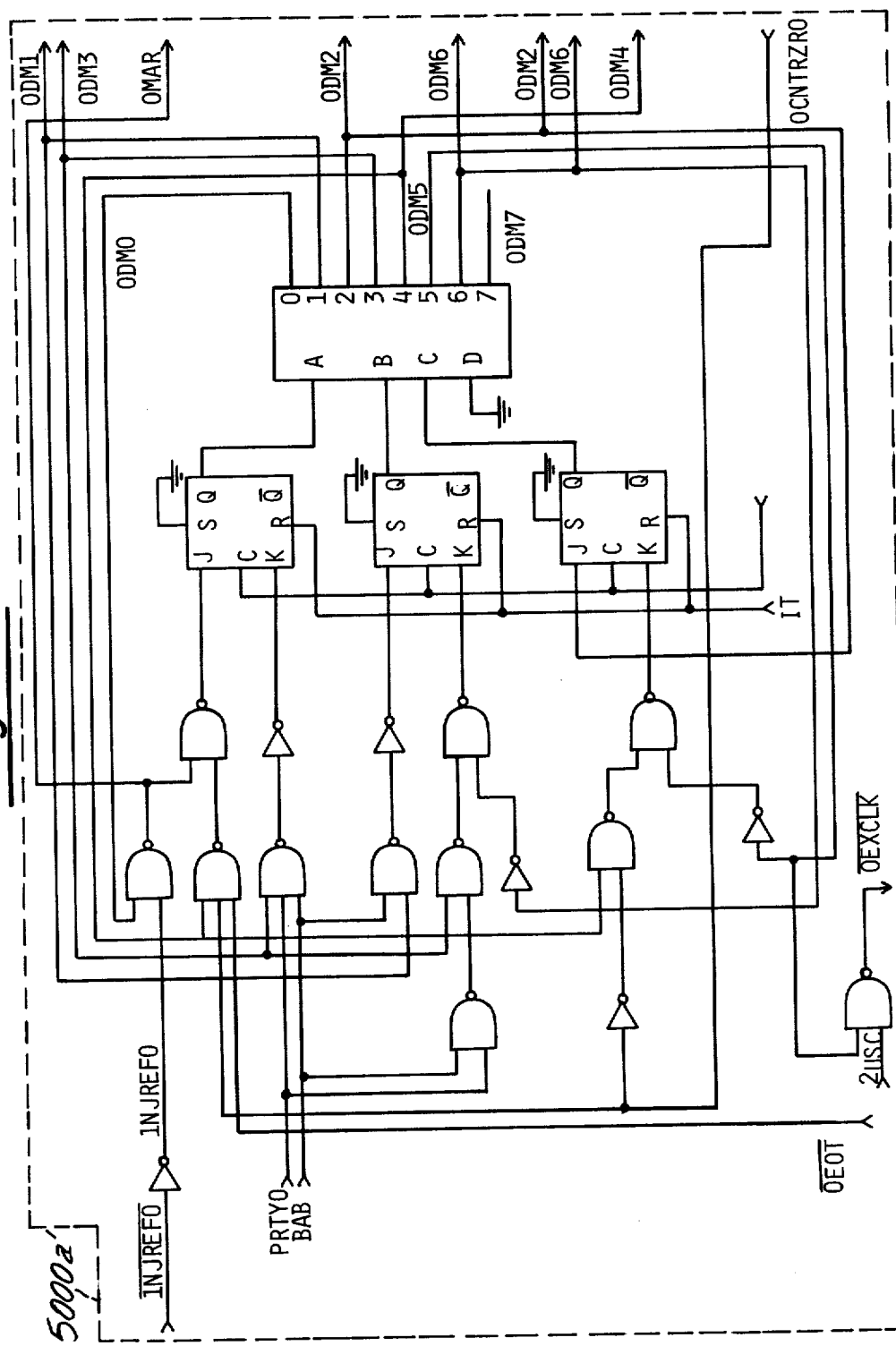

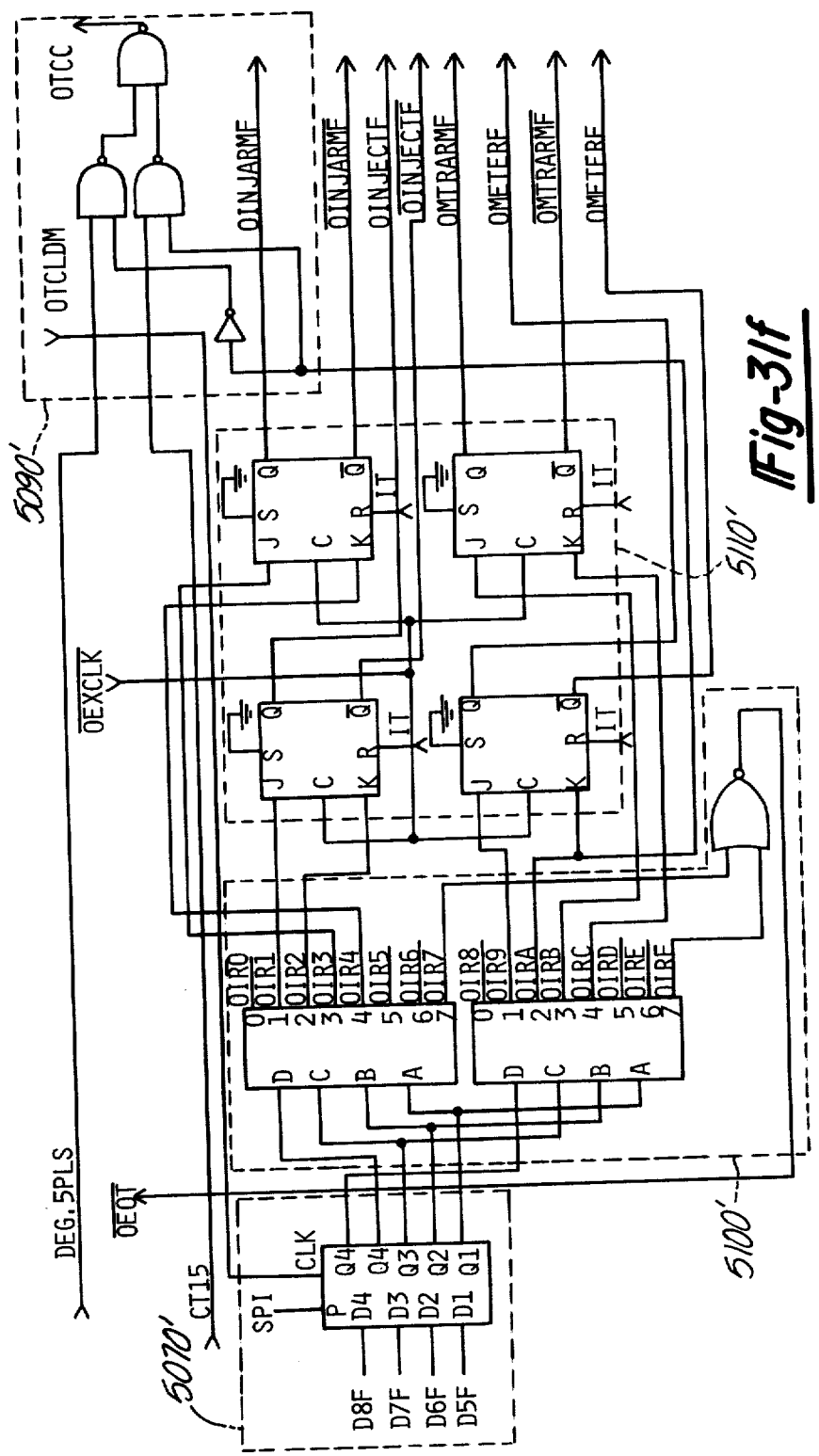

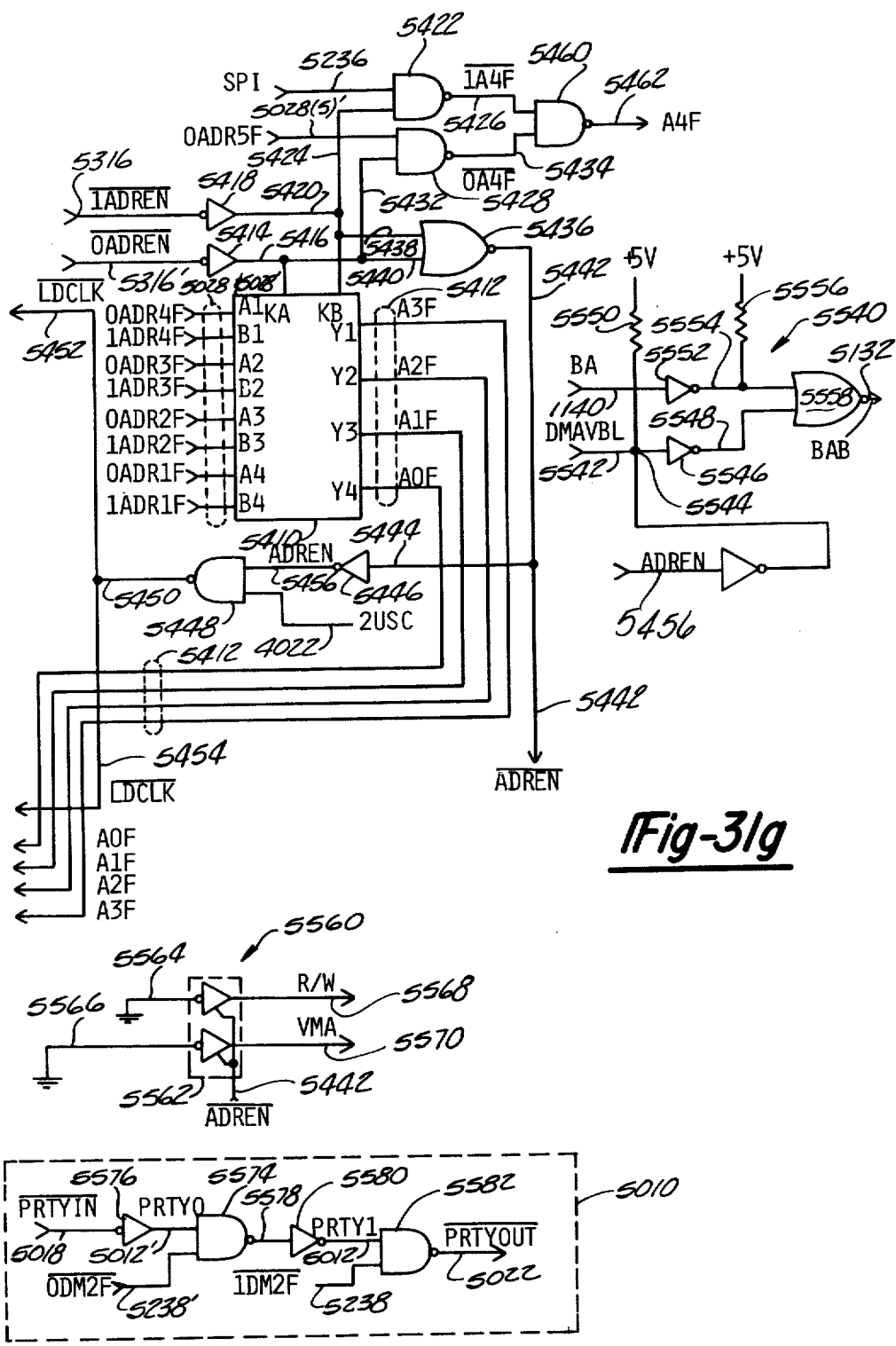

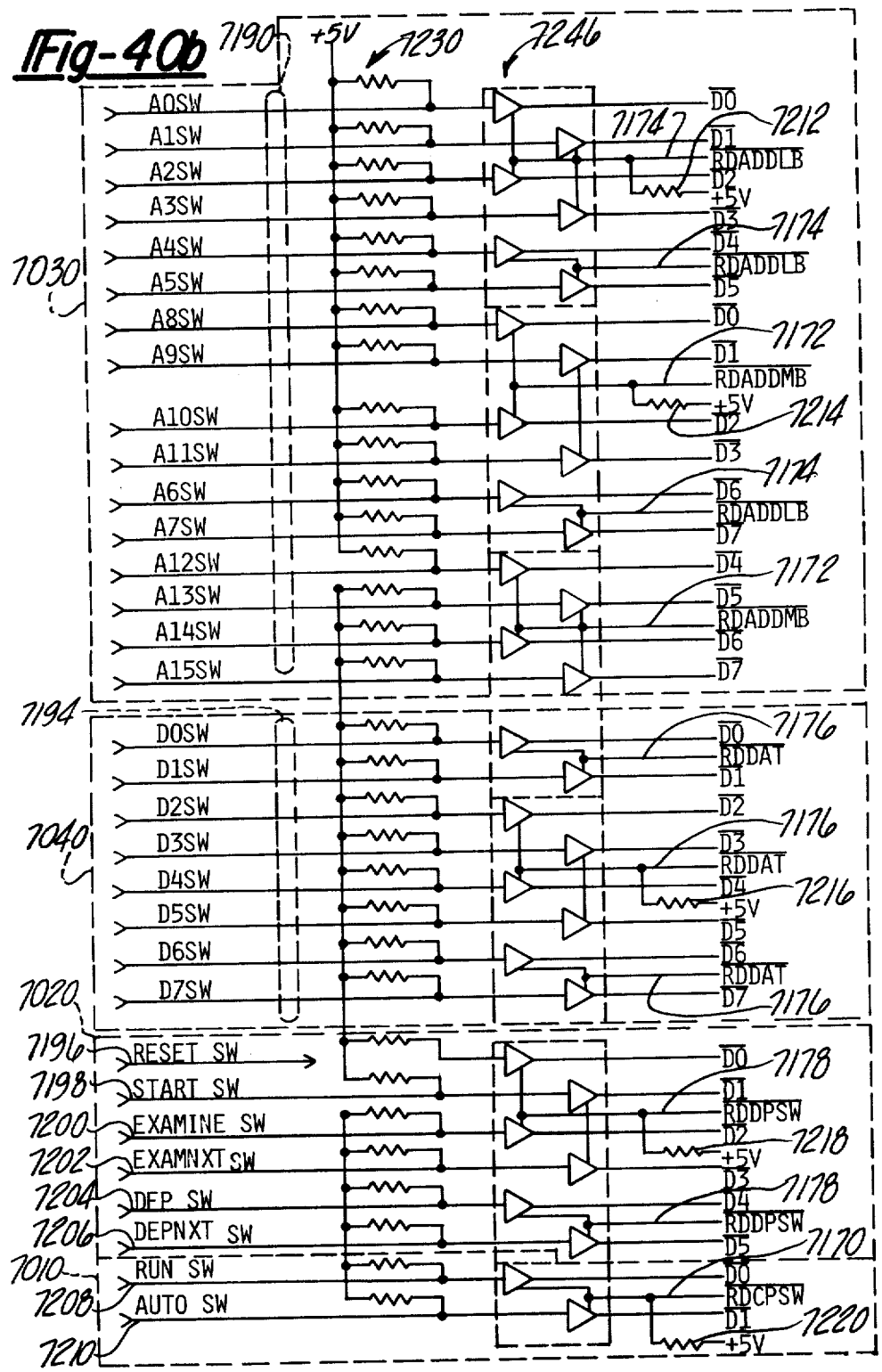

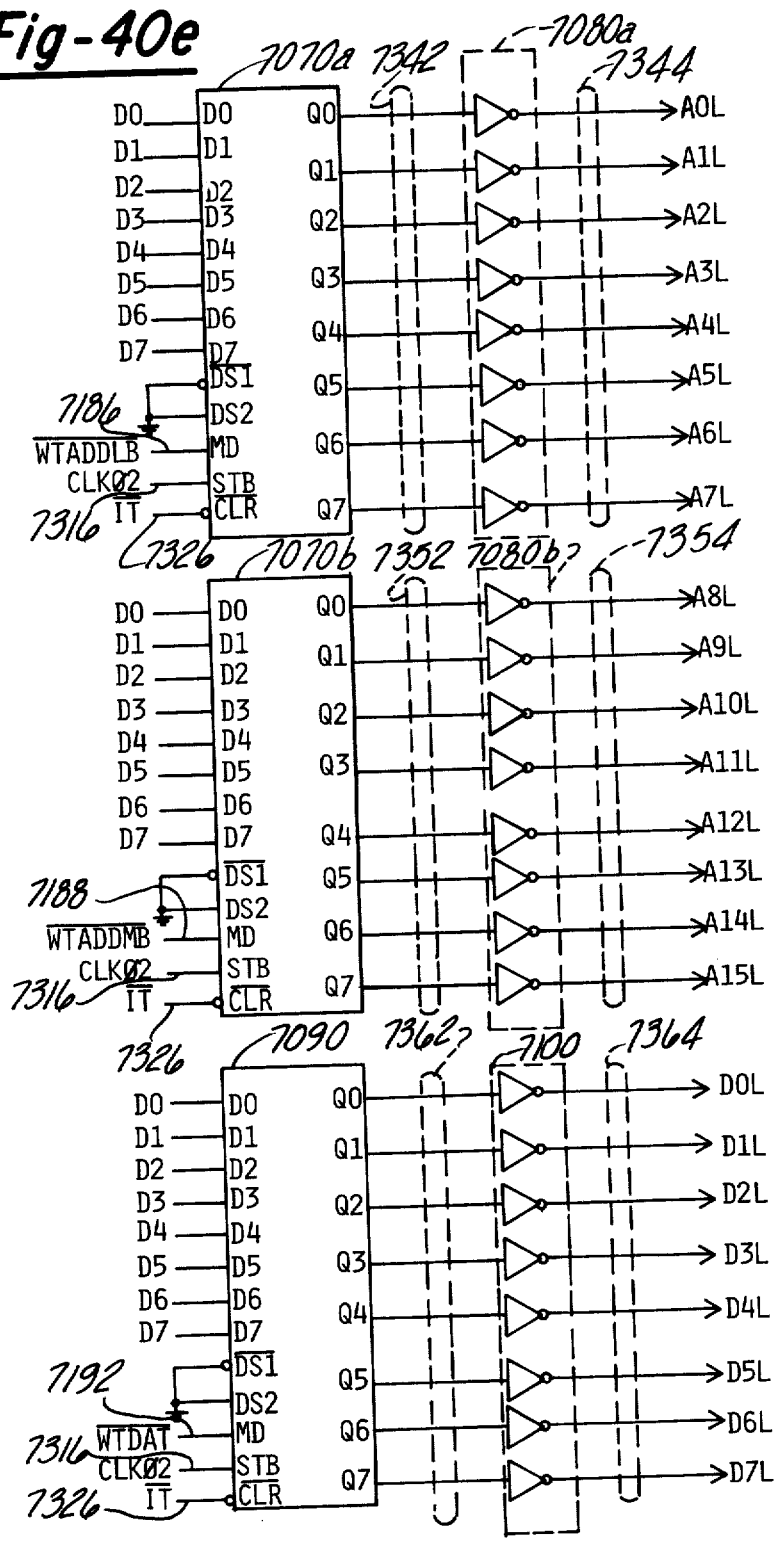

TFig. 43

TFig. 45

TFig.46

TFig. 47

TFig. 48

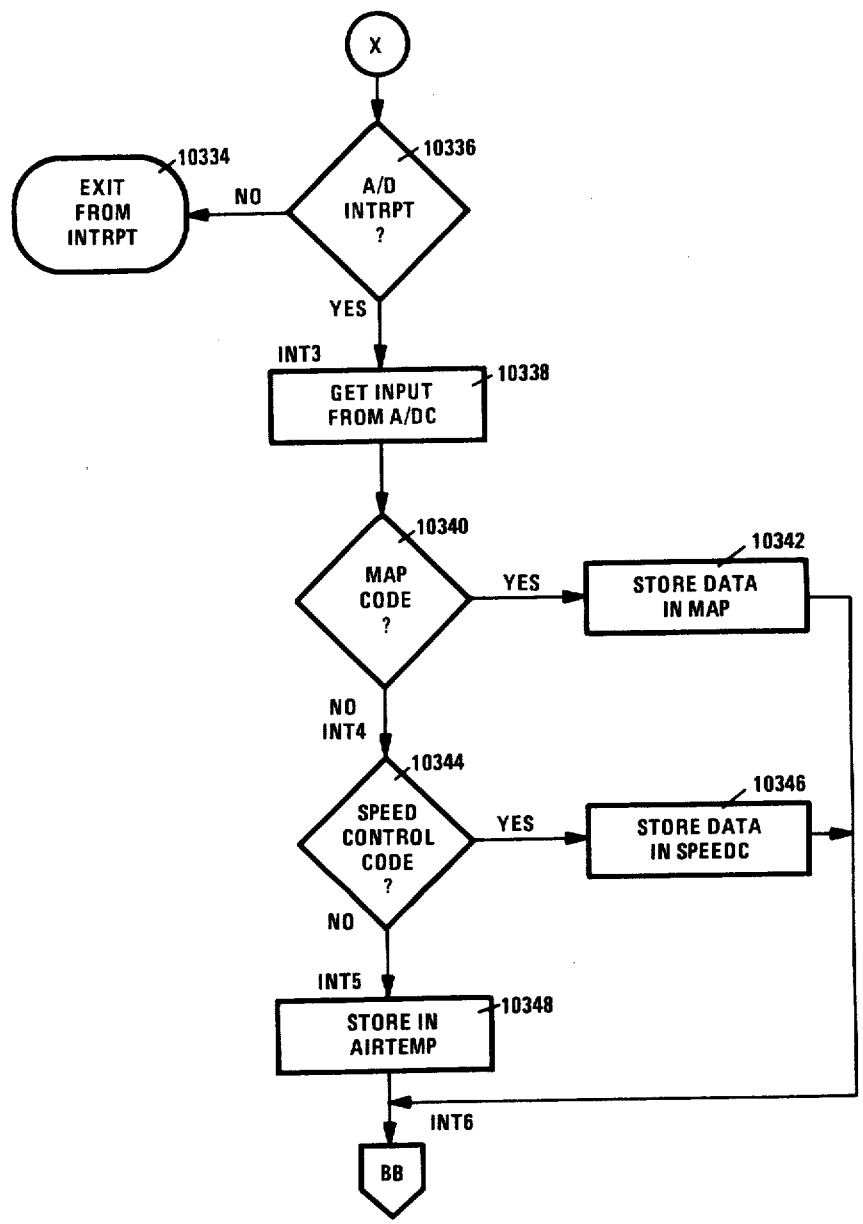
TFig. 52

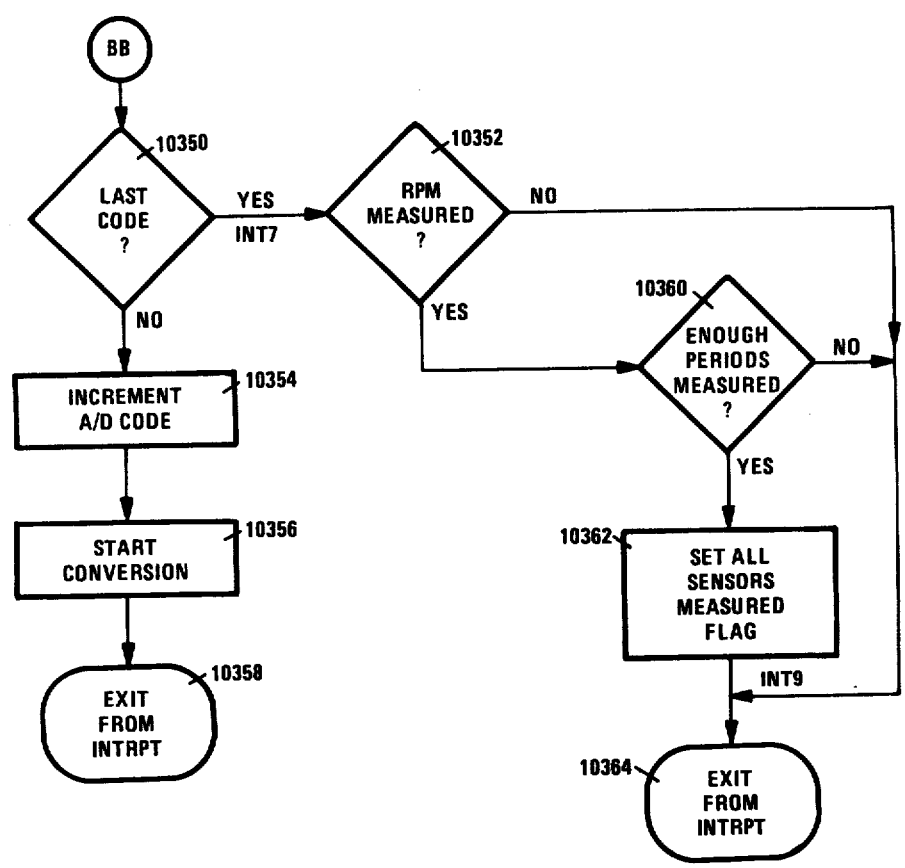
TFig.53

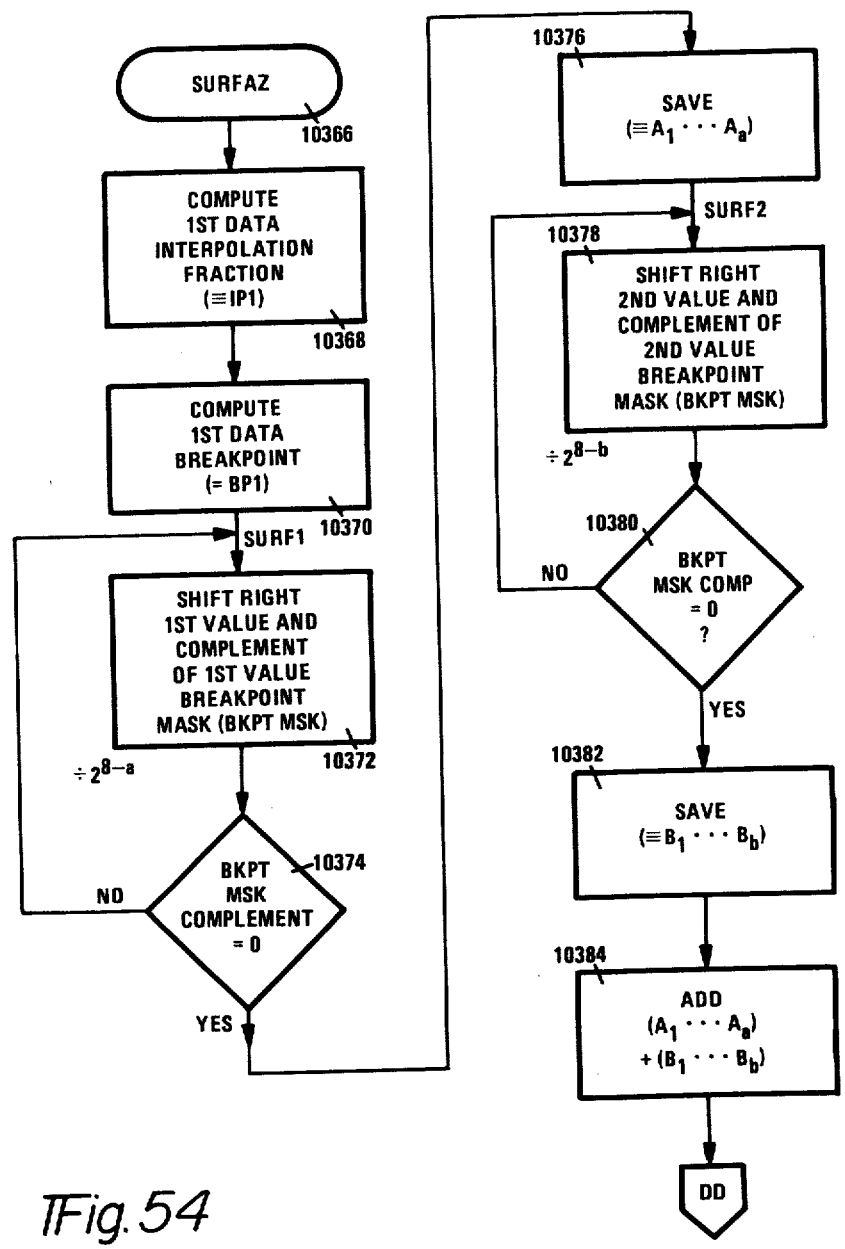
TFig.54

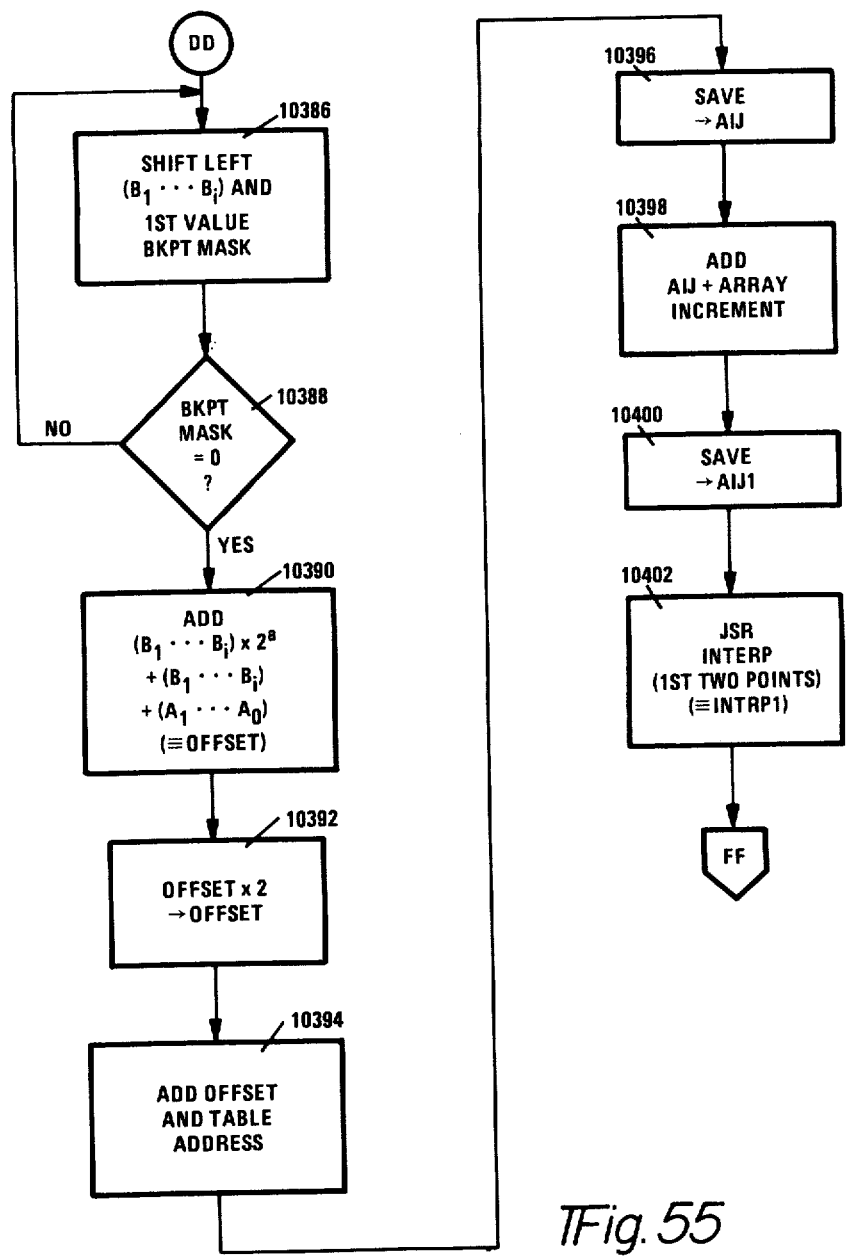
TFig.55

TFig. 57

PERCENT LOAD FROM SPEED CONTROL AND RPM

FUEL QUANTITY FROM MAD AND RPM

DEGREES ADVANCE FROM FUEL QUANTITY AND RPM

DEGREES ADVANCE FROM TEMPERATURE

ELECTRONIC FUEL INJECTION CONTROL SYSTEM FOR AN INTERNAL COMBUSTION ENGINE

TECHNICAL FIELD

This invention relates to electronic fuel injection (EFI) systems for internal combustion engines, and more particularly to an electronic control unit for such EFI systems. The electronic fuel injection system of the present invention is described with reference to a compression ignition engine, but certain features of the invention have general utility with both compression engines and spark ignition engines.

BACKGROUND ART

The current state of development of electronic fuel injection systems can be attributed to both regulatory and economic influences. The regulatory influences include the imposition of strict fuel economy and pollution control laws and regulations governing the performance of motor vehicles. The economic influences include the desire to develop a fuel injection system that will accomplish the specific objectives of providing optimal engine performance in terms of fuel efficiency and pollution control, and yet be commercially feasible for production manufacture.

The focus of the present disclosure is on direct-injection, compression-ignition engines of the type used in passenger, truck, agricultural and industrial applications. In a direct-injection, compression ignition engine the critical parameters in fuel injection control are injection timing and fuel metering. The optimal values for these parameters can be affected by a number of different engine operating conditions. It is important that each significant engine operating condition that affects either of the critical parameters of injection timing or fuel quantity be measured and accounted for in controlling fuel injection.

The known existing systems for controlling fuel injection in a compression ignition engine have limitations that fall into either of two basic categories. First, such systems may be limited by the number of significant engine operating conditions to which they respond in controlling injection timing and fuel quantity. Secondly, such systems have otherwise been limited in their computational capability; i.e. by requiring that computations related to parameter values be performed in synchronism with the engine operating cycle, and thereby effectively tying the speed at which the computations can be performed to the instantaneous speed of the engine. A more specific description of each of these two categories of limitation is as follows.

The first category of limitation relates to the number and character of engine operating conditions that are used to control injection timing and fuel quantity. In mechanical fuel injection systems for compression engines, parameter values for injection advance and fuel quantity are conventionally derived on the basis of the actual engine speed and the commanded engine speed; i.e., the speed error. However, there are additional significant engine operating conditions that can materially affect these parameter values. Included among these other significant engine operating conditions are manifold air pressure, air temperature, and other variables associated with the hardware, notably the actual injectors.

The manifold air pressure and temperature determine the density of the air available for combustion in the cylinder. Air density affects directly the air-fuel (A/F) combustion ratio, and is therefore a significant factor in determining an upper limit on fuel quantity. If there is insufficient air in the cylinder to support combustion of the injected fuel, then unburned fuel will pass into the exhaust. This will adversely affect fuel economy and emissions control.

The cumulative or integral speed error is derived from the condition of the actual speed error over preceding error cycles. The cumulative speed error represents information that can be used to stabilize the steady state operation of the engine. It has proven to be particularly efficacious in stabilizing engine operation in a low speed range of 800-1000 RPM.

The injection timing can be influenced by both the quantity of fuel to be injected into the cylinder and the temperature of the air with which the injected fuel is mixed. The quantity of fuel is significant in that it will affect the timing and duration of combustion in the cylinder taken with reference to the top dead center (TDC) position. There is a predetermined angle following TDC for any given engine configuration at which it is optimal to have peak cylinder pressure to occur. It is therefore advantageous to control the timing of fuel injection as a function of the quantity of injected fuel to correlate peak cylinder pressure with the predetermined angle that corresponds to optimal power output.

For similar reasons, it is advantageous to control injection timing as a function of the temperature of the air in the cylinder. The air temperature will likewise influence the time at which combustion is initiated with reference to the TDC position. By controlling injection timing as a function of air temperature, peak cylinder pressure can be made to correspond with the angle after TDC which corresponds to maximum power output.

Another consideration in selecting the critical parameter of fuel quantity is the particular characteristics of the injector which is to inject the fuel into the cylinder. Each individual injector is a physical device that varies in performance within an acceptable range of tolerance. However, even small variations within the tolerated values can have a nonnegligible effect on fuel quantity. It is therefore desirable to have a capability to accommodate such variations in injector characteristics to make compensation in fuel quantity on the basis of these variations.

The second broad category of limitation that concerns existing fuel injection systems is computational capability. This concern is with limitation in adapting to changes in engine speed. If computations are performed in relation to engine speed or displacement, the time allowed for computations will vary depending on engine speed. Yet, it is important that sensing or measurement of engine operating condition values used in the computation of fuel injection parameter values be carried out on a regular schedule throughout the engine operating cycle. Therefore, the problem is identified as one of not unduly limiting the time for computing or otherwise processing parameter values, but on the other hand maintaining regularity or consistency in the sensing or measurement of engine operating condition values.

The present invention responds to the needs of providing expanded control capabilities in a flexible manner by the provision of an electronic fuel injection system for a compression ignition engine that meets the general objective of enhanced engine performance in terms of fuel efficiency and emissions control.

DISCLOSURE OF THE INVENTION

The present invention is an electronic fuel injection control system and associated method of operation for a compression ignition engine that incorporates a programmable, digital electronic control unit. The electronic control unit controls injection timing and fuel quantity as a function of several significant engine operating conditions. Although the invention is disclosed in conjunction with the compression ignition engine, certain precepts of the invention have broader applicability to internal combustion engines in general.

The responsibility for carrying out the control of injection timing and fuel quantity is accomplished by the electronic control unit. The electronic control unit responds to a plurality of signals, of both analog and digital origin, which represent significant engine operating conditions. The signal values representing the engine conditions are entered into a control law that relates the specific conditions with a corresponding set of specific critical parameters, i.e. injection advance and fuel quantity. The computations necessary to implement the control law are carried out within a programmable processing unit forming a central element of the electronic control unit. The values for injection advance and fuel quantity that result from the computations are stored in a read/write memory. These stored values are then retrieved by logic external to the programmable processing unit for use in controlling the actuation of the injectors on the engine.

The signal values representing the significant engine operating conditions are updated on a regular basis in synchronism with the engine operating cycle. These signal values representative of engine operating conditions are provided to the programmable processing unit by means of periodic interrupts which postpone normal processing activities to initiate routines which receive the signal values and place them in read/write memory. The computations which implement the control law and determine the critical parameters of the injection timing and fuel quantity as a function of the several engine operating conditions are, however, executed asynchronously with the engine operating cycle. The programmable processing unit carries out the computations and places the results in read/write memory. The computed values stored in memory are then retrieved by external logic in a direct memory access (DMA) operation that halts the activities of the programmable processing unit. The scheduling of DMA operation is in synchronism with the engine cycle. The use of a DMA operation is efficient in terms of time and without limitation on the freedom of the programmable processing unit to perform its computations asynchronously with the engine cycle.

The several engine operating conditions that are used to control injection timing and fuel quantity include: actual engine speed, commanded engine speed, integral or cumulative speed error, manifold air pressure and manifold air temperature. The portion of the control law specifically directed to a fuel quantity relates actual engine speed, commanded engine speed, integral speed error, manifold air pressure and manifold air temperature. The other specific portion of the control law that governs injection timing relates actual engine speed, fuel quantity, and air temperature.

The invention also includes as another feature the capability to compensate for non-uniform characteristics of each individual injector and cylinder. For example, each injector may have certain identifiable characteristics that vary within a permissible range of tolerances, e.g. fuel leakage. These variations, although tolerated, can produce a non-negligible effect in varying the fuel quantity injected into the cylinder. Therefore, based on a priori knowledge of the characteristics of each individual injector and cylinder, compensation may be made within the computations carried out in a programmable processing unit. More factually, a table of injector trim values that represents the variations between the performance of actual injectors and an ideal injector may be stored in memory and used to adjust fuel quantity computations.

Another feature of the invention relates to the capability of the electronic control unit to service a dual solenoid injector. This form of injector generally has one solenoid to control fuel metering or quantity, and another solenoid to control injection timing. There is typically an internal chamber within the injector that is allowed to fill and store fuel under pressure upon actuation of the first solenoid. The internal chamber is vented by actuation of the second solenoid to permit the pressurized fuel in the chamber to be injected directly into the cylinder on which the injector is mounted. In actual operation of the injector, there is preferably a predetermined time delay between the end of metering and the start of injection to permit hydraulic transients to settle out.

The electronic fuel injection control system of the present invention includes other features and advantages which will be more fully appreciated by a reading of the following detailed description of a specific embodiment when considered in connection with the accompanying drawings.

BRIEF DESCRIPTION OF DRAWINGS

FIG. 2 is a corresponding block diagram representation of the environmental view of FIG. 1;

FIG. 7A-E are detailed schematic illustrations of the microprocessor board;

FIG. 9A-F are detailed schematic illustrations of the memory board;

FIG. 11 is a timing diagram which illustrates a typical sequence of signal levels through a read operation followed by a write operation on the memory board;

FIG. 12 is a generalized block diagram illustration of an A/D converter board of the electronic control unit;

FIGS. 13A-C are detailed schematic illustrations of the A/D converter board;

FIG. 18 is a timing diagram which illustrates the time duration of control signals and control states in the A/D state control circuit on the A/D converter board;

FIGS. 20A-H are detailed schematic illustrations of the input controller board;

FIGS. 31A-I are detailed schematic illustrations of one of the two virtually identical output controller boards;

FIGS. 40A-I are detailed schematic illustrations of the panel interface board;

FIGS. 41-57 are flow charts which are used to explain the operation of the system software;

BEST MODE FOR CARRYING OUT THE INVENTION

I. INTRODUCTION

Figure 1:
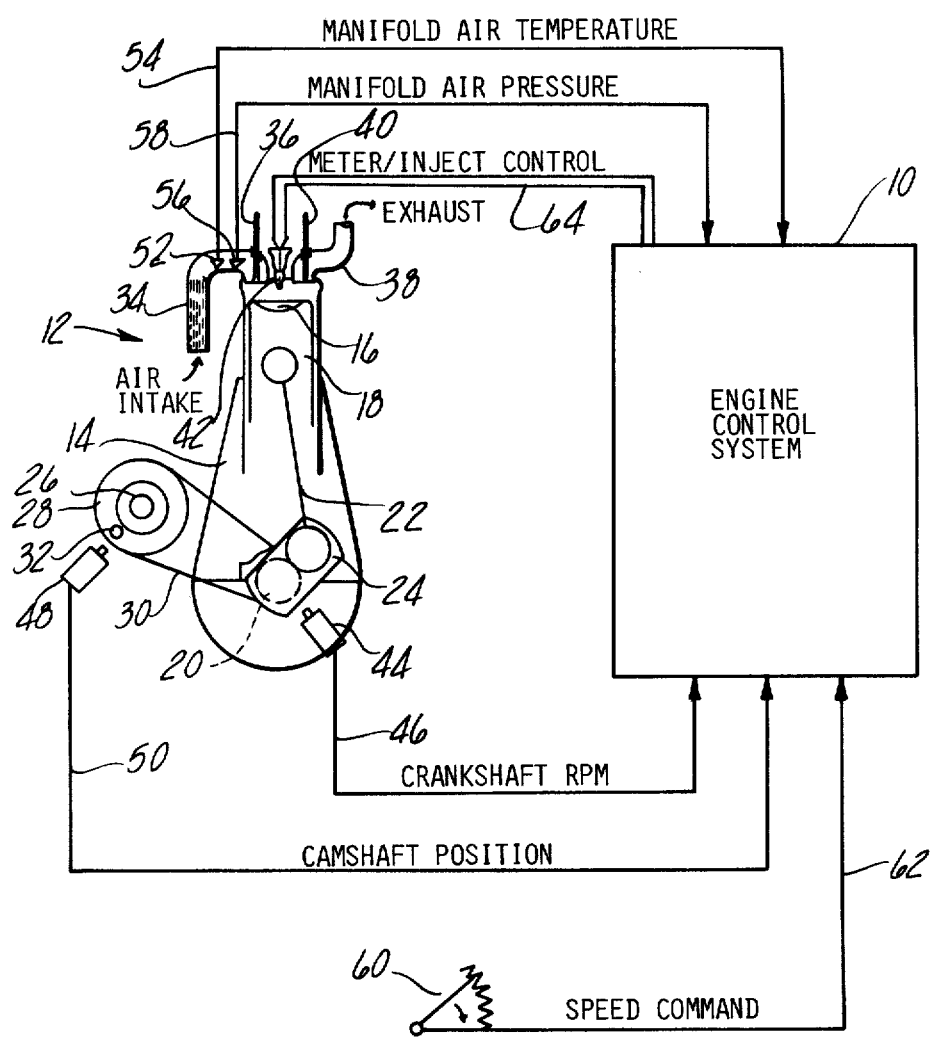
FIG. 1 is an environmental view illustrating a compression ignition engine equipped with the EFI control system of the present invention.

The electronic fuel injection (EFI) system of the present invention is based on a programmable, electronic control unit designed to control fuel quantity and injection timing as a function of several engine operating conditions. In practical terms, the programmable, electronic control unit is based on a microcomputer system which comprises a microprocessor and related peripheral elements, including memory components.

In general, the microprocessor will compute fuel quantity and injection timing or advance according to a control law stored in the microcomputer memory. The several engine operating conditions that are used to control fuel quantity and injection timing—actual engine speed, commanded engine speed, intake manifold air pressure, and air temperature—are monitored by the microcomputer through sensors mounted at various positions on the engine. The signals obtained from the sensors—of both analog and digital character—are used to obtain values for the independent variables in the control law. The results of computations implementing the control law are in the form of injection solenoid "on" and "off" times which control the quantity of fuel and the degree of injection advance.

The organization of the system description is as follows. First, a generalized system description is presented. This generalized description provides an overview of the present system at a functional level. It includes a description of the engine environment in which the system functions; a description of a block diagram representation of the engine environment; a description of a block diagram representation of the electronic control unit (ECU) which provides the control capability of the present system; a description of a graphical representation of the control law relating engine operating conditions to fuel quantity and injection timing; and a description of the timing considerations involved in controlling fuel injection.

Secondly, each constituent block of the block diagram representation of the ECU is further analyzed as a distinct sub-system. Alternatively stated, block diagrams for the system are presented on a hierarchal level with a generalized block diagram representation of the system first being described, and then a more detailed block diagram for each constituent block of the system block diagram being described secondly. The more detailed block diagram descriptions include, where appropriate, a state diagram and a timing diagram for the signals processed within each sub-system.

Each of the plurality of more detailed block diagrams of sub-systems is then described in full detail with respect to its hardware circuitry and signals. The detailed description of each sub-system will be done in a manner to maintain continuity with other related or interdependent sub-systems.

A description of the operation of the system will be accomplished by a detailed description of the system software. The system software is represented in the drawing by flowcharts. The flowcharts are presented at a level of detail commensurate with each significant step, computation, decision or other form of operation implemented by the software. The detailed description of the system software flowcharts will synthesize the detailed descriptions of each sub-system to provide a comprehensive understanding of the entire system.

A number of tables have been compiled and are appended to the detailed description. The tables provide qualitative and quantitative information as to signals, memory addresses and the like, and are helpful in identifying signals referred to within the detailed description of hardware circuitry as well as providing continuity between the detailed description of related sub-systems.

II. GENERALIZED SYSTEM DESCRIPTION

The engine environment in which the electronic fuel injection (EFI) system of the present invention operates is illustrated schematically in FIG. 1. The EFI system control logic and associated injector-driver circuitry are indicated generally at 10 in the block labeled Engine Control System.

A compression ignition (or diesel) engine is shown schematically at 12. The compression ignition engine 12 is of conventional design and includes an engine block 14 having a plurality of cylinders formed therein, as exemplified by the cylinder 16. A piston 18 is reciprocable within the cylinder 16. The piston 18 is connected in driving relation to a crankshaft 20. Specifically, the connection is effected by a rod 22 coupled to a crank 24 mounted on the crankshaft 20. In general, the rate at which the piston 18 reciprocates within the cylinder 16 is related directly to the angular velocity (or RPM) of the crankshaft 20.

A camshaft 26 is coupled to the crankshaft 20 and rotates in timed relation therewith. Specifically, the camshaft 26 has mounted on it a gear 26 that is connected to a gear (not shown) on the crankshaft 20 by means of a timing chain 30. The relative diameter of the crankshaft and camshaft pulleys are such that the camshaft normally rotates at one half the angular velocity of the crankshaft.

The compression ignition engine 12 includes an air intake manifold that branches off into a duct or line 34 for each of the cylinders. The control of air flow through the line 34 to the cylinder 16 is controlled by an intake valve 36. The intake valve 36 is of conventional design and operation and is mechanically actuated by a cam on the camshaft 26.

The engine 12 also includes an exhaust manifold having an exhaust duct or line 38 for each of the engine cylinders. The flow of engine exhaust from the cylinder 16 through the exhaust line 38 is controlled by an exhaust valve 40. The exhaust valve 40, similiar to the intake valve 36, is of conventional design and operation and is mechanically actuated by a cam on the camshaft 26.

An electromagnetic injector valve 42 is mounted on the head of the cylinder 16. The injector valve 42 when actuated injects a pulse or charge of fuel into the cylinder. The principal objective of the engine control system 10 is to control the time at which the injector valve 42 injects fuel and the quantity of fuel which it injects into each cylinder within an engine operating cycle. The injector valve 42 is preferably a dual solenoid injector of the type disclosed in the copending application entitled "Fuel Injector", of Edwin B. Watson, U.S. Ser. No. 869,875, filed Jan. 16, 1978, whose disclosure is herein incorporated in its entirety.

A dual solenoid injector valve, such as the injector valve 42, generally includes a first solenoid to control fuel quantity or metering, and a second solenoid to control injection timing. The first solenoid is actuated to permit pressurized fuel to enter into an internal chamber within the injector valve and then released to close off flow into the chamber. The second solenoid is subsequently actuated at the appropriate injection time to vent the internal chamber and permit the pressurized fuel contained therein to flow into the engine cylinder on which the injector valve is mounted.

A number of sensors or transducers are used to monitor the instantaneous values of certain engine operating conditions. These values are used as input data for computations to ascertain the actual fuel quantity and injection timing advance required for each engine cylinder. The computations are in practical terms an implementation of a control law that will hereinafter be described in greater detail.

The angular velocity of the crankshaft 20 (or engine RPM) is detected by a sensor 44 mounted in proximity to the engine crankshaft. A practical form of sensor 44 is a conventional magnetic pick-up, e.g. a Bendix EECSG type X1505-0296. The crankshaft 20 is encoded with a plurality of equally spaced marks over its circumference; nominally there are 360 marks, each spaced 1° apart to provide a pulse output from the sensor 44 for every 1° of crankshaft revolution. The degree pulses from the sensor 44 are communicated to the engine control system 10 on a signal line 46.

A sensor 48 is mounted in proximity to the camshaft pulley 28. The function of the sensor 48 is to derive an absolute engine position signal once for each cycle of the engine, i.e. in the present case one reference pulse per each 720° of crankshaft revolution. A practical form of sensor 48 is a conventional magnetic pick-up e.g. a Bendix EECSG type X1508-0478. The camshaft pulley 28 has a timing mark 32 on its surface that is sensed by the sensor 48 to produce an absolute engine position pulse once for each 360° of camshaft revolution. The absolute engine position reference pulse is communicated to the engine control system 10 on a signal line 50.

A temperature sensor 52 is mounted in the engine air intake manifold 34 to sense the temperature of the air in the manifold. A practical form of sensor 52 is a Dale Electronics SPR-890. This form of sensor has an electrical resistance that varies in proportion to air temperature. The temperature signal from the sensor 52 is communicated to the engine control system 10 on a signal line 54.

The air pressure within the engine air intake manifold is detected by a sensor 56. A practical form of sensor 56 is a quartz capacitive pressure sensor, e.g. of the type manufactured by Kavlico Corporation, Chatsworth CA, Series 604, "Low Cost Pressure Sensor". The manifold air pressure (MAP) signal produced by the sensor 56 is communicated to the engine control system 10 on a signal line 58.

An engine speed command from an operator is detected by sensing the engine throttle position with a sensor 60. A practical form of speed control sensor 60 is a potentiometer, e.g. a Bendix EECSG type B-1037. The signal produced by the speed control sensor 60 is communicated to the engine control system 10 on a signal line 62.

The output of the engine control system 10 is a pair of signals on the signal lines 64. One of the pair of signals controls fuel quantity or metering and is related to the actuation time of the first solenoid in a dual solenoid injector valve. The other of the pair of signals controls degrees of injection advance and is related to the actuation time of the second solenoid of a dual solenoid injector valve.

The engine environment illustrated schematically in FIG. 1, is represented in corresponding block diagram form in FIG. 2.

The engine control system 10 includes an electronic control unit (ECU) 100 and injector driver circuitry 200. The electronic control unit contains the hardware and software logic necessary to compute the parameters of fuel quantity and injection timing as a function of certain engine operating conditions. The injector driver circuitry 200 implements the signal information from the electronic control unit 100 relating to the parameters of fuel quantity and injection timing by producing energization signals of sufficient magnitude to actuate and deactuate fuel injectors. The fuel injectors are shown generally at 42a-f. In the present disclosure, it is assumed that the engine 12 of FIG. 1 includes six cylinders.

Each of the sensors that detects the value of an engine operating condition is shown in relation to the electronic control unit 100. More specifically, the manifold air pressure (MAP) sensor 56 communicates with the ECU 100 through the signal line 58. The air temperature sensor 52 communicates with the ECU 100 through the signal line 54. The speed command sensor 60 communicates with the ECU 100 through the signal line 62. The camshaft sensor 48 communicates with the ECU 100 through the signal line 50. The crankshaft sensor 44 communicates with the ECU unit through the signal line 46.

Figure 3L:
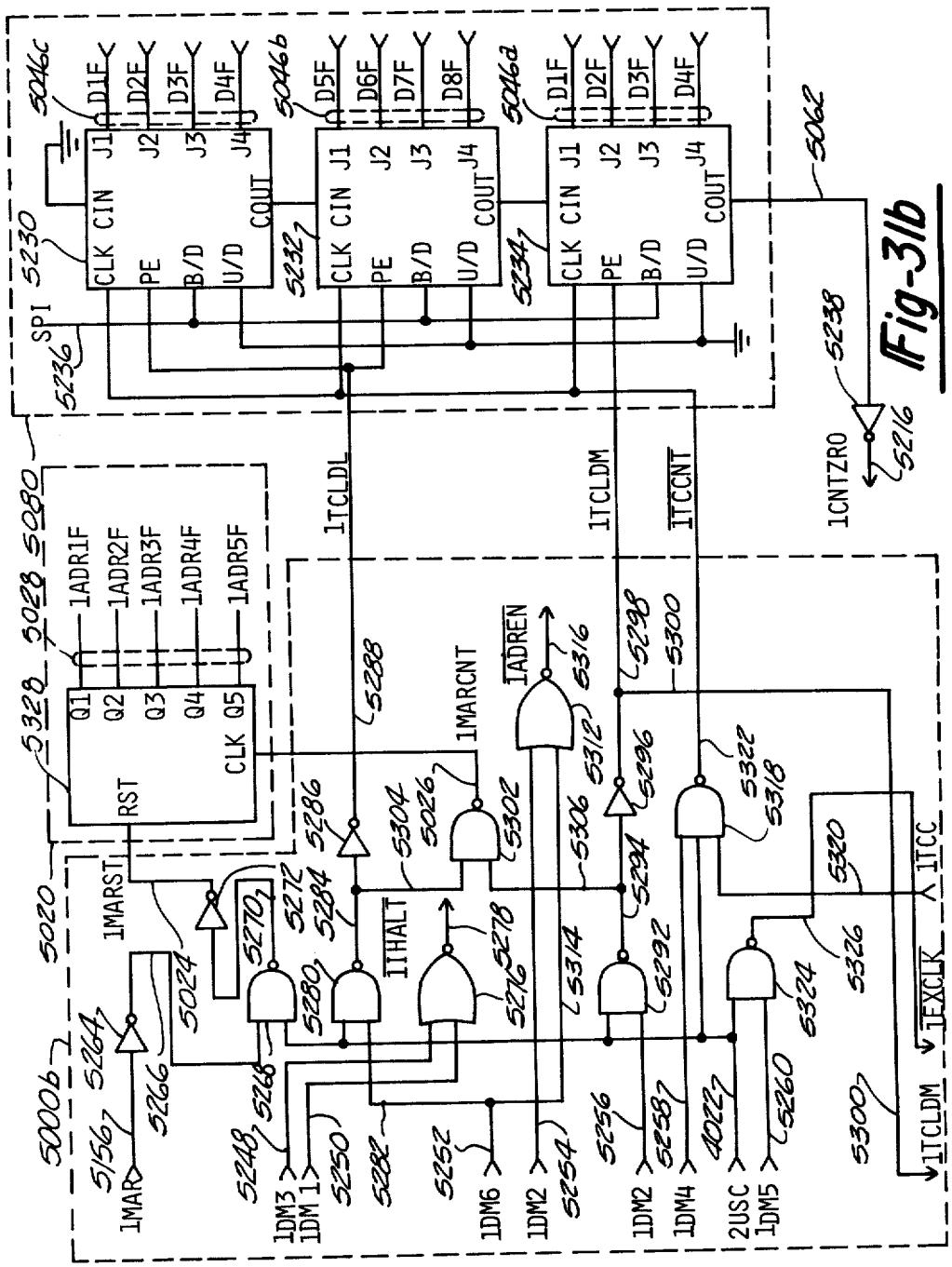
FIG. 3 is a generalized, block diagram illustration of the electronic control unit identified in FIG. 2.
Figure 3L:
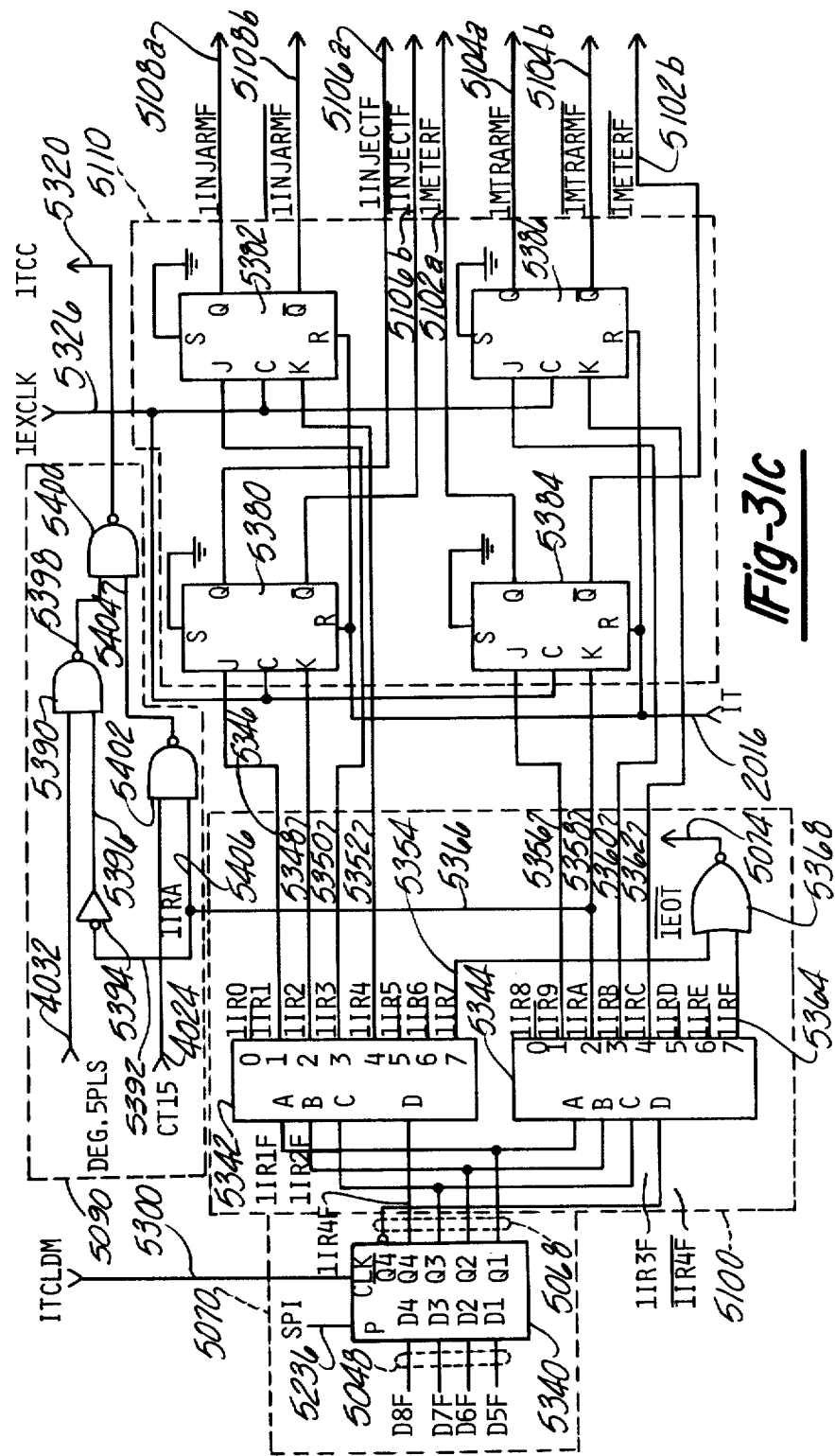

The architecture of the electronic control unit 100 is illustrated in modified block diagram form in FIG. 3. In the present disclosure, the ECU 100 is described as being formed of a number of discrete circuit boards with each circuit board being built of a number of discrete circuit elements, including large scale integrated circuit chips. This form of disclosure is for clarity of illustration and ease of explanation; it is not to be regarded as limiting the form in which the ECU 100 can be embodied.

The ECU 100 includes a microprocessor board 110. The microprocessor board 110 is the main control element in the ECU 100. It includes a programmable, microprocessing unit which has general responsibility for obtaining, processing and distributing signal information throughout the ECU.

A memory board 120 provides random access memory (RAM) capability for the microprocessor board 110. The memory board contains 2K (2048) bytes of random access storage.

An analog-to-digital (A/D) converter board 130 is provided to convert signal information from the analog sensors into a digital format useful with the microprocessor board 110. The analog sensors include the MAP sensor 56, the air temperature sensor 52 and the speed command sensor 60.

An input collector board 140 assumes general responsibility for the handling of signal information received by the ECU 100. It performs a number of specific functions including: synchronization of digital position sensors on the crankshaft and camshaft with the system clock; generation of metering and injection reference signals throughout each engine operating cycle; performing RPM measurement; and providing a pair of special clock signals as derived from a system clock signal.

A pair of complementary output controller boards 150a and b assume responsibility for the control of metering and injection signal information from the ECU 100 to the injector driver circuitry 200. The output controller board 150a has two controls 152 and 154. The control 152 is responsible for the metering signal information for injectors nos. 1 and 6. The controller 154 is responsible for the metering signals for injectors nos. 2 and 5. The output controller board 150b likewise has two controls 156 and 158. The control 156 is responsible for the metering signals for injectors nos. 3 and 4. The controller 158 is responsible for the injection signals for injectors nos. 1-6.

A digital input/output (I/O) buffer board 160 is provided for a number of functions, including: buffering input signals from the digital sensors; decoding the output signals from the input control board 140 and the output control board 150a and b; and providing signals for the injector drivers 200.

A panel interface board 180 provides a buffer between an operator control panel 170 and the rest of the ECU boards. The control panel 170 provides a means for an operator to monitor the operation of the ECU 100. More particularly, it allows an operator to select off-line or on-line mode control over the operation of the ECU 100. In an off-line mode, the operator can monitor the activities of the ECU 100 through diagnostic routines that provide information along with a display of information on the control panel 170. In an on-line mode, the operator can select either manual or automated control over fuel quantity and injection timing. In normal operation, the ECU 100 will operate in the on-line, automated mode.

The circuit boards 110, 120, 130, 140, 150a and 150b, and 180 all communicate signal information among one another through a common system bus 190.

In broad language, the basic function of the ECU 100 is to implement a control law that relates fuel quantity and injection timing for a given cylinder to the current values of a plurality of engine operating conditions. The control law is represented graphically in FIG. 4.

Figure 4:
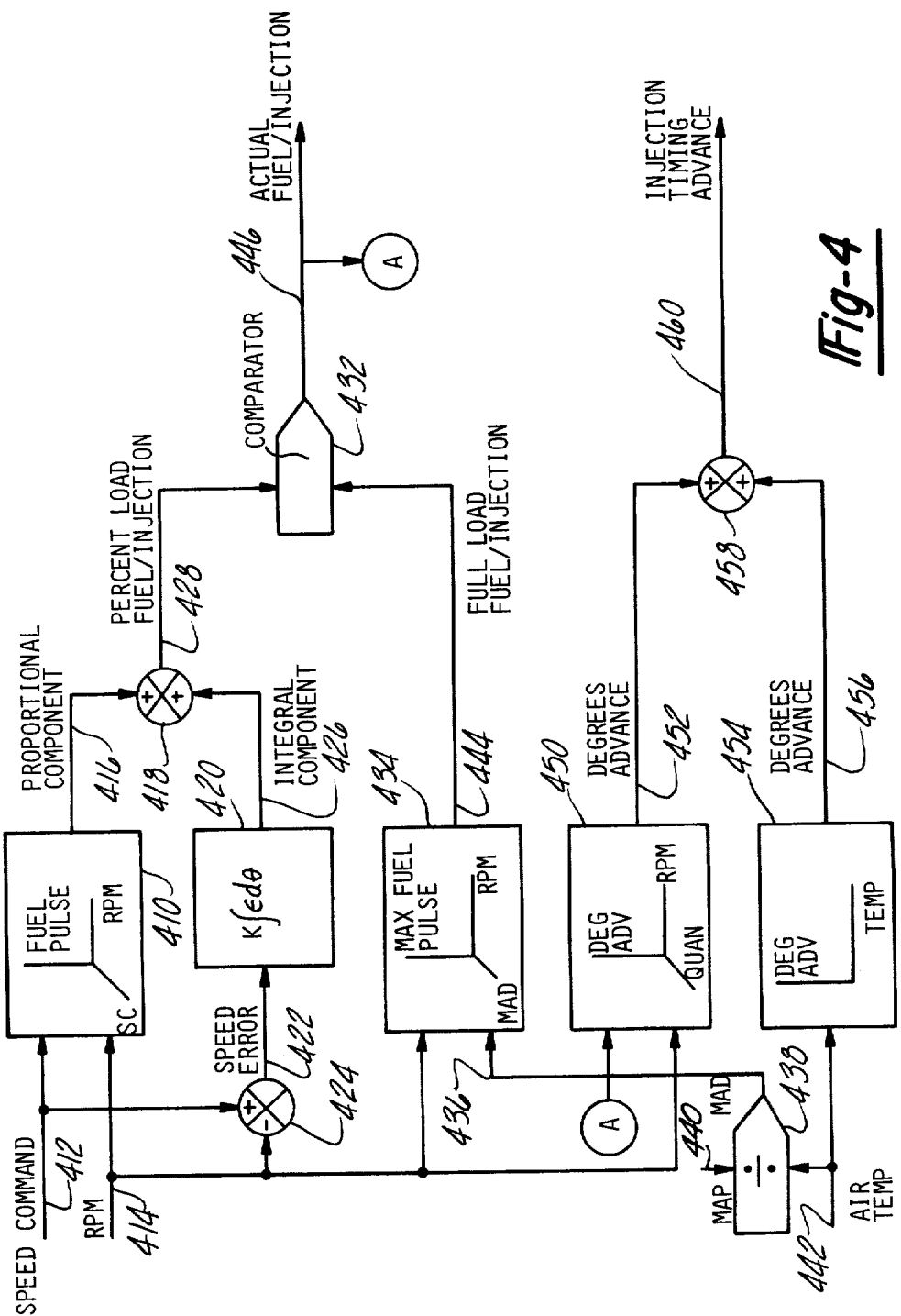
FIG. 4 is a graphic embodiment of the control law implemented by the electronic control unit for control of fuel quantity and injection timing.

In FIG. 4, the control law is shown in two interrelated parts. A first part relates to computation of an actual fuel quantity. The second part relates to computation of an injection advance, and uses the result of the computation in the first part as one input parameter.

In overview, the fuel quantity computation is based on a comparison of a percent-load fuel quantity requirement to a full-load fuel quantity requirement. The comparison uses the full-load fuel quantity requirement as a maximum permissible fuel quantity as based on the current values of certain engine operating conditions. Alternatively stated, if the percent-load fuel quantity requirement is less than or equal to the full-load fuel quantity requirement, the former will be used as the actual fuel quantity. The full-load fuel quantity requirement will only be used when the computations from the percent-load fuel quantity requirement yield a result exceeding the full-load fuel quantity requirement.

The percent-load fuel quantity requirement has a proportional component and an integral component. The computation of the proportional component is modeled by the block 410 illustrating a three-dimensional surface. The signal inputs to the proportional component block 410 are speed command 412 and actual engine speed or RPM 414. The proportional component of percent-load fuel quantity requirement is computed by interpolating a three-dimensional surface illustrated schematically within the proportional component 410. The independent axes of the surface are RPM and speed command. The dependent axis is the proportional component of the percent-load fuel quantity.

The proportional component of the percent-load fuel quantity requirement corresponds to the amount of fuel needed to bring the actual engine speed into agreement with the commanded engine speed, i.e. its magnitude is related to the instantaneous value of speed error. Its value or magnitude at any given time is directly affected by ever-present inertial effects, such as friction and the like, and is indirectly affected by dynamic effects, such as changes in load. At steady-state operating conditions the proportional component will converge toward zero as the speed error tends toward zero.

The percent-load fuel quantity requirement also includes an integral component as indicated by the block 420. The integral component is computed using speed error 422. The speed error 422 is defined as the difference between the current values of the speed command signal 412 and the RPM signal 414. The derivation of the speed error 422 from the speed command 412 and the RPM 414 is represented by the summing junction 424.

The integral component 426 of the percent-load fuel quantity requirement is computed by summing the speed error over preceding engine cycles and scaling the sum by a factor k. At steady state engine operating conditions with a constant speed command 412 and constant engine load, the integral component 426 will converge toward a constant, non-zero value related directly to the steady state load.

Under dynamic operating conditions, with either a change in speed command 412 or engine load, or both, the proportional component will respond directly to such change to act to bring the actual engine speed or RPM 414 into agreement with the commanded engine speed 412. The integral component will change more slowly and supplement the proportional component in minimizing speed error.

Accordingly, the percent-load fuel quantity requirement 428 is obtained by summing the proportional component 416 and the integral component 426 as represented by the summing junction 418.

A full load fuel quantity requirement is computed in block 434 to provide a maximum permissible limit on the percent-load fuel quantity requirement 428. This maximum permissible limit imposes a limitation on vehicle emissions by controlling the quantity of fuel injected into the cylinder in relation to the ability of the engine to properly combust the fuel, notwithstanding a relatively large speed error 422 and a correspondingly large percent-load fuel quantity requirement 428. The full load fuel quantity requirement is proportionately related to the amount of fuel required by the engine under a full load condition at the current RPM. A method for ascertaining the full load fuel quantity requirement is described in E. F. Obert, *Internal Combustion Engines and Air Pollution*, 1973, Intext Educational Publishers, New York, N.Y. 10019, at Sec. 2-21, 22, pp. 52–4. The signal information used to compute the full load fuel quantity requirement includes the actual engine speed or RPM 414 and the manifold air density 436.

The manifold air density 436 is computed as a function of manifold air pressure 440 and air temperature 442 in accordance with the ideal gas law, $PV=nRT$. More specifically, a division of manifold air pressure 440 by manifold air temperature 442 is carried out to obtain the manifold air density 436. The division is represented by the operator block 438.

A full-load fuel quantity requirement is computed by a surface interpolation as indicated schematically by the block 434. More specifically, the independent axes of the surface are RPM 414 and manifold air density 436. The dependent axis is the full-load fuel quantity requirement 444.

A comparator 432 receives as one input signal the percent-load fuel quantity requirement 428, and as another input signal the full-load fuel quantity requirement 444. Normally, the percent-load fuel quantity requirement 428 will be used as an actual fuel quantity requirement 446, unless it exceeds the full-load fuel quantity requirement 444. In such case, the full-load fuel quantity requirement 444 is used as the actual fuel quantity requirement 446. The actual fuel quantity 446 as thus derived is used as a base value that may be trimmed by a software-implemented fuel trimming routine (to be hereinafter described) that compensates for non-uniformities among the injector valves and cylinder.

The other part of the control law is directed to the computation of injection advance. The actual injection timing advance is the sum of the result of two separate computations, each of which is described as follows with reference to FIG. 4.

A first injection advance is computed in the block 450. The block 450 receives as its input signals the actual fuel quantity 446 (via connectors A) as computed in the first part of the control law and the actual engine speed or RPM 414. A first quantity of degrees advance 452 is computed by interpolating a three-dimensional surface. The independent axes of the surface are actual fuel quantity 446 and engine RPM 414. The dependent axis is the first quantity of degrees advance 452.

The first quantity of degrees advance 452 is computed to compensate for effects in cylinder combustion characteristics which are caused by the quantity of fuel in the cylinder and the actual engine speed. The combustion characteristics will determine at what angular position past top dead center (TDC) peak pressure will occur in the cylinder. For any given engine configuration, there is some optimal angle past top dead center at which peak cylinder pressure will yield maximum power output from the engine. It is therefore necessary to adjust injection timing advance as a function of fuel quantity and actual engine speed to maintain constant the peak pressure angle.

A second fuel injection advance is computed in block 454. The input signal to the block 454 is air temperature 442. The second injection timing advance 456 is computed by interpolating a curve. The independent axis of the curve is air temperature and the dependent axis of the curve is the second quantity of injection timing advance.

The second quantity of injection timing advance 456 is computed for basically the same reason as the first quantity of fuel injection advance 452. More specifically, the cylinder combustion characteristics are also affected by the temperature of the air in the cylinder. A relatively cool air temperature will delay combustion. It is therefore advantageous to compensate for changes in combustion timing caused by air temperature to maintain peak cylinder pressure at the optimal angular position past TDC.

A total injection timing advance 460 is obtained by summing the first quantity of injection timing advance 452 with the second quantity of injection timing advance 456 as represented by the summing junction 458. However, in certain applications the second quantity of fuel injection advance 456 will not be used once the engine is warmed up. Generally, the air temperature is of concern primarily when the engine is being started, and once the engine reaches a predetermined level of RPM the air temperature will stabilize within a limited range of values and the second quantity of injection timing advance 456 may be assumed to have minimal influence on cylinder combustion characteristics.

Figure 5:
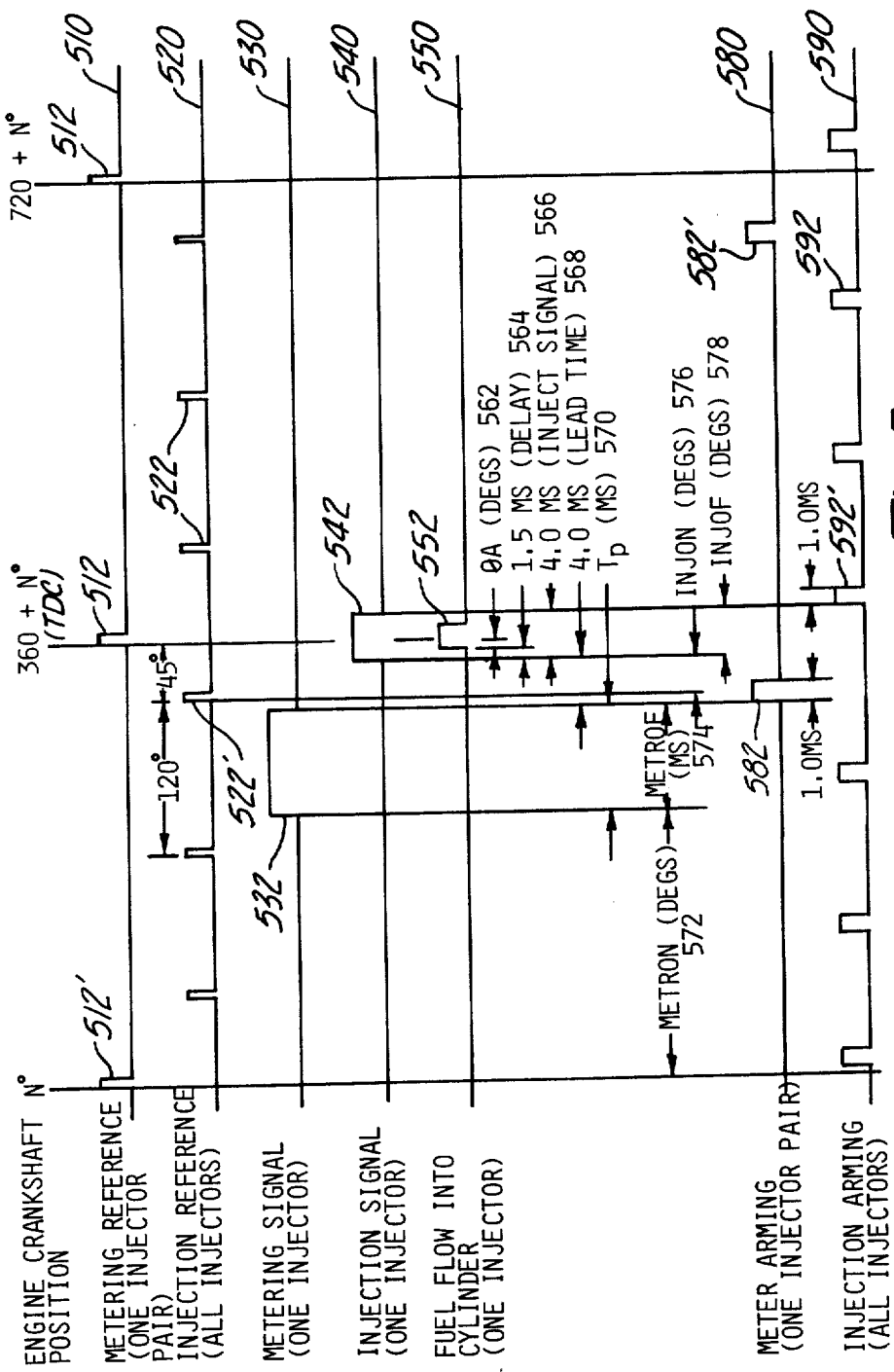
FIG. 5 is a timing diagram which illustrates the timing considerations involved in the control of fuel quantity and injection timing for one cylinder of the compression ignition engine of FIG. 1.

FIG. 5 is a timing diagram that illustrates the timing considerations involved in the control of fuel quantity and injection timing for one cylinder. The timing diagram assumes the ECU 100 of FIG. 3 will be used to control a six-cylinder compression ignition engine. The signals used in the timing diagram are derived from both hardware and software, and the manner in which they are derived or computed will be hereinafter more fully described in connection with the detailed description of the system hardware and software.

With reference to line 510 of the timing diagram, a metering reference signal 512 is generated for each pair of injectors. The injectors are paired in the manner illustrated in the description of the output control boards 150a and b of FIG. 3. The metering reference signal 512 for an injector pair occurs every 360° of crankshaft revolution and is keyed to the top dead center (TDC) position of the piston in the cylinder.

With reference to line 520, an injection reference signal 522 occurs every 120° of crankshaft revolution. The injection reference signals 522 are offset from the metering reference signal 512 by an advance of 45°. The scheduling of fuel injection is taken with respect to the injection reference signal 522. The sequence of injection reference signals 522 appearing on line 520 applies to all injectors. The digital I/O board 160 of FIG. 3 includes a demultiplexer to correlate the occurrence of an injection reference signal with a specific injector based on camshaft position.

With reference to line 530, a metering signal 532 for one injector is shown. The metering signal 532 is controlled with respect to the occurrence of the metering reference signal 512' occurring at engine crankshaft position N°. The first or metering solenoid of the dual solenoid injector 42 of FIG. 1 will be energized for the time duration of metering signal 532.

With reference to line 540, an injection signal 542 for the same one injector is shown. The injection signal 542 logically follows the metering signal 532, and is controlled with reference to the injection reference signal 522'. The second or inject solenoid of injector 42 of FIG. 1 will be energized for the time duration of the injection signal 542.

With reference to line 550, a fuel flow curve 552 indicates the actual time or degree interval within the injection signal 542 during which fuel flows into the cylinder to which it is being injected.

The timing and engine angular displacement considerations that relate the occurrence of the metering reference signal 512' to the metering signal 532 and the injection reference signal 522' to the injection signal 542 and fuel flow signal 552 are indicated by the time and degree quantities 562-578. A description of each individual time and degree quantity 562-578 is as follows.

The width in degrees of the metering signal 532 is determined by pair of signals computed by the ECU 100. More specifically, a degree displacement METRON 572 defines the angular displacement between the leading edge of the metering reference signal 512' and the leading edge of the metering signal 532. The time duration between the leading edge of the metering signal 532 and its trailing edge is defined by a time quantity METROF 574. The quantity METROF 574 is identical with a fuel pulse $T_P$ 570.

The degrees of displacement between the leading edge of the injection reference signal 522' and the leading edge of the injection signal 542 is defined by the quantity INJON 576. The displacement in degrees between the leading edge of the injection signal 542 and its trailing edge is defined by the quantity INJOF 578. The injection signal 542 has a constant time duration of 4.0 msec as indicated by the time quantity 566.

There is always provided a constant 4.0 msec delay between the end of metering and the start of fuel injection as indicated by the lead time quantity 568. This constant delay is sufficient to allow any hydraulic transient to die out, yet, because it is constant, it will result in a constant leakage which can be calibrated out in the ECU 100.

The degree quantity 562 and the time quantity 564 explains the relationship between the injection signal 542 and the fuel flow signal 552. The degree quantity 562 is the total injection advance $\theta$ obtained from the injection timing advance computations of the control law of FIG. 4. The time quantity 564 is a constant 1.5 msec delay that is emperically determined as the nominal response time between solenoid energization and actual flow of fuel into the cylinder. The time quantity 564 is not obtained from the computations of the control law, but is an offset based on the typical physical characteristics of all injectors.

With reference to line 580, a meter arming signal 582 occurs each 360° of engine crankshaft revolution. The meter arming signal 582 is used to arm a voltage boosting circuit used in the injector driver circuitry 200. The meter arming signal 582' is used to arm the voltage boosting circuit that operates in conjunction with the output controller that produces the metering signal 532 just described. Each meter arming signal has a minimum time duration of 1.0 msec to allow for energy build-up in the voltage boosting circuit, followed by a minimum delay of 0.5 msec to allow for energy transfer from the voltage boosting circuit.

With reference to line 590, an injection arming signal occurs each 120° of engine crankshaft revolution. The injection arming signal 592' follows the injection signal 542 to arm the voltage boosting circuit in the injector driver circuitry 200 used by the output controller 158. Each injection arming signal has a minimum time duration of 1.0 msec, followed by a minimum delay of 0.5 msec.

Although the timing considerations of FIG. 5 apply to a dual-solenoid injector valve, the modifications necessary to adapt to a single solenoid injector valve are straightforward. In such a case, the injection signal 566 and the 4.0 msec lead time 568 would be dropped and injection would automatically start at the end of metering.

III-DETAILED DESCRIPTION OF THE SYSTEM HARDWARE a. The Microprocessor Board

The microprocessor board 110 provides central control over the functioning of the ECU 100. The microprocessor board 110 is illustrated in block diagram form in FIG. 6 and in detailed schematic form in FIGS. 7A-E.

Figure 6:
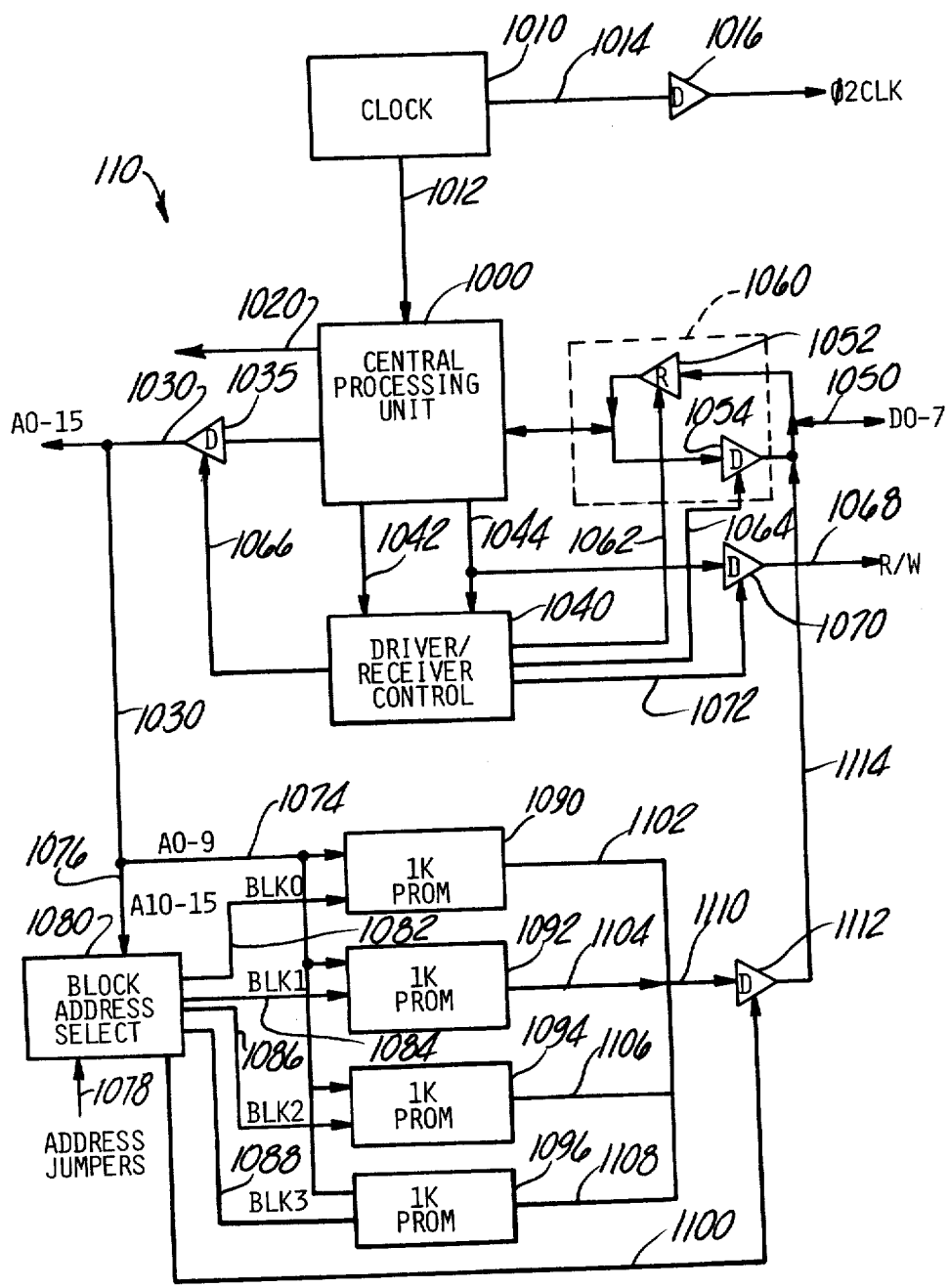
FIG. 6 is a generalized block diagram illustration of the microprocessor board of the electronic control unit.

With reference to FIG. 6, the microprocessor board 110 includes a central processing unit (CPU) 1000. The CPU 1000 is a programmable, general purpose logic element that operates under control of the system software.

The CPU 1000 has a clock terminal that receives a pair of complementary NMOS clock signals on lines 1012 from a clock 1010. The clock 1010 also has another output line 1014 on which is carried a TTL level clock signal ∅2. The clock output line 1014 is applied to a driver 1016 which amplifies the clock signal ∅2 to a level sufficient for use with external logic.

The CPU 1000 has a conventional bus system. A control bus is shown as three sub-sets of control lines 1020, 1042, and 1044. The control bus sub-set 1020 carries signals relating generally to interruption and resetting of the CPU 1000. The bus subsets 1042 and 1044 generally contain signal information relating to communications with devices external to the CPU.

A sixteen-bit address bus is indicated generally at 1030. The address bus 1030 includes a tri-state driver 1035.

An eight-bit data bus is indicated generally at 1050. The data bus 1050 is bidirectional and can both transmit and receive signal information, and includes a transceiver, generally indicated at 1060.

The conditions of the tri-state driver 1035 and the transceiver 1060 are controlled by a driver/receiver control 1040. The general functions of the driver/receiver control 1040 are twofold. Its first function is to enable the address bus 1030 and data bus 1050 for communications between the CPU 1000 and external logic when the CPU authorizes such communications; and its second function is to disable the address bus and the data bus when operations by external logic require use of these two buses without interference from the CPU. The driver/receiver control 1040 receives as input the signals in the control bus sub-sets 1042 and 1044 and outputs a control signal on line 1066 that controls the conditions of the tri-state driver 1035. A pair of control signals are also output on lines 1062 and 1064 to control the conditions of a receiver 1052 and a driver 1054, respectively in the data bus transceiver 1060. The driver/receiver control 1040 outputs another signal on line 1072 to control the condition of a tristate driver 1070 that drives the read/write signal line 1068.

The microprocessor board 110 also includes memory capability in the form of a group of 1K PROM chips and chip select logic. More specifically, the memory capability includes four-1K chips of PROM 1090, 1092, 1094 and 1096, and block address select logic 1080 that selects which of the PROM chips is to be used on the basis of information contained in the six high order bits 1076 of the address bus 1030.

The block address select logic 1080 receives as input the six high order bits 1076 of the address bus 1030. It also receives address jumpers on lines 1078. The function of the block address select logic 1080 is to decode the six high order address bits 1076 and produce a block select signal that will enable one of the PROM chips 1090-1096.

The ten low order bits 1074 of the address bus 1030 are provided as input to each of the 1K PROM chips 1090-1096. The other input to each of the PROM chips 1090-1096 is a chip select line 1082-1088, respectively, that controls selection of a chip on the basis of the six high order address bits 1076.

The data outputs of the PROM chips 1090-1096 are carried on respective lines 1102-1108 which combine in a common group of lines 1110. A tri-state driver 1112 receives as input the common lines 1110. The condition of the tri-state driver 1112 is controlled by a control signal on the line 1100 that is output from the block address select logic 1080. The output of the driver 1112 is carried on line 1114 which connects to the data bus 1050.

The microprocessor board 110 as illustrated in block diagram form in FIG. 6 and described in connection therewith, is illustrated in detailed schematic form in FIGS. 7A-E to which reference is now made.

Figure 7A:
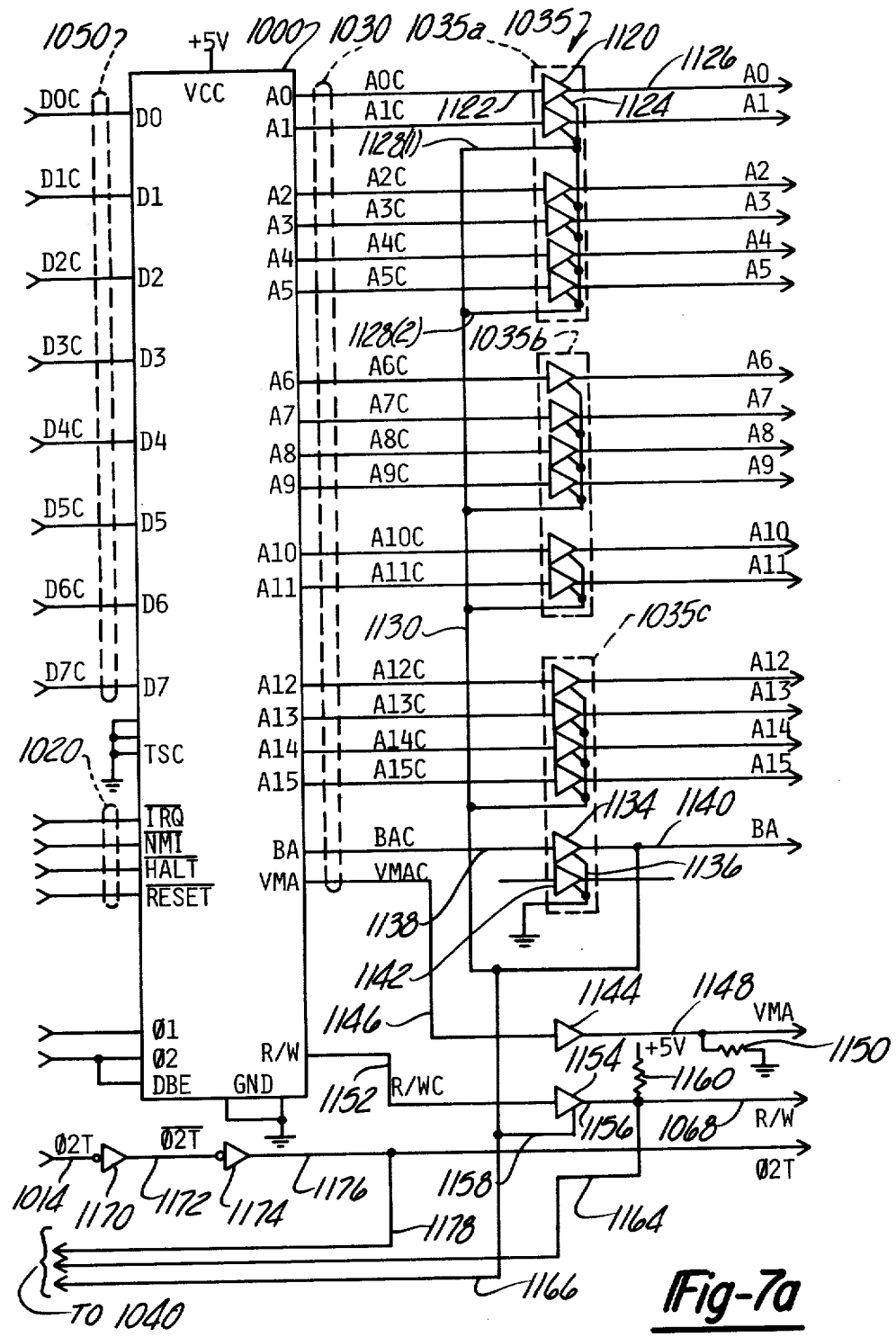

With particular reference to FIG. 7A, the CPU 1000 is preferably implemented as a microprocessor. A practical form of microprocessor for this application is a Motorola MC6800 MPU, manufactured by Motorola Incorporated, Semiconductors Products Division, 3501 Ed Bluestein Boulevard, Austin, Texas 78721. The MC6800 is fully documented in the publications *Motorola MC6800 Microcomputer System Design Data Manual*, and *Microprocessor Applications Manual*, both by Motorola Semiconductor Products, Inc., the disclosures of which are herein incorporated by reference.

A description of each of the terminals on the CPU 1000 is as follows. A terminal VCC is an input terminal that receives power from a nominal +5 volt source, which, for example, may be of the type manufactured by Power/Mate Corp., 514 River Street, Hackensack, N.J., 07601.

The terminals D0-D7 are bidirectional I/O data terminals that connect to the data bus 1050.

The terminals A0-A15 are output terminals that connect directly to the address bus 1030.

The terminal TSC is a tri-state control input terminal, which, in the present application, is not used and tied to ground with two other unused terminals.

The TSC terminal is used to float the address bus and the read/write control output (to be described presently) when the input signal to this terminal is high.

The terminal IRQ/ (the virgule character being hereinafter used to designate the inverted or complementary use or condition of a signal) is an interrupt request input terminal. The IRQ/ terminal is used to request an interrupt of normal CPU operation and execution of an interrupt routine. If interrupts have been enabled and the CPU 1000 is not in a halt state, then it will acknowledge an interrupt request at the end of the currently executing instruction.

The terminal NMI/ is a non-maskable interrupt input terminal. The NMI/ terminal differs from the IRQ/ terminal in that it cannot be inhibited. Typically, this terminal is used for catastrophic interrupts such as power failure.

The HALT/ terminal is a halt input terminal. When the HALT/ terminal receives a logically low input signal, it will terminate execution of the CPU 1000 and float the data bus 1050 and the address bus 1030.

The RESET/ terminal is a reset input terminal. During normal execution of the CPU 1000, the signal applied to this terminal is at a logically high level. However, when the applied signal falls to a logically low level, the CPU 1000 is reset.

The terminals ∅1 and ∅2 are clock signal input terminals. These terminals receive complementary NMOS clock signals ∅1 and ∅2 from an external clock to be hereinafter described more fully.

The terminal DBE is a data bus enable input terminal. When the signal applied to this input is logically low, the data bus 1050 will be floated. In the present application, the DBE terminal is tied to ∅2 clock terminal, in which case ∅2 and DBE are identical.

The terminal BA is a bus available output terminal. The signal value on this line is logically high when the data bus 1050 and the address bus 1030 have been floated following a processor halt. When the signal on the BA terminal is low, the CPU 1000 is in communication with the data bus 1050 and the address bus 1030.

The VMA terminal is a valid memory address output terminal. The signal value on this terminal is logically high whenever a valid address has been output on the address bus 1030.

The R/W terminal is a read/write output terminal. When the signal value on this terminal is logically high, it indicates that the CPU 1000 wishes to read data off the data bus 1030; when logically low, it indicates that the CPU is outputting data onto the data bus. The normal standby state for this signal is "read" (high).

A pair of ground terminals are tied to the system ground in a conventional manner.

An address bus driver, generally indicated at 1035, is provided to float the address terminals A0-A15 on the CPU 1000 from the address bus 1030 during a system operation in which external logic will need to make use of the address bus.

The address bus driver 1035 comprises three high-speed hex tri-state inverters 1035a, b and c. In general, the tri-state inverters 1035a, b and c are provided to amplify the output signals A0C-A15C on the terminals A0-A15 to TTL compatible levels. However, in special instances when the address bus 1030 is needed by external logic, the terminals A0-A15 on the CPU 1000 can be floated from the address bus by applying a control signal to the bus driver 1035.

A description of the high-speed hex tri-state inverter 1035a is exemplary of all three inverters. A practical form of tri-state inverter 1035a for the present application is a Signetics 8T97. It includes six drivers divided into groups of four and two. A driver 1120 has an input line 1122 which receives the address signal A0C. A tri-state control terminal 1124 on the driver 1120 is connected to a control line 1128(1) to receive a control signal. When the signal applied to the control terminal 1124 is high, the input line 1122 will be floated. When the signal on the control terminal 1124 is low, the signal A0C on line 1122 appears in amplified form as A0 on output line 1126. The control line 1128(1) controls the state of the upper two drivers; and another control line 1128(2) controls the state of the lower four drivers. In the present embodiment, a main control line 1130 controls the state of all drivers in the tri-state inverters 1035a, b and c, with the exception of drivers 1134 and 1142. These latter two drivers are not used to drive the data bus 1030, but for other purposes to be presently described.

The driver 1134 receives the signal BAC on line 1138 from the bus available terminal and amplifies it into signal BA on line 1140. The driver 1142 is not used. The control terminals of drivers 1134 and 1142 are tied in common by line 1136 which is connected to ground.

The bus available signal BA is taklen off line 1140 by both lines 1130 and 1166. The signal BA is used as the tri-state control signal on line 1130 for the address bus driver 1035. It is also used on line 1166 as an input to the driver/receiver control 1040.

The valid memory address signal VMAC from the VMA terminal on the CPU 1000 is carried on line 1146 and input to a driver 1144 which produces an amplified signal VMA on line 1148. The line 1148 is connected to ground through a pull-down resistor 1150.

The read/write signal R/WC from the R/W terminal on the CPU 1000 is carried on line 1152 and applied as input to a tri-state driver 1154. The control terminal 1158 of the tri-state driver 1154 is connected to line 1166 and receives the bus available signal BA therefrom. When the signal BA is low, the driver 1154 produces an output signal on line 1156 that is an amplified form of its input signal; and when the signal BA is high, the line 1152 is floated from line 1156. The line 1156 is pulled up by a +5 volt source connected to line 1156 across a resistor 1160. The read/write signal R/W is output on line 1068. A line 1164 connects to the common terminus of lines 1156 and 1068 and carries the read/write signal R/W to the driver/receiver control 1040.

The second phase TTL level ∅2T of the two available phases of the clock signal is carried on line 1014 to an inverter driver 1170 which produces an output signal ∅2T/ on line 1172 that is the complement of the input signal. The complementary signal ∅2T/ is received as input by another inverter driver 1174 which re-inverts its input signal ∅2T/ back into the original form ∅2T on line 1176. A line 1178 is connected to the line 1176 and carries the signal ∅2T as input to the driver/receiver control 1040.

Figure 7B:
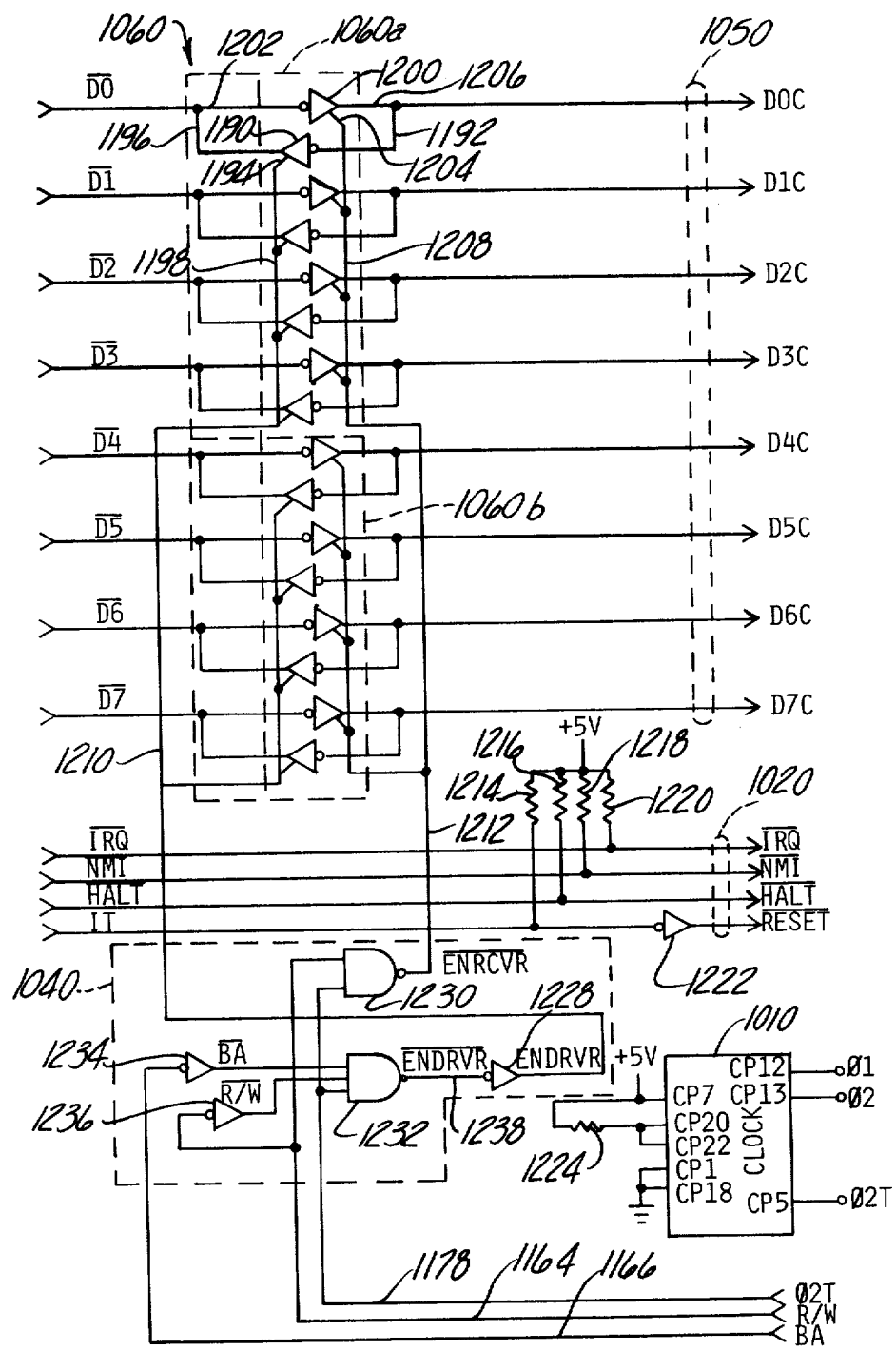

Reference is now made to FIG. 7B which includes the basic detailed illustration of the data bus transceiver 1060; the driver/receiver control logic 1040; the system clock 1010; and the sub-set of the control bus 1020 that relates to interrupt and reset operations.

The data bus transceiver, generally indicated at 1060, is formed of two tri-state quad bus receivers 1060a and 1060b. A practical form of tri-state quad bus receiver for this application is a Signetic 8T26A.

The data bus transceiver 1060 has three basic functions. First, it provides a buffer for incoming data signals D0/-D7/ to the CPU 1000 on the data bus 1050.

Specifically, it attenuates the incoming signals D0/-D7/ into the signals D0C-D7C which are at a level compatible for use with the CPU 1000. Secondly, it buffers the outgoing signals D0C-D7C on the data bus 1050 to a level suitable for use by external logic. Specifically, the data signals D0C-D7C from the CPU 1000 on the data bus 1050 are amplified and inverted into the TTL compatible signals D0/-D7/.

Thirdly, the data bus transceiver 1060 can be used to float the data terminals D0-D7 on the CPU 1000 from external logic whenever external logic needs to make use of the data bus 1050 without interference from the CPU 1000.

The tri-state quad bus receiver 1060a is described as exemplary of both bus receivers 1060a and *b*. The tri-state quad bus receiver 1060a consists of four pairs of tri-state logic elements configured as quad bus driver/receivers along with separate buffered receiver enable and driver enable lines. Each pair of tri-state logic elements includes an inverter driver 1190 which receives an input signal on line 1192. The state of the inverter driver is controlled by a signal on control terminal 1194. If the signal on terminal 1194 is logically high, the input line 1192 is floated from the output line 1196; and if low, the inverter driver 1190 produces an output signal on output line 1196 that is an inverted and amplified version of its input signal. The control terminals of each of the four inverter drivers in the tri-state quad bus receiver 1060a are connected in common by control line 1198. The control line 1198 is in turn connected to another main control line 1210 that carries a driver enable signal ENDRVR from the driver/receiver control logic 1040.

Each pair of tri-state logic elements also includes an inverter receiver 1200 which receives an input signal on line 1202 and produces an output signal on line 1206. The inverter receiver 1200 has a control terminal 1204. If the signal on the control terminal 1204 is high, the input line 1202 is floated from the output line 1206; and if low, the inverter receiver will produce an output signal on line 1206 that is an inverted and attenuated form of its input signal. The control terminals of each of the four inverter receivers in the tri-state quad bus receiver 1060a are connected in common by a control line 1208. The control line 1208 is in turn connected to main control line 1212 which carries a receiver enable signal ENRCVR/ that is output by the driver-receiver control logic 1040.

The control bus sub-set 1020 connects to the terminals IRQ/, NMI/, HALT/ and RESET/ on the CPU 1000. Each of the lines of the control bus sub-set 1020 is biased to a normally high condition by a resistor network comprising the parallel connection of resistors 1214, 1216, 1218 and 1220. Each of the resistors has one terminal connected to a respective line in the control bus sub-set 1020, and another terminal connected to a +5 volt source.

The IRQ/ terminal is activated when a logically low interrupt request signal IRQ/ is applied to its respective line. The NMI/ terminal is activated when a non-maskable interrupt signal NMI/ is applied to its respective line. The HALT/ terminal is activated when a logically low processor halt signal HALT/ is applied to its respective line. The RESET/ terminal is activated when a logically high initiate reset signal IT is applied to its respective line and inverted by an inverter 1222.

The system clock is shown generally at 1010. A practical form of clock is a Motorola MC6871A full-function microprocessor clock. Each of the clock pin assignments are described as follows, with the symbols CP used to designate the clock pin number.

The clock pin CP7 is a power terminal and receives a nominal +5 volt DC. The clock pin CP20 will suppress the first phase of the two complementary clock output signals when a logically low hold signal HOLD1/ is applied thereto. In the present application, CP20 is tied to CP7 through a resistor 1224 to maintain the signal applied to CP20 at a normally high level. The clock pin CP22 is used to indicate a memory ready condition, and when a logically high MEMORY READY signal is applied thereto, the memory clock is enabled. In the present application, CP22 is tied to CP20 and held at a normally high level. The clock pins CP1 and CP18 are ground terminals and are tied together and connected to ground as indicated. The clock pin CP12 is a first phase ∅1 NMOS clock signal. The clock pin CP13 is a second phase ∅2 NMOS clock signal. The clock pin CP5 is a second phase ∅2 TTL level signal for use with logic external to the CPU 1000.

The driver/receiver control logic is indicated generally at 1040. The function of the driver/receiver control logic 1040 is to control the operating mode of the data bus transceiver 1060. As will be recalled, the three operating modes of the data bus transceiver 1060 are: a data receiving mode; a data transmitting mode; and a non-receiving and non-transmitting mode with the data bus 1050 floated from the CPU 1000.

The inputs to the driver/receiver control logic 1040 are the bus available signal BA on line 1166, the read/write signal R/W on line 1164 (as conditioned by the application of the bus available BA signal to the control terminal 1158 of the tri-state driver 1154), and the second phase clock signal ∅2T on line 1178. The relationship between the bus available signal BA and the read/write signal R/W is such that when the bus available signal BA is high, the read/write signal R/W will be high. This relationship holds as a result of the bus available signal BA being applied to the control terminal 1158 of the tri-state driver 1154 which receives as its input the read/write signal R/W on line 1152. The bus available signal BA is high when the data bus 1050 and the address bus 1030 have been floated. The read/write signal R/W is normally high when the CPU 1000 wishes to read data off the data bus 1050; and low, when the CPU wishes to write data onto the data bus.

The two output signals of the driver/receiver control logic 1040 are an enable driver signal ENDRVR on line 1210, and an enable receiver signal ENRCVR/ on line 1212. The enable driver signal ENDRVR, when high, enables the data bus transceiver 1060 to transmit data from the CPU onto the data bus. The enable receiver signal ENRCVR/ when low enables the data bus transceiver 1060 to receive data off the data bus and provide it to the CPU. When ENDRVR is low and ENRCVR/ is high, the data bus is floated from the CPU 1000.

The enable driver signal ENDRVR is developed through a NAND gate 1232. The NAND gate 1232 has a first input terminal that receives the bus available signal BA on line 1166 through an inverter 1234; a second input terminal that receives the complement of the read/write signal (R/W) from the output of an inverter 1236; and a third input terminal that receives the second phase of the clock signal ∅2T on line 1178. The output signal from the NAND gate 1232 is the signal ENDRVR/ on line 1238. It is applied to an inverter 1228 to produce the enable driver signal ENDRVR on line 1210. The logic for the enable driver signal ENDRVR is as follows:

ENDRVR=BA/·(R/W)/·φ2

The enable receiver signal ENRCVR/ is developed through a NAND gate 1230. The NAND gate 1230 has a first input terminal that receives the read/write signal R/W on line 1164, and a second input terminal that receives the second phase of the clock signal φ2T on line 1178. The logic for the enable receiver signal ENRCVR/ is as follows:

ENRCVR/=(R/W·φ2T)/

With reference to FIG. 7C, the block address select logic is indicated generally at 1080. The basic function of the block address select logic 1080 is to interpret or decode the six high order bits A10–A15 on the address bus 1030 and select the block of memory indicated by the information contained in the six high order bits.

The block address select logic 1080 includes a pair of high-speed 1 out of 8 binary decoders 1250 and 1252. In general, each of the binary decoders 1250 and 1252 interprets three bits of input information as selecting one of eight possible output signals; thus the characterization "1 out of 8". A practical form of binary decoder is an Intel 8205, manufactured by Intel Corporation, 3065 Bowers Avenue, Santa Clara, CA 95051. The pin assignments of each of the decoders 1250 and 1252 are described as follows.

The three terminals A0, A1 and A2 are effectively the input terminals. On the decoder 1250, the three highest bits 1076H of the address bus 1030 are applied to these terminals. On the decoder 1252, the next three highest bits 1076L of the address bus 1030 are applied to these terminals.

There are three chip enable terminals E1, E2 and E3 on each of the decoders. The enable terminals E1, E2 are inverted and in an enabled state when a low signal is applied thereto. In the present application, the read/write signal R/W is supplied on line 1068 through an inverter 1240 to produce an inverted signal (R/WP)/ on line 1242. The signal (R/WP)/ will be low when the CPU 1000 wishes to read from memory. The enable terminal E3 is in an enabled state when a high signal is applied thereto. In the present application, the valid memory address signal VMA on line 1148 is applied to terminal E3. If the memory address placed on the address bus 1030 is valid, the signal VMA is high, and the terminal E3 is in an enabled state.

The output terminals on each of the decoders 1250 and 1252 are designated 00–07. When all three of the enable terminals E1, E2 and E3 are in an enabled state, the three address bits on the input terminals A0, A1, A2 will select one and only one of the output terminals 00–07. The three address bits represent a binary number ranging in value from 0–7. If the three address bits are, for example, 010, the output terminal 02 will be selected. The terminal 02 will have a low signal on it, and the signals on all the other output terminals will be high.

The output signals from the decoder 1250 are designated UA0/–UA7/; the first two letters referring to an upper address bit, and the numeral identifying the output terminal with which it is associated. The output signals from the decoder 1252 are designated LA0/–LA7/; the first two letters relating to the lower address bit, and the numeral relating to the output terminal with which it is associated.

The two bits of signal information from the two selected output terminals of the decoders 1250 and 1252 are used to select one of four 1K PROM blocks 1090–1096. The output signals UA0/–UA7/ appear on respective connectors A11, A12, A13, A14, A15, A16, A17, and B17. The output signals LA0/–LA7/ appear on the respective output connectors A19, A20, A21, A22, A23, A24, A25 and B25. These output connectors represent pin identifications on an otherwise unused IC socket on the microprocessor board 110. The output connectors for the decoder 1250 are connected by jumpers to the connectors designated by B11, B12, B13 and B14. In other words, only four of the output connectors on the left side in the figure are used; the other four are not used. This scheme affords flexibility in assigning fixed addresses in PROM by hardwiring the addresses in the block address select logic 1080.

The output connectors associated with the decoder 1252 are likewise characterized by their pin assignments on the IC socket. They are similarly matched with four other pins on the socket designated B19, B20, B21 and B22. Again, only four of the output connectors on the left side of the drawing are used; the other four are not used. The connections are made by hardwiring jumpers across the integrated circuit socket.

The signals appearing on the connectors B11–B14 are respectively designated UBLK0/–UBLK3/. The letters indicate that the signal is an upper block bit, and the numeral indicates which of the upper blocks it relates to.

The signals appearing on the connectors B19–B22 are respectively designated LBLK0/–LBLK3/. The letters indicate that it is a lower block bit, and the numeral relates to the block of memory which it indicates.

A group of four NOR gates 1254–1260 are used to decode the signals UBLK0/–UBLK3/ and LBLK0/–LBLK3/ and select which of the PROM blocks 1090–1096 is to be accessed based on the information contained in the six high order bits 1076 of the address bus 1030. Each of the NOR gates 1254–1260 has two inputs. The NOR gates are positioned in a 0, 1, 2, 3 sequence in correspondence to the numerical designation of the upper block input signals and the lower block input signals which they receive. One input terminal of each of the NOR gates receives a correspondingly enumerated upper block signal and the other input receives a correspondingly enumerated lower block signal.

Any of the NOR gates 1254–1260 that receives a high signal at one or both of its inputs, will produce a low output signal. The single NOR gate that receives low input signals at both of its input terminals, will produce a high output signal. By way of example, if the signals UBLK1/ and LBLK1/ are both low, the output signal BLK1 produced by NOR gate 1256 will be high. This signal is placed in its complementary form BLK1/ by an inverter 1264 in the output signal line 1272. If the complementary signal BLK1/ is low, it will indicate that block 1 of the memory is to be accessed or selected.

Each of the NOR gates 1254–1260 has a respective output signal line 1270–1276 with a respective inverter 1262–1268. In accordance with the convention of the present disclosure, whenever one of the block select signals BLK0/, BLK1/, BLK2/, and BLK3 on respective lines 1082–1086 is low, that signal will access or select a corresponding block of PROM.

A NAND gate 1280 has four input terminals, each carrying one of the block select signals BLK0/-BLK3/. If the six high order bits 1076 of the address bus 1030 indicate that none of the 1K blocks of the PROM 1090–1096 is to be selected, the input signals BLK0/-BLK1/ to the NAND gate 1280 will all be high. The output signal BRDADD on the output line 1282 will correspondingly be high. The signal BRDADD is input to an inverter 1284 (a NAND gate with its two inputs connected in common) which produces a complementary signal BRDADD/ on line 1100. The signal BRDADD/, when low, will enable a data bus driver 1112 to be hereinafter more fully discussed.

Figure 7D:
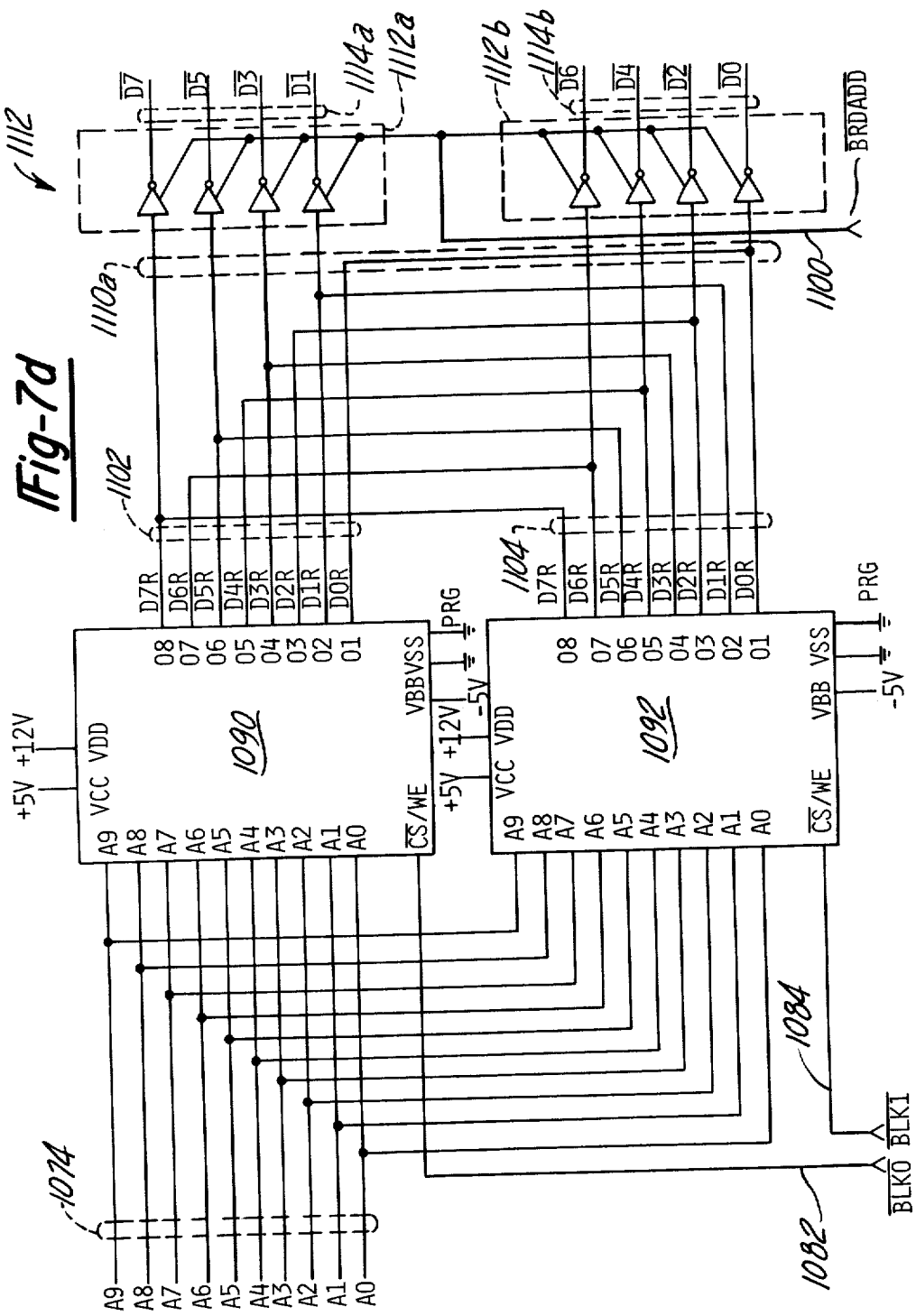

With reference to FIG. 7D, blocks 0 and 1 of the four 1K PROMS 1090–1096 are illustrated. Specifically, the PROM chips 1090 and 1092 are illustrated with their input, output and control terminals, specifically denoted. Each of the four PROM chips 1090–1096 may, for example, be an Intel 2708 Ultraviolet Erasable PROM of the type manufactured by Intel Corporation.

The pin assignments for each of the 1K PROM chips 1090–1096 are as follows.

The input terminals are designated A0-A9 and receive the ten lower bits 1074 on the address bus 1030. The output terminals are designated 01-08, and provide capability for parallel output of an eight-bit data word. A pair of power terminals VCC and VDD receive respective +5 volts and +12 volts energization signals. Another power terminal VBB receives a −5 volts energization signal. The terminals VSS and PRG are connected to ground. A chip select terminal is designated (CS1)/WE. When the signal applied to this terminal is low, the chip is selected for reading data therefrom; and when high, the chip is disabled.

The chip select terminal (CS1)/WE on PROM 1090 receives the memory block select signal BLK0/ on line 1082. The chip select terminal on PROM 1092 receives the memory block select signal BLK1/ on line 1084. Whichever of the block select signals BLK0/ and BLK1/ is low, if either, will select or enable for reading its respective 1K PROM block.

The PROM 1090 has a group of data output lines 1102, and the PROM 1092 has a group of data output lines 1104. The data signals carried on the lines 1102 and 1104 are designated D0R-D7R. The group of data lines 1102 and the group of data lines 1104 combine to form a common group of data lines 1110a.

A tri-state driver for the data lines 1110a is indicated generally at 1112. The tri-state driver 1112 is formed of two high-speed hex tri-state inverters 1112a and b. Each of the tri-state inverters 1112a and 1112b is similar to the tri-state address bus drivers 1035a, b and c of FIG. 7A, with the exception of the output signal of the tri-state inverters 1112a and b is inverted relative to the input signal. A suitable device for each of the tri-state inverters 1112a and b is a Signetics 8T98 tri-state inverter.

The data output signals D1/, D3/, D5/ and D7/ are carried on a sub-set of data lines 1114a. The output signals from the tri-state inverter 1112b are designated D0/, D2/, D4/, and D6/ and are carried on a sub-set of data lines 1114b.

The condition of the driver 1112 is controlled by the state of the signal BRDADD/ on line 1100. If BRDADD/ is low, the driver 1112 will invert and amplify the signals carried on lines 1110a; if high, the driver 1112 will float the input lines from the output lines.

Figure 7E:
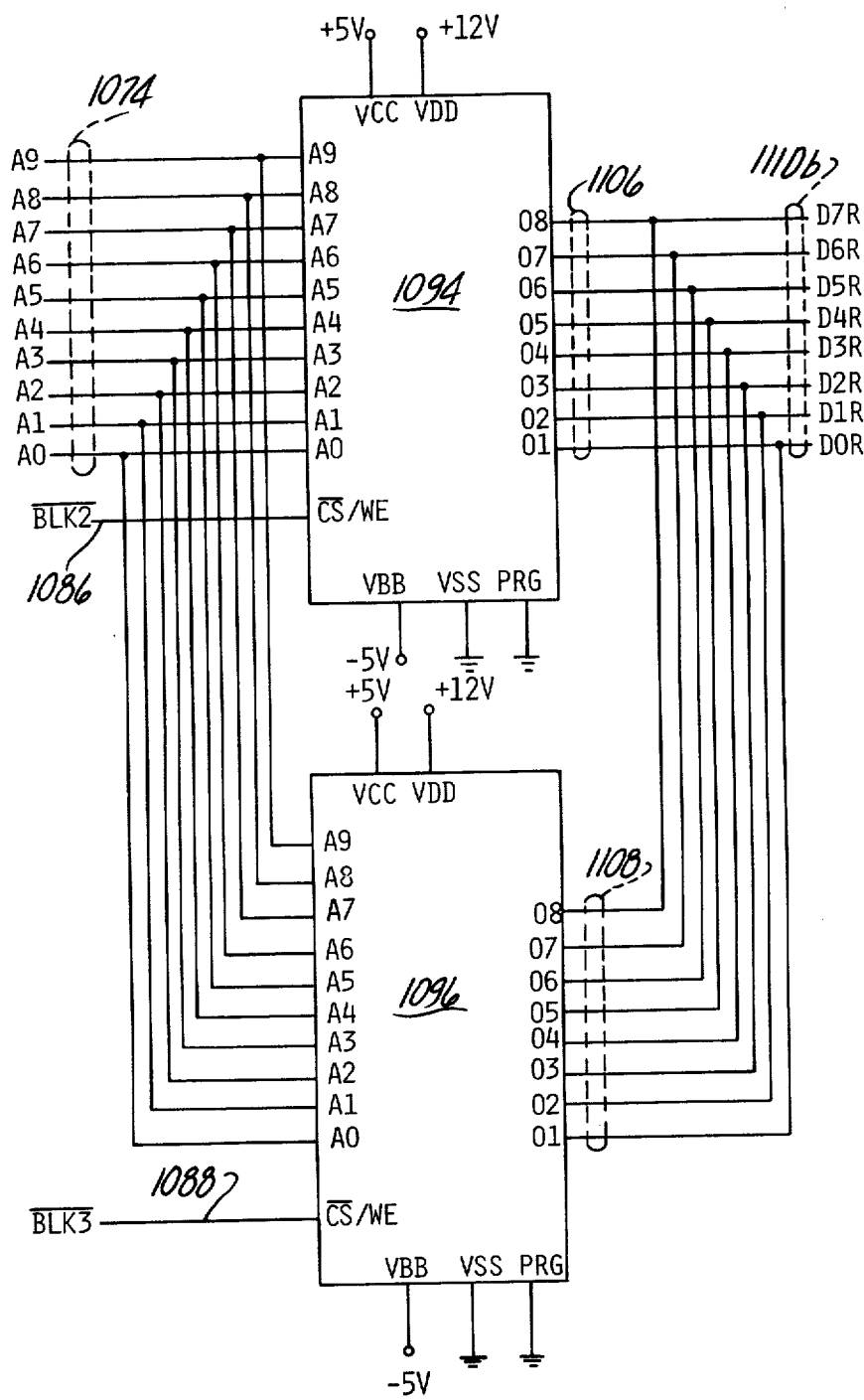

With reference to FIG. 7E, the other two 1K PROM chips 1094 and 1096 are illustrated. The pin assignment for both PROM chips 1094 and 1096 are identical to those of the PROM chips 1090 and 1092.

The input terminals on both PROM chips 1094 and 1092 receive the ten low order bits 1074 of the address bus 1030. The output signals from PROM chip 1034 are carried on data lines 1106, and the output signals from PROM 1096 are carried on data lines 1108. The data lines 1106 and the data lines 1108 join to define a common set of data lines 1110b that carry data signals designated by D0R-D7R.

The PROM chip 1094 is selected or accessed when the block select signal BLK2/ on line 1086 is low. The PROM chip 1096 is selected or accessed when the block select signal BLK3/ on line 1088 is low.

b. The Memory Board

The ECU 100 includes a memory board 120 which provides random access memory (RAM) capability for the CPU 1000.

In overview, the memory board 120 includes two 1K (1024 byte) blocks of RAM. The RAM is used to store output data tables for the injection parameters and to provide temporary storage registers that facilitate software computations. The RAM does not store the system software—that is stored in two of the 1K blocks of RAM 1090–1096 on the microprocessor board 110.

The memory board 120 also includes reset circuitry and a battery back-up system to protect the volatile RAM in the event of power failure or power-down condition.

Figure 8:
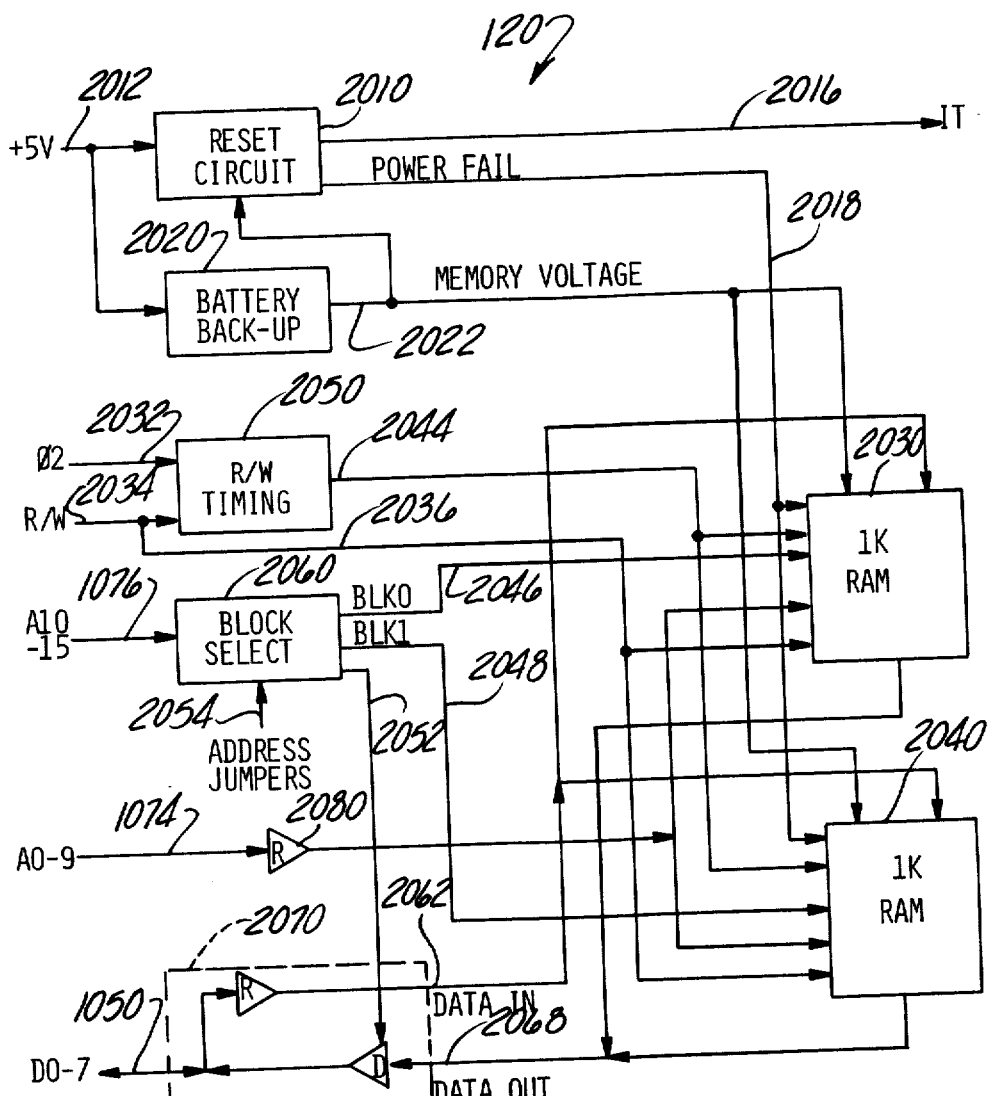
FIG. 8 is a block diagram illustration of the memory board of the electronic control unit.

The memory board 120 is illustrated in block diagram form in FIG. 8. The memory board 120 includes several blocks of hardware logic in addition to RAM chips. A discussion of each block of hardware logic is as follows.

A reset circuit 2010 protects the RAM in the event of a power failure of power-down condition. The reset circuit 2010 operates in conjunction with a battery back-up circuit 2020 which responds to a power failure or power-down condition by enabling a DC battery to sustain the contents of the RAM for a period of time that is normally adequate to correct the condition causing the power failure.

The reset circuit 2010 and the battery back-up circuit 2020 each receive +5 volts supply voltage on line 2012. If the voltage on line 2012 falls below a predetermined minimum acceptable level, nominally 4.75 volts, the reset circuit 2010 will respond by enabling an initial reset signal IT on line 2016 and a power fail signal PF/ on line 2018. The battery back-up circuit 2020 will respond to the power failure and protect the memory by supporting a memory voltage VMEM on line 2022.

The power fail signal PF/ on line 2018 and the memory voltage VMEM on line 2022 are both received as input signals by two blocks of 1K RAM 2030 and 2040. If the power fail signal PF/ is high, it will disable any reading from or writing to the RAM blocks 2030 and 2040.

A read/write timing circuit 2050 is provided to control the timing of reading data from and writing data into the RAM blocks 2030 and 2040. The read/write timing circuit 2050 receives as its two control inputs the second phase $\phi2$ of the clock signal on line 2032 and the read/write signal R/W from the CPU 1000 on line 2034. The output signal from the read/write timing circuit 2050 is applied by way of lines 2044 to a control input on each of the RAM blocks 2030 and 2040. The read/write signal R/W is also applied by way of line 2036 to another control input on each of the RAM blocks 2030 and 2040.

A block select circuit 2060 is provided to decode the information contained in the six high order bits A1-0–A15 of lines 1076 of the 16-bit address bus. The block select circuit 2060 also receives information from address jumpers 2054. The two main output signals of the circuit 2060 are block select signals BLK0 and BLK1 on lines 2046 and 2048, respectively. Each of the block select signals is applied to an enable input terminal on respective RAM blocks 2030 and 2040. Another output from the circuit 2060 is applied by way of line 2052 as the control signal to a driver in a data line transceiver 2070.

The nine low order bits 1074 of the address bus are applied through a receiver buffer 2080 to corresponding data input terminals on each of the RAM blocks 2030 and 2040.

Data is input to the RAM blocks 2030 and 2040 on one set of lines 2062, and output on another set of lines 2068. Both of the lines 2062 and 2068 are interfaced with the 8-bit data bus 1050 through a data bus transceiver 2070.

With reference to FIG. 9A, the reset circuit 2010 and battery back-up circuit 2020 are shown in schematic detail.

The reset circuit 2010 includes two independently-operated reset switches 2110 and 2112. Either of these switches may be used to initiate a reset of the CPU 1000 by closing the switch to produce an initial reset signal IT. This signal is communicated to the microprocessor board 110 where it is inverted and applied to the reset terminal on the CPU. In the present case, the switch 2110 is a manual reset switch mounted on the rear of the memory board 120. The switch 2112 is similarly a manual reset switch mounted on the operator control panel 170.

By closing either of the switches 2110 or 2112, a circuit is created that connects a resistor 2124 between +5 volts at node 2128 and ground. The closing of the circuit causes the voltage at node 2130 to drop from a voltage equal to one base—emitter drop (approx. 0.7 v) to zero potential. An NPN transistor 2116 experiences a change from saturation to cutoff as a result of the closing of either of the switches 2110 or 2112. The transistor 2116 has a base terminal 2118 that is connected to the node 2130, an emitter terminal 2120 that is connected to ground, and a collector terminal 2122 that is connected through a resistor 2126 to +5 volts at node 2128. As the transistor 2116 goes from saturation to cutoff, the voltage at the collector terminal 2122 experiences a positive transition from a low logic level to a high logic level. The initial reset signal IT is taken from the collector terminal 2122 on line 2016. In effect, in closing either of the switches 2110 or 2112, the initial reset signal IT will go from low to high and cause the CPU 1000 to be reset.

The battery back-up circuit 2020 is normally passive until a power fail or power-down condition is detected by the reset circuit 2010. The battery back-up circuit 2020 includes a diode 2134 that receives at its anode the +5 volts supply voltage on line 2132. The cathode of the diode 2134 is connected to a node 2136.

A back-up battery 2138 is also connected to the node 2136 through the parallel connection of a diode 2140 and a resistor 2142. The diode 2140 has its cathode connected to the anode 2136 and its anode connected to the positive terminal of the battery 2138. The negative terminal of the battery 2138 is connected to ground. In a practical embodiment, the battery 2138 can comprise three 1.25 V nickel-cadmium, rechargeable cells wired in series to supply approximately 3.75 volts when the +5 volts supply falls below its normal level.

Under normal power-up conditions, the diode 2134 is forward biased and the diode 2140 is reverse biased. The resistor 2142 provides a shunt path around the diode 2140 for a small overcharging current while the main +5 volt supply is operating.

The voltage appearing at the node 2136 is normally +5 volts less a small nominal drop across the diode 2134. This voltage is carried on line 2144 and is characterized as the memory voltage VMEM. The memory voltage is applied to a power terminal on each of the memory chips in the RAM blocks 2030 and 2040.

A micropower voltage detector 2150 is provided to detect excursions in the supply voltage below a minimum acceptable level, nominally 4.75 volts. In a practical embodiment, the micropower voltage detector 2150 can be an Intersil ICL 8211 of the type manufactured by Intersil, Inc., 10900 N. Tantau Avenue, Cupertino, California 95014. In general, the micropower voltage detector 2150 will monitor the supply voltage and produce a high output when the supply voltage is above the minimum acceptable level and a low output signal when the supply voltage is below the minimum acceptable level.

The micropower voltage detector 2150 includes a V+ input terminal that receives the memory voltage VMEM on line 2166; a V− input terminal that is connected to ground by line 2168; a threshold input terminal THR that receives a scaled representation of the supply voltage on line 2158; an output terminal OUT that produces a high or low output signal depending upon the level of the supply voltage; and a hysteresis output terminal HYS that provides a positive feedback signal to the input terminal THR on line 2160. The input signal appearing on line 2158 is scaled to normalize it with the rated trigger voltage (nominally 1.15 volts) of the micropower voltage detector 2150. The scaling of the threshold input signal is accomplished by connecting a pair of resistors 2154 and 2164 in series between the line 2132 and ground and taking the voltage appearing at node 2156 as the threshold input signal. The hysteresis output signal is a positive feedback signal which is communicated to input line 2158 through a resistor 2160. The hysteresis output signal is a low current signal which is switched whenever the signal applied to the threshold terminal THR is in excess of 1.15 volts. The hysteresis signal facilitates positive switching of the output signal on line 2170 when there has been a transition in the level of the supply voltage at the vicinity of the minimum acceptable level.

In the event of a power failure or power-down condition, the threshold input signal on line 2158 will fall below the trigger voltage of the micropower voltage detector 2150. The memory voltage VMEM on line 2144 will then become the greater of either the voltage from the battery 2138 or the below-normal supply voltage on line 2132. The output signal on line 2170 will experience a downward transition from the memory voltage VMEM on line 2166 to ground potential on line 2168. The transition in the output signal on line 2170 will be assisted by the positive feedback applied by the hysteresis output terminal.

The drop in voltage level on line 2170 from the base-emitter voltage of transistor 2176 to ground potential will be communicated by line 2174 to the base terminal 2178 of an NPN transistor 2176. The transistor 2176 has an emitter terminal 2180 connected to ground, and a collector terminal 2182 connected through resistor 2186 to line 2144 which carries the memory voltage VMEM. The transistor 2176 is normally in saturation as a result of the presence of current through resistor 2172 into the base input terminal 2178. However, in a power failure condition, the ground potential appearing on line 2170 will cause the voltage at the base terminal 2178 to be low and the transistor 2176 to be in cutoff. This will cause the voltage appearing at the collector terminal 2182 to experience a transition from a low to a high level.

A power failure signal PFL/ appears on a line 2190 connected to the collector terminal 2182. In normal operation, the power failure signal PFL/ is low, but upon the occurrence of a power failure or power-down condition, the signal goes high. The power failure signal PFL/ is applied as a control signal to each of the chips of the RAM blocks 2030 and 2040.

The power failure signal PFL/ is applied across a resistor 2194 to the base terminal 2218 of an NPN transistor 2216. The transistor 2216 has an emitter terminal 2220 connected to ground, and a collector terminal 2224 connected to the node 2130. When the power failure signal PFL/ is logically high, it will cause the transistor 2216 to go from a normal cutoff state into saturation. The voltage appearing at the node 2130 will experience a transition from high to low level.

The base terminal 2118 of the transistor 2116 is connected to the node 2130. The transistor 2116, which was brought into cutoff by the closing of either the switches 2110 or 2112, will be forced into saturation by current flowing into the base terminal 2118. The voltage at the collector terminal 2122 will correspondingly drop, causing the initial reset signal IT on line 2016 to go low. The initial reset signal IT which is applied across an inverter to the reset terminal of the CPU 1000 will cause the CPU to cease operation when it is high.

The power failure signal PFL/ is also carried on line 2200 and applied through a resistor 2202 to the base terminal 2206 of a PNP transistor 2204. The transistor 2204 has an emitter terminal 2208 that is connected to the line 2144 carrying the memory voltage VMEM, and a collector terminal 2210 that is connected by line 2212 to the emitter terminal. The voltage appearing at the collector terminal 2210 is designated a power voltage VPR and is used to buffer the read/write signal R/W received by the R/W timing circuit 2050.

Figure 10:
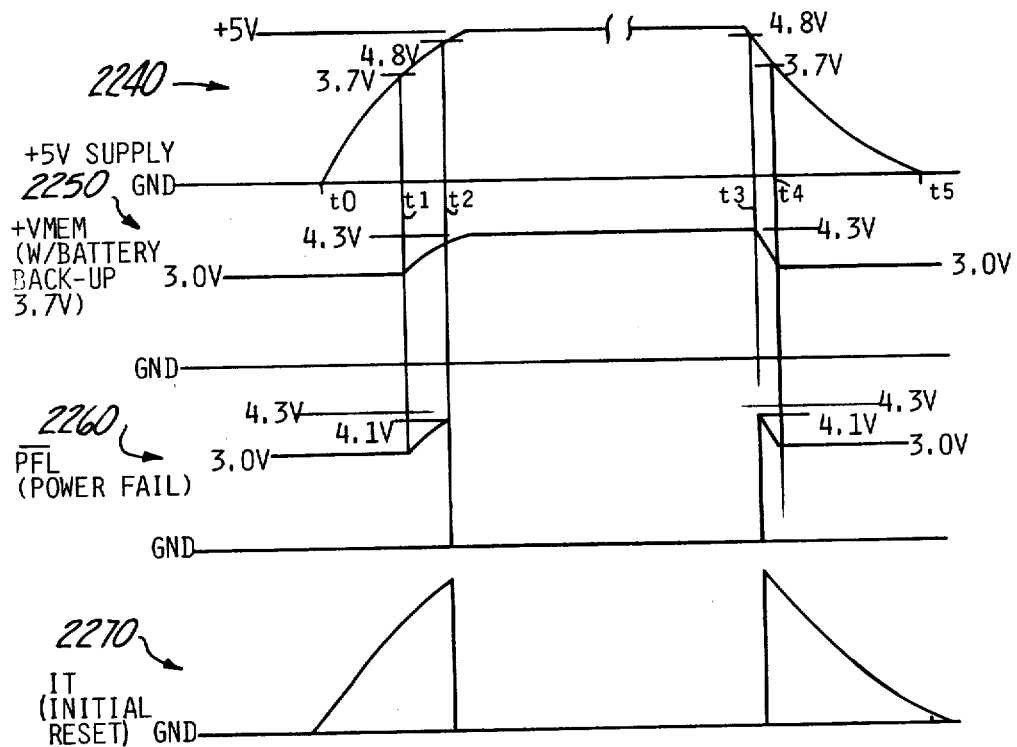
FIG. 10 is a timing diagram related to the reset circuit on the memory board.

FIG. 10 illustrates the transition in voltage levels which the supply voltage, memory voltage, power failure signal and initial reset signal experience in the course of a system power-up and power-down.

In curve 2240, the supply voltage is shown experiencing a power-up betweem times t0-t2. The supply voltage is maintained at its normal level of +5 volts for an indefinite interval between times t2-t3. The supply voltage experiences a power-down occurrence between times t3 and t5.

From the t0 until t1 when the supply voltage has increased from ground potential to approximately 3.7 volts, the memory voltage VMEM will be represented by the battery voltage, as indicated by curve 2250. During the same time interval, the power failure signal PFL/ will be a steady 3.0 volts as indicated by curve 2260.

During the time interval from t1 to t2, the supply voltage increases from 3.7 volts to the minimum acceptable level of 4.8 volts. During this same time, the memory voltage VMEM is increasing from the back-up battery voltage of 3.7 volts toward a steady state value of 4.3 volts. The power fail signal PFL/ is increasing during this time from 3.0 volts to a maximum value of 4.1 volts.

At time t2 when the minimum acceptable level is reached by the supply voltage, the power failure signal PFL/ drops to 0. Also at time t2, the initial reset signal IT has ascended to its maximum value, and then simultaneous with the drop of the power failure signal, it likewise experiences a transition to 0 volts, as indicated by curve 2270.

During the time from t2 until t3, the memory voltage VMEM has ascended to and held at a steady state value of 4.3 volts. During the same time, both the power fail signal PFL/ and the initial reset signal IT are maintained at 0 volts.

During the time from t3 until t4 the supply voltage experiences a drop from its normal level of +5 volts to the minimum acceptable level of 4.8 volts. Also, during this time interval the memory voltage VMEM experiences a decline from its steady state value of 4.3 volts to the back-up steady state value of 3.0 volts. The power fail signal PFL/ experiences a stepped increase at time t3 to its maximum value of 4.1 volts, and then a decline until time t4, where it reaches a steady state value of 3.0 volts. The initial reset signal IT starts a decline at time t3 toward an eventual 0 volt level.

During the time from t4 until t5, the supply voltage experiences a decrease from 3.7 volts to 0 volts. During the same time interval, both the memory voltage VMEM and the power failure signal PFL/ are maintained at 3.0 volts. The initial reset signal IT continues its descension toward 0 volts.

FIG. 9B illustrates in schematic detail the receiver circuit 2080 for the ten low order bits 1074 of the address bus. In general, the receiver 2080 functions as a buffer between the address bus 1030 and the address bus terminals on the memory chips forming the RAM blocks 2030 and 2040.

The receiver 2080 is formed of four high-speed hex tri-state inverters 2310a, b, c and d. A practical form of tri-state inverter for this application is a Signetics 8T98.

The tri-state inverter 2310c is described as exemplary of all the tri-state inverters 2310a-d. It includes six inverter receivers grouped into two sets. One set of four has a common control input line, and the other set of two has another common control input line. Each inverter receiver 2312 has an input line 2314, an output line 2316 and a control terminal 2318. If the signal on the control terminal 2318 is high, the input terminal 2314 is floated from the output terminal 2316; and if low, the output signal appearing on the terminal 2316 will be an amplified and inverted version of the input signal on terminal 2314.

A common control line 2324 connected to ground provides a constant low level signal to the control terminals in the set of four inverter receivers in the tri-state driver 2310a. Another line 2326 connected to ground provides a constant low level signal to the control terminals of the set of four inverter receivers in the tri-state inverter 2310c. The power failure signal PFL/ is applied on line 2320 to the control terminals of the balance of the inverter receivers in the tri-state inverters 2310a-d. The power failure signal PFL/ is normally low, but goes high on the occurrence of power failure or power-down condition. When the power failure signal PFL/ is high, it will float the specific lines of bus subset 1074 carrying address signals A4–A9.

The output lines from each of the inverter receivers in the tri-state inverters 2310c and d are connected across a pull-up resistor to the power voltage VPR appearing on line 2342. The resistive connection between each of the output lines at line 2342 is effected by a network 2340 of parallel connected resistors. Each resistor in the network 2340 has one terminal connected to a corresponding output line, and another terminal connected to the line 2342.

The operation of the receiver 2080 is described as follows. Initially, the ten low order bits A0–A9 on the address bus sub-set 1074 are applied to the tri-state inverters 2310a and b. The output signals from the tri-state inverters 2310a and b are designated A0M/–A9M/ and are inverted and amplified versions of the input signals A0–A9. The intermediate signals A0M/–A9M/ are then applied to the tri-state inverters 2310c and d. The output signals from the tri-state inverters 2310c and d are designated A0M–A9M and are an inverted and amplified version of the intermediate signals A0M-/–A9M/. The output signals A0M–A9M are pulled up to a level suitable for use with the memory chips forming the RAM blocks 2030 and 2040 by the resistor network 2340.

FIG. 9C illustrates in schematic detail the data bus transceiver 2070. In general, the data bus transceiver 2070 provides bidirectional buffering between the data bus 1050 and the memory chips forming the RAM blocks 2030 and 2040.

The transceiver 2070 is formed of two tri-state quad bus receivers 2350a and b. A practical device for each of the bus receivers 2350a and b is a Signetics 8T26A. Each of the tri-state quad bus drivers 2350a and b includes one set of four inverter drivers and another set of four inverter receivers.

The tri-state quad bus receiver 2350a is described as exemplary of both bus receivers. An inverter receiver 2352 has an input terminal 2354, an output terminal 2356, and a control terminal 2358. The output terminal 2356 is connected across a pull-up resistor 2370 to a line 2372 carrying the power voltage VPR. The condition of the inverter receiver 2352 is controlled by the signal level on the control terminal 2358. If the signal level is high, the input terminal 2354 will be floated from the output terminal 2356; and if low, the output signal on the terminal 2356 will be an inverted and amplified version of the input signal on terminal 2354.

An inverter driver 2364 has an input terminal 2366, an output terminal 2368, and a control terminal 2378. The condition of the inverter driver 2364 is determined by the signal level on the control terminal 2378. If the signal level is low, the input terminal 2366 will be floated from the output terminal 2368; and if high, the output signal on the terminal 2368 will be an inverted and amplified form of the input signal on terminal 2366.

The control terminals of the inverter receivers in the upper bus receiver 2350a have applied to them the power failure signal PFL/ on line 2360. The inverter buffers in the lower bus receiver 2350b likewise have applied to their input terminals the power failure signal PFL/ on line 2362. In the event of a power failure or power-down condition, the power failure signal PFL/ will go to a high logic level and float the inverter receiver input terminals from their respective output terminals.

The inverter drivers in both the upper and lower bus receivers 2350a and b have applied to their control terminal a drive enable signal DRVREN on line 2374. The drive enable signal DRVREN is derived from the block select circuit 2360 to be hereinafter described in detail.

FIGS. 9D-1 and 9D-2 collectively illustrate the block select circuit 2060 in schematic detail. In general, the function of the block select circuit 2060 is to decode the information contained in the six high order bits on the address bus into a block select signal that identifies which of the RAM blocks 2030 or 2040 is to be accessed for reading or writing purposes.

FIG. 9D-1 illustrates in schematic detail the portion 2060a of the block select circuit 2060 that is used to decode the six high order bits of the address bus. It includes a pair of binary decoders 2410 and 2412. Each of the binary decoders 2410 and 2412 decodes three of the six high order bits of the address bus into a block select signal. A practical form of each of the decoders 2410 and 2412 is an Intel 8205 High Speed 1 Out Of 8 Binary Decoder. This type of binary decoder was hereinbefore described in connection with the block select logic 1080 in FIG. 7C.

The address input terminals A0–A2 of the binary decoder 2410 receive address bits A10–A12 on the address bus sub-set 1076a. The address input terminals A0–A2 of the binary decoder 2412 receive the address bits A13–A15 on the address bus 1076b. The enable input terminals E1 and E2 of both the binary decoders 2410 and 2412 receive a buffered valid memory address signal VMAM/ on line 2414. The signal VMAM/ is low when a valid address is on the address bus. The enable input terminal E3 on both of the binary decoders 2410 and 2412 receives a voltage signal SPIV on line 2416. The signal SPIV is a current limited version of the power voltage VPR. It is obtained by applying the signal VPR on line 2420 across a resistor 2418. The power voltage signal VPR is normally high and, therefore, SPIV will normally be high. Accordingly, under normal operating conditions, the enable input terminals E1–E3 will receive the appropriate signals required to place them all in an enabled condition to permit decoding of the address bits A10–A15.

The binary signal appearing on the address bus subset 1076a is decoded by the binary decoder 2410 by causing one and only one of the output terminals O0–O7 to go low. The balance of the output terminals will be maintained at a high logic level.

The signals from the output terminals O0–O7 are designated LAD0/–LAD7/ and appear on a set of lower address lines 2422. The letters LAD designate lower address, and the numeral relates to which of the output terminals O0–O7 the signal is associated with.

The lower address lines 2422 are connected in respective order to terminals N19, N20, N21, N22, N23, N24, N25, and P25 of an IC chip socket 2424 on the memory board. Of the terminals N19–N25 and P25, only two of these terminals are selected for use. Those two terminals are connected by jumpers to another two terminals P19 and P20. This feature is provided to allow memory addresses to be hard-wired into the block select circuit 2060. A line 2426 is connected to terminal P19 and carries a lower block select signal LBLK0/. A line 2428 is connected to the terminal P20 and carries another lower block signal LBKL1/.

The output terminals O0–O7 of the binary decoder 2412 are connected to a set of upper address lines 2432 carrying signals UAD0/-UAD7/. The letters UAD designate upper address, and the numeral relates to which of the output terminals O0-O7 the signal is associated.

The upper address output lines 2432 connect in respective order to the terminals R19, R20, R21, R22, R23, R24, R25 and S25 on an IC chip socket 2434 on the memory board 120. Again, only two of the terminals R19-R25 and S25 are used; the others are unused. The two terminals that are selected are connected to another two terminals S19 and S20 on the IC chip socket 2134 by address jumpers. As previously indicated, this is provided as a means to hard-wire the memory addresses into the block select circuit 2060.

A line 2436 is connected to the terminal S19 and carries an upper block select signal UBLK0/. A line 2430 is connected to the terminal S20 and carries another upper block select signal UBLK1/.

With particular reference to FIG. 9D-2, a pair of NOR gates 2440 and 2442 are provided to decode the four upper and lower block select signals into two block select signals.

The NOR gate 2440 receives as one input the upper block select signal UBLK0/ on line 2436, and as another input the lower block select signal LBLK0/ on line 2438. The output of the NOR gate 2440 is a signal BLK0 on line 2444. The signal BLK0 is applied to an inverter 2446 and appears in inverted form as a block select signal BLK0/ on line 2448. The inverted block select signal BLK0/ is pulled up by connecting a resistor 2450 between the memory voltage VMEM and line 2448.

The NOR gate 2442 has as one input the upper block select signal UBLK1/ on line 2426, and as another input the lower block signal LBLK1/ on line 2428. The output of the NOR gate 2442 is a signal BLK1 on line 2452. The signal BLK1 is applied to an inverter 2454 and appears on line 2456 as an inverted block select signal BLK1/. The block select signal BLK1/ is pulled up by a resistor 2458 connected between the memory voltage VMEM and the line 2456.

When the block select signal BLK0/ is low, it indicates that Memory Block 0 is to be selected. This requires that both the upper and lower block select signals UBLK0/ and LBLK0/ be low when applied to the input terminals of the NOR gate 2440. Similarly, when the block select signal BLK1/ is low, it indicates that the Memory Block 1 is to be selected. This requires that the upper and lower block select signals UBLK1/ and LBLK1/ be low when applied to the input terminals of the NOR gate 2442.

The block select signals BLK0/ and BLK1/ are also used to control the condition of a driver enable signal DRVREN on line 2374. The signal DRVREN is used to control the tri-state condition of the inverter-drivers in the data bus transceiver 2070.

More specifically, a NAND gate 2470 has a first input that receives a block select signal BLK0/ on line 2448, a second input that receives the other block select signal BLK1/ on line 2456, and third and fourth inputs that are tied in common and receive the voltage signal SPIV on line 2472. The voltage signal SPIV will be maintained high under normal system operating conditions. The output of the NAND gate 2470 is a board addressed signal BRDADD on line 2474.

A NAND gate 2476 has a first input that receives the second phase of the memory clock Ø2M on line 2478, a second input that receives the board addressed signal BRDADD on line 2474, and third and fourth inputs that are connected in common and receive a buffered and inverted memory read/write signal (R/WM)/ on line 2480. The signal (R/WM)/ will be high when the CPU 1000 is requesting a memory write operation, and low when a memory read operation is requested.

The output of the NAND gate 2476 is a complementary driver enable signal DRVREN/ on line 2482. The signal DRVREN/ is applied to an inverter 2484 that inverts it into a direct driver enable signal DRVREN on line 2374. The driver enable signal DRVREN on line 2374 is applied to the control terminals of the inverter drivers in the data bus transceiver 2070.

Reference is now made to FIG. 9E which illustrates in schematic detail a number of blocks of hardware logic used to buffer input signals into a form suitable for use with the read/write timing circuit 2050 and the block select circuit 2060. A block 2510 includes the hardware logic used to derive the buffered read/write signal (R/WM)/. A block 2530 includes the hardware logic used to obtain the modified valid memory address signal VMAM/. A block 2540 includes the hardware logic used to produce the memory clock signal Ø2M, and its complement Ø2M/.

The block 2510 receives as input the read/write signal R/W on line 2034 from the CPU 1000. The signal R/W is applied to an inverter receiver 2512 that produces an inverter and amplified output signal on line 2514. The line 2514 is connected through a resistor 2516 to the memory voltage VMEM to pull up the output signal of the inverter receiver 2512.

The signal on line 2514 is applied as input to another inverter-receiver 2518 which produces a re-inverted and further amplified signal (R/WM)/ on line 2480. The signal (R/WM)/ is pulled up by the connection of a resistor 2426 between the line 2480 to the power voltage VPR.

The inverter-receivers 2512 and 2518 each have a respective control terminal 2520 and 2522 that are tied together in common and connected to ground. In a practical embodiment, the inverter-receivers 2512 and 2518 are taken as two of the four unused inverter-receivers in the data bus receiver 2080.

The hardware logic of the block 2530 receives as input the valid memory address signal VMA on line 2532. The signal VMA is normally high when a valid memory address is on the address bus. The VMA signal on line 2532 is applied to an inverter-receiver 2534 which produces an inverted and amplified output signal VMAM/ on line 2538. The inverter-receiver 2534 may likewise be one of the four unused inverter-receivers in the address bus receiver 2080.

The hardware logic of the block 2540 receives as input the second phase of the system clock signal Ø2 on line 2032. The signal Ø2 is applied to an inverter receiver 2540 which produces an inverted and attenuated memory clock signal Ø2M/ on line 2542. The inverter-receiver 2540 has a control terminal 2544 that is tied to ground. For practical purposes, the inverter-receiver 2540 may be one of the four unused inverter-receivers in the address bus receiver 2080. The memory clock signal Ø2M/ is pulled up by the application of the power voltage VPR across a resistor 2546. The memory clock signal Ø2M/ is also applied to an inverter 2548 which produces a complementary memory clock signal Ø2M on line 2550.

FIG. 9F illustrates in schematic detail the read/write timing circuit 2050 and the two 1K blocks of RAM 2030 and 2040. The read/write timing circuit 2050 includes hardware logic for controlling the timing of reading from and writing into the RAM blocks 2030 and 2040.

The read/write timing circuit 2050 includes a monostable multivibrator (MMV) 2610. The MMV 2610 has an input terminal J, an output terminal Q, a reset terminal R, and two trimming terminals T1 and T2 onto which can be connected a resistor-capacitor network for controlling the time duration of the signal appearing at the output terminal Q.

A capacitor 2612 has one terminal connected to the trimming terminal T1, and another terminal connected to a node 2616. The other trimming terminal T2 has a shunt line 2614 connected between it and the node 2616. The supply voltage of +5 volts is connected to the node 2616 across a resistor 2618. The resistor-capacitor network connected to trimming terminals T1 and T2 can, by proper selection of component values, be used to limit the time duration of the output signal at the terminal Q.

The reset terminal R has the normally high voltage signal SPIV applied to it by way of line 2620. The MMV 2610 will not reset so long as the voltage signal SPIV remains high, which is the normal state of signal SPIV.

The J input terminal of the MMV 2610 receives directly the output of the effective NAND gate 2624 that is defined by a NOR gate with inverted input terminals. The NAND gate 2624 has as one input the non-inverted memory clock signal Ø2M on line 2550, and as another input the signal appearing at the output terminal Q. The output signal at terminal Q is designated BØMM and is carried on line 2626. The signal BØMM is effectively a one-shot pulse of 400 nanoseconds which is triggered on the falling edge of the clock signal Ø2M. It is used to inhibit any reading from RAM until the address bus has settled.

A NOR gate 2630 has as one input the signal BØMM on line 2632, and as another input the complement of the of the board addressed signal BRDADD/. The complement of the latter signal is obtained by applying the board addressed signal BRDADD on line 2474 to an inverter 2628. When both of the input signals to the NOR gate 2630 are low, its output signal on line 2634 will be high. The NOR gate output signal is a read enable signal RDEN. When the signal RDEN is high, it indicates that the address lines have settled and the memory board 120 has been accessed and is in condition for having data read from it.

The read enable signal RDEN on line 2634 is applied as one input to an AND gate 2636. The other input to the AND gate is the buffered read/write signal (R/WM)/ on line 2480. When the buffered read/write signal (R/WM)/ is high, it indicates that the CPU 1000 is seeking to read data from memory; and when low, indicates that a write to memory is requested. When both of the input signals to the AND gate 2636 are high, its output signnal on line 2638 will correspondingly be high.

A NOR gate 2640 receives as one input the AND gate output signal on line 2638. The other input signal to the NOR gate 2640 is the output signal on line 2622 of an AND gate 2644. The AND gate 2644 has as one input the memory clock signal Ø2M on line 2550, and as another input the non-inverted, buffered read/write signal R/WM on line 2514. When both of the input signals to the AND gate 2644 are high, its output signal on line 2622 will correspondingly be high, and when either of its input signals is low, its output signal will be low.

The NOR gate output signal on line 2646 is a chip enable signal and is designated BØCS/. The signal on line 2646 is pulled up by the connection of the memory voltage VMEM across a resistor 2648.

The chip select signal BØCS/ is connected to each of the memory chips in the RAM blocks 2030 and 2040. It enables reading from and writing into the memory chips when it is in a low state, and is in a low state when the following logic equation is satisfied:

BØCS/=((R/W)/·Ø2+R/W·BRDADD·BØMM/)/.

FIG. 11 is a timing diagram which illustrates a typical sequence of signal levels through a read operation followed by a write operation. The memory clock signal Ø2M is shown in curve 2650; the read/write signal R/W is shown in curve 2660; the board addressed signal BRDADD is shown in curve 2670; the MMV output signal BØMM is shown in curve 2680; and the chip select signal BØCS/ is shown in curve 2690.

The memory clock signal Ø2M on line 2650 is a periodic train of clock signals 2652, 2654, 2656, 2658, . . . .

The read/write signal R/W on line 2660 is high and in a read request condition until the transition point 2662 at which time it goes low. The signal R/W remains low until transition point 2664 at which time it goes high again. For the time interval between the transition points 2662 and 2664 when the signal R/W is low, a write to memory operation is requested.

The board addressed signal BRDADD on line 2670 is low until transition point 2672. A low BRDADD signal indicates that the present board is not selected for access by the CPU 1000. The transition to the high signal level at point 2672 indicates that the present board is now being accessed by the CPU. At transition point 2674, the signal BRDADD once again goes low.

The MMV outpt signal BØMM on line 2680 is a periodic signal of approximately 400 nanoseconds duration. The signal BØMM is shown as a train of periodic pulses 2682, 2684, 2686, 2688 . . . .

The chip select signal BØCS/ is low whenever a read or write operation from or to memory is requested, and high at all other times. A transition from a high level to a low level occurs at point 2692. This transition is timed with the trailing edge of the MMV output signal 2682. At the time of the transition 2692, the address bus has settled down and the current address on the address bus will be valid for 460 nanoseconds maximum. At the end of that time interval the data read from the RAM will be valid on the data bus.

At transition point 2694 the chip select signal BØCS/ goes high in timed relation with the leading edge of the MMV output signal 2684. Shortly after the time of the transition point 2694 the read/write signal R/W experiences a transition at point 2662 from high to low, which indicates that a write operation is requested.

At transition point 2696, the chip select signal BØCS/ goes from high to low in timed relation with the leading edge of the memory clock signal 2656. At the time of the transition point 2696, the current address on the address bus will be valid due to the fact that the transition occurred subsequent to the trailing edge of the MMV output signal 2684.

At transition point 2698, the chip select signal BØCS/ goes from low to high in timed relation with the leading edge of the MMV output signal 2686. For at least 225 nanoseconds prior to the time at which the transition 2698 occurs, the data on the data bus as transmitted by the CPU will be valid.

With reference again to FIG. 9F, the two 1K blocks of RAM 2030 and 2040 are described as follows.

Each of the 1K blocks of RAM 2030 and 2040 is comprised of eight CMOS 1024×1 RAM chips. The RAM block 2030 is comprised of chips 2810–2880 and the RAM block 2040 is comprised of chips 2910–2980. In a practical embodiment, each of the RAM chips can be an Intersil IM6518 of the type manufactured by Intersil, Inc., 10900 N. Tantau Avenue, Cupertino, Calif. 95014.

A description of the RAM chip 2810 is given as exemplary of all other RAM chips in the RAM blocks 2030 and 2040.

The RAM chip 2810 includes ten data input terminals A0–A9 which receive the output signals A0M–A9M from the data bus receiver 2080.

There are three chip select control terminals CS1, CS2 and CS3. A high input signal applied to any one of the three chip select control terminals will disable the chip from read or write operations. The terminal CS1 receives the chip select signal BØCS/ from the read-write circuit 2050. The terminal CS2 receives the chip select signal appropriate to the block in which the chip is situated. In the present case, the chip select signal BLK0/ is applied to the terminal CS2 of the chip 2810. The terminal CS3 receives the power failure signal PFL/. The power failure signal PFL/ is normally low, but in a power failure or power-down condition, it will go high.

A write enable terminal is designated WE and receives the buffered memory read/write signal (R/WM)/. When the signal on terminal WE is high, the memory is in condition to be read from; and when low, a write operation may take place. The chip 2810 has a data input terminal DIN that receives one of eight bits of data from the data bus. In the present case, the chip 2810 receives the signal D0I from the memory side of the data bus transceiver 2070. The chip 2810 has a data out terminal DOUT from which data is output to a corresponding line on the data bus transceiver 2070. In the present case, the data bit D0O is output from the chip.

The chip 2810 also has a power terminal VCC that receives the memory voltage VMEM, and a ground terminal GND that is connected to system ground.

The chips 2810–2880 and 2910–2980 collectively configure the two 1K blocks of RAM 2030 and 2040, respectively.

c. A/D Converter Board

Figure 13A:
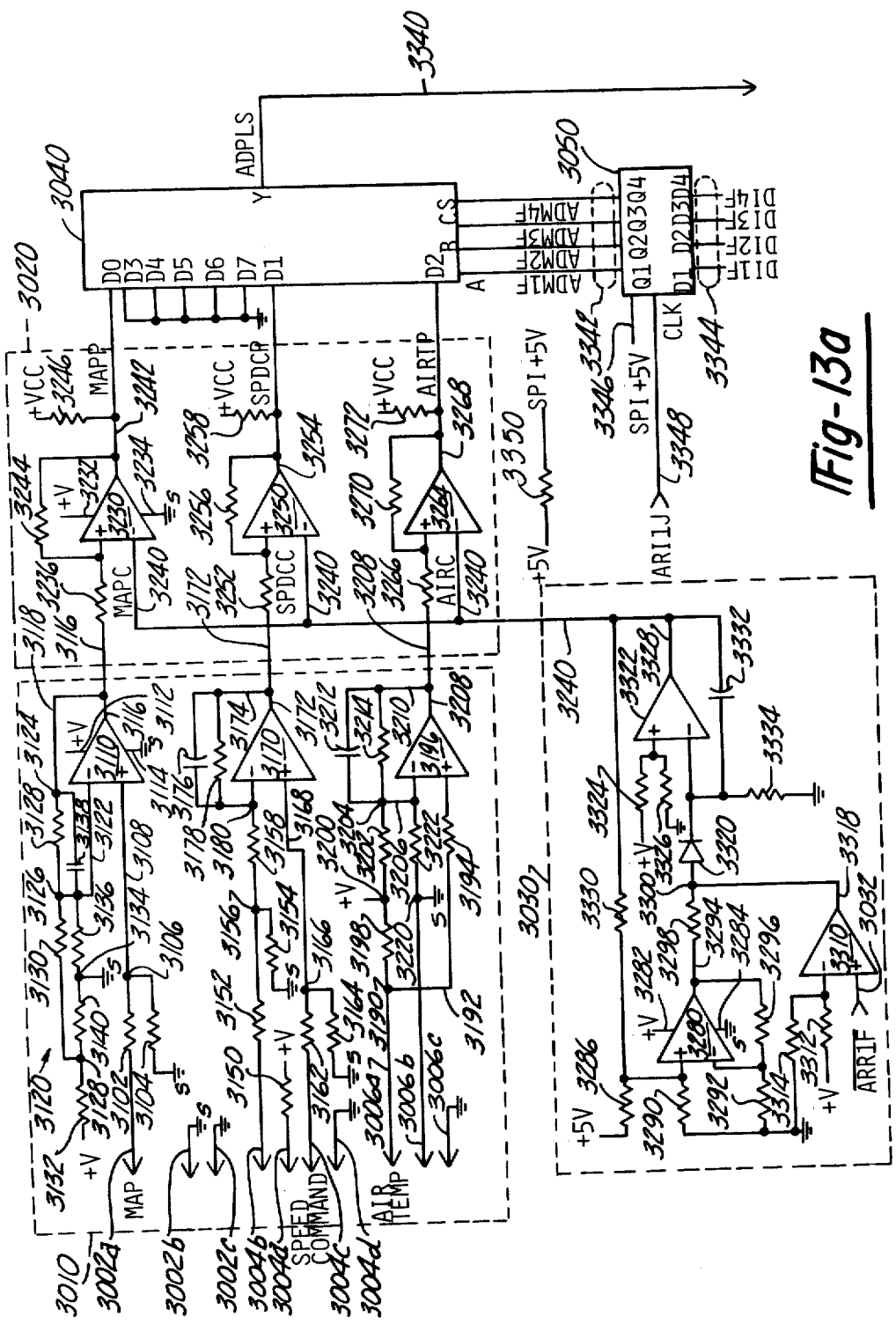

The A/D converter board is illustrated in block diagram form in FIG. 12, and in detailed schematic form in FIGS. 13A, B and C. FIGS. 14–17 are state diagrams and truth tables which show the relationship of the various states which the A/D converter board may assume. FIG. 18 is a timing diagram which illustrates the significant signals processed by the A/D converter board.

In general, the function of the A/D converter board is to convert the analog input variables manifold air pressure, air temperature and speed command from analog form into digital form so that they can be used for processing by the microprocessor board.

In overview, an A/D conversion is carried out by generating a synchronized, linear voltage ramp and comparing it with an analog input voltage. The time it takes for the voltage ramp to equal the analog input voltage is directly proportional to the analog voltage. The time is measured with a digital counter, synchronized to the voltage ramp. The digital output signal from the counter can be read by the microprocessor and used to represent the analog input voltage.

Another feature of the A/D converter board is the inclusion of multiplexer circuitry which allows the system to convert up to eight different analog input voltages, although only three are converted in the present application. The selection of which analog input voltage is to be converted is under the control of the CPU. In addition to the multiplexer circuitry, the board contains hardware logic to provide conversion status and to generate an interrupt to the microprocessor whenever a conversion is complete.

The overall operation of the A/D converter board is explained in the following manner. During power-up initialization or resetting, the voltage ramp is reset to a fixed voltage level by a regulating circuit. The conversion process is started when the microprocessor issues an instruction to load the select code of the analog input voltage to be converted from its accumulator to a multiplexer address register. When this instruction is decoded by an A/D converter control logic circuit, and the multiplexer address register has been loaded, the voltage ramp is enabled along with two counters. One counter is used to time the interval between the start of the linear ramp voltage and the point at which the ramp voltage equals the analog input voltage specified by the multiplexer address register. The other counter is used to reset the ramp generator after 256 microseconds. After 256 microseconds the ramp generator is reset, an A/D conversion complete flag is set, and an interrupt is generated. While the hardware logic is performing the A/D conversion, the software can either be sampling the A/D conversion complete flag, or performing other computations pending the receipt of an interrupt request signal.

When the A/D conversion is completed, the system software can read the contents of the first counter and restart the A/D conversion process by loading a different analog input voltage select code into the multiplexer address register. The resetting of the ramp generator takes 128 microseconds. A new conversion will not begin until this reset period has expired. Any pending conversion requests will be made following the reset period.

FIG. 12 illustrates the A/D converter board 130 in block diagram form.

The analog input voltages representing the sensed analog variables manifold air pressure (MAP), air temperature and speed command are carried on respective lines 3002, 3004 and 3006. These lines are received by an input buffer 3010. In general, the function of the input buffer 3010 is to amplify the analog input voltages to a level suitable for processing in the A/D converter board 130.

A group of comparators, indicated generally at 3020, receive the output signals of the input buffer 3010 on lines 3012. The group of comparators 3020 also receive as another input a linear, ramp voltage on line 3022 which is used as a time-varying reference voltage for comparison to each of the analog signals on lines 3012. There is one comparator for each analog variable that is sensed; in the present case, three comparators are required. The output signals from the group of comparators 3020 are carried on lines 3024.

A multiplexer 3040 selects one of the comparator output lines 3024 for an A/D conversion. The choice of which one of the comparator output lines 3024 is to be selected is controlled by the contents of a multiplexer address register 3050. The multiplexer address register provides by way of output lines 3052 a select code designating which of the comparator output lines 3024 is to be selected for use in the present A/D conversion.

The output of the multiplexer 3040 is applied by way of line 3042 to the input of an 8-bit counter 3060. The other input signal to the counter on line 3062 is a count enable signal from an A/D state control circuit 3070. The 8-bit counter 3060 contains a digital counter which is used to count through the time interval it takes for the linear, ramp voltage on line 3022 to increase from an initial value to a value equal to the analog voltage being converted. The output of the 8-bit counter 3060 is an eight bit word representing the digital equivalent of the analog input voltage being converted. This eight bit word is placed on the data bus 1050 and appears in the form of signals D0–D7.

The A/D state control circuit 3070 controls the sequence of operation in the A/D converter board 130. It communicates through bilateral lines 3082 with an 8-bit timer 3080. The 8-bit timer provides the A/D state control circuit 3070 with two derivative clock signals that are used to time certain operations on the A/D converter board 130. One of the dervative clock signals has a 128 microsecond period, and the other has a 256 microsecond period.

The other inputs to the A/D state control circuit 3070 are the output signals on lines 3084 from an address decoding circuit 3090. In general, the address decoding circuit 3090 decodes the information transmitted from the CPU 1000 on the address bus 1030, the valid memory address control line 1148, and the read/write control line 1060.

The outputs of the A/D state control circuit include the following. First, a reset/enable signal on line 3032 to the linear voltage ramp generator 3030. Second, a load signal on line 3054 to the multiplexer address register 3050. Third, a reset/enable signal on line 3062 to the 8-bit counter 3060. Fourth, a status word on lines 3092 to the data bus 1050. A line 3056 branching from the lines 3092 carries a channel address to the multiplexer address register 3050.

FIG. 13A illustrates in schematic detail the input buffer 3010, the group of comparators 3020, the linear voltage ramp generator 3030, the multiplexer 3040 and the multiplexer address register 3050. Each of these main components of the A/D converter board 130 will be described in order.

The input buffer 3010 is provided generally to amplify the analog input voltages representing manifold air pressure, air temperature and speed command to a level suitable for processing by the A/D converter board 130. In overview, each of the analog input voltages is amplified by a separate operational amplifier. Each of the operational amplifiers is stabilized by applying its output signal through a feedback circuit to its negative input terminal. The feedback circuit includes resistors and capacitors selected with component values to normalize the analog input voltages to a standard reference voltage.

The analog input voltage representing manifold air pressure (MAP) is received on line 3002. The MAP signal is applied across a voltage divider network defined by the serial connection of resistors 3102 and 3104. The signal at node 3106 of the voltage divider network is applied by way of lines 3108 to the positive input terminal of an operational amplifier 3110. The operational amplifier 3110 can be of the type manufactured by National Semiconductor LM2902. The operational amplifier 3110 has a power terminal 3112 that receives the system reference voltage +V and a ground terminal 3114 that is connected to signal ground. (The letter S is hereinafter used in the drawings to distinguish signal ground from system ground; the former being provided for noise-sensitive analog signals that may be affected by the grounding of relatively high level digital signals.) The output signal of the operational amplifier 3110 appears on line 3116. A feedback line 3118 interconnects output line 3116 with a feedback circuit, indicated generally at 3120.

The feedback circuit 3120 connects to feedback line 3118 at a node 3124. A parallel connection of a resistor 3128 and capacitor 3138 is connected between node 3124 and another node 3126. A resistor 3130 is connected between node 3126 and another node 3128. The system reference voltage +V is applied through resistor 3132 to node 3128. A resistor 3140 is connected between node 3128 and another node 3134. The node 3134 is connected to system ground. A resistor 3136 is connected between node 3134 and node 3124. The node 3126 is connected by line 3122 to the negative input terminal of the operational amplifier 3110.

The analog input voltage on line 3002 is taken with respect to a reference line 3002b that is connected to signal ground. A line 3002c represents the grounded shield for lines 3002a and b.

The speed command signal is derived from a potentiometer which has three terminals: a power terminal; a reference or ground terminal; and a wiper terminal which is displaced relative to the first two-mentioned terminals in response to changes in speed command.

The power terminal is represented by line 3004a. It has applied to it the system reference voltage V across a resistor 3150.

The reference or ground terminal is represented by line 3004b. It connects to a voltage divider network defined by the serial connection of resistors 3152 and 3154. The output signal from the voltage divider network is taken from node 3156 and applied through a resistor 3158 to the negative input terminal of an operational amplifier 3170. The operational amplifier may likewise be a National Semiconductor LM2902. The output signal of the operational amplifier 3170 appears on line 3172. A feedback line 3174 communicates the output signal across the parallel connection of a capacitor 3176 and a resistor 3178 to a node 3180 at the negative input terminal of the operational amplifier 3170.

The wiper terminal is represented by line 3004c. The signal on line 3004c is directly related to the instantaneous value of the speed command. It is applied across a voltage divider network defined by the serial connection of resistors 3162 and 3164. The output signal from the voltage divider network is taken off node 3166 and applied by way of line 3168 to the positive input terminal of the operational amplifier 3170.

The line 3004d represents the grounded shield that is used to shield the signals on lines 3004a–c.

The air temperature is represented by the analog input voltage appearing on line 3006a. The line 3006a develops into two separate branches at node 3190. One branch is along line 3192 which applies the signal at node 3190 across a resistor 3194 to the positive input terminal of an operational amplifier 3196. The operational amplifier can be a National Semiconductor LM2902 as hereinbefore described. The other branch applies the signal at node 3190 across the resistors 3198 to a node 3200. The voltage at the node 3200 is pulled up by connection of the node to the system reference voltage +V. A resistor 3202 is connected between node 3200 and a node 3204. The node 3204 is connected directly to node 3206 at the negative input terminal of the operational amplifier 3196.

A reference terminal for the air temperature is designated on line 3006b. It is connected to signal ground at node 3220. The node 3220 is connected across the resistor 3222 to the node 3206 which directly communicates with the negative input terminal of the operational amplifier 3196.

The output of the operational amplifier 3196 appears on line 3208. A feedback line 3210 connects the output line 3208 across the parallel connection of capacitor 3212 and the resistor 3214 to the node 3204.

The grounded shield used to isolate the input lines 3006a and b is indicated by line 3006c which is connected to system ground.

The group of comparators 3020 receives the buffered analog signals output by the input buffer 3010. In general, the group of comparators 3020 will perform a comparison of each buffered analog voltage to a linear, voltage ramp. The time required for the linear, voltage ramp to increase from a reset level to a level equal to the analog voltage will be proportionate to the magnitude of that analog voltage. This time is measured by a digital counter, and the output of the digital counter is used as the digital representation of the analog voltage.

The buffered manifold air pressure signal MAPC on line 3116 is applied across a resistor 3236 to the positive input terminal of a comparator 3230. The comparator 3230 can be a National Semiconductor LM2901 comparator. The comparator 3230 has a power terminal 3232 that is energized at the system reference voltage +V, and a ground terminal 3234 that is connected to signal ground. The negative input terminal of the comparator 3230 receives the linear, ramp voltage on line 3240. The linear ramp voltage is generated from the linear ramp voltage generator 3030 to be hereinafter described in detail. The comparator 3230 will produce a high level output on line 3242 whenever the magnitude of the signal at its positive input terminal exceeds the magnitude of the signal at its negative input terminal; and will produce a low level output whenever the signal magnitude at its negative input terminal equals or exceeds the signal magnitude at its positive input terminal. The output signal of the comparator 3230 is fed back to the positive input terminal across a resistor 3244. A reference voltage +VCC is applied across resistor 3246 to the output line 3242 to pull up the comparison signal MAPP.

The buffered speed command voltage on line 3172 is applied across a resistor 3252 to the positive input terminal of comparator 3250. The comparator 3250 may likewise be a National Semiconductor LM2901 comparator. The negative input terminal of the comparator 3250 receives the linear, ramp voltage on line 3240. The output signal from the comparator 3250 appears on line 3254.

The output signal on line 3254 is applied back to the positive input terminal across a feedback resistor 3256. A reference voltage +VCC is applied across resistor 3258 to the line 3254 to pull up the comparison signal SPDCP.

The buffered air temperature analog voltage on line 3208 is applied across a resistor 3266 to the positive input terminal of a comparator 3264. The comparator 3264 may likewise be a National Semiconductor LM2901. The negative input terminal of the comparator 3264 receives the linear, ramp voltage on line 3240. The output signal from the comparator 3264 appears on line 3268. The output signal is applied to the positive input terminal across a resistor 3270. A reference voltage +VCC is applied across resistor 3272 to the output line 3268 to pull up the comparison signal AIRTP.

The linear, ramp voltage on line 3240 is generated by the linear voltage ramp generator 3030. In general, the linear voltage ramp generator 3030 uses two operational amplifiers of the LM2902 type and a comparator of the LM2901 type to generate the linear, ramp voltage.

A first operational amplifier 3280 has a power terminal 3282 that receives the system reference voltage +V, and a ground terminal 3284 which is connected to signal ground. The signal applied to the positive input terminal of the operational amplifier 3280 is developed from a voltage divider defined by the serial connection of resistors 3286 and 3290. The positive input signal is a scaled version of a +5 volt signal applied to the free terminal of resistor 3286. The negative input terminal is connected through a resistor 3292 to ground. The output signal from the operational amplifier 3280 appears on line 3294. The output signal is applied to the negative input terminal across a feedback resistor 3296. The feedback resistor 3296 is connected in serial relation with the resistor 3292 to define a voltage divider network for scaling the feedback of the output signal. The output signal on line 3294 is applied across a resistor 3298 to a node 3300. The voltage level at the node is controlled by the signal on the output line 3318 of a comparator 3310. The comparator 3310 can be a National Semiconductor LM2901. The comparator 3310 has applied to its positive input terminal a reset/enable control signal ARR1F/ on line 3032. The signal ARR1F/ is developed from the A/D state control circuit 3070 to be hereinafter described. The negative input terminal of the comparator 3310 receives the output signal from a voltage divider network defined by the serial connection of resistors 3312 and 3314. The output of the voltage divider network will be a scaled version of the system reference voltage +V applied to the free terminal of resistor 3312.

The voltage at node 3300 is applied across a diode 3320 to the negative input terminal of an operational amplifier 3322. The positive input terminal of the operational amplifier 3322 receives the output signal of a voltage divider network defined by the serial connection of resistors 3324 and 3326. The voltage divider network output signal will be a scaled version of the system reference voltage +V which is applied to the free terminal of resistor 3324. The output signal of the operational amplifier 3322 appears on line 3328. This output signal is the linear, ramp voltage used for the comparisons in the comparators 3020. It is applied across a feedback capacitor 3332 to the negative input terminal of the operational amplifier 3322. The negative input terminal is connected to ground through a resistor 3334. The output signal is also applied to the positive input terminal of the operational amplifier 3280 across a feedback resistor 3330. The output signal is, of course, also applied by way of line 3240 to the negative input terminals to each of the comparators 3230, 3250 and 3264.

The basic principles of operation of the linear, voltage ramp generator 3030 are as follows. The operational amplifier 3280 and its associated circuitry function as a voltage regulator circuit which is used to maintain the reset voltage of the ramp signal at a fixed value above a saturation value of the amplifier 3322. The comparator 3310 is used to disable the effect of the voltage regulator circuit and allow the ramp signal to experience a linear increase in value. The operational amplifier 3322 will generate the desired linear ramp voltage when allowed by the other circuitry, i.e. when the comparator 3310 effectively grounds node 3300.

The comparison signals MAPP on line 3242, SPDCP on line 3254, and AIRTP on line 3268 are applied as input signals to a multiplexer 3040. The purpose of the multiplexer 3040 is to select one of the comparison signals for a present A/D conversion in response to a command from the CPU 1000 which designates the comparison signal to be converted presently. The multiplexer 3040 can be National Semiconductor MM74C151 8 Channel Digital Multiplexer.

The multiplexer 3040 has eight data input terminals D0-D7. Only three of the available eight input terminals are used in the present application, i.e. D0, D1, and D2. The data input terminal D0 receives the manifold air pressure comparison signal MAPP on line 3242; the data input terminal D1 receives the speed command comparison signal SPDCP on lin 3254; and the data input terminal D2 receives the air temperature comparison signal AIRTP on line 3268. The data input terminals D3-D7 are connected in common to ground.

The multiplexer 3040 has three address input terminals A, B and C that receive a 3-bit select code identifying which of the data input terminals is to be selected. A strobe input terminal S receives a strobe signal that is either high or low. When the strobe signal is high, the multiplexer will be effectively disabled, i.e. the output signal will be 0 irrespective of the condition of any of the other signals. When the strobe input signal is low, the multiplexer 3040 is enabled to operate in its normal mode.

The multiplexer output terminal Y is at the same signal level of whichever of the data input terminals D0-D2 is selected by the address signals on the address input terminals A-C (assuming, of course, the strobe input signal is low). For example, if the 3-bit address input signals applied to terminals A, B and C are 000, the data input terminal D0 will be selected and the multiplexer output signal ADPLS appearing at output terminal Y will be the manifold air pressure comparison signal MAPP. The multiplexer output signal ADPLS is carried on line 3340 to the A/D state control circuit 3070 for purposes to be hereinafter described.

The multiplexer address input signals are designated ADM1F-ADM4F and are carried on lines 3342. The multiplexer address input signals ADM1F-ADM4F represent the output of the multiplexer address register 3050. The multiplexer address register can be a National Semiconductor CD4042 clocked D latch.

The multiplexer address register 3050 has four data input terminals D1-D4. These input terminals receive an analog variable identification or select code DI1F-DI4F on lines 3344. The identification code signals DI1F-DI4F originate with the CPU 1000 and are communicated to the A/D converter board over the data bus 1050 in a manner to be hereinafter described.

The multiplexer address register 3050 has four corresponding output terminals Q1-Q4. A polarity terminal, whose function is to determine at what level data is to be strobed in, receives a voltage SPI+5 V on line 3346. The voltage SPI+5V is developed by applying +5 volts through a dropping resistor 3350 as shown in the adjunctive view. The multiplexer address register 3050 also has a clock input terminal that receives a load signal ARI1J on line 3348. The load signal is generated by the A/D state control circuit 3070.

The signal levels at the output terminals Q1-Q4 follow the signal levels at the data input terminals D1-D4 depending on the polarity of the signal applied to the clock input terminal. If the clock signal is high, the information present at the data input terminals D1-D4 is transferred directly to the output terminals Q1-Q4.

When the input signal to the clock terminal is low, the output terminals Q1-Q4 will hold their previous values, and the input terminals D1-D4 are free to receive updated signal values.

With reference to FIG. 13B, the 8-bit timer counter 3060 is shown along with related data bus driver circuitry in the dashed block forming the lower right-hand part of the figure.

The data bus 1050 is interfaced with the associated circuitry through a data bus transceiver, indicated generally at 3360. The data bus transceiver 3360 comprises two tri-state quad bus receivers 3362a and b. Each of the tri-state quad bus receivers can be a Signetics 8T26 Bus Receiver. Each of the bus receivers 3362a and b has four tri-state inverter-drivers, and four tri-state inverter-receivers. The tri-state control terminal of the bus receivers 3362a and b are connected to ground through lines 3364 and 3366, respectively. Only the inverter-receivers in bus receiver 3362a are used to receive data off the data bus 1050; the inverter-drivers in bus receiver 3362b are not used and their output terminals are allowed to float.

The tri-state control terminals of the inverter-drivers in both of the bus receivers 3362a and b are controlled by an analog-to-digital read enable signal ADREAD on line 3092.

The data bus transceiver 3360 is used for bilateral communication with the data bus. More specifically, the data bus 1050 is used to communicate 4-bit analog input variable select codes from the CPU 1000 to the A/D converter board 130. It is also used to communicate 8-bit digital words representing current analog sensor values from the A/D converter board 130 to the CPU 1000. The data bus transceiver 3360 controls the availability of the data bus 1050 for these data communications.

When a 4-bit analog variable select code is communicated from the CPU 1000, it is received by the inverter-receivers in the bus receiver 3362a and placed on lines 3370 in inverted form as signals DI1-DI4. The signals DI1-DI4 on lines 3370 are received as data input signals by a 4-bit bistable latch 3372. The bistable latch 3372 has four data input terminals D1-D4 and four data output terminals Q1-Q4. It also includes enable terminals E1 and E2. The enable terminals E1 and E2 receive a WRITE signal on line 3368. When the WRITE signal is high, the signal values appearing at data input terminals D1–D4 will be transferred directly to the data output terminals Q1–Q4. When the WRITE signal on line 3368 is low, the data output terminals Q1–Q4 will hold their previous values, and the data input terminals D1–D4 will be free to receive updated data signals.

The output signals from the data terminals Q1–Q4 are designated DI1F–DI4F on lines 3344. A parallel resistor network, indicated generally at 3376, has a resistor connected between each of the several lines 3344 and a +5 volts source. The data output signals DI1F–DI4F on lines 3344 are communicated as the analog input variable select code to the multiplexer address register 3050 previously described in connection with FIG. 13A.

The data bus transceiver 3360 also provides buffering for the communication of 8-bit digital words representing analog sensor voltages from the A/D converter board 130 to the CPU 1000. The 8-bit data words are designated by signals AD1–AD8 on lines 3064 which are the output signals from the 8-bit counter 3060. The 8-bit counter 3060 can be a National Semiconductor CD4040M 12-Stage Ripple-Carry Binary Counter/Divider, with only eight of the twelve available output terminals being used in the present application.

The output terminals of the counter 3060 are designated Q1–Q8. The counter 3060 has a clock input terminal CLK and a reset terminal RST. The clock will count up one binary value for each count pulse ADCLK applied on line 3062a. The counter can be reset by a reset pulse ADCRST applied on line 3062b. The count pulse ADCLK and reset pulse ADCRST are both generated by the A/D state control circuit 3070 to be hereinafter described.

The address decoding circuit is indicated generally at 3090 in the dashed block in the upper right part of FIG. 13B. The basic purpose of the address decoder circuit is to decode information sent out on the address bus from the CPU. The Motorola MC6800 Microprocessor Unit that is used as the CPU in the present system treats memory and I/O ports as a single memory space. The A/D converter board 130 is accessed by the CPU through the same addressing technique that the CPU would use to access an address in memory.

The address decoding circuit 3090 includes a pair of 1 out of 8 binary decoders 3410 and 3412. A practical form of decoder for this application is an Intel 8205 as was previously herein described. The basic function of the binary decoder 3410 is to decode the four low order bits A0–A3 on the subset of the address bus 1030L. The basic function of the decoder 3412 is to decode the four high order bits on the subset of the address bus 1030H.

The four low order address bits A0–A3 on the address bus subset 1030L are applied to data input terminals A0–A2 and enable input terminal E1, respectively. The four high order address bits A12–A15 on address bus subset 1030H are applied to the data input terminals A0–A2 and enable input terminal E1 of the decoder 3412. The enable input terminals E3 of both the decoders 3410 and 3412 receive the valid memory address signal VMA on line 1148. The enable input terminal E2 of the decoder 3412 is connected to ground through line 3141. The enable input terminal E2 of decoder 3610 is connected to the data output terminal O2 of the decoder 3412 by a line 3416.

There are three specific sixteen bit address codes used to access the A/D converter board 130 for certain functions. These address codes (in hexadecimal format) and the related function of each is given as follows:

| 2XX0 | Read system status |
|---|---|
| 2XX3 | Read A/D converter output |
| 2XX7 | Load the multiplexer address register on the A/D converter board and start an A/D conversion. |

The binary decoders 3410 and 3412 will respond to each of the address codes—2XX0, 2XX3 and 2XX7—and provide a corresponding signal identifying the receipt of the code. More specifically, the binary decoder 3412 tests the four high order address bits A12–A15 on address bus 1030H to determine if the following bit code is present: 0010. If so, the signal on data output terminal O2 will be low. The low output signal will be communicated by line 3416 to the enable input terminal E2 on the binary decoder 3410. A low signal applied to terminal E2 will place it in an enabled state.

The binary decocer 3410 tests the four low order address bits A0–A3 on address bus subset 1030L to determine which of the three permissible address codes is specified. More specifically, if the bit pattern of the four low order address bits A0–A3 is 0000 the data output terminal O0 will go low; if the bit pattern is 0011, the data output terminal O3 will go low; and if the bit pattern is 0111, the data output terminal O7 will go low. The output signal 2XX0/ from terminal O0 is carried on line 3418 for further processing within the address decoding circuitry 3090 in a manner to be described presently. The output signal 2XX3/ from the terminal O3 is carried on line 3420 for use in the A/D state control circuit 3070. The output signal 2XX7/ from terminal O7 is carried on line 3422 for further processing in the A/D state control circuitry 3070.

A NOR gate 3426 has as one input the signal 2XX0/ on line 3418, and as another input a WRITE signal on line 3428. The WRITE signal is derived from the read/write signal R/W output on line 1068 by the CPU 1000. Specifically, the read/write signal R/W on line 1068 is applied to an inverter 3430. The output of the inverter appears on line 3432 as the WRITE signal. It is pulled up by the application of +5 volts through a resistor 3434 connected to output line 3432. The WRITE signal is also applied to another inverter 3436 which produces a complementary WRITE/ signal on line 3438. The complementary signal is pulled up by the application of +5 volts through a resistor 3440 connected to the output line 3438.

The NOR gate 3426 produces an output signal RD2X0 on line 3442 as a function of the conditions of its input signals. Specifically, if both the signal 2XX0/ on line 3418 and the WRITE signal on line 3428 are low, then the signal RD2X0 will be high; but for all other permutations of the input signals RD2X0 will be low. The signal RD2X0 on line 3442 is applied to an inverter 3444. The inverter output signal on line 3446 is applied to the control terminals of a set of two inverter drivers, indicated generally at 3448. One inverter driver 3452 is not used and its input terminal is connected to ground by line 3464, and its output terminal 3466 is allowed to float. The other inverter driver 3450 receives the interrupt control signal ARI2F on line 3454. The output terminal of the inverter driver 3450 is connected by line 3456 to bit 1 of the data bus. The signal on line 3456 is a status bit D1/ that is low when an A/D conversion of an analog variable has been completed, and high when the A/D conversion is still in process.

The interrupt control signal AR12F on line 3454 is also communicated by way of line 3458 to an inverter 3460. The inverter output signal on line 3462 is the interrupt request signal IRQ/ that is applied to the interrupt request terminal of the CPU 1000.

FIG. 13C illustrates in schematic detail the A/D state control circuit 3070 and the 8-bit timer 3080. The state diagram and truth tables of FIGS. 14, 15, 16 and 17 and the timing diagram of FIG. 18 are useful in understanding the state and timing considerations involved in the operation of the A/D state control circuit 3070.

In overview, the A/D state control circuit 3070 uses four J-K flip-flops (or bistable latches) to control the timing of A/D conversion events on the A/D converter board 130. The primary timing consideration includes the control of the multiplexer address register 3050, the linear voltage ramp generator 3030, the 8-bit counter 3060 and the 8-bit timer 3080.

More specifically, the A/D state control circuit 3070 includes four J-K flip-flops 3510, 3512, 3514 and 3516. Each of the J-K flip-flops is identical and a description of the pin assignments on the J-K flip-flop 3510 is applicable to all of the other J-K flip-flops.

The J-K flip-flop 3510 has J and K data input terminals. Data input signals are synchronized to a clock signal which is received at the clock terminal C. The output terminals are designated Q and Q/, the latter being the inverse of the former. The output characteristics at the Q and Q/ terminals of the J-K flip-flop 3510 as a function of the four different permutations of input signals that can be applied to terminals J and K are well-known in the art and will not be described in length herein. The J-K flip-flop 3510 also includes a set terminal S that will set the Q output terminal high whenever a high signal is applied thereto. In the present case, the set terminal S of each of the J-K flip-flops 3510-3516 is connected to ground as this feature is not required for the present use. The J-K flip-flops also include a reset terminal R. A high signal applied to the reset terminal R will reset the Q output terminal to a low level. In the present case, the reset terminals R of each of the J-K flip-flops 3510-3516 are connected in common to line 2016 which carries the initial reset signal IT. The signal IT will be high at the time of power-up of the system and will otherwise be low during normal operation of the system. Accordingly, on occurrence of the initial reset signal IT the J-K flip-flops 3510–3516 will be reset.

A NOR gate 3520 has as one input the signal 2XX7/ on line 3422, and as another signal the complement of the write signals WRITE/ on line 3438. When both the signals 2XX7/ and the signal WRITE/ are low, it indicates that the CPU 1000 wishes to load the multiplexer address register 3050 with a new analog variable select code and begin an A/D conversion. Moreover, the NOR gate output signal on line 3522 will be high and applied directly to the J input terminal of flip-flop 3514. The NOR gate output signal on line 3522 is shown in line 3640 of FIG. 18.

The NOR gate output signal on line 3522 is also communicated by way of line 3348 to the clock input terminal of the multiplexer address register 3050. The signal on line 3348 is designated AR11J and is used to load the multiplexer address register 3060 with an updated analog input variable select code.

The clock terminal C of the J-K flip-flops 3510-3516 is connected in common and receives the buffered second phase clock signal ∅2CLK/ on line 3470.

The K input terminal of J-K flip-flop 3514 receives an A/D read signal ADREAD on line 3594. The signal ADREAD is developed as the output signal of a NOR gate 3590. The NOR gate 3590 has as one input the signal 2XX3/ on line 3420, and as another input the write signal WRITE on line 3432. When both the signals 2XX3/ and the signal WRITE are low, it indicates that the CPU 1000 wishes to read the results of the most recent A/D conversion. The signal ADREAD is shown on line 3720 of FIG. 18. Initially, this signal is low until the CPU reads the results at the completion of the current A/D conversion.

Accordingly, the J-K flip-flop 3514 will be set initially by the application of a high signal to the J terminal and a low signal to its K terminal. The high signal on the Q output terminal is communicated by way of line 3524 to one input of a NAND gate 3526. The other input of the NAND gate 3526 is received on line 3528 from the Q/ output terminal of the J-K flip-flop 3516. The initial resetting of the J-K flip-flop 3516 causes the signal on the Q/output terminal to be high Accordingly, the NAND gate output signal on line 3530 will initially be high. The signal on 3530 is applied to an inverter 3532. The inverter output signal appears on line 3534 and is initially low.

A NAND gate 3536 receives as one input the signal on line 3534. The other input to the NAND gate 3536 is the signal carried on line 3538. This signal is taken from the Q/ output terminal of J-K flip-flop- 3512. With the initial resetting of J-K flip-flop 3512, the signal at its Q/ output terminal is high. Accordingly, the NAND gate output signal on line 3540 is initially high. The signal on line 3540 is applied to an inverter 3542. The inverter output signal appears on line 3544. This signal is used to reset the 8-bit counter 3060 and is designated ADCRST. It is communicated to the reset input terminal of the counter 3060 by way of line 3062b. The signal ADCRST on line 3544 is also applied directly to the J input terminal of the flip-flop 3510.

A NAND gate 3550 also receives as one input the signal on line 3534. The other input to the NAND gate 3550 is carried on line 3552. The signal on line 3552 will initially be low, because the J-K flip-flop 3512 has been reset and, therefore, the Q output signal on line 3600 will be low. The NAND gate output signal on line 3554 will initially be high. The signal on line 3554 is applied to an inverter 3556. The inverter output signal on line 3558 will initially be low. This signal is applied directly to the K input terminal of the flip-flop 3510. It is also applied directly to the J input terminal of flip-flop 3516.

When the J-K flip-flop 3514 has set in response to a request for an A/D conversion, the signal on line 3524 will go high, and eventually cause the inverter output signal on line 3544 to go high. When this occurs the J-K flip-flop 3510 will, upon receipt of an initial clock signal ∅2CLK/ at clock terminal C, then toggle from its reset condition to its set condition. This signal at its Q output terminal is carried on line 3564, and the signal on its Q/ output terminal is carried on line 3590.

A line 3566 takes the signal on Q output line 3564 and applies it as one input to a NAND gate 3568. The other input to the NAND gate is the A/D pulse signal ADPLS on line 3340. This signal is taken from the Y output terminal of the multiplexer 3040. The NAND gate output signal appears on line 3570. This signal is applied to an inverter 3572 which produces an A/D conversion control signal ADCCTRL on line 3574.

The signal ADCCTRL on line 3574 is applied as one input to a NAND gate 3576. The other input to the NAND gate is the second phase of the clock signal ∅2CLK on line 3476. The NAND gate output signal appears on line 3578. This signal is applied to an inverter 3580 which produces an A/D clock signal ADCLK on line 3062a. The signal ADCLK is applied to the clock input terminal on the 8-bit counter 3060.

The Q output signal on line 3564 of the J-K flip-flop 3510 is also taken by line 3596 and applied as one input to a NAND gate 3598. The other input to the NAND gate 3598 is the Q output signal of J-K flip-flop 3512 on line 3600. The NAND gate output signal appears on line 3602 and is applied to inverter 3604. The inverter output signal is carried on line 3606 to one input of a NAND gate 3608. The other input to the NAND gate 3608 is the 256 microsecond clock signal C256US on line 3610. The signal C256US appears in FIG. 18 on line 3710. This signal is derived from the 8-bit timer 3080.

The 8-bit timer 3080 for practical purposes can be a National Semiconductor 4040 12-Bit Binary Counter. In this application, only the terminals Q8 and Q9 are used. The timer 3080 has a clock input terminal CLK that receives the second phase of the clock signal ∅2CLK on line 3470, and a reset terminal RESET that is reset by the Q/ output signal on line 3592 of the J-K flip-flop 3512. The Q8 output signal characteristics are shown in FIG. 18 on line 3700. The Q9 output signal characteristics are shown in FIG. 18 on line 3710.

The NAND gate 3608 has an output signal that appears on line 3612. This signal is applied to inverter 3614. The inverter output signal on line 3552 is applied to an input of the NAND gate 3550 in the manner hereinbefore described.

The Q/ output signal of J-K flip-flop 3510 on line 3590 is taken by line 3032 and applied to the positive input terminal of comparator 3310 in the linear voltage ramp generator 3030. This signal which is designated ARR1F/ is used to initiate the linear voltage ramp generated by the ramp generator 3030.

The same Q/ output signal from the J-K flip-flop 3510 on line 3590 is taken by line 3616 and applied as one input to a NAND gate 3622. The other input to the NAND gate is the 128 microsecond clock signal C128US on line 3624. The NAND gate output signal appears on line 3626. This signal is applied to inverter 3628. The inverter output signal on line 3630 is applied directly to the K input terminal of the flip-flop 3512.

The signal ADREAD from the output terminal of the NOR gate 3590 is taken by line 3092 and applied to the control terminals of the data bus transceiver 3360 in FIG. 13B. When the signal ADREAD is high, it enables the transfer of data signals from the A/D converter board 130 to the CPU 1000.

The following two tables "Tables of Signals" and "Logic Equations" identify the significant control signals produced by the A/D control circuit 3070 and their logical relation to the control of the linear voltage ramp generator 3030, the multiplexer address register 3050, the 8-bit counter 3060 and the 8-bit timer 3080, respectively. The signals defined in the "Table of Signals" are used in the following table of "Logic Equations". The two tables together explain the logical operation of the A/D state control circuit 3070.

TABLE OF SIGNALS

| Signal | Line | Related to |
|---|---|---|
| ARR2F/ | 3632 | 8 Bit Timer - Reset |
|  |  | 8 Bit Counter - Reset |
| ∅2CLK | 3476 | 8 Bit Timer - Count |
|  |  | 8 Bit Counter - Count |
| ARI1 | 3534 | 8 Bit Counter - Reset |
| ARR1F/ | 3564 | 8 Bit Counter - Count |
| ADPLS | 3340 | 8 Bit Counter - Count |
| ARR1F/ | 3032 | Ramp Generator - Reset |
| ARI1J | 3522 | Multiplexer Add. Reg. - Load |

| LOGIC EQUATIONS | | |
|---|---|---|
| Device | Event | Signal(s) |
| 8 Bit Timer | Reset = | ARR2F/ |
|  | Count = | ∅2CLK |
| 8 Bit Counter | Reset = | ARR2F/·ARI1 |
|  | Count = | ARR1F·ADPLS·∅2CLK |
| Ramp Generator | Reset = | ARR1F/ |
| Multiplexer Address Register | Load = | ARI1J |

Figure 14:
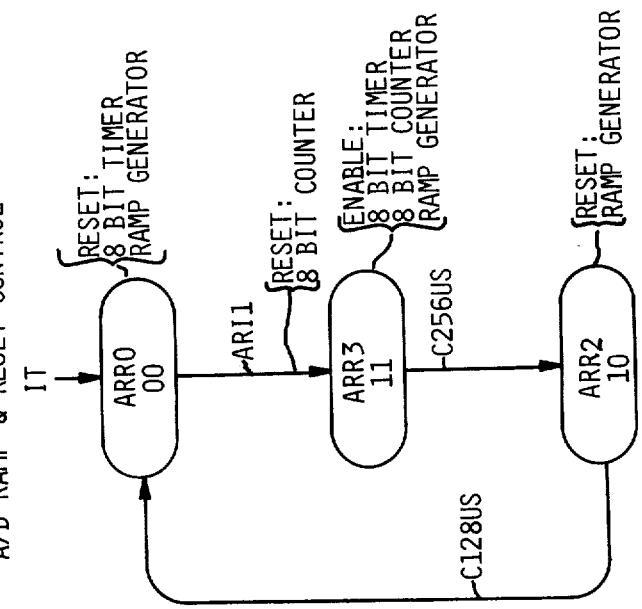
FIG. 14 is a state diagram which illustrates A/D ramp and reset control states on the A/D converter board.
Figure 15:
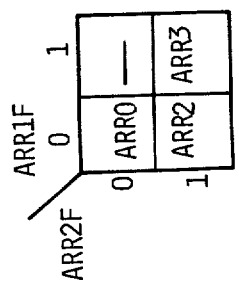
FIG. 15 is a truth table relating the control states shown in FIG. 14.

FIGS. 14 and 15 are a state diagram and truth table, respectively, of the control state of the A/D state control circuit 3070 for A/D ramp and reset control. The initial state is designated ARR0. This state is entered on the occurrence of the initial reset signal IT. In the state ARR0 both the 8-bit timer 3080 and the linear voltage ramp generator 3030 are reset preparatory to entering into another A/D conversion.

The next following state is designated ARR3. This state is entered upon the occurrence of the signal ARI1 on line 3534 of the A/D state control circuit 3070. On the transition from state ARR0 to state ARR3, the 8-bit counter 3060 is reset.

In state ARR3, the analog-to-digital conversion is in process. More specifically, the 8-bit timer 3080, the 8-bit counter 3060 and the linear voltage ramp generator 3030 are all enabled.

The next following state is designated ARR2. This state is entered upon the occurrence of the 256 microsecond clock signal C256US shown on line 3710 of FIG. 18. In state ARR2, the linear voltage ramp generator 3030 receives a reset signal. The ramp generator requires 128 microseconds to reset. The state ARR0 is reentered from state ARR2 by the occurrence of the 128 microsecond clock signal C128US.

FIG. 15 is a truth table showing the relationship of the states ARR0, ARR2 and ARR3 to the conditions of A/D state control signals ARR1F and ARR2F. The signal ARR1F represents the Q output terminal of flip-flop 3510 and the signal ARR2F represents the Q terminal of flip-flop 3512.

Figure 16:
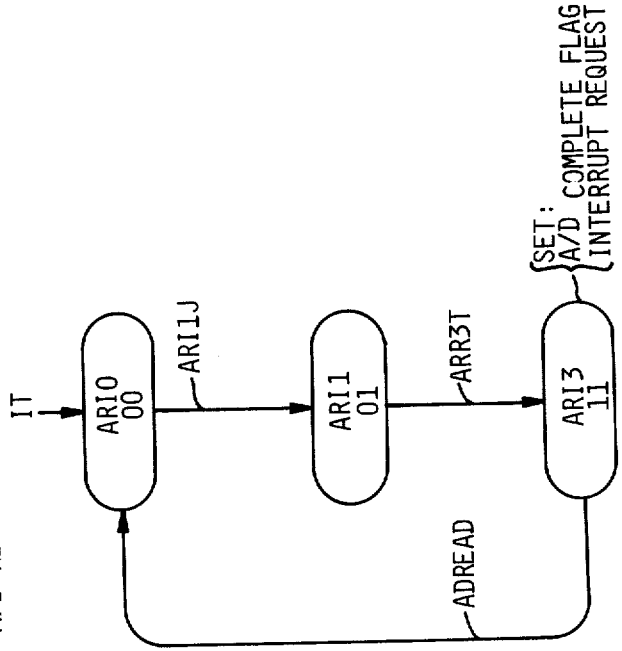
FIG. 16 is a state diagram which illustrates the A/D request and interrupt states on the A/D converter board.
Figure 17:
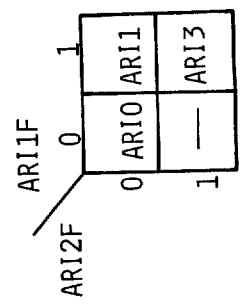
FIG. 17 is a truth table relating the control states shown in FIG. 16.

FIGS. 16 and 17 are a state diagram and truth table, respectively, relating to A/D request and interrupt controls.

With specific reference to FIG. 16, the A/D request and interrupt control states are shown. The initial state is designated ARI0. This state is entered on the occurrence of the initial reset signal IT.

The next following state is designated ARI1. The transition to this state occurs with a signal ARI1J on line 3522 of the A/D state control circuit 3070, which is generated when the CPU requests an A/D conversion.

The next following state is designated ARI3. A transition to this state occurs with the signal on line 3558 of the A/D control circuit 3070. In the state ARI3, the A/D complete flag D1/ on line 3456 and the interrupt request flag IRQ/ on line 3462 are set.

The reentry to state ARI0 from state ARI3 takes place upon the occurrence of the A/D read signal ADREAD.

The truth table of FIG. 17 relates the A/D request and interrupt control states of FIG. 16 to the signals ARI1F and ARI2F. The signal ARI1F represents the Q terminal of flip-flop 3514, and the signal ARI2F represents the Q terminal of flip-flop 3416.

FIG. 18 is a timing diagram illustrating the time duration of control signals and control states in the A/D state control circuit 3070. A brief line-by-line account of each signal and state illustrated is as follows:

In line 3640, the signal ARI1J (=WRITE.2XX7) is shown. This signal indicates that the CPU is ready to load the multiplexer address register with a new analog variable select code and begin the A/D conversion for that analog variable.

In line 3650, the A/D request and interrupt control states ARI0, ARI1 and ARI3 are shown in timed relation to the other control signals in the system.

In line 3660, the A/D ramp reset control states ARR0, ARR2 and ARR3 are shown in timed relation to other control signals in the system.

In line 3670, the counter reset signal ADCRST is shown. The signal ADCRST appears on line 3062b of the A/D state control circuit 3070. This signal is applied to the reset terminal of the 8-bit counter 3060.

In line 3680, the timer reset signal ARR2F/ is shown. This signal appears on line 3632 of the A/D state control circuit 3070. Its function is to reset the 8-bit timer 3080.

In line 3690 the ramp reset signal ARR1F/ is shown. The signal is carried on line 3032 of the A/D state control circuit 3070. Its function is to reset the linear voltage ramp generator 3030.

In line 3700, the 128 microsecond clock signal C128US is shown. The signal appears at the Q8 output terminal of the 8-bit timer 3030 and is carried on line 3624. It is a delay signal which provides the linear ramp voltage generator 3030 a predetermined time to reset.

In line 3710, the 256 microsecond clock signal C256US is shown. This signal is produced at the Q9 output terminal of the 8-bit timer 3080 and carried on line 3610. Its function is to provide an upper limit to the A/D conversion time interval.

In line 3720, the A/D read signal ADREAD (=READ.2XX3) is shown. This signal appears on lines 3592, 3594 and 3092 of the A/D state control circuit 3070. Its occurrence indicates that the CPU desires to read the results of the most recent A/D conversion.

In line 3730, the linear ramp voltage output signal from the linear voltage ramp generator 3030 is shown. This signal is carried on line 3240 between the comparators 3020 and the ramp generator 3030. It is shown with three typical analog signals representing manifold air pressure, speed command and air temperature.

In line 3740, the A/D count enable signal ADCCTRL is shown. This signal is carried on line 3574 to generate ADCLK.

d. The Input Controller Board

The input controller board is broadly concerned with the processing of data and computation of parameters relating to engine speed and position. Its primary input signals are from the crankshaft position sensor and the camshaft position sensor.

In more specific terms, the input controller board performs the following four functions:

Synchronizing the crankshaft position sensor to the system clock, and generating an encoded output signal representative of camshaft position.

Generating metering and injection reference signals for the output controllers and multiplexer control signals for the output demultiplexers.

Performing the RPM measurement by timing 120 engine degrees.

Providing a 16-microsecond clock and a 2-microsecond clock for use by the other electronics.

The manner in which the first function of synchronizing the crankshaft position sensor to the system clock is carried out is basically described as follows. The crankshaft position sensor provides one pulse per engine degree. The output signal from the crankshaft position sensor is sampled every two microseconds, and, if a transition in signal level occurs, it is again sampled by a 16-microsecond clock. If sampling with both 2-microsecond and 16-microsecond clocks indicates that a transition has occurred, then a pulse is generated to indicate 0.5 degrees has passed. This pulse is designated DEG.5PLS and it occurs with both positive and negative transitions in the output signal from the crankshaft position sensor. In sensing both positive and negative transitions in the degree pulse in timed relation to the 2-microsecond clock and the 16-microsecond clock, the degree pulse is effectively differentiated and synchronized to the system clock.

The second specific function of generating metering and injection reference signals is basically carried out as follows. The crankshaft position sensor and the camshaft position sensor generate a pair of signals from which absolute camshaft position can be derived. A first decoding of these signals defines a set of three signals which are used collectively to define six possible 120 degree intervals throughout the full engine cycle of 720 degrees. A second decoding is used to define a set of six distinct camshaft position signals which have a one-to-one correspondence with the six 120 degree engine intervals. At each of the six engine positions an injection reference signal is generated. This is generally accomplished by sending the results of the second decoding to a synchronizing and differentiating circuit similar to that used for the synchronization and differentiation of the degree output signal.

The metering reference signals are generated 45 degrees after each injection reference signal. At the time for each injection reference signal a counter is preset to a count of 90, and then is counted down with the 0.5 degree pulse signal DEG.5PLS. When the counter reaches 0, a metering reference signal is generated and logically gated to the appropriate output controller on the output controller boards. Because each metering reference signal is used for two injectors, a flag is used to select one of the two injectors for operation. These flags are designated CYLXXF and are switched between states by the metering reference signal. There is one such flag CYLXXF and one metering reference signal for each output controller of the pair of output controller boards.

The third specific function of measuring engine RPM every 120 degrees is accomplished as follows. The timing of 120 degrees of engine revolution is correlated with the decoding of the absolute camshaft position into six 120 degree intervals. A counter is enabled at the start of each 120 degree interval and counted up by the 16- microsecond clock until the end of the interval. The output signal from the counter, which is in the form of two 8-bit words, is made available to the CPU on the data bus along with an accompanying interrupt request control signal.

The fourth specific function of providing a 16-microsecond clock and a 2-microsecond clock is carried out as follows. The 2-microsecond clock is generated by dividing the second phase of the TTL level system clock signal ∅2, which is a 1-microsecond clock, with a flip-flop. The 2-microsecond clock is used by all of the timing circuitry on the input controller board and by the control circuitry on the output controller boards. The 16-microsecond clock is generated from the 2-microsecond clock by using a divide-by-8 counter. The 16-microsecond clock signal is used as a sampling signal by the first synchronizing and differentiating circuit and as a counting signal for RPM measurement and an output controller metering signal function.

All interrupt request signals to the CPU are timed to the occurrence of an injection reference pulse. Each interrupt signal is held until a system status is read, at which time the interrupt is cleared. A flag is used to identify the reading of the system status. The reading and interpretation of the flag is under the control of the system software.

Figure 19:
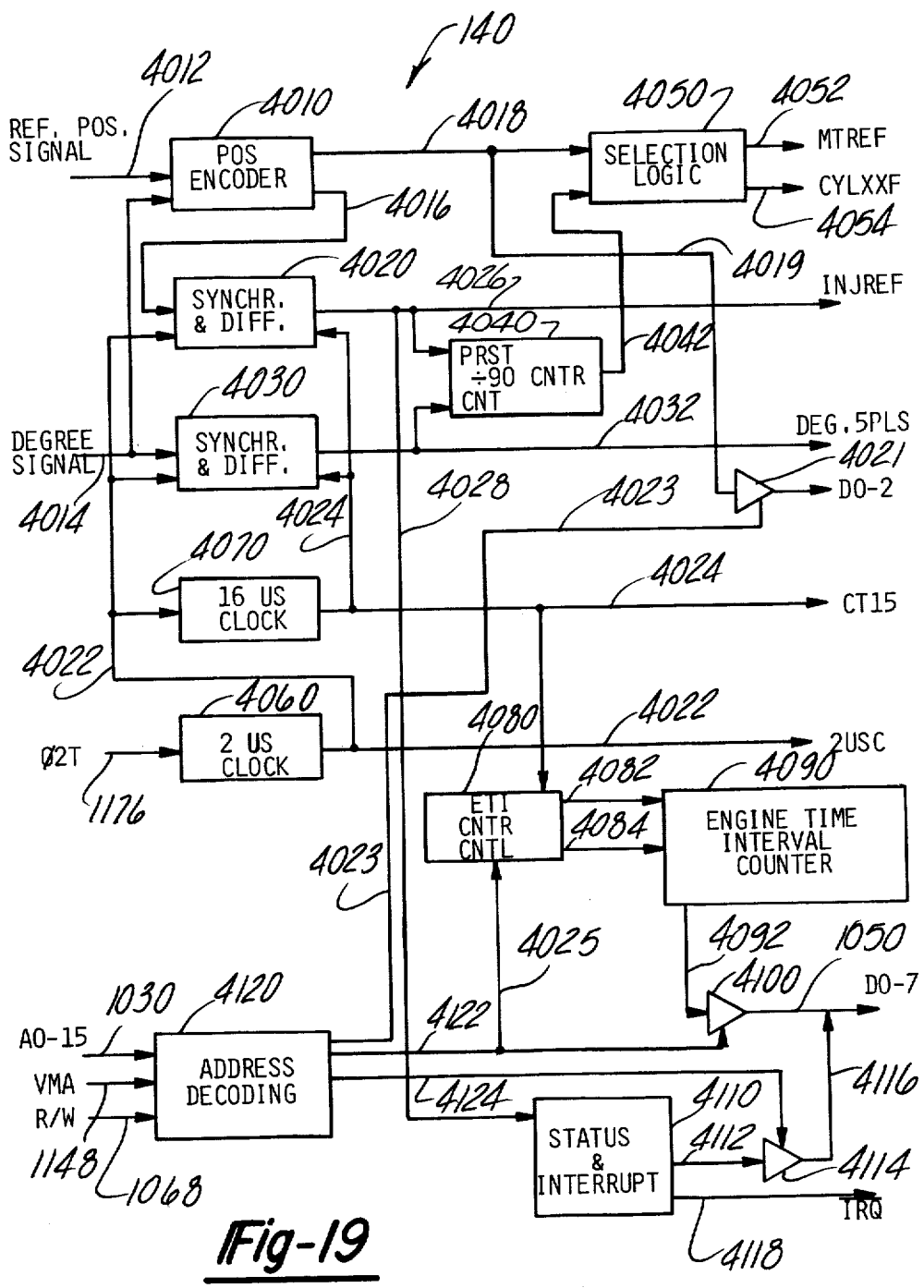
FIG. 19 is a generalized block diagram illustration of the input controller board of the electronic control unit.

FIG. 19 illustrates the input controller board 140 in block diagram form. FIGS. 20A–H illustrate the input controller 140 in schematic detail.

With reference to FIG. 19, the input controller board 140 includes a position encoding circuit 4010. The general function of the position encoding circuit 4010 is to relate the position signals from the camshaft sensor and the crankshaft sensor to an absolute camshaft position. More specifically, the position encoding circuit 4010 has as one input a reference position signal on line 4012 from the camshaft sensor, and as another input a degree signal on line 4014 from the crankshaft position sensor. The circuit 4010 produces output signals on lines 4016 representing an absolute camshaft position. Another set of output signals on lines 4018 relating to absolute camshaft position are used by a selection logic circuit 4050 and are also taken off by line 4019 to a tri-state driver 4021. The driver 4021 buffers the signals on lines 4019 and places them on the data bus for use by the CPU.

A first synchronizer and differentiator circuit 4020 is provided generally to synchronize the absolute camshaft position signal on line 4016 to a 16-microsecond clock. The first synchronizer and differentiator (SD) circuit 4020 receives as a first input absolute camshaft position signals on line 4016, a second input in the form of a 2-microsecond clock signal on line 4022, and a third input in the form of a 16-microsecond clock signal on line 4024. The 2-microsecond clock signal is produced by a 2-microsecond clock 4060, and the 16-microsecond signal is produced by a 16-microsecond clock 4070. The first SD circuit 4020 produces a first output in the form of an injection reference signal INJREF on line 4026, and an interrupt request signal on line 4028.

A second SD circuit 4030 is provided generally to differentiate the degree signals from the crankshaft sensor and synchronize them with the system clock. The SD circuit 4030 has as one input the degree signal on line 4014, as a second input the 2-microsecond clock signal on line 4022, and as a third input a 16-microsecond clock signal on line 4024. The output of the second SD circuit 4030 is a sequence of pulses on line 4032. There is a pulse DEG.5PLS for each one-half degree of engine revolution.

A divide-by-90 counter 4040 is provided generally to time the occurrence of a metering reference signal with the injection reference signal INJREF on line 4026. In overview, the divide-by-90 counter 4040 is preset to a count of 90, and then counted down through 90 pulses, with each pulse representing one-half degree of engine revolution. When the counter 4040 is counted down to zero, it indicates that 45 degrees of engine revolution have occurred since the occurrence of the injection reference signal INJREF. The divide-by-90 counter has a preset input terminal PRST that receives the injection reference signal INJREF off line 4026, and a count terminal CNT that receives each one-half degree pulse DEG.5PLS off line 4032. When the counter 4040 is counted down to zero, a signal is produced on line 4042 signifying that event.

A selection logic circuit 4050 is provided generally to produce a metering reference signal for one injector pair on the output controller board 150, and set a flag indicating which injector of the pair is to be selected. The selection logic 4050 receives as one input the set of absolute camshaft position signals on lines 4018, and as another input the zero count signal on line 4042. The first output of the selection logic circuit 4050 is one of a set of metering reference signals MTREF0-2, and a second output is a set of flags CYLXXF which are set or reset to indicate which injector of each injection pair is to be selected.

An engine time interval counter control circuit 4080 and an engine time interval counter 4090 cooperate to provide a measurement of engine RPM through each 120 degrees of engine revolution. The engine time interval control receives as a first input a decoded address signal on line 4025, and as a second input the 16-microsecond clock signal on line 4024. The outputs of the engine time interval counter control circuit 4080, which are applied directly as inputs to the engine time interval counter 4090, are a reset signal on line 4082 and a count signal on line 4084. The output of the engine time interval counter is a pair of 8-bit words on lines 4092. The signals on 4092 are received by a data bus driver 4100 which produces a set of output signals onto the data bus 1050 which are an inverted and amplified form of its input signals.

A status and interrupt circuit 4110 is provided generally to supply the CPU 1000 with information relating to the status of the present engine time interval measurement and produce an interrupt request signal upon the completion of each RPM measurement. The status and interrupt circuit 4110 receives as input the injection reference signal INJREF on line 4026. It produces as a first output signal a status flag on line 4112. The status flag is applied to a tri-state driver 4114. The driver output on line 4116 is placed onto the data bus 1050. The second output of the status and interrupt circuit is the interrupt request signal IRQ/ on line 4118.

An address decoding circuit 4120 is provided generally to decode inquiries from the CPU 1000 and control access to the data bus 1050 for response to those inquiries. The address decoding circuit 4120 receives as input the 16-bit address bus 1030, the valid memory address signal VMA on line 1148, and the read/write signal R/W on line 1068. A pair of sequential output signals on line 4122 are applied to the control terminals on the tri-state driver 4100 to control communication of the engine time interval counter output lines 4092 with the data bus 1050; the first of the pair of signals controls the first 8-bit word placed on the data bus, and the second signal controls the second 8-bit word. Another output signal on line 4124 is applied to the control terminal of the tri-state driver 4114 to likewise control communication of this output line 4116 with the data bus 1050; and another output signal on line 4023 is used to control communication of the once-decoded camshaft position signals on lines 4018 onto the data bus, and to control resetting of the engine time interval counter control 4080.

Figure 20B:
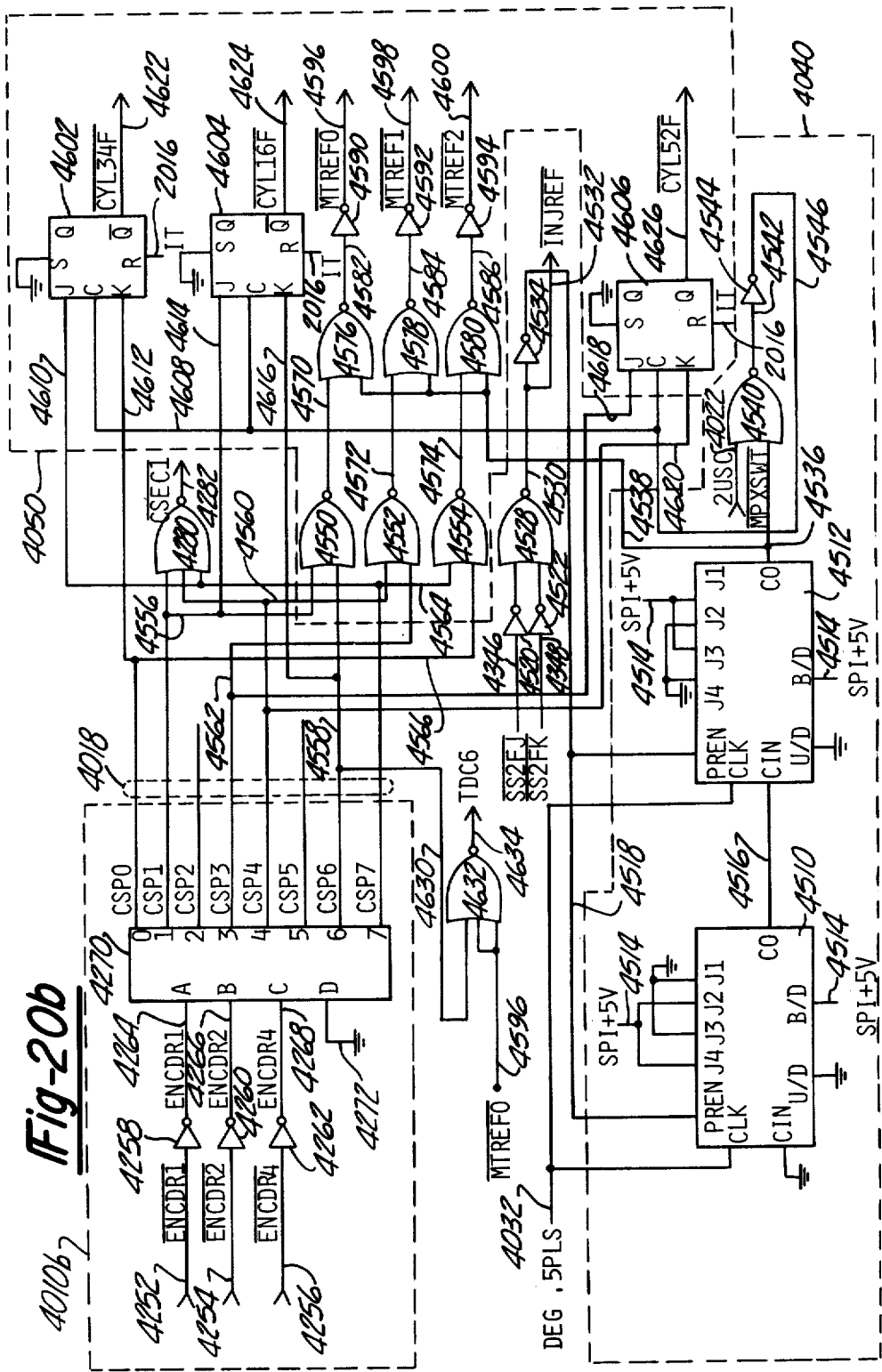
Figure 21:
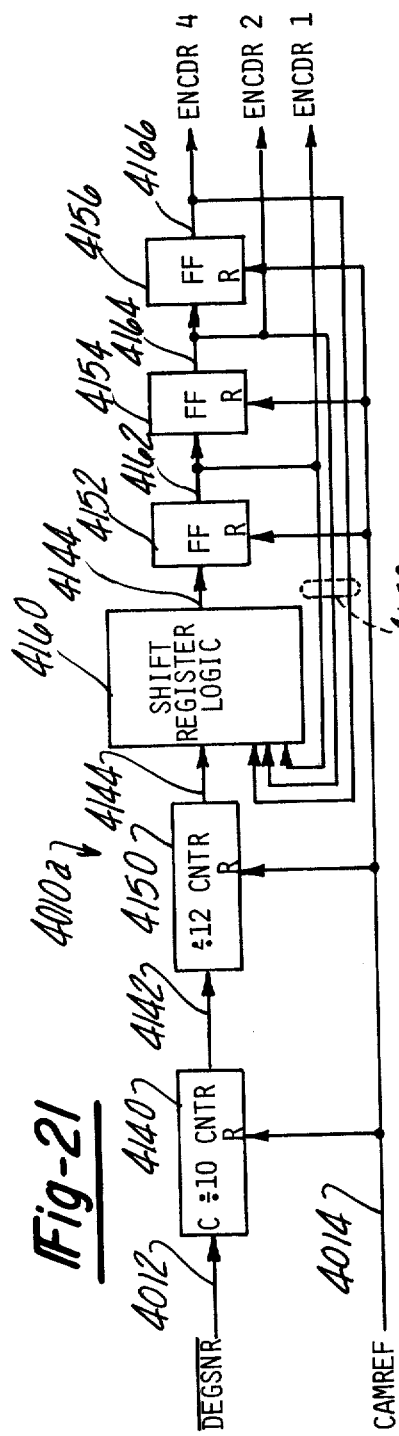
FIG. 21 is a block diagram of a portion of the position encoder on the input controller board.

With reference to FIGS. 20A and 21, the position encoder is shown in part generally at 4010a. FIG. 21 is a relatively detailed block diagram illustration of a major part of the position encoder, and FIG. 20A illustrates the same part of the position encoder in full schematic detail.

With specific reference to FIG. 21, the position encoder 4010 includes a divide-by-10 counter 4140 which receives as one input the crankshaft sensor signal, which is designated DEGSNR/ on line 4012 and as another input the camshaft reference signal, designated CAMREF, on line 4014. More specifically, the crankshaft sensor signal DEGSNR/ is applied to the clock input terminal on the counter 4140, and the camshaft reference signal CAMREF is applied to the reset input terminal. The counter output signal on line 4142 is a divided-by-10 version of the input signal.

A divide-by-12 counter 4150 receives as input the signal on line 4142. The basic function of the divide-by-12 counter is to step down further, by a factor of 12, the frequency of the signal on line 4142. Overall, the divide-by-10 counter 4140 and the divide-by-12 counter 4150 effect a division by 120 of the frequency of the crankshaft sensor signal DEGSNR. This overall division by 120 divides the engine operating cycle of 720 degrees into six 120 degree intervals. The divide-by-12 counter 4150 has a reset input terminal which receives the camshaft reference signal CAMREF on line 4014. The counter output signal on line 4144 is a divided-by-120 version of the crankshaft sensor signal DEGSNR/.

A shift register, defined by the serial connection of three flip-flops, and a shift register logic circuit are used to develop three encoder output signals. Each of the three encoder output signals are phase shifted relative to one another by 120 degrees. The three encoder output signals can be used collectively to uniquely define any one of six distinct 120 degree operating intervals.

More specifically, the shift register logic circuit 4160 receives as input the signal on line 4144. It also receives feedback from the flip-flop on feedback lines 4158.

The shift register is defined by three serially connected flip-flops 4152, 4154 and 4156. The flip-flop 4152 receives as input the S/R logic output signal on line 4144. The output signal of flip-flop 4152 is communicated on line 4162 to the input of the flip-flop 4154. The output signal of flip-flop 4154 is communicated on line 4164 to the input of flip-flop 4156. The output signal of flip-flop 4156 appears on line 4166. The first encoder signal ENCDR1 is taken off line 4162 as the output signal from flip-flop 4152. The signal ENCDR1 is also fed back on one of the lines 4158 to the S/R logic circuit 4160. The second encoder signal ENCDR2 appears on line 4164 as the output signal of flip-flop 4154. This signal is also fed back on one of the lines 4158 to the input of the S/R logic circuit 4160. The third encoder output signal ENCDR4 appears on line 4166. This signal is also fed back on one of the lines 4158 to the input of the S/R logic circuit 4160. Each of the flip-flops 4152, 4154 and 4156 has a reset input terminal R which has applied to it the camshaft reference signal CAMREF on line 4014.

Figure 22:
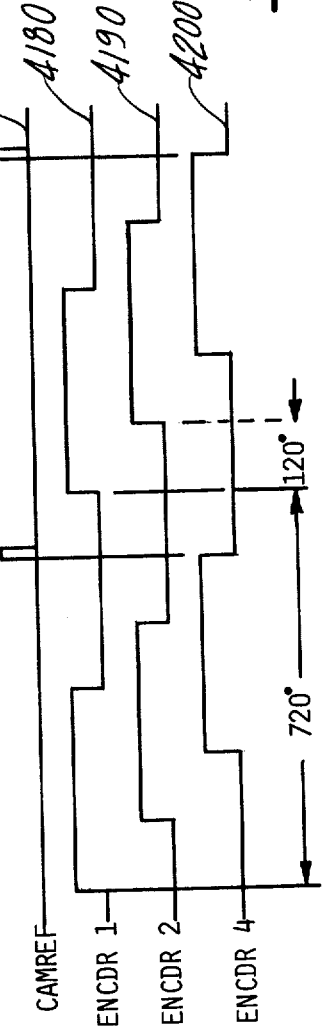
FIG. 22 is a timing diagram which illustrates the output signals from the portion of the position encoder illustrated in FIG. 21.

More specifically, with reference to FIG. 22, the camshaft reference signal CAMREF on line 4170 is a single pulse that occurs every 720 degrees of engine revolution, i.e. once for each complete engine cycle. The first encoder output signal ENCDR1 on line 4180 is high through the first 360 degrees of engine revolution, after a phase shift of 120 degrees from CAMREF and low for the next 360 degrees in a periodic manner. The second encoder output signal ENCDR2 on line 4190 is phase shifted by a delay of 120 degrees relative to the signal ENCRD1. This signal is likewise high for 360 degrees, and low for the next 360 degrees. The third encoder output signal ENCDR4 on line 4200 is phase shifted relative to the signal ENDCR1 by a delay of 240 degrees. It likewise is high for 360 degrees, and low for the next 360 degrees. The states of the three encoder output signals on line 4180, 4190 and 4200 collectively define six distinct engine operating intervals of 120 degrees duration.

With specific reference to FIG. 20A, the major portion 4010a of the position encoder is shown in schematic detail.

The divide-by-10 counter 4140 has a clock input terminal CLK, an enable input terminal EN, and a reset input terminal RST. A practical form of divide-by-10 counter for this application is a National Semiconductor CD4017C Divide-By-10 Counter/Divider. The clock input terminal CLK receives the crankshaft sensor output signal DEGSNR/ on line 4012. The signal DEGSNR/ provides a pulse for each degree of crankshaft revolution. The enable input terminal is connected to ground by line 4184 to hard-wire the counter 4140 into its enabled state. The reset input terminal RST receives a buffered form of the camshaft sensor output signal CAMREF. Specifically, the signal CAMREF is applied on line 4014 to a voltage divider network defined by the serial connection of resistors 4172 and 4174. The voltage at the common node of resistors 4172 and 4174 is applied as input to an inverter 4176. The output signal from inverter 4176 is applied as input to another inverter 4178. The output signal from inverter 4178, which appears at node 4182, is applied to the reset input terminal RST of the counter 4140.

The counter 4140 has one output terminal O10 which produces an output signal DEG10 on line 4146 for every 10 degrees of engine revolution. It also has a carry output terminal C that produces a carry bit on line 4142 whenever the counter 4140 has counted up to its limit. A carry bit signal on line 4142 represents the divided-by-10 version of the input signal on line 4012.

The divide-by-12 counter 4150 is effected by interconnecting four J-K flip-flops 4202, 4204, 4206 and 4208 in the following described manner.

Each of the J-K flip-flops 4202–4208 has conventional data input terminals, J, K; data output terminals Q, Q/; a clock terminal C; a set terminal S; and a reset terminal R. The set terminals of all the J-K flip-flops 4202–4208 are connected to ground potential by line 4210, and the reset terminals R are connected in common to node 4182 by line 4216. The K data input terminals of each of the flip-flops 4202–4208 are held high by the application of +5 volts through a resistor 4212. The clock terminals C of both flip-flops 4202 and 4204 are connected to line 4142 and receive the carry bit output signal from the counter 4140. The J data input terminal of flip-flop 4202 is connected by line 4214 to the Q/ output terminal of flip-flop 4204. The Q output terminal of flip-flop 4202 is connected by line 4218 to the J input terminal of flip-flop 4204. The Q output terminal of flip-flop 4204 is connected by line 4220 to the clock terminal C of flip-flop 4206. The J data input terminal of flip-flop 4206 is connected to the associated K input terminal and held high by the application of the +5 volt source through the resistor 4212. The Q output terminal of flip-flop 4206 is connected by line 4222 to the clock terminal C of flip-flop 4208. The J data input terminal of flip-flop 4208 is connected in the same manner as the J data input terminal of flip-flop 4206. The output signal from the Q output terminal of flip-flop 4208 appears on line 4224 and represents a divided-by-12 version of the carry bit signal on line 4142. Basically, the first two flip-flops 4202 and 4204 are interconnected in such a manner as to effect a divide-by-3 of the carry bit signal on line 4142, and the flip-flops 4206 and 4208 are interconnected in a manner to effect a divide-by-4 of the signal on line 4220 from the Q output terminal of flip-flop 4204.

The shift register (S/R) logic circuit is contained within the dashed block indicated generally at 4160. The three-bit shift register comprises the serial connection of J-K flip-flops 4152, 4154 and 4156. The interconnection of the flip-flops 4152-4156 is described in the following manner.

Each of the set terminals S of the J-K flip-flops is connected to ground potential by line 4210. The reset terminals R on each of the flip-flops are connected in common by line 4216 to the node 4182, i.e. the reset terminals each receive the buffered form of the camshaft sensor reference signal CAMREF.

The J input terminal of flip-flop 4152 receives the output signal of the shift register logic circuit 4160 on line 4242. The K input terminal of flip-flop 4152 receives a feedback signal on line 4166 from the Q output terminal of flip-flop 4156.

The Q output terminal of flip-flop 4152 is connected by line 4162 to the J input terminal of flip-flop 4154. The Q/ output terminal of flip-flop 4152 is connected by line 4230 to the K input terminal of flip-flop 4154.

The Q output terminal of flip-flop 4154 is connected by line 4164 to the J input terminal of flip-flop 4156. The Q/ output terminal of flip-flop 4154 is connected by line 4232 to the K input terminal of flip-flop terminal 4156.

The clock terminals C of the flip-flops 4152, 4154 and 4156 are connected in common to the Q output terminal of flip-flop 4208 by line 4224. In other words, the shift register flip-flops are clocked once per 120 degrees of engine revolution.

The shift register logic circuit 4160 comprises a first NOR gate 4236 which receives as one input the signal appearing on line 4162, and as another input the signal appearing on line 4232. The NOR gate output signal on line 4238 is applied as one input to a second NOR gate 4240. The other input to the NOR gate 4240 is the signal on line 4166. The NOR gate output signal on line 4242 is applied directly to the J input terminal of flip-flop 4152.

The encoder output signals are defined by the Q/ output signals of flip-flops 4152, 4154, and 4156. More specifically, the first encoder output signal ENCDR1 appears in inverted form on line 4230. The second encoder output signal ENCDR2 appears in inverted form on line 4232. The third encoder output signal ENCDR4 appears in inverted form on line 4234.

The logic equations for the shift register logic circuit are presented as follows:

J input signal (line 4242) = ENCDR4/·(ENCDR2/+ENCDR1)

K input signal (line 4166) = ENCDR4

With reference to FIG. 20B, the other part of the position encoder is indicated generally at 4010b. This part of the position encoder performs a BCD-to-decimal conversion of the encoder output signals.

Specifically, encoder output signals ENCDR1/, ENCDR2/ and ENCDR4 are carried on respective lines 4252, 4254 and 4256. Each of the encoder output signals is applied to a respective inverter 4258, 4260 and 4262 which inverts the signals into the form ENCDR1, ENCDR2 and ENCDR4 on lines 4264, 4266 and 4268, respectively.

A BCD-to-decimal converter 4270 performs a conversion of the encoder output signals from binary coded decimal format into decimal format. A practical form of BCD-to-decimal converter 4270 is a National Semiconductor CD4028 BCD-to-Decimal Decoder.

The BCD converter 4270 has four data input terminals designated A, B, C and D. The D input terminal is not used in this application and is connected to ground by line 4272. The converter also includes ten output terminals, of which eight, 0-7, are used in the present application. In general, the signals applied to the input terminals A, B, C and D are interpreted as binary coded decimal signals representing a decimal number between 0 and 10. The input signals will select one and only one corresponding terminal of the ten available output terminals. In the present case, only three bits of input signal information are used, and therefore only eight of the ten available output terminals are needed. In sum, the encoder output signals ENCDR1, ENCDR2 and ENCDR4 will uniquely define one of six possible engine operating intervals of 120 degrees duration. Whichever of the six possible intervals is represented by the present value of the encoder output signals will be converted into a decimal representation on one of the lines 4018.

The signals on lines 4018 are designated CSP0-CSP7. The signals CSP2 and CSP5 are not used.

The signals CSP1, CSP4 and CSP7 are used to derive another camshaft reference signal designated as CSEC1/. More specifically, a NOR gate 4280 receives as inputs the signals CSP1, CSP4 and CSP7. When all of the input signals are low, the camshaft reference signal CSEC1/ on line 4282 will be high.

Figure 20C:
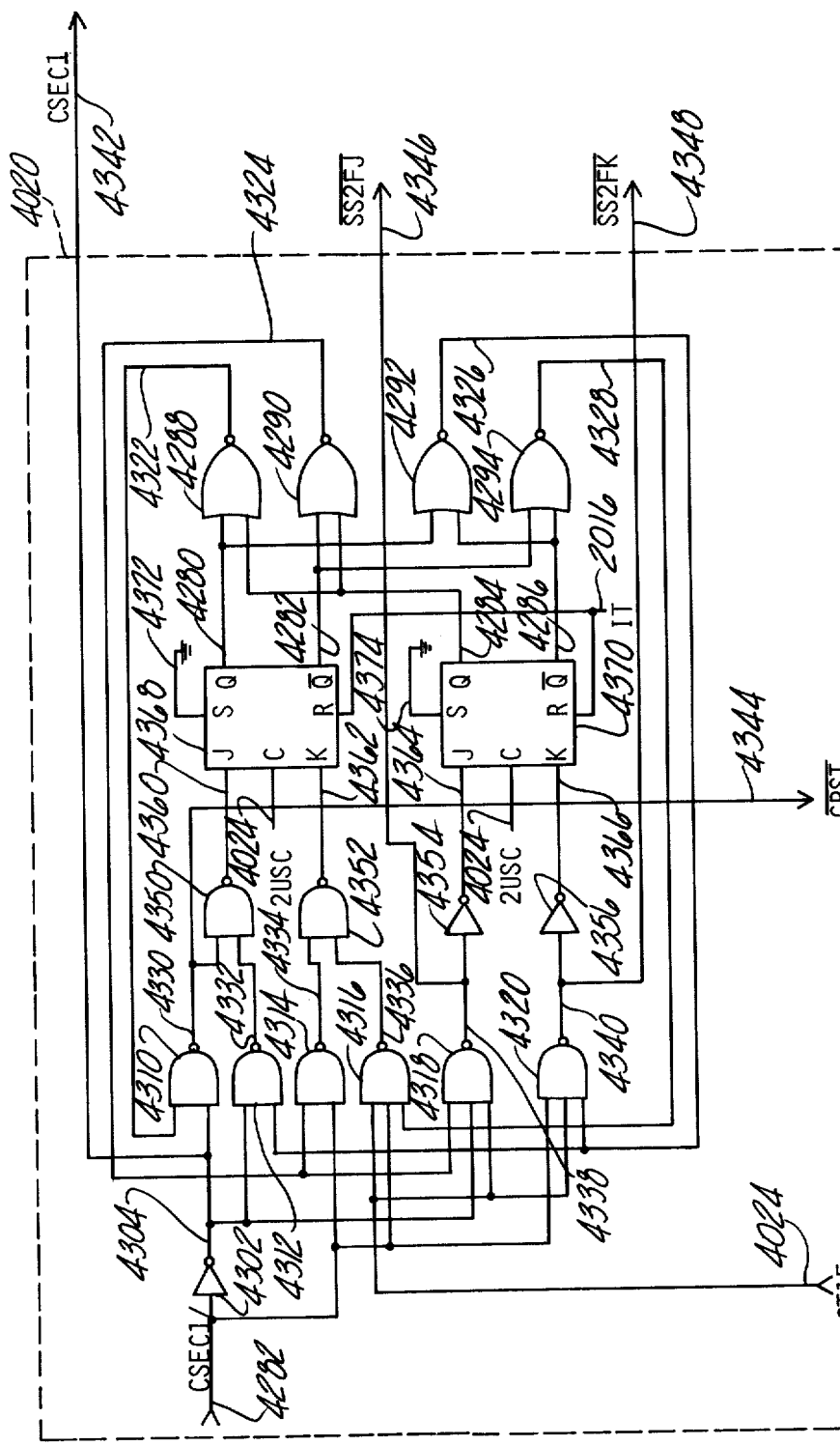

FIG. 20C is a schematic illustration of the first synchronizer and differentiator (S-D) circuit 4020. The primary function of the first S-D circuit 4020 is to synchronize the camshaft reference signal CSEC1/ with the 16-microsecond clock signal CT15 and produce an injection reference signal INJREF every 120 degrees of engine revolution and an interrupt request control signal at the same time as the injection reference signal.

The first S-D circuit 4020 receives the camshaft reference signal CSEC1/ on line 4282, (this signal is not to be confused with the camshaft reference pulse CAMREF which occurs once per engine cycle). The signal CSEC1/ is applied to inverter 4302. The inverter output signal on line 4304 is a non-inverted camshaft reference signal CSEC1 which is taken off by line 4342 for use with other circuits. The other input signal to the first S-D circuit 4020 is the 16-microsecond clock signal CT15 on line 4024.

A group of six NAND gates 4310, 4312, 4314, 4316, 4318 and 4320 receive as inputs various combinations of the inverted and non-inverted forms of the camshaft reference signal, the 16-microsecond clock signal and certain various feedback signals. More specifically, the NAND gate 4310 has as one input the signal CSEC1, and as another input a feedback signal on line 4322. The NAND gate 4312 has as one input the signal CSEC1, and as another input a feedback signal on line 4326. The NAND gate 4314 has as one input the signal CSEC1/, and as another input a feedback signal on line 4342. The NAND gate 4316 has as a first input the clock signal CT15, as a second input the signal CSEC1/, and as a third input a feedback signal on line 4328. The NAND gate 4318 has as a first input the feedback signal on line 4342, as a second input the signal CSEC1, and as a third input the clock signal CT15. The NAND gate 4320 has as a first input the signal CSEC1/, as a second input the clock signal CT15, and as a third input the feedback signal on line 4326.

The NAND output signal on line 4330 is taken off by line 4344 and used as a counter reset signal for the 16-microsecond clock 4070. The NAND output signal on line 4338 is taken off by line 4346 and designated SS2FJ/. The NAND gate output signal on line 4340 is taken off by line 4348 and designated SS2FK/. The signals SS2FJ/ and SS2FK/ are used to derive both the injection reference signal INJREF and the interrupt request signal IRQ/.

The NAND gate output on line 4330 is applied as input to a NAND gate 4350. The other input to the NAND gate 4350 is the NAND gate output signal on line 4332. The output signal from NAND gate 4350 appears on line 4360.

The NAND gate output signal on line 4334 is applied as one input to a NAND gate 3452. The other input to the NAND gate 4352 is the NAND gate output signal on line 4336. The output signal from NAND gate 4352 appears on line 4362.

The NAND gate output signal on line 4338 is applied to an inverter 4354. The inverter output signal appears on line 4364. The NAND gate output signal on line 4340 is applied to an inverter 4356. The inverter output signal appears on line 4366.

A pair of J-K flip-flops 4368 and 4370 each have conventional terminal designations. The set terminal S of the flip-flop 4368 is connected to ground by line 4372. The set terminal S of the flip-flop 4370 is connected to ground by line 4374. The reset terminal R of both flip-flops 4368 and 4370 are connected in common to receive the initial reset signal IT on line 2016. The clock terminals C of both flip-flops 4368 and 4370 each receive the 2-microsecond clock signal 2USC on line 4024.

The J input terminal of flip-flop 4368 receives the NAND gate output signal on line 4360. The K terminal receives the NAND gate output signal on line 4362. The J terminal of flip-flop 4370 receives the inverter output signal on line 4364. The K terminal of flip-flop 4370 receives the inverter output signal on line 4366.

The Q terminal of flip-flop 4368 produces an output signal on line 4280. The Q/ output terminal of flip-flop 4368 produces an output signal on line 4282. The Q output terminal of flipflop 4370 produces an output signal on line 4284. The Q/ output terminal of flip-flop 4370 produces an output signal on line 4286.

A group of four NOR gates 4288, 4290, 4292 and 4294 receive various combinations of the Q and Q/ output signals of flip-flops 4368 and 4370. More specifically, the NOR gate 4288 receives as one input the Q output signal on line 4280, and as another input the Q output signal on line 4284. The NOR gate output signal is fed back on line 4322 as one input to the NAND gate 4310.

The NOR gate 4290 receives as one input the Q/ output signal on line 4282, and as another input the Q output signal on line 4284. The NOR gate output signal on line 4324 is fed back as an input signal to the NAND gates 4314 and 4318.

The NOR gate 4292 receives as one input the Q output signal on line 4280, and as another input the Q/ signal on line 4286. The NOR gate output signal on line 4326 is fed back as input to the NAND gates 4312 and 4320.

The NOR gate 4294 has as one input the Q/ output signal on line 4282, and as another input the Q/ output signal on line 4286. The NOR gate output signal on line 4328 is fed back as input to the NAND gate 4316.

Figure 23:
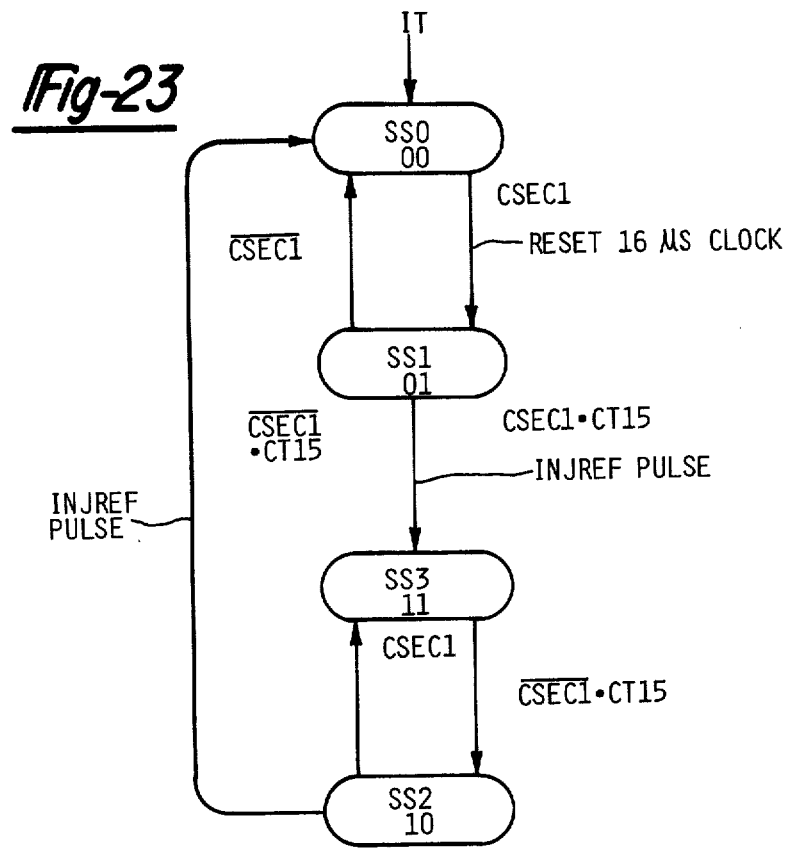
FIG. 23 is a state diagram illustrating the various control states which a first synchronizer and differentiator circuit on the input controller board may assume.
Figure 24:
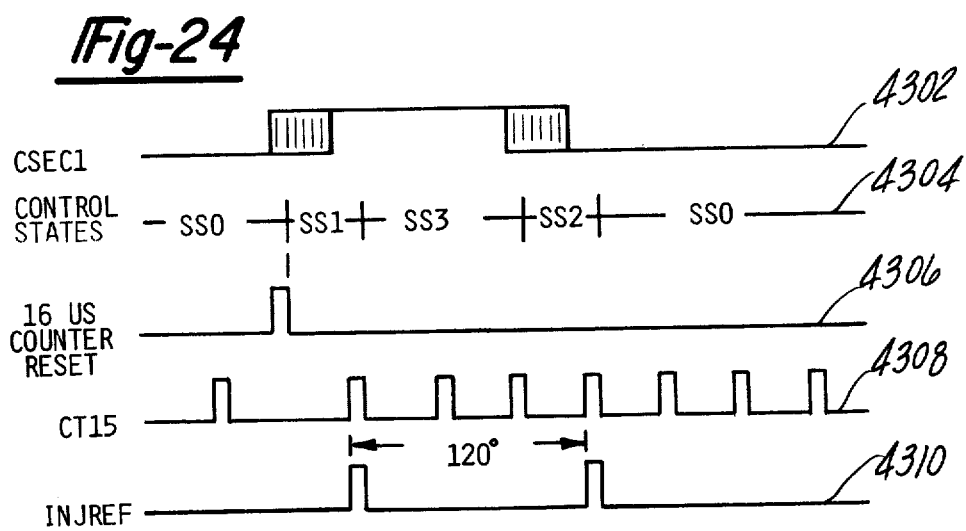
FIG. 24 is a timing diagram which relates the significant signals processed by the first synchronizer and differentiator circuit with the various control states of FIG. 23.

FIG. 23 is a state diagram illustrating the various control states which the first synchronizer and differentiator circuit 4020 may assume. FIG. 24 is a timing diagram which relates the significant signals of the first synchronizer and differentiator circuit 4020 with various control states.

With reference to FIG. 23, the first control stage is designated SS0. This state is entered upon the occurrence of the initial reset signal IT. In control state SS0 the engine time interval counter 4090 is enabled.

The next related control state is designated SS1. This state is entered from SS0 when the camshaft reference signal CSEC1 goes high. With the occurrence of the signal CSEC1 the 16-microsecond clock 4070 is reset. The control state SS0 is reentered from control state SS1 upon occurrence of the inverted camshaft reference signal CSEC1/.

The control state SS3 is entered from the control SS1 upon the concurrence of signal CSEC1 and CT15. The concurrence of these signals also marks the timing of an injection reference pulse signal INJREF.

The control state SS2 is entered from state SS3 upon the concurrence of the signals CSEC1/ and CT15. The control state SS3 can be reentered from state SS2 upon the occurrence of the signal CSEC1.

The control state SS0 is reentered upon the concurrence of the signals CSEC1/ and CT15. With the reentry of state SS0 in this manner, the injection reference signal INJREF is generated.

With reference to FIG. 24, the various control states SS0–SS3 are related to the significant signals processed by a first synchronizer and differentiator circuit 4020. More specifically, in line 4302, the non-inverted camshaft reference signal CSEC1 is shown. In line 4304, the various control states SS0–SS3 are shown in timed relation to the non-inverted camshaft reference signal CSEC1. In line 4306, the 16-microsecond clock reset signal CRST is shown with its trailing edge timed to the transition between states SS0 and SS1. In line 4308, the 16-microsecond clock signal CT15 is shown synchronized with the injection reference signal INJREF in line 4310.

Figure 25:
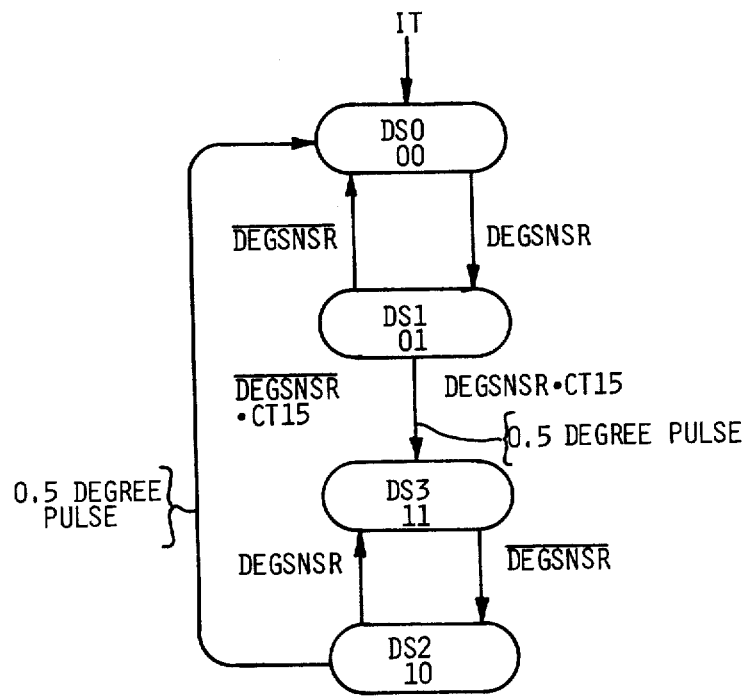
FIG. 25 is a state diagram of the various control states which a second synchronizer and differentiator circuit on the input controller board may assume.
Figure 26:
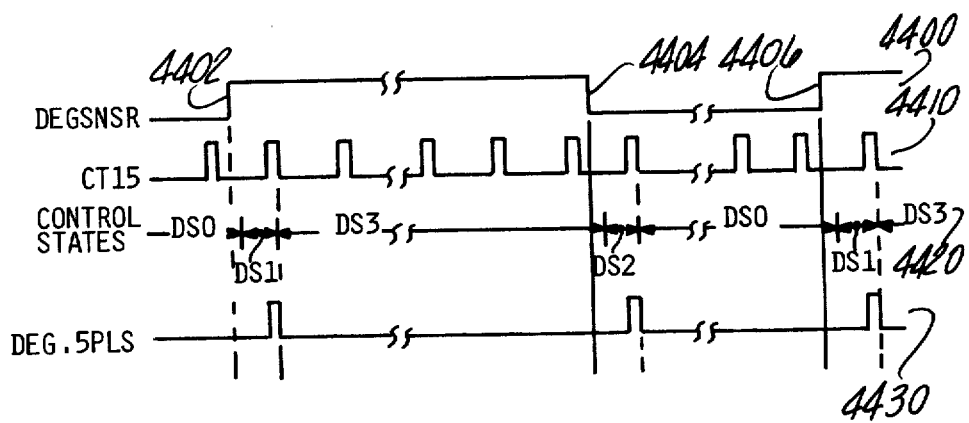
FIG. 26 is a timing diagram which relates significant signals processed by the second synchronizer and differentiator circuit with the control states illustrated in FIG. 25.

FIG. 20D illustrates schematically the second synchronizer and differentiator 4030. FIG. 25 is a state diagram of the various control states which the second S-D circuit 4030 may assume. FIG. 26 is a timing diagram relating the control states of FIG. 25 to significant signals within the second S-D circuit 4030.

With reference to FIG. 20D, the second S-D circuit 4030 receives as one input the output signal of the crankshaft sensor DEGSNSR/ on line 4014. The signal DEGSNSR/ is applied to an inverter 4312. The inverter output signal appears on line 4314. Another input to the second SD circuit 4030 is the 16-microsecond clock signal CT15 on line 4348.

A group of six NAND gates 4316, 4318, 4320, 4322, 4324 and 4326 receive as input various combinations of the inverted and noninverted forms of the signal DEGSNSR/, the signal CT15, and certain feedback signals to be described.

More specifically, the NAND gate 4316 has as a first input the noninverted signal DEGSNSR, and as second and third inputs a feedback signal on line 4340. The output signal of NAND gate 4316 appears on line 4328.

The NAND gate 4318 has as one input the noninverted crankshaft sensor signal DEGSNSR, and as another input the feedback signal on line 4344. The output signal of the NAND gate 4318 appears on line 4330.

The NAND gate 4320 has as a first input the inverted crankshaft sensor signal DEGSNSR, and as second and third inputs a feedback signal on line 4346. The output signal of NAND gate 4320 appears on line 4332.

The NAND gate 4322 has as one input a feedback signal on line 4342, and as another input the inverted crankshaft sensor output signal DEGSNSR/. The output signal from the NAND gate 4322 appears on line 4334.

The NAND gate 4324 has as a first input the noninverted crankshaft sensor signal DEGSNSR/, as a second input the 16-microsecond clock signal CT15 on line 4348, and as a third input the feedback signal on line 4342. The output signal of the NAND gate 4324 appears on line 4336. The NAND gate 4326 has a first input the inverted crankshaft sensor signal DEGSNSR/, as a second input the 16-microsecond clock signal CT15 on 4348, and as a third input the feedback signal on line 4344. The output signal of the NAND gate 4326 appears on line 4338.

A NAND gate 4350 has as one input the NAND gate output signal on line 4328, and as another input the NAND gate output signal on line 4330. The output signal of the NAND gate 4350 appears on line 4358.

A NAND gate 4352 has as one input the NAND gate output signal on line 4332, and as another input the NAND gate output signal on line 4334. The output signal of the NAND gate 4352 appears on line 4360.

An inverter 4354 receives as input the NAND gate output signal on line 4336. The inverter output signal appears on line 4362. The signal on line 4362 is designated DEGPOS and represents a positive transition in the crankshaft sensor output signal. It is taken off line 4362 by line 4366.

An inverter 4356 receives as input the NAND gate output signal on line 4338. The inverter output signal appears on line 4364. This signal is designated DEGNEG and represents a negative transition in the crankshaft sensor output signal. It is taken off line 4364 by line 4368.

A NOR gate 4398 has as one input the positive transition signal DEGPOS on line 4366, and as another input the negative transition signal DEGNEG on line 4368. The NOR gate output signal on line 4032 is designated DEG.5PLS/. This signal goes low during the occurrence of either of the signals DEGPOS or DEGNEG. It occurs once for each one-half (0.5) degree of engine revolution.

A pair of J-K flip-flops 4370 and 4372 have conventional terminal connections and designations. The set terminals S of both flip-flops 4370 and 4372 are connected to ground by lines 4374 and 4376, respectively. The reset terminals R of both flip-flops receive the initial reset signal IT on line 2016. Also, the clock terminals C of both flip-flops receive the 2-microsecond clock signal 2USC on line 4022.

The J input terminal of flip-flop 4370 receives the NAND gate output signal on line 4358. The K input terminal of flip-flop 4370 receives the NAND gate output signal on line 4360. The J input terminal of flip-flop 4372 receives the inverter output signal on line 4362. The K input terminal receives the inverter output signal on line 4364.

The Q output terminal of flip-flop 4370 produces a signal on line 4380 that is applied as one input to a NOR gate 4390, and also as one input to a NOR gate 4394. The Q/ output terminal of flip-flop 4370 produces a signal on line 4382 that is applied as one input to a NOR gate 4392, and also as one input to a NOR gate 4396. The Q output terminal of flip-flop 4372 produces an output signal on line 4384 that is applied as one input to the NOR gate 4390, and also as one input to the NOR gate 4392. The Q/ output terminal of flip-flop 4372 produces an output signal on line 4386 that is applied as one input to the NOR gate 4394, and also as one input to the NOR gate 4396.

The output signal of the NOR gate 4390 appears on line 4340 and is fed back as an input signal to the NAND gate 4316. The output signal of the NOR gate 4392 appears on line 4342 and is fed back as an input signal to both the NAND gates 4322 and 4324. The output signal of the NOR gate 4394 appears on line 4344 and is fed back as an input signal to both the NAND gates 4318 and 4326. The output signal of NOR gate 4396 appears on line 4346 and is fed back as an input signal to the NAND gate 4320.

FIG. 25 is a state diagram illustrating the various control states which the second synchronizer and differentiator circuit 4030 may assume. An initial state designated is DS0 and is entered upon the occurrence of the initial reset signal IT.

The next following state is designated DS1 and is entered upon the occurrence of the crankshaft sensor output signal DEGSNSR. Alternatively, the state address DS0 is reentered from state DS1 upon the occurrence of the inverted crankshaft sensor output signal DEGSNSR/.

The next following state is designated DS3. This state is entered upon the concurrence of the signals DEGSNSR and CT15. In the transition from the state DS1 to the state DS3 the signal DEG.5PLS will occur.

The next following state is designated DS2. This state is entered from the state DS3 upon the occurrence of the inverted crankshaft sensor output signal DEGSNSR/. Alternatively, state DS3 is reentered from state DS2 upon the occurrence of the crankshaft sensor output signal DEGSNSR.

The reentry of control state DS0 from state DS2 takes place upon the concurrence of the signals DEGSNSR/ and CT15. In this transition the signal DEG.5PLS occurs.

FIG. 26 is a timing diagram which relates the control states of the second synchronizer and differentiator circuit 4030 with the significant signals processed by the circuit.

In line 4400 appears the crankshaft sensor output signal DEGSNSR. The signal DEGSNSR has a positive transition at point 4402 and a negative transition at point 4404. During the time interval between point 4402 and point 4404 the crankshaft position sensor is sensing a mark on the crankshaft that signifies one degree of revolution. In fact, the transition point 4402 is displaced by exactly one degree of crankshaft revolution from another transition point 4406.

In line 4410, the 16 microsecond clock signal CT15 is shown. The signal CT15 is a series of pulses, with one pulse every 16 microseconds.

In line 4430, the one-half degree pulse signal DEG.5PLS is shown. This signal has one pulse for both the leading edge 4402 and the trailing edge 4404 of the signal DEGSNSR. In essence, the signal DEG.5PLS synchronizes the rising and falling edges of the signal DEGSNSR with the 16-microsecond clock signal CT15.

In line 4420, the various control states of the second synchronizer and differentiator circuit 4030 are shown. Initially, the second SD circuit 4030 is in state DS0. The circuit then enters the state DS1 shortly after the rising edge at point 4402 of the signal DEGSNSR. The state DS3 is entered at the trailing edge of the next succeeding 16-microsecond clock signal CT15. The state DS2 is entered shortly after the falling edge at point 4404 of the signal DEGSNSR. The state DS0 is reentered from state DS2 at the trailing edge of the first 16-microsecond clock signal CT15 following the transition point 4404.

With reference again to FIG. 20D, the 16-microsecond clock 4070 is shown in schematic detail. The main component of the 16-microsecond clock 4070 is an up/down counter 4450, a practical form of which is a National Semiconductor CD4029 Presettable, Binary/Decade, Up/Down Counter. The up/down counter 4450 has a plurality of signal terminals which are described as follows.

A preset enable terminal PREN receives a clock reset signal CRST on line 4454. The signal CRST is the output of an inverter 4452 which receives as input the earlier-described signal CRST/ on line 4344. A high signal is applied to the preset enable terminal PREN to allow the counter 4450 to be preset to the level represented by the signals at the jam input terminals J1, J2, J3 and J4. In the present case, the jam input terminals J1-J4 as well as a carry bit input terminal CIN are connected to ground so that the counter will be preset to zero upon an occurrence of the counter reset signal CRST. A clock terminal CLK receives the 2-microsecond clock signal 2USC on line 4022. A binary/decade terminal B/D receives a control signal which indicates the mode in which the counter 4450 is to count. If the control signal applied to terminal B/D is high, the counter 4450 will count in binary; and if low, it will count in decade. In the present case, the terminal B/D is held high by the application of +5 volts on line 4456. An up/down terminal U/D has a control signal applied to it which determines whether the counter is to count up or down. Specifically, if the control signal is high, the counter will count up; if low, it will count down. The terminal U/D is held high by the application of +5 volts on line 4456. In the present case, the counter 4450 will count up in binary format. A group of output signal terminals are designated A, B and C. The three signals appearing on terminals A, B and C will indicate the binary count presently on the counter 4450. The signals output from terminals A, B and C appear on lines 4458, 4460 and 4462, respectively.

A NAND gate 4463 receives as input the signals on lines 4458, 4460 and 4462. The NAND gate output is the inverted 16-microsecond clock signal CT15/ and appears on line 4464. This signal is taken off by line 4024 for use by other circuitry.

An inverter 4466 receives as input the signal CT15/ on line 4464. The inverter output signal is the noninverted 16-microsecond clock signal CT15 and appears on line 4348.

With reference again to FIG. 20B, the divide-by-90 counter 4040 is illustrated in schematic detail. The basic function of the divide-by-90 counter 4040 is to produce a metering reference signal 45 degrees after the occurrence of the injection reference signal INJREF. In overview, the counter 4040 accomplishes this purpose by counting down ninety pulses of the one-half degree signal DEG.5PLS.

The divide-by-90 counter 4040 comprises two up/down counters 4510 and 4512. These counters, like the counters 4450 in FIG. 20D, can be a National Semiconductor CP4029 Presettable, Binary/Decade, Up/Down Counter. The input signals applied to each of the counter terminals are described as follows.

The clock terminals CLK of both the up/down counters 4510 and 4512 receive the one-half degree signal DEG.5PLS/ on line 4032. The carry-in terminal CIN of counter 4510 is connected to ground. The up/down control terminals U/D on both the counters 4510 and 4512 are connected to ground. This will cause both of the counters to count down from their preset values. The binary/decade terminals B/D each receive the voltage signal SPI+5 V on line 4514. This will cause the counters to count in binary mode. The jam terminals J3 and J1 of counter 4510 are connected to ground. The jam terminals J4 and J2 of counter 4512 are likewise connected to ground. The jam terminals J4 and J2 of counter 4510 are held high by the signal SPI+5 V on line 4514. The jam terminals J3 and J1 of counter 4512 are held high by the signal SPI+5 V on line 4514. This selection of high and low signals applied to the jam terminals is equivalent to presetting the decimal number 90 onto the counters. The signal applied to the preset enable terminals PREN of both counters 4510 and 4512 is taken off line 4518. This signal is derived from the signals SS2FJ/ and SS2FK/ which were output from the first synchronizer and differentiator circuit 4020. More specifically, the signal SS2FJ/ on line 4346 is applied to an inverter 4520. The signal SS2FK/ on line 4348 is applied to an inverter 4522. The output signal of inverter 4520 is applied as one input to a NOR gate 4528, and the output signal of inverter 4522 is applied as the other input to the NOR gate. The NOR gate output signal on line 4530 is taken off by line 4532 and appears as the inverted form of the injection reference signal INJREF/. This signal occurs each 120 degrees of engine revolution. The NOR gate output signal on line 4530 is also applied to an inverter 4534. The inverter output signal on line 4518 is used to enable the preset enable terminal PREN of both the up/down counters 4510 and 4512. In other words, the counters will be reset at the occurrence of the injection reference signal INJREF.

The carry-out terminal CO of up/down counter 4510 is connected by line 4516 to the carry-in CIN terminal of counter 4512. The carry-out terminal CO of counter 4512 is normally high, and goes low upon the occurrence of either the counter reaching its maximum count in the "up" mode or minimum count in the "down" mode, provided the carry-in terminal CI is at a low state. In the present case, the terminal CO of counter 4512 will go low when the preset count of 90 is counted down to zero. This will produce a signal at node 4536 that is designated MPXSWT/. This signal is taken off by line 4538 and used to time the occurrence of the metering reference signals MTREF0/, MTREF1/, and MTREF2/ which are to be hereinafter described.

The signal MPXSWT/ at node 4536 is applied as one input to a NOR gate 4540. The other input in the NOR gate is the 2-microsecond clock signal 2USC on line 4022. The NOR gate output signal on line 4542 is applied to an inverter 4544. The inverter output signal appears on line 4546. This signal is used to time the setting of a cylinder select flag designated generally by CYLXXF/.

The selection logic 4050 is also illustrated in schematic form in FIG. 20B. The basic function of the selection logic circuit 4050 is to produce metering reference signals and an associated flag signal that indicates to which of two injectors each metering signal is to be applied. In general, the selection logic circuit 4050 uses the resultant camshaft position signals CSP0-CSP7 from the second decoding performed by the position encoder 4010 and the timing signals output by the divide-by-90 counter 4040.

The selection logic circuit 4050 includes a group of NOR gates 4550, 4552 and 4554. The NOR gate 4550 has as one input the camshaft position signal CSP1 taken off by line 4556, and as another input the camshaft position signal CSP6 taken off by line 4558. The NOR gate 4552 has as one input the camshaft position signal CSP4 taken off by line 4560, and as another input the camshaft position signal CSP3 taken off by line 4562. The NOR gate 4554 has as one input the camshaft position signal CSP7 taken off by line 4564, and as another input the camshaft position signal CSP0 taken off by line 4566.

The output signal of NOR gate 4550 appears on line 4570 and is applied as one input to a NOR gate 4576. The other input to the NOR gate 4576 is the signal MPXSWT/ on line 4538. The output signal of the NOR gate 4552 appears on line 4572 and is applied as one input to a NOR gate 4578. The other input to the NOR gate 4578 is likewise the signal MPXSWT/ on line 4538. The output of NOR gate 4554 appears on line 4574 and is applied as one input to a NOR gate 4580. The other input to NOR gate 4580 is similarly the signal MPXSWT/ on line 4538.

The output signal of NOR gate 4576 appears on line 4582 and is applied to an inverter 4590. The inverter output signal on line 4596 is designated the metering reference signal MTREF0/. The output signal of NOR gate 4578 appears on line 4584 and is applied to an inverter 4592. The inverter output signal on line 4598 is designated as another metering reference signal MTREF1/. The output signal of NOR gate 4580 appears on line 4586 and is applied to an inverter 4594. The inverter output signal on line 4600 is another metering reference signal MTREF2/.

The logic equations for the metering reference signals MTREF0, MTREF1 and MTREF2 are as follows:

$$MTREF0 = (CSP1 + CSP6) \cdot MPXSW$$

$$MTREF1 = (CSP3 + CSP4) \cdot MPXSW$$

$$MTREF = (CSP0 + CSP7) \cdot MPXSW.$$

The selection logic circuit 4050 also includes a group of J-K flip flops 4602, 4604 and 4606. In general, these three flip flops are used to set or reset the flags designated generally at CYLXXF. They are described as follows.

The set terminals S of the flip flops 4602, 4604, 4606 are connected to ground to prevent any of the flip flops from being set. The reset terminals R of the flip flops receive the initial reset signal IT on line 2016. The clock terminals C of the flip flops receive the divide-by-90 counter output signal on line 4546.

The J input of flip flop 4602 receives the camshaft position signal CSP7 taken off by line 4610. The K input terminal of flip flop 4602 receives the camshaft position signal CSP0 taken off by line 4612. The J input terminal of flip flop 4604 receives the camshaft position signal CSP1 taken off by line 4614. The K input terminal of flip flop 4604 receives the camshaft position signal CSP6 taken off by line 4616. The J input terminal of flip flop 4606 receives the camshaft position signal CSP3 taken off by line 4618. The K input terminal of flip flop 4606 receives the camshaft position signal CSP4 taken off by line 4620. The Q output terminals of the flip flops 4602, 4604, 4606 are not used in this application and allowed to float.

The output signal from the Q/ terminal of flip flop 4602 appears on line 4622 as the cylinder flag CYL34F/. The output signal from terminal Q/ of flip flop 4604 appears on line 4624 as the cylinder flag CYL16F/. The output signal from terminal Q/ of flip flop 4606 appears on line 4626 as the cylinder flag CYL52F/.

A top dead center reference signal TDC6 for one of the engine cylinders is derived from the camshaft position signal CSP6 and the metering reference signal MTREF0/. More specifically, a NOR gate 4632 has as one input the signal CSP6 taken off by line 4630, and as another input the signal MTREF0/ on line 4596. The NOR gate output signal on line 4634 is the desired reference signal TDC6. This signal appears as a single pulse once each engine cycle and may be used for instrumentation purposes when testing.

Figure 27:
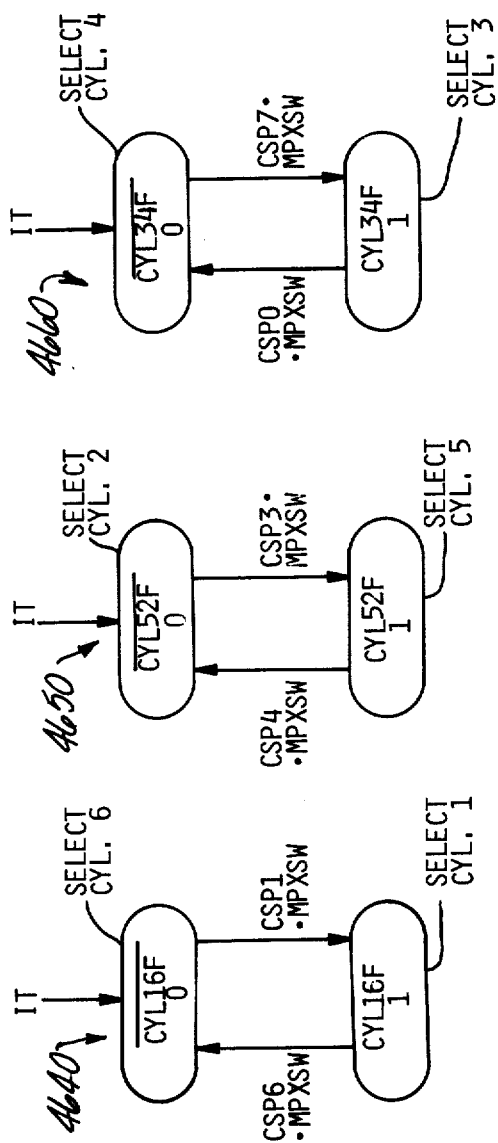
FIG. 27 is a group of three state diagrams which relate to the setting and resetting of cylinder select flags in a selection logic circuit on the input controller board.

FIG. 27 is a group of three state diagrams 4640, 4650 and 4660 relating to the setting and resetting of the cylinder select flags in the selection logic circuit 4050.

The state diagram 4640 relates to the cylinder select flag CYL16F. More specifically, the state CYL16F/ is initially entered upon the occurrence of the initial reset signal IT. In this state, the flag signal is reset to zero indicating that cylinder 6 is to be selected.

The other state is designated CYL16F. In this state the flag is set to 1 indicating that cylinder 1 should be selected. The entry of state CYL16F from state CYL16F/ occurs with the concurrence of the signal CSP1 and MPXSW. The converse transition occurs upon the concurrence of signals CSP6 and MPXSW.

The state diagram 4650 is specifically related to the cylinder flag CYL52F. The state CYL52F/ is initially entered on the occurrence of the initial reset signal IT. In this state, the flag is reset to zero indicating that cylinder 2 is to be selected.

In the other state, which is designated CYL52F, the flag is set to 1 indicating that cylinder 5 is to be selected. The transition to state CYL52F from state CYL52F/ occurs with the concurrence of the signals CSP3 and MPXSW. The converse transition occurs with the concurrence of the signals CSP4 and MPXSW.

The state diagram 4660 is related specifically to the cylinder select flag CYL34F. The initial state of the flag is designated CYL34F/, and is entered upon the occurrence of the initial reset signal IT. In this state, the flag is reset to zero indicating that cylinder 4 is to be selected.

The other state of the flag is designated CYL34F. In this state, the flag is set to 1 indicating that cylinder 3 is to be selected. The transition to state CYL34F from state CYL34F/ occurs upon the concurrence of signals CSP7 and MPXSW. The converse transition occurs on the concurrence of signals CSP0 and MPXSW.

Figure 20E:
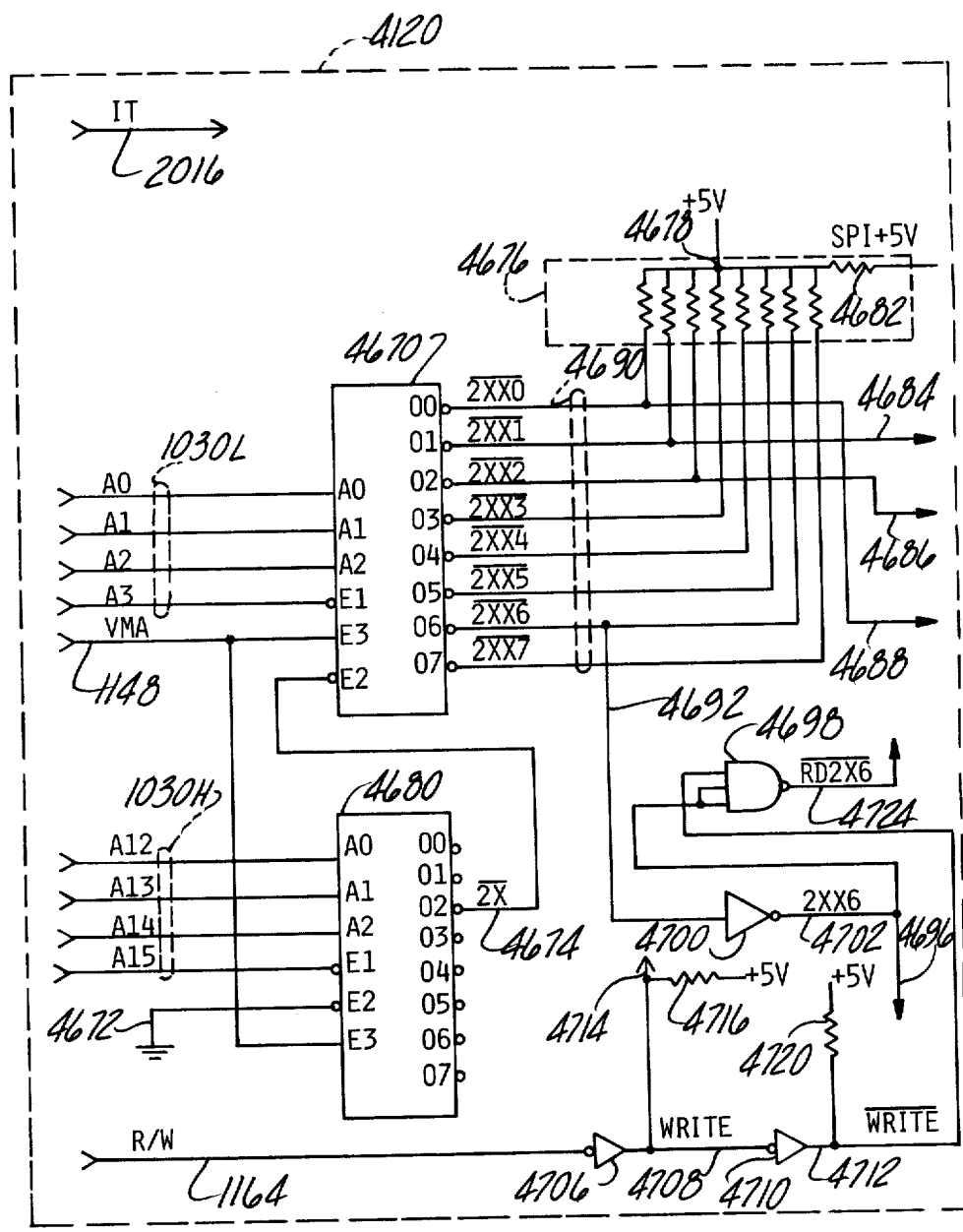

FIG. 20E illustrates the address decoding circuit 4120 in detailed schematic form. The basic function of this circuit is to decode or interpret requests from the CPU 1000 placed in coded form on the address bus 1030. The requests that are made to the input controller board 140 from the CPU 1000 include a read of the system status; a read of the most recent engine time interval measurement; a read of the camshaft position; and a write of an engine time period reset signal. The CPU requests are designated by the following respective codes:

2XX0/; 2XX1/ and 2XX2/; and 2XX6/.

The address decoder circuit 4120 employs two binary decoders 4670 and 4680 to decode communications from the CPU 1000 on the address bus 1030. The decoders 4670 and 4680 can each be an Intel 8205 High Speed 1 Out of 8 Binary Decoder as was hereinbefore fully described. The decoder 4670 is responsive to the four low order bits A0-A3 on the address bus subset 1030L. The decoder 4680 is responsive to the four high order bits A12-A15 on the address bus subset 1030H.

More specifically, the data input terminals A0-A2 of the decoder 4670 receive the correspondingly identified low order bits on the address bus subset 1030L. The address bit A3 is applied to the enable terminal E1. The enable terminal E3 has applied to it the valid memory address signal VMA on line 1148. The enable terminal E2 receives the output signal from the decoder 4680.

The output terminals of both the decoders 4670 and 4680 are designated O0-O7. The output terminals of the decoder 4670 produce a set of signals 2XX0/-2XX7/ on lines 4690.

The data input terminals A0-A2 of the decoder 4680 receive address bits A12-A14 on the address bus subset 1030H. The enable terminal E1 of the decoder 4680 receives the address bit A15. The enable terminal E2 is connected to ground by line 4672. The enable terminal E3 receives the valid memory address signal VMA from line 1148. Of the eight output terminals O0-O7, only the terminal O2 has significance in this immediate application. More specifically, only if the high order hexadecimal digit on the address bus is 2 will there be a communication of interest to the input controller board 140. Therefore, the balance of the output terminals O0, O1, O3-O7 of the decoder 4680 are not used. The output terminal O2 produces the signal 2X/ on line 4674. When the signal 2X/ is low, it indicates that the information contained in the four low order address bits A0-A3 on address bus subset 1030L may be pertinent to the input controller board 140. A low signal 2X/ applied to the E2 enable terminal of the decoder 4670 will place that decoder in an enabled state (assuming, of course, the signals applied to enable terminals E1 and E3 are low and high, respectively.)

A parallel-resistor network 4676 is used to pull up the signals 2XX0/-2XX7/ on lines 4690. The network 4676 has eight parallel connected resistors, each having one end connected to respective decoder output lines and another end connected to a common node 4678. The node 4678 receives energization from a +5 volts source. A voltage signal SPI+5 volts is developed by applying the +5 volts source through a resistor 4682.

The decoder output signals 2XX0/, 2XX1/, 2XX2/ and 2XX6/ are pertinent to the operation of the input controller board 140. The signals 2XX1/ and 2XX2/ are taken off by lines 4684 and 4686, respectively. The signal 2XX0/ is taken off by line 4688. The signal 2XX6/ is taken off by line 4692.

A number of ancillary signal processing operations take place in the address decoder circuit 4120. Specifically, the signal 2XX6/ on line 4692 is applied to an inverter 4700. The inverter output signal on line 4702 is designated 2XX6. This signal is taken off by line 4696 for use in the status interrupt circuit 4110. It is also applied as first and second inputs to a NAND gate 4698. The third input to the NAND gate 4698 is derived from the read/write signal R/W on line 1164.

The signal R/W on line 1164 is applied to an inverter 4706. The inverter output signal on line 4708 is designated WRITE. This signal is pulled up by the application of +5 volts through a resistor 4716. The WRITE signal is taken off by line 4714 for use by the engine time interval counter control 4080. The WRITE signal is also applied to an inverter 4710. The inverter output signal on line 4712 is designated WRITE/. This signal is pulled up by the application of +5 volts through the resistor 4720. It is applied as the third input to the NAND gate 4698.

The output signal of the NAND gate 4698 appears on line 4724 and is designated RD2X6/. This signal is used in the engine time interval counter control circuit 480.

The initial reset signal IT is brought onto the input controller board 140 by the line 2016.

Figure 20F:
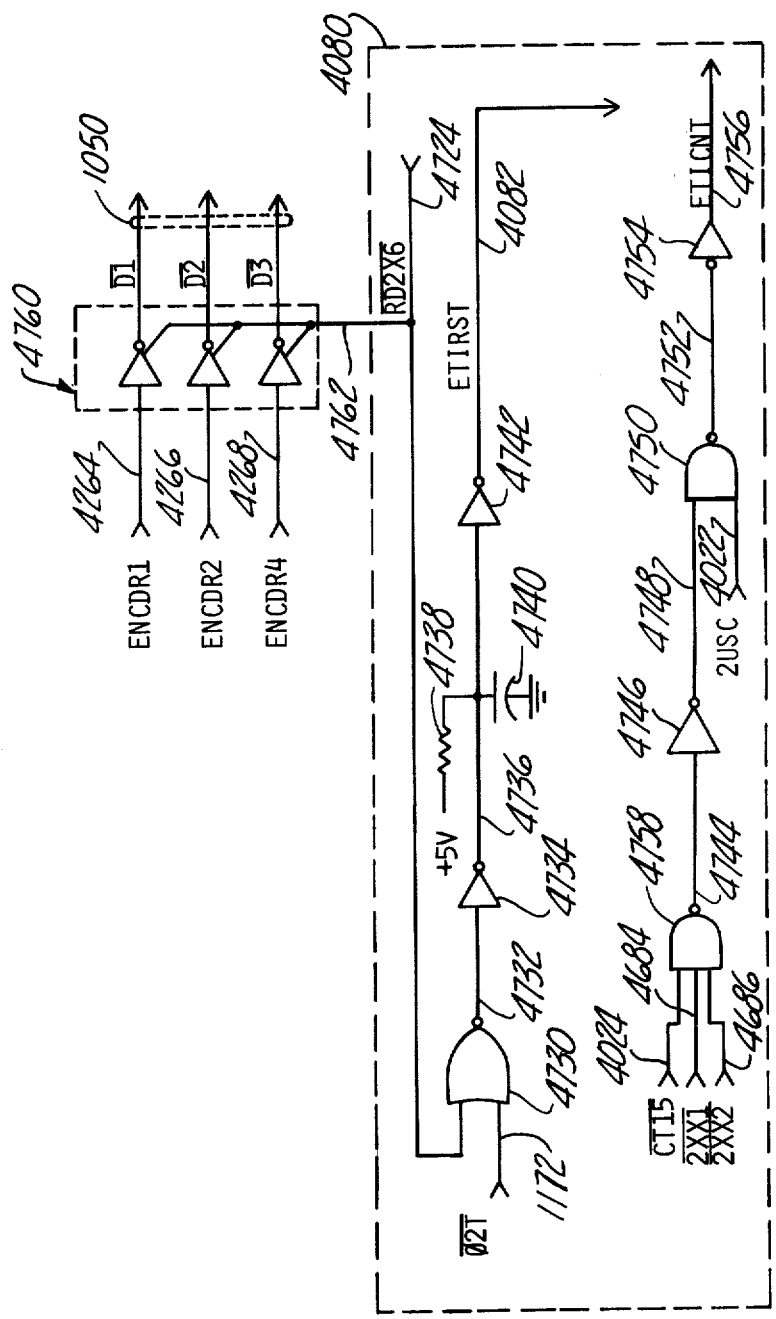

FIG. 20F illustrates a schematic detail the engine time interval counter control circuit 4080. It also illustrates the buffer circuit for placing the position encoder input signals ENCDR1, ENCDR2 and ENCDR4 onto the data bus subset 1050L.

The basic function of the engine time interval counter control circuit 4080 is to produce a count signal ETICNT and a counter reset signal ETIRST. Each of these signals is produced by a respective control channel described as follows.

The first control channel for the engine time interval reset signal ETIRST includes a NOR gate 4730. The NOR gate 4730 has as one input the signal RD2X6/ on line 4724. This signal was derived from the read/write signal and the CPU request signal 2XX6/ in the address decoding circuit 4120. The other input to the NOR gate 4730 is the one microsecond clock signal ∅2T/ on line 1172. The NOR gate output signal on line 4732 is applied to an inverter 4734. The inverter output signal on line 4736 is pulled up and filtered by the serial connection of a resistor 4738 and capacitor 4740 between a +5 volts source and ground. The buffered inverter output signal is applied to another inverter 4742. The inverter output signal on line 4082 is the engine time interval reset signal RTIRST.

The second control channel includes a NAND gate 4758. A first input to the NAND gate is the 16-microsecond clock signal CT15/ on line 4024. The second and third input to the NAND gate 4758 are the CPU request signals 2XX1/ and 2XX2/ on lines 4684 and 4686, respectively. The NAND gate output signal on line 4744 is applied to an inverter 4746. The inverter output signal on line 4748 is applied to another NAND gate 4750. The other input to NAND gate 4750 is the 2 microsecond clock signal 2USC on line 4022. The NAND gate output signal on line 4752 is applied to an inverter 4754. The inverter output signal on line 4756 is the engine time interval count signal ETINCT.

The buffer between the position encoder output signals ENCDR1, ENCDR2 and ENCDR4 on respective lines 4264, 4266 and 4268 and the data bus subset 1050 is a group of three inverter drivers, generally at 4760. These three inverter drivers are all tri-state devices, and may be a portion of Signetics 8T98 Tri-State Driver. The control terminals of the inverter drivers 4760 are connected in common to a line 4762 which carries the signal RD2X6/.

Figure 20G:
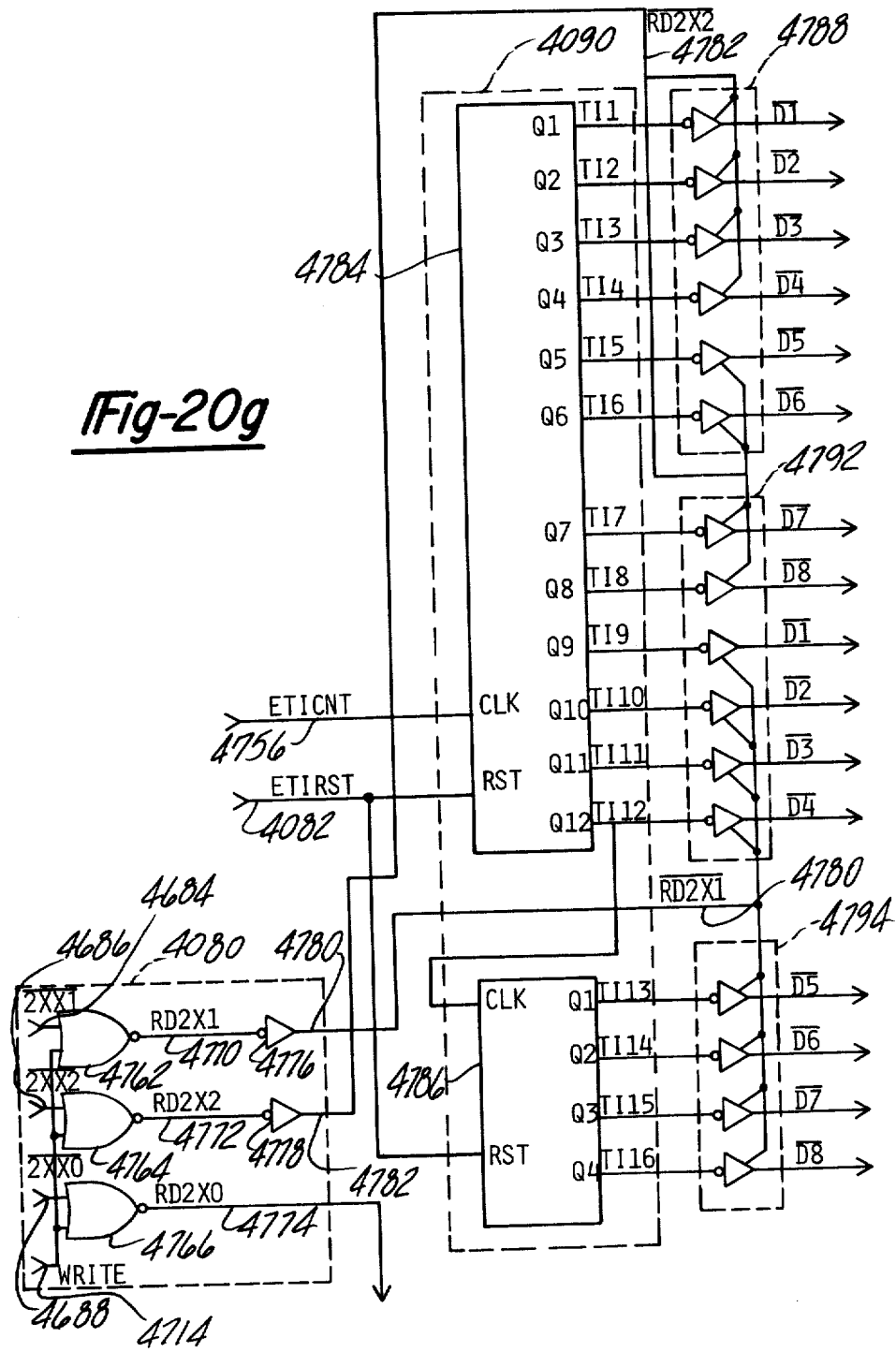

FIG. 20G illustrates a subpart of the engine time interval counter-control circuit 4080 and the engine time interval counter 4090 in schematic detail.

The subpart of the engine time interval counter control circuit 4080 includes a group of three NOR gates 4762, 4764 and 4766. The NOR gate 4762 has as one input the decoded address signal 2XX1/ on line 4684, and as another input the WRITE signal on line 4714. The output signal of the NOR gate 4762 is designated RD2X1 and appears on line 4770.

The NOR gate 4764 has as one input the decoded address signal 2XX2/ on line 4686, and as another input the write signal WRITE on line 4714. The output signal of the NOR gate 4764 is designated RD2X2 and appears on line 4772.

The NOR gate 4766 has as one input the decoded address signal 2XX0/ on line 4688, and as another input the write signal WRITE on line 4714. The output signal of the NOR gate 4766 is designated RD2X0 and appears on line 4774.

The signal RD2X1 on line 4770 is applied to inverter 4776. The inverter output signal on line 4780 is designated RD2X1/ and is used as a tri-state control signal for a data bus interface.

The signal RD2X2 on line 4772 is applied to an inverter 4778. The inverter output signal on line 4782 is designated RD2X2/ and is used as another tri-state control signal.

The engine time interval counter 4090 comprises a pair of 12-bit binary counters 4784 and 4786. Only four of the 12 available bits of the counter 4786 are used in the present application, as there are only 16 bits to represent the RPM measurement to be communicated to the CPU 1000. A practical form of a 12-bit binary counter for this application is a National Semiconductor CD4040 12-Stage Ripple-Carry Binary Counter/Divider.

The reset terminal RST of both the counters 4784 and 4786 receive the engine time interval reset signal ETIRST on line 4082. The clock input terminal CLK of counter 4784 receives the engine time interval count signal ETICNT on line 4756. The clock terminal CLK of counter 4786 receives the output signal TI12 from terminal Q12 of counter 4784.

As previously indicated, the engine time interval (or RPM) measurement is a 16-bit word that is placed onto the data bus as two sequential eight-bit words. Accordingly, the output terminals Q1–Q8 of the counter 4784 produce output signals TI1–TI8 representing the first (least significant) eight-bit word. The output terminals Q9–Q12 of counter 4784 and Q1–Q4 of counter 4786 produce signals TI9–TI16 which represent the second (most significant) 8-bit data word.

A data bus buffer for interfacing the signals TI1–T16 with the data bus comprises three tri-state hex bus inverter drivers 4788, 4792 and 4794. Each of the inverter drivers can be a Signetics 8T98 as was hereinbefore described. All six of the tri-state control terminals of inverter driver 4788 and the upper two control terminals of inverter driver 4792 are connected in common and receive the control signal RD2X2/ on line 4782. The other four tri-state control terminals of inverter driver 4792 and the four illustrated control terminals of inverter driver 4794 are connected in common and receive the control signal RD2X1/ on line 4780.

FIG. 20H illustrates the 2-microsecond clock 4060 and the status and interrupt circuit 4110 in schematic detail. The status and interrupt circuit 4110 is shown in parts 4110a and 4110b relating to status and interrupt functions, respectively.

The 2-microsecond clock is shown generally at 4060. In overview, the 2-microsecond clock signal 2USC is generated by dividing-by-2 the second phase of the system clock signal ∅2T on line 1176 with a J-K flip flop. The 2-microsecond clock 4060 receives the second phase of the system clock signal ∅2T on line 1176. This signal is applied to an inverter 4802. The inverter output signal appears on line 4804. The inverter output signal is pulled up by the application of +5 volts through a resistor 4806.

The inverter output signal on line 4804 is first taken off by a line 4810 and applied as a clock signal to the clock terminal C of a J-K flip flop 4812. The inverter output signal is also applied to another inverter 4814 whose output signal appears on line 4816.

The J-K flip flop 4812 has its J and K input terminals held high by the constant application of the voltage signal SPI+5 V. In this state the flip flop 4812 will toggle with each clock signal. The set terminal S and the reset terminal R are both connected to ground. The Q output terminal is not used.

The Q/ output terminal produces a signal on line 4818 that is applied as one input to the NAND gate 4820. The other input to the NAND gate is the signal on line 4816. The NAND gate output signal appears on line 4822 and is applied to an inverter 4824. The inverter output signal on line 4826 is pulled up by the application of +5 volts across a resistor 4828. The resulting 2-microsecond clock signal 2USC appears on line 4022.

The interrupt part of the status and interrupt circuit 4110 is indicated generally at 4110a. The interrupt circuit 4110a includes a NAND gate 4840 which has as one input the signal SS2FK/ on line 4346 and as another input the signal SS2FJ/ on line 4348. These two signals are taken from the first synchronizer and differentiator circuit 4020. They will both be low upon the occurrence of an injection reference signal INJREF for each 120 degrees of engine revolution.

The NAND gate output signal on line 4842 is applied to the J input terminal of a J-K flip flop 4844. The K input terminal receives the signal 2XX6 on line 4696 from the address decoding circuit 4120. The clock terminal C receives the signal on line 4810 as taken off by the line 4846. The set terminal S is grounded. The reset terminal R receives the initial reset signal IT on line 2016. The Q/ output terminal is not used. The output signal from the Q terminal on line 4848 is applied to an inverter 4850. The inverter output signal on line 4118 is the interrupt request signal IRQ/.

The other part of the status and interrupt circuit 4110 which relates to status is indicated generally at 4110*b*. The status circuit 4110*b* includes two inverter-drivers 4852. These inverter drivers may be part of a Signetics 8T98 Tri-State Hex Bus Driver. The signal SS2F on line 4284 is applied as input to the upper inverter-driver. The output of the inverter-driver is placed on the data bus as bit D3/. The lower inverter-driver receives as input the signal on line 4858 which is the output signal produced at the Q terminal of flip flop 4844. The output of the lower inverter-driver is placed on the data bus as bit D1/.

The tri-state control terminals of the inverter drivers 4852 are connected in common and receive a control signal RD2X0 on line 4854. This signal is derived from the signal RD2X0/ which is output by the engine time interval counter control circuit 4080. It is applied on line 4774 to an inverter 4856 which produces the signal RD2X0.

Figure 28:
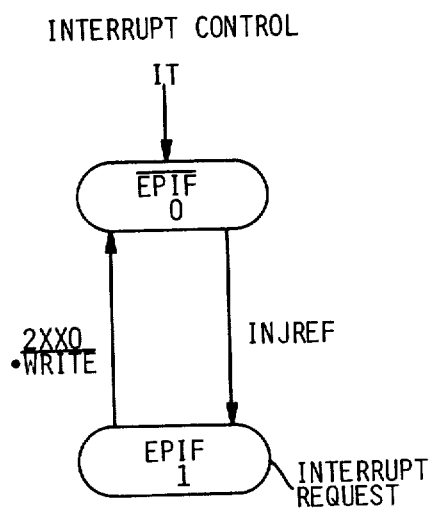
FIG. 28 is a state diagram of the status bit used in an interrupt status word generated on the input controller board.

FIG. 28 is a state diagram of the two possible states of the D1 bit as it is used in the interrupt status word. An initial state designated EPIF/ is entered upon the occurrence of the initial reset signal IT. In this state, the bit D1 is reset to zero (or D1/ is set to one) indicating that an interrupt is not presently requested.

The other possible state is designated EPIF. In this state the D1 bit is set to one (or D1/ is set to zero) indicating that an interrupt is requested. The transition from state EPIF/ to state EPIF occurs with the injection reference signal INJREF. The converse transition occurs upon the concurrence of signals 2XX0 and WRITE/.

Figure 29:
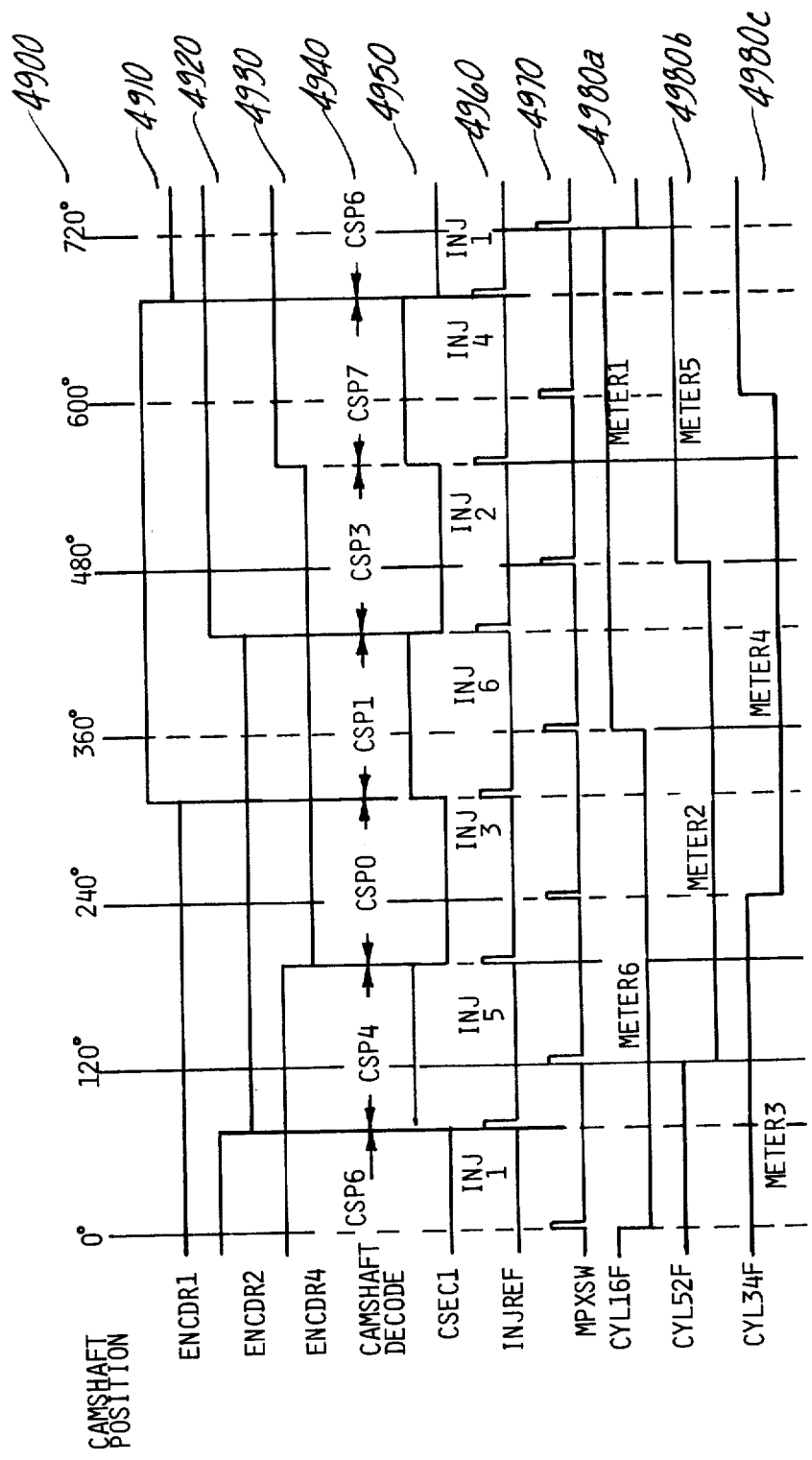
FIG. 29 is a timing diagram which illustrates the significant signals produced by the input controller board.

FIG. 29 is a timing diagram of the significant signals produced by the input controller board 140. Each signal shown in the timing diagram is correlated with camshaft position through one complete engine cycle.

In line 4900, the full 720 degree range of camshaft position is shown in units of 120 degrees.

In line 4910, the first of three encoder signals ENCDR1 is shown. This signal has a positive transition at 315 degrees and a negative transition at 675 degrees. In line 4920, the second of the three encoder signals ENCDR2 is shown. This signal has a negative transition at 75 degrees and a positive transition at 435 degrees. In line 4930, the third of the encoder signals ENCDR4 is shown. The signal has a negative transition at 195 degrees and a positive transition at 555 degrees. The signal ENCDR2 is shifted from the signal ENCDR1 by −120 degrees. The signal ENCDR4 is phase shifted from the signal ENCDR1 by −240 degrees.

The camshaft position signals CSP0–CSP6 are shown in line 4940. One and only one of these signals is high through each 120 degrees of engine revolution.

In line 4950, the camshaft reference signal CSEC1 is shown. This signal has alternating positive and negative transitions each 120 degrees of engine revolution.

In line 4960, the injection reference signal INJREF is shown. This signal is in the form of a pulse every 120 degrees of engine revolution.

In line 4970, the signal MPXSW is shown. This signal is likewise in the form of a pulse, but is delayed by 45 degrees from the occurrence of each injection reference signal INJREF.

In lines 4980*a*, *b* and *c* the metering windows METER0–METER6, the time allowed for metering for the given cylinder, are shown in relation to their corresponding cylinder select flag CYL16F, CYL52F and CYL34F.

e. The Output Controller Boards

The general function of the output controller boards is to retrieve from memory the results of computations relating to parameter values for injection advance and fuel metering, and provide those parameter values to the digital I/O board in synchronous relation with the engine operating cycle. The output controller boards physically comprise two boards, with each board containing two output controls. Of the four output controls, one is assigned to control injection advance, and three are assigned to control fuel metering for three respective injector pairs.

In general, the output controller boards (150*a* and *b* in FIG. 3) use a direct memory access (DMA) technique to obtain parameter values for injection advance and fuel metering. These parameter values are contained in two data output buffers in RAM—one for metering and one for injection. The entries in the metering buffer are in the following order:

Δ degrees to meter solenoid on
Δ time to meter solenoid off
Δ degrees to arm meter solenoid on
Δ degrees to arm meter solenoid off
End of buffer.

The entries in the injection buffer are:
Δ degrees to injection solenoid on
Δ degrees to injection solenoid off
Δ degrees to arm injection solenoid on
Δ degrees to arm injection solenoid off
End of buffer.

Each of the parameter entries in the metering buffer and the injection buffer comprise two 8-bit words. The four high order bits of the first 8-bit word are used as an instruction code to identify the entry. The four low order bits of the first word and the eight bits of the second word define a 12-bit numerical code. Generally, these twelve bits define a degree measurement, except for the case of the meter off signal METROF where the twelve bits define a time measurement. In the case of the degree measurement, the least significant bit represents 0.5 degree; the time measurement has a least significant bit representing 16 microseconds.

Each table entry retrieved by a DMA operation is used by an output control as follows. First, the four bit instruction code of the first 8-bit word is loaded into an instruction register. Secondly, the least significant half of the first 8-bit word and the entire second 8-bit word are loaded into an increment counter.

The instruction code in the instruction register is decoded to determine which of certain output flags should be turned on or off. The related 12-bit degree or time measurement in the increment counter is counted down using either the 0.5 degree signal DEG.5PLS or the 16-microsecond clock signal CT15, both signals being carried over from the input controller board. Generally, all parameter values in the metering buffer and the injection buffer are in degrees and the signal DEG.5PLS will be used as a count signal; however, the metering off signal METROF in the metering buffer is counted down using the signal CT15. When the increment counter has been counted down or decremented to zero, the instruction code stored in the instruction register is executed by the setting or resetting of a corresponding output flag. When this sequence is completed, the output control returns to undertake another DMA operation.

These DMA operations are repeated continuously until an end of table instruction EOT is encountered. When this occurs, the output control resets itself and waits for a reference pulse to re-initiate its operation.

The four output controls on the two output controller boards operate independently of one another. Thus, it is required that some means be provided to assure that there is no conflict between two controls in attempting a DMA operation at the same time. For this purpose the output controller boards include priority logic to preclude one control from interrupting another control while the address bus and the data bus are under DMA control. The priority logic uses daisy-chain priority to afford the control closest to the CPU priority over the next closest competing control.

Figure 30:
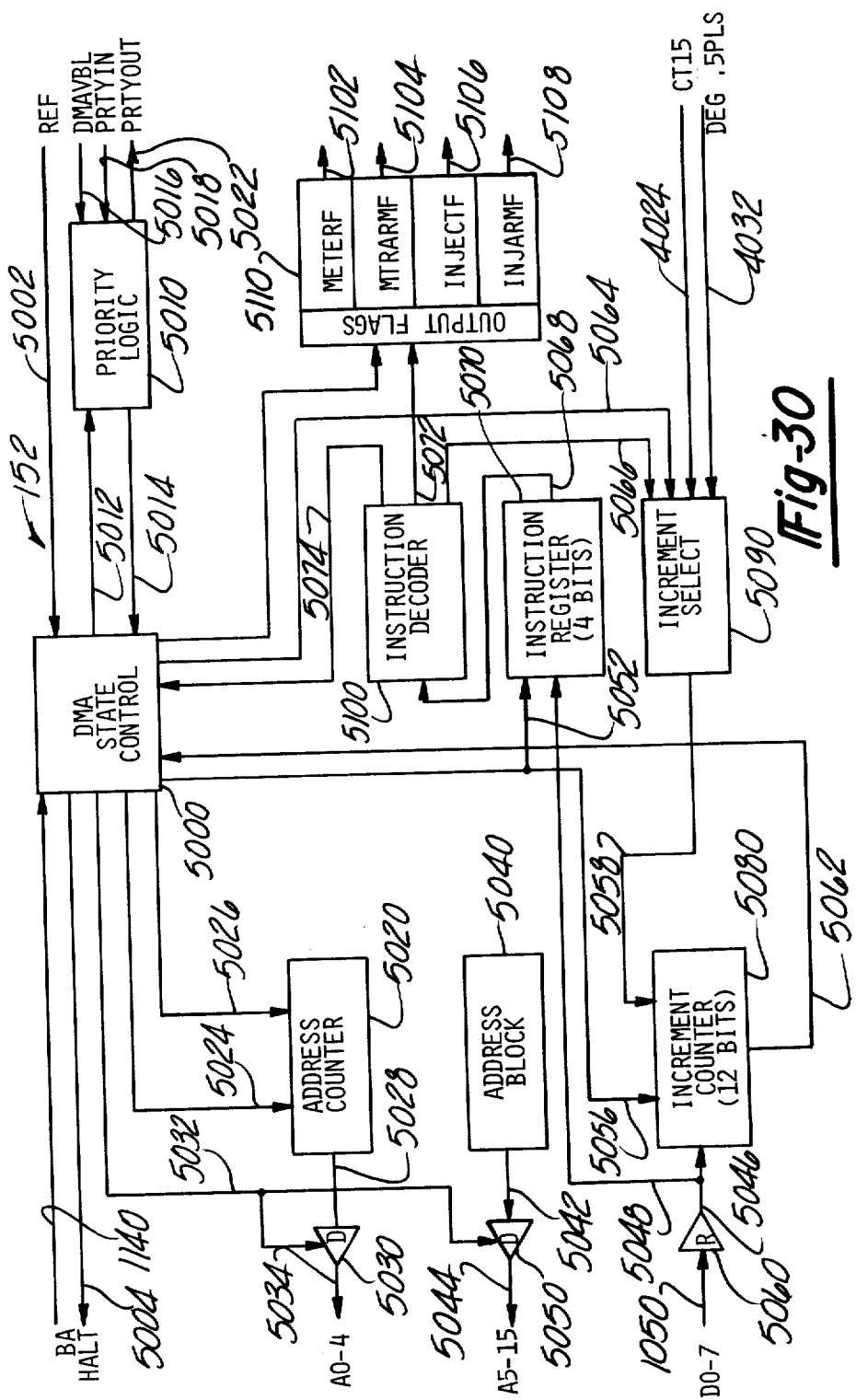
FIG. 30 is a generalized block diagram illustration of a typical control configuration on either of a pair of output controller boards of the electronic control unit.
Figure 31A:
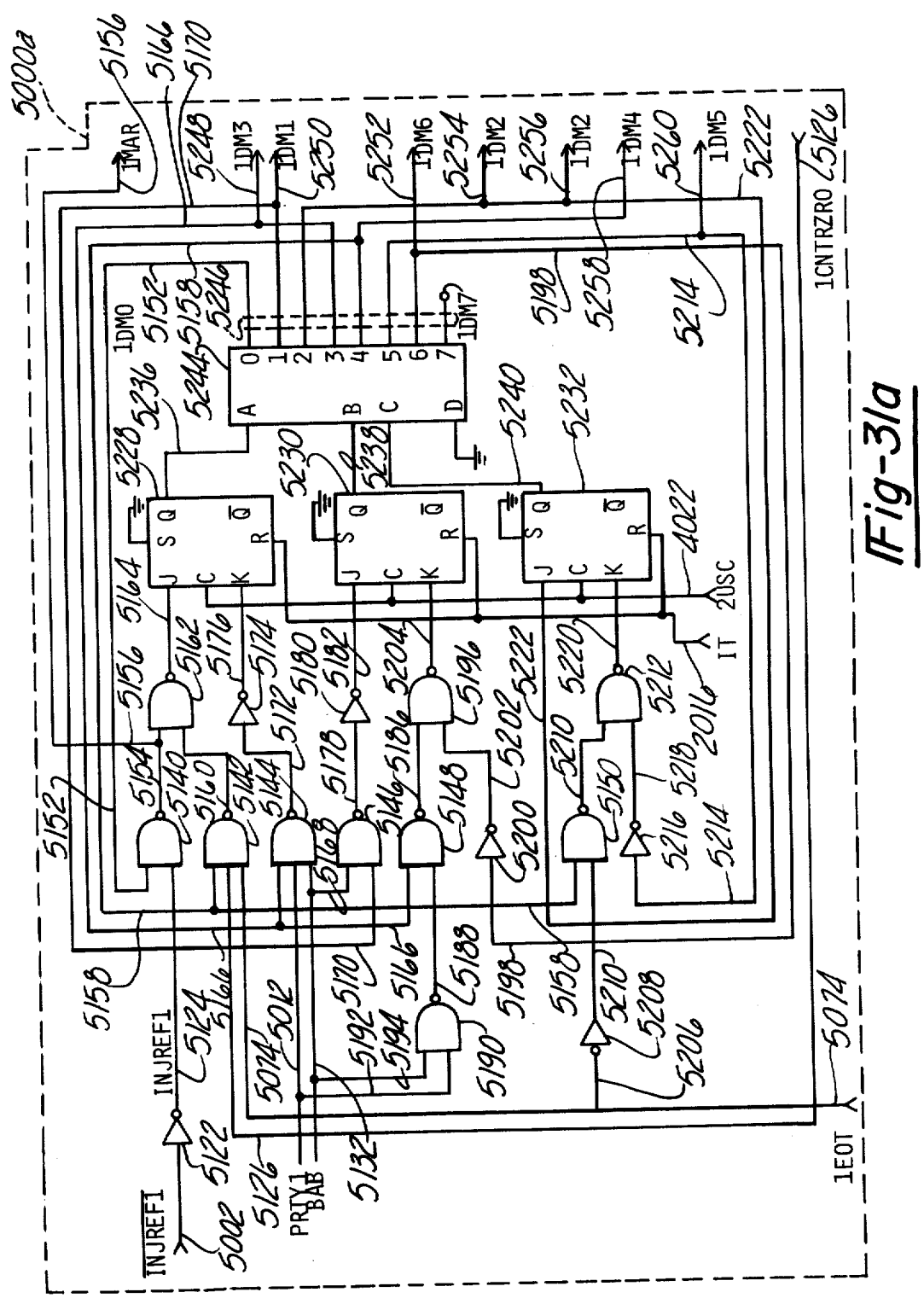
Figure 32:
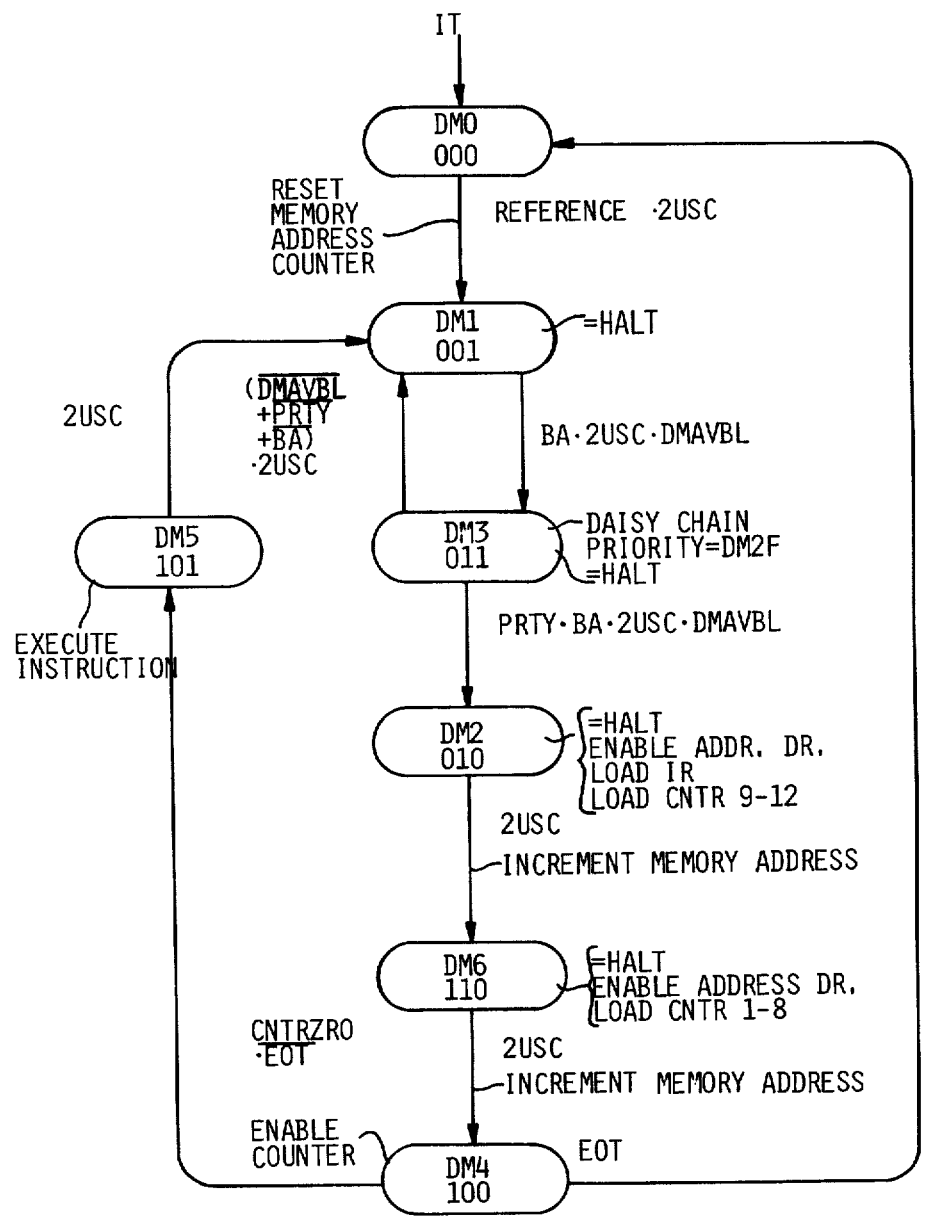
FIG. 32 is a state diagram of the various control states which a DMA state control circuit on each of the output controller boards may assume.
Figure 33:
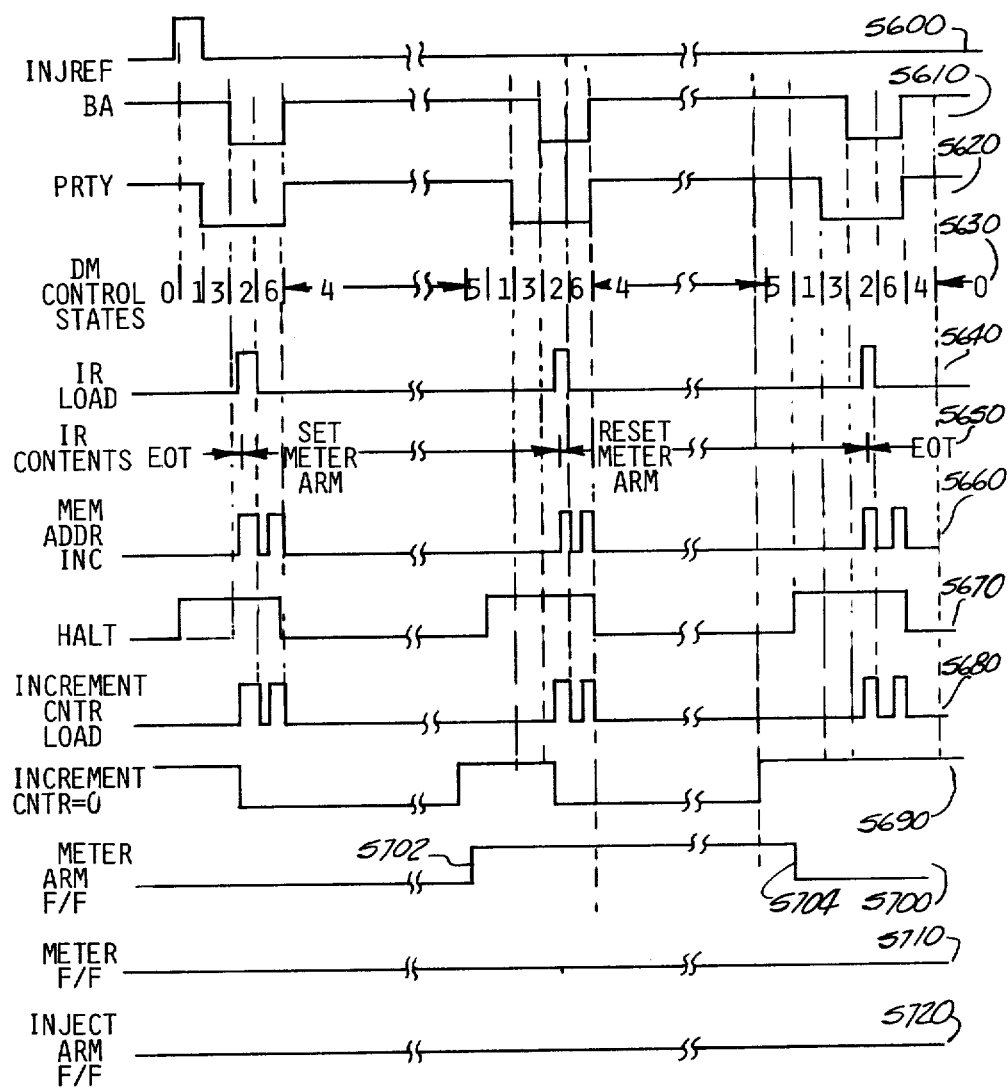
FIG. 33 is a timing diagram which illustrates the significant signals processed by each of a pair of controls on each of the output controller boards.

FIG. 30 is a block diagram illustration of a typical control configuration on either of the output controller boards 150a and b. FIGS. 31A, B and C illustrate in schematic detail one control 152 on the output controller board 150a. FIGS. 31D, E and F illustrate in schematic detail the other control 154 on the output controller board 150a. FIGS. 31G, H and I illustrate in schematic detail ancillary circuits used by both of the controls 152 and 154 on the output controller board 150a. FIG. 32 is a state diagram illustrating the various control states that the controls 152 and 154 may assume. FIG. 33 is a timing diagram illustrating the significant signals processed by each of the controls 152 and 154 on the output controller board 150a.

The description of the output controller boards 150a and b is organized as follows. First, because the output control board 150b is virtually a structural and functional duplicate of the output controller board 150a, only the latter output controller board will be described in detail. Secondly, because each output controller board contains two controls which are virtually structural and functional duplicates of one another, only control 152 and the ancillary circuitry on output controller board 150a will be described in detail. The other control 154 on this board will be described only to the extent necessary to show its similarity to the control 152.

With reference to FIG. 30, the control 152 includes a direct memory access (DMA) state control circuit 5000. The general function of the state control circuit 5000 is to control the timing of tasks performed by the control 152. A control sequence is initiated by receipt of a reference signal REF on line 5002. In practical form this signal may be an injection reference signal produced by the input controller board 140. In response to this signal, the DMA state control circuit 5000 will place a pulse signal HALT on line 5004. This signal will cause the CPU 1000 to halt execution while the signal is in a high state. The response to the HALT signal is a bus available signal BA on line 1140. This signal informs the DMA state control circuit 5000 that the address bus and the data bus are accessible for a direct memory access operation.

The DMA state control circuit 5000 issues a reset signal on line 5024 to an address counter 5020. This signal will reset the address counter 5020 to the address of the first entry in the data output buffers in RAM containing results of computations for fuel metering and injection advance. The DMA state control circuit 5000 will appropriately place a count signal on line 5026 to increment the address counter 5020 when the next consecutive entry in a data output buffer is to be accessed.

The output signals from the address counter 5020 comprise five binary digits on lines 5028. The output signals are received by a tri-state driver 5030 for amplification to a level suitable for communication over the address bus. The condition of the tri-state driver 5030 is controlled by an enable signal on line 5032 produced by the DMA state control circuit 5000. The driver output signals appear on lines 5034 and represent the five low order bits A0–A4 on the address bus.

The remaining eleven high order address bits A5–A15 are hard wired in an address block 5040. These high order address bits A5–A15 define the block of RAM comprising the data output buffers containing fuel metering and injection advance parameter values. The address block output signals appear on lines 5042 and are received by a tri-state driver 5050.

The condition of the tri-state driver 5050 is controlled by the enable signal on line 5032. The driver output signals on line 5044 represent the address bits A5–A15.

The data word at the memory address specified by the present value of address bits A0–A15 is placed on the data bus in the form of data signals D0–D7. The data signals D0–D7 are applied to a receiver 5060 for attenuation to a level suitable for use within the control 152. The receiver output signals appear on lines 5046.

As previously indicated, each table entry in the data output tables in RAM comprises two 8-bit words. Accordingly, the retrieval of each table entry by a DMA operation will cause two consecutive 8-bit words to be placed on the data bus 1050. The first 8-bit data word or byte has four high order bits which represent an instruction code. These bits are loaded into an instruction register 5070 in response to a load command on line 5052 from the DMA state control circuit 5000. The other four low order bits of the first data byte are loaded in the first four bit positions of a 12-bit increment counter 5080 in response to a load command on line 5056 from the DMA state control circuit 5000. The second data byte of the table entry is loaded in its entirety in the remaining eight bit positions in the increment counter 5080.

An increment select circuit 5090 provides a count signal on line 5058 to count down the increment counter 5080. The increment select circuit 5090 will select as a count signal either the 16-microsecond clock signal CT15 on line 4024 or the 0.5 degree pulse signal DEG.5PLS on line 4032. The increment select circuit 5090 receives an enable increment signal on line 5064 from the DMA state control circuit 5000. A select signal on line 5066 is used as a criterion for selecting between the signal CT15 and the signal DEG.5PLS. The instruction register 5070 produces a group of output signals on lines 5068 to an instruction decoder 5100. The instruction decoder 5100 decodes the four high order bits of the first byte of the table entry to determine which parameter value is represented by the twelve bits presently stored in the increment counter 5080.

The information obtained from the decoding of the instruction by the decoder 5100 is then utilized in three basic ways. First, if the decoded instruction indicates that the parameter value relates to the metering off signal METROF, it will produce a selection signal on line 5066 informing the increment selector 5090 to select the signal CT15 as a count signal. Otherwise, the signal DEG.5PLS will be used as the count signal. Second, the instruction decoder 5100 informs the DMA state control circuit 5000 when an end of table entry EOT has been reached in the data output buffer in RAM presently being accessed. This information is communicated as an end of table signal EOT on line 5074. Third, the instruction decoder 5100 produces an output signal on line 5072 designating which of the output flags in an output register 5110 is to be set or reset upon the increment counter producing a count-equals-zero signal on line 5062.

An output register 5110 sets or resets four metering and injection related flags used by the digital I/O buffer board 160. These flags include a metering flag METERF on line 5102; a meter aiming flag MTRARMF on line 5104; an injection flag INJECTF on line 5106; and an injection arming flag INJARMF on line 5108.

A priority logic circuit 5010 is provided to control conflicting priority requests among the controls 152, 154, 156 and 158. The priority logic circuit 5010 receives a priority request signal on line 5012 from the DMA state control circuit 5000, and returns a priority grant signal thereto on line 5014. The other inputs to the priority logic circuit 5010 are a DMA available signal DMAVBL on line 5016 and a priority in signal PRTYIN on line 5018. The other output is a priority out signal PRTYOUT on line 5022. The priority logic circuit 5010 is part of a daisy-chain priority system among the output controls 152, 154, 156 and 158.

With reference to FIG. 31A, the DMA state control circuit is shown, in part, at 5000a. In brief, the function of the overall DMA state control circuit 5000 is to control the timing of events related to the retrieval of an injection advance parameter value or a fuel metering parameter value and to set or reset a specified flag at a time specified by such parameter values.

The primary inputs to the circuit 5000a includes an initiating reference signal on line 5002, which in the present case is taken to be one of the three injection reference signals INJREF1/ produced by the input controller board 140. Each of the controls 152, 154, 156 and 158 uses a distinct injection or metering reference signal as an initiating signal. Also provided as input to the circuit 5000a is a signal BAB on line 5132 which is derived from the bus available signal BA and the DMA available signal DMAVBL; a priority grant signal PRTY1 on line 5012; an end of table signal 1EOT on line 5074 which signifies the end of either a metering data output table or an injection data output table; and a counter-equals-zero signal 1CNTRZRO on line 5126 which signifies that the increment counter 5080 has been counted down to zero. Based on the use of these signals, the DMA state control circuit 5000 will schedule the retrieval of parameter values; the loading of such parameter values in the increment counter; the counting down of the increment counter to zero; and the setting or resetting of an output flag corresponding to each particular parameter value.

The circuit 5000a includes a group of six NAND gates 5140, 5142, 5144, 5148 and 5150. The NAND gate 5140 has as one input the non-inverted form of the injection reference signal INJREF1 on line 5124 obtained by applying the inverted reference signal INJREF1/ on line 5002 to an inverter 5122, and as another input a signal 1DM0 on feedback line 5152. The NAND gate output signal appears on line 5154.

The NAND gate 5142 has as a first input the signal 1DM4 on line 5158, as a second input the counter-equals-zero signal 1CNTRZRO on line 5126, and as a third input the end of table signal 1EOT on line 5074. The NAND gate output signal appears on line 5160.

The NAND gate 5144 has as a first input the signal 1DM3 on line 5166, as a second input the priority signal PRTY1 on line 5012, and as a third input the signal BAB on line 5132. The NAND gate output signal appears on line 5172.

The NAND gate 5146 has as one input the signal BAB taken off by line 5168, and as another input the signal 1DM1 on line 5170. The NAND gate output signal appears on line 5178.

The NAND gate 5148 has as one input the signal 1DM3 on line 5166, and as another input a NAND gate output signal on line 5188. This NAND gate output signal is derived from a two-input NAND gate 5190 which receives as one input the priority signal PRTY1 taken off by line 5192, and as another input the signal BAB taken off by line 5194. The output signal of NAND gate 5148 appears on line 5186.

The NAND gate 5150 has as one input the signal 1DM4 on line 5158, and as another input the inverted end of table signal on line 5210. The latter signal is obtained by taking off the end of table signal 1EOT by line 5206 and applying it to an inverter 5208.

The output signal of NAND gate 5140 which appears on line 5154 is designated 1MAR and is taken off by line 5156 for use in deriving a reset signal for the address counter 5020.

The NAND gate output signal on line 5154 is also applied as one input to a NAND gate 5162. The other input to the NAND gate 5162 is the signal on line 5160. The output signal of NAND gate 5162 appears on line 5164.

The NAND gate output signal on line 5172 is applied to an inverter 5174. The inverter output signal appears on line 5176.

The NAND gate output signal on line 5178 is applied to an inverter 5180. The inverter output signal appears on line 5182.

The NAND gate output signal on line 5186 is applied as one input to a NAND gate 5196. The other input to the NAND gate 5196 is the invert of the signal 1DM6 on line 5198. The invert is obtained by applying the signal 1DM6 to an inverter 5200 and obtaining an output signal on line 5202. The NAND gate output signal appears on line 5204.

The output signal of NAND gate 5150 on line 5210 is applied as one input to a NAND gate 5212. The other input to the NAND gate 5212 is the inverted form of the signal 1DM5 on line 5214. The inverted form of this signal is obtained by applying it to an inverter 5216 which produces an output on line 5218. The output signal of the NAND gate 5212 appears on line 5220.

A group of three J-K flip-flops 5228, 5230 and 5232 are used as logic control elements in the circuit 5000a. Each of the J-K flip-flops has conventional terminal designations. The set terminal S of each of the flip-flops is connected to ground. The reset terminals R of each of the flip-flops are connected in common to the line 2016 carrying the initial reset signal IT. The clock terminals C of each of the flip-flops are connected in common to line 4022 which carries the 2-microsecond clock signal 2USC.

The J input terminal of flip-flop 5228 receives directly the NAND gate output signal on line 5164. Its K input terminal receives the inverter output signal on line 5176. The Q output terminal produces an output signal on line 5236.

The J input terminal of flip-flop 5230 receives directly the inverter output signal on line 5182. Its K input terminal receives directly the NAND gate output terminal on line 5204. The Q output terminal produces an output signal on line 5238.

The J input terminal of flip-flop 5232 receives the signal 1DM2 on feedback line 5222. Its K input terminal receives a NAND gate output terminal on line 5220. The Q output terminal produces an output signal on line 5240.

The output signals from the J-K flip-flops 5228, 5230 and 5232 are applied to a BCD-to-decimal decoder to decode them into a corresponding decimal signal. More specifically, a BCD-to-decimal decoder 5244 receives the flip-flop output signals on lines 5236, 5238 and 5240 and decodes or translates them into a corresponding decimal signal on one of the eight output lines 5246. The decoder 5244 can be a National Semiconductor CD4028 BCD-to-Decimal Decoder.

In particular, the A input terminal of the decoder 5244 receives the signal on line 5236. The B input terminal receives the signal on line 5238. The C input terminal receives the signal on line 5240. The D input terminal is not used and is connected to ground. The output signal from terminals 0–7 appear on lines 5246 and are designated 1DM0–1DM7. One and only one of the output signals 1DM0–1DM7 will be high at any given time; all other signals will be low. The signal that is high represents the decimal equivalent of the BCD from of the signals on lines 5236, 5238 and 5240.

Of the signals 1DM0–1DM7, the signal 1DM3 is taken off by line 5248. The signal DM1 is taken off by line 5250. The signal 1DM6 is taken off by line 5252. The signal 1DM2 is taken off by lines 5254 and 5256. The signal 1DM4 is taken off by line 5258. The signal 1DM5 is taken off by line 5260. The signal 1DM7 is not used.

With reference to FIG. 31B, the other part of the DMA state control circuit 5000b is shown.

The circuit 5000b includes an inverter 5264 which receives as input the signal 1MAR on line 5156. The inverter output signal on line 5266 is applied as one input to a NAND gate 5268. The other input to the NAND gate is the 2-microsecond clock signal 2USC on line 4022. The NAND gate output signal on line 5270 is applied as input to an inverter 5272. The inverter output signal on line 5024 is designated 1MARST and is used to reset the address counter 5020.

A NOR gate 5276 has as one input the signal 1DM3 on line 5248, and as another input the signal 1DM1 on line 5250.

The NOR gate output signal on line 5278 is designated 1IHALT/ and is used to inform the CPU 1000 of an impending DMA operation.

A NAND gate 5280 has an one input the 2-microsecond clock signal 2USC from line 4022, and as another input the signal 1DM6 taken off by lines 5282 from line 5252. The NAND gate output signal appears on line 5284 and is applied to an inverter 5286. The inverter output signal on line 5288 is designated 1TCLDL and is used as a load signal for the increment counter 5080.

A NAND gate 5292 has as one input the 2-microsecond clock signal 2USC from line 4022, and as another input the signal 1DM2 on line 5256. The NAND gate output signal on line 5294 is applied to an inverter 5296. The inverter output signal on line 5298 is designated 1TCLDM and is used as a load signal for the increment counter 5080. This signal is also taken off by line 5300 from line 5298 for use as a load signal for the instruction register 5070.

A NAND gate 5302 has as one input the NAND gate output signal taken by line 5304, and as another input another NAND gate output signal taken off by line 5306. The output signal of the NAND gate 5302 appears on line 5026 and is designated 1MARCNT and is used as a count signal for the address counter 5020.

A NOR gate 5312 has as one input the signal 1DM2 on line 5254, and as another input the signal 1DM6 taken off by line 5314 from line 5252. The NOR gate output signal on line 5316 is designated 1ADREN/ and is used as an address enable signal by the address bus drivers 5030 and 5050.

A NAND gate 5318 has as a first input the signal 1DM4 on line 5258, as a second input the 2-microsecond clock signal 2USC taken off line 4022, and as a third input a signal 1TCC on line 5320, the last-mentioned signal being produced by the increment select circuit 5090. The NAND gate output signal on line 5322 is designated 1TCCNT/ and is used as a count signal by the increment counter 5080.

A NAND gate 5324 has as one input the 2-microsecond clock signal 2USC on line 4022 and as another input the signal 1DM5 on line 5260. The NAND gate output signal on line 5326 is designated 1EXCLK/ and is used as a timing signal by the output register 5110.

The address counter 5020 comprises basically a binary counter 5328. A practical form of binary counter 5328 is a National Semiconductor CD4040 12-Stage Full-Carry Binary Counter-Divider, where only five of the twelve available output terminals are used.

The binary counter 5328 has a reset terminal RST which has the signal 1MARST upon line 5024 applied to it. A clock terminal CLK receives the signal 1MARCNT on line 5026. The output terminals Q1–Q5 produce on lines 5028 the signals 1ADR1F–1ADR5F. These signals represent the five low order bits A0–A4 that are placed on the address bus in a DMA operation.

The increment counter 5080 comprises basically three up-counters 5230, 5232 and 5234. In general, the up-down counter provides four bits of count capability, and collectively they suffice to handle a 12-bit binary-coded parameter value. A practical form of up-down counter is a National Semiconductor CD4029 Presettable, Binary/Decade, Up/Down Counter as was hereinbefore described in detail.

The binary/decade terminals B/D of each of the up/down counters are held high by the application of the voltage signal SPI on line 5236; this will cause each counter to count in binary. The up/down terminals U/D of each of the up/down counters are held low by connecting them in common to ground to cause them to count down from a pre-set level. The preset enable terminals PE of up/down counters 5230 and 4232 are connected in common to receive the load signal 1TCLDL on line 5288. The preset enable terminal PE of up/down counter 5234 receives the load signal 1TCLDM on line 5298. The carry-bit-in terminal CIN of up/down counter 5230 is connected to ground. The carry-bit-out terminal COUT counter 5230 is connected to the carry-bit-in terminal CIN of counter 5232. The carry-bit-out terminal COUT of counter 5232 is connected to the carry-bit-in terminal CIN of counter 5234. The carry-bit-out terminal COUT of counter 5234 produces an output signal on line 5062 which is applied as an input to inverter 5238 to produce an output on line 5216 which is designated 1CNTZRO to indicate when the increment counter 5080 has been counted down to zero from its preset state.

The jam terminals J1–J4 of the counter 5234 receive on lines 5046a the four low order bits D1F–D4F of the first byte of a data output buffer table entry. The jam terminals J1–J4 of the counter 5232 receive on lines 5046b the four high order bits D5F–D8F of the second byte of the data buffer output table entry. The jam terminals J1–J4 of the counter 5230 receive on lines 5046c the four low order bits D1F–D4F of the second byte of the data buffer output table entry.

With reference to FIG. 31C, the instruction register 5070, instruction decoder 5100, output register 5110 and increment select circuit 5090 are shown in schematic detail.

The instruction register 5070 comprises basically a 4-bit latch 5340. The 4-bit latch may be, for example, a National Semiconductor CD4042 Clocked D Latch as was hereinbefore described in detail. The latch 5340 has a clock terminal CLK which receives the load signal 1TCLDM on line 5300. A polarity terminal P receives a voltage signal SPI on line 5236. The data input terminals D1–D4 receive on lines 5048 the four high order bits D5F–D8F of the first byte of each data output buffer table entry. The output terminals Q1–Q4 and Q4/ produce on lines 5068 a set of corresponding output signals designated 1IR1F–1IR4F and 1IR4F/.

The instruction decoder 5100 comprises basically two BCD-to-decimal decoders 5342 and 5344. Each of the decoders may, for example, be a National Semiconductor CD4028 BCD-to-Decimal Decoder. The decoder 5342 has the task of decoding metering buffer table entries, and the decoder 5344 has the task of decoding injection buffer table entries.

In overview, each of the decoders 5342 and 5344 receives the four bit instruction code contained in the four high order bits of each output buffer table entry. There are five distinct instruction codes associated with each of the data output buffers. The output signals, therefore, from the decoder 5342 will be five distinct single bit codes representing the various table entries in the injection buffer, and the output signals from the decoder 5344 will be five distinct one bit codes representing the table entries in the metering buffer.

More specifically, the terminals A, B, C and D of decoder 5342 receive respective signals 1IR1F, 1IR2F, 1IR3F and 1IR4F. These signals will be translated into a corresponding decimal equivalent on the output terminals 0–7. The decimal signals 1IR1 on line 5346, 1IR2 on line 5348, 1IR3 on line 5350, 1IR4 on line 5352 and 1IR7 on line 5354 each represent a distinct table entry in the injection buffer.

The terminals A, B, C and D of the decoder 5344 receive respective input signals 1IR1F, 1IR2F, 1IR3F and 1IR4F/. The decimal equivalent of the input signal appears at one of the output terminals 0–7. In the present case, the output signal 1IR9 on line 5356, 1IRA on line 5358, 1IRB on line 5360, 1IRC on line 5362 and 1IRF on line 5364 are used to represent each of the table entries of the metering buffer.

An end of table entry EOT in the injection buffer will cause the signal 1IR7 on line 5354 to go high. Similarly, an end of table entry EOT in the metering buffer will cause the signal 1IRF to go high. Both of these signals are provided as input to a NOR gate 5368. The NOR gate output signal on line 5074 is the end of table signal 1EOT/. This signal will be low upon the detection of an end of table entry EOT in either the metering buffer or the injection buffer. It is used by the DMA logic state circuit 5000 to control the scheduling of the DMA activities.

The signal 1IRA on line 5358 is taken off by line 5366 and applied as input to the increment select circuit 5090. The signal 1IRA will be high upon the decoding of a meter off METROF instruction from the instruction register. In this case, the increment select circuit 5090 will select the 16-microsecond clock signal CT15 as a count signal for the increment counter.

More specifically, the increment select circuit 5090 receives as two primary inputs the one-half degree signal DEG.5PLS on line 4032, and the 16-microsecond clock signal CT15 on line 4024. The signal DEG.5PLS is applied as one input to a NAND gate 5390. The other input is derived by applying the signal 1IRA on line 5392 to an inverter 5394. The inverter output on line 5396 represents the other NAND gate input. The output signal from the NAND gate 5390 appears on line 5398.

The 16-microsecond clock signal CT15 is applied as one input to a NAND gate 5402. The other input is the signal 1IRA on line 5406. The output signal of NAND gate 5402 appears on line 5404.

A NAND gate 5400 has as one input the NAND gate output signal on line 5398, and as another input the NAND gate output signal on line 5404. The output signal of NAND gate 5400 appears on line 5320 and is designated 1TCC and is used to derive a count signal for the increment counter 5080.

The output register 5110 comprises four J-K flip-flops 5380, 5382, 5384 and 5386. Each of the J-K flip-flops has conventional terminal designations.

The set terminal S of each of the flip-flops is connected to ground. The reset terminals R of the flip-flops are connected in common to line 2016 which carries the initial reset signal IT. The clock terminals C of the flip-flops are connected in common to line 5326 which carries the signal 1EXCLK from the DMA state control circuit 5000.

The J input terminal of flip-flop 5380 receives directly the signal 1IR1 on line 5346. The K input terminal receives directly the signal 1IR2 on line 5348. The Q output terminal produces on line 5106a an injection flag 1INJECTF. The Q/ output terminal produces on line 5106b the complementary injection flag 1INJECTF/.

The J input terminal of flip-flop 5382 receives directly the signal 1IR3 on line 5350. The K input terminal receives directly the signal 1IR4 on line 5352. The Q output terminal produces on line 5108a an injection arming flag 1INJARMF. The Q/ terminal produces on line 5108b the invert of the injection arming flag 1INJARMF/. The J terminal of flip-flop 5384 receives directly the signal 1IR9 on line 5356. The K input terminal receives directly the signal 1IRA on line 5358. The Q output terminal produces on line 5102a a metering flag 1METERF. The Q/ output terminal produces on line 5102b the inverted metering flag 1METERF/.

The J input terminal of flip-flop 5386 receives directly the signal 1IRB on line 5360. The K input terminal receives directly the signal 1IRC on line 5362. The Q output terminal produces on line 5104a a meter arming flag 1MTRARMF. The Q/output terminal produces on line 5104b the invert of the meter arming flag 1MTRARMF/.

FIGS. 31D, E and F collectively illustrate the second control 154 on the output controller board 150a. The second control 154 is virtually identical in structure and function to the first control 152. Accordingly, a detailed description of the second control 154 is not provided herein, but rather an identification in the figures of functional blocks in the second control 154 that correspond with the same functional blocks in the first control 152 is made. In addition, signals that appear in more than one of the FIGS. 31D, E and F are identified to show continuity between the figures.

FIGS. 31G, H and I illustrate the balance of the logic circuitry on the output controller board 150a. This circuitry services both of the controls 152 and 154. Included is the priority logic circuit 5010, and other ancillary circuits for interfacing the controls 152 and 154 with the address bus and the data bus.

With reference to FIG. 31G, an AND-OR select gate 5410 is provided to select between the signals 0ADR-1F–0ADR4F and 1ADR1F–1ADR4F on lines 5028 and 5028'. The select gate 5410 may, for example, be a National Semiconductor CD4019 AND-OR select gate.

The select gate 5410 has data input terminals A1–A4 which receive the respective signals 0ADR-4F–0ADR1F, and input terminals B1–B4 which receive the respective signals 1ADR4F–1ADR1F. A pair of select terminals are designated KA and KB. When a high signal is applied to terminal KA and a low signal is applied to terminal KB, the data signals on terminals A1–A4 will be transmitted to output terminals Y1–Y4. In the converse situation where the signal applied to terminal KA is low and the signal on terminal KB is high, the data signal on terminals B1–B4 will be transmitted to the output terminals Y1–Y4. The output signals produced by the terminals Y1–Y4 appear on lines 5412 and are designated A3F–A0F.

The signal applied to the select terminal KA is derived from the address enable signal 0ADREN/ on line 5316' from the control 154. Specifically, signal 0ADREN/ is applied to an inverter 5414. The inverter output on line 5416 is provided as the input signal to select terminal KA.

The input signal applied to select terminal KB is derived from the address enable signals 1ADREN/ on line 5316 from the control 152. Specifically, signal 1ADREN/ is applied to an inverter 5418. The inverter output signal on line 5420 is communicated to the select terminal KB.

The fifth address bit A4F identifies which of the controls 152 and 154 on the output controller board 150a is requesting a DMA data transfer. The logic for deriving the fith address bit A4F is described as follows.

A NAND gate 5422 has as one input the signal SPI on line 5236, and as another input the signal 1ADREN taken off line 5420 by line 5424. The NAND gate output signal on line 5426 is designated 1A4F/. A NAND gate 5428 has as one input the signal 0ADR5F on line 5028(5)' from the address counter 5020', and as another input the signal 0ADREN taken off line 5416 by line 5432. The NAND gate output signal on line 5434 is designated 0A4F/. A NAND gate 5460 receives as one input the signal 1A4F/ on line 5426, and as another input the signal 0A4F/ on line 5434. The NAND gate output signal on line 5462 is the fifth address bit A4F. An address enable signal ADREN/ is developed to control the access of the output controller board 150a to the address bus. The signal ADREN/ is derived from the signal 1ADREN/ on line 5316 from the first control 152, and the signal 0ADREN/ on line 5316' from the second control 154. Specifically, a NOR gate 5436 receives as one input the signal 1ADREN on line 5438, and as another input the signal 0ADREN on line 5440. The NOR gate output signal on line 5442 is the address enable signal ADREN/.

The address enable signal ADREN/ is also used to derive a load clock signal LDCLK/ for use in controlling access to the data bus by the output controller board 150a. Specifically, the signal ADREN/ is taken off line 5442 by line 5444 and applied as input to an inverter 5446. The inverter output signal on line 5456, designated ADREN, is applied as one input to a NAND gate 5448. The other input to the NAND gate is the 2-microsecond clock signal 2USC on line 4022. The NAND gate output signal on line 5450 is taken off by lines 5452 and 5454 for use as the load clock signal LDCLK/.

Figure 31E:
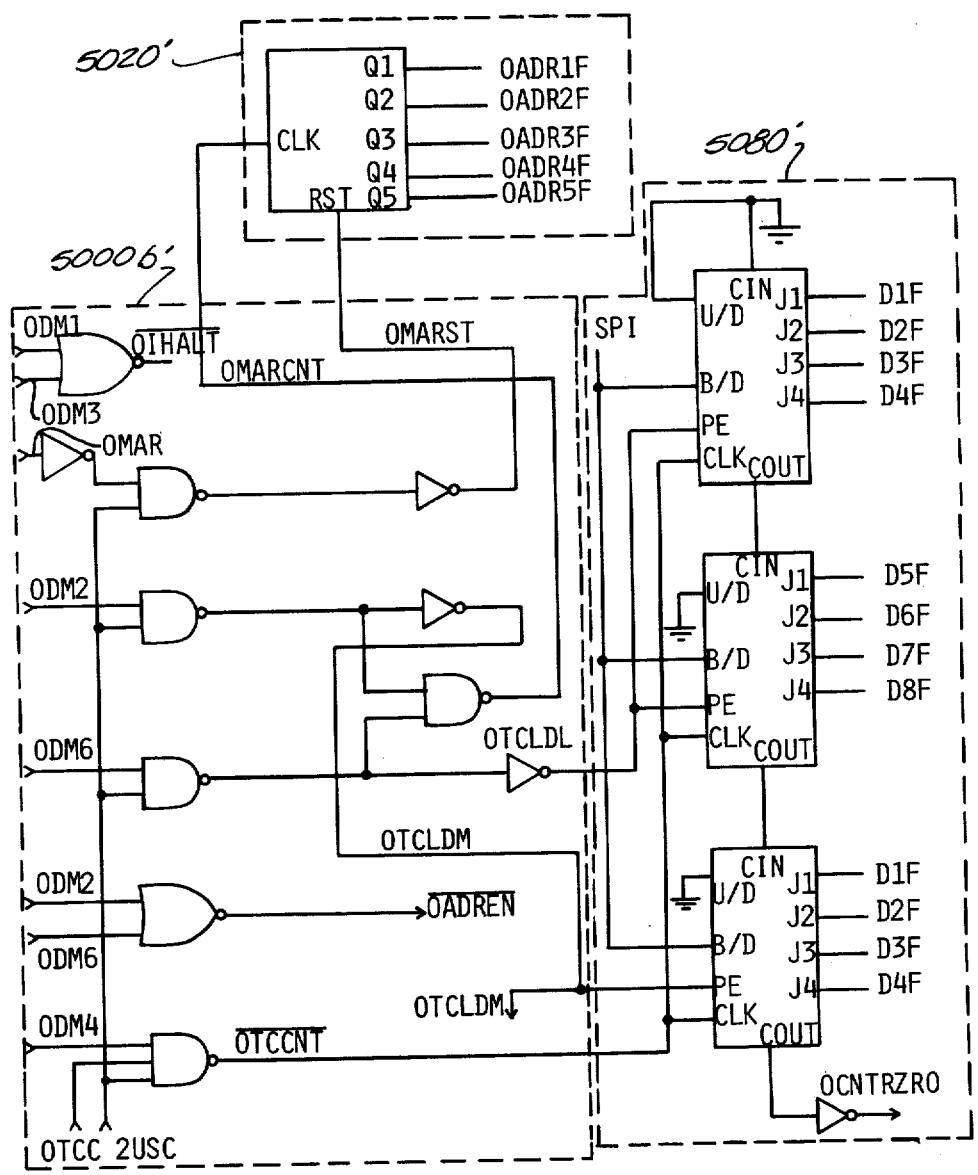
Figure 31H:
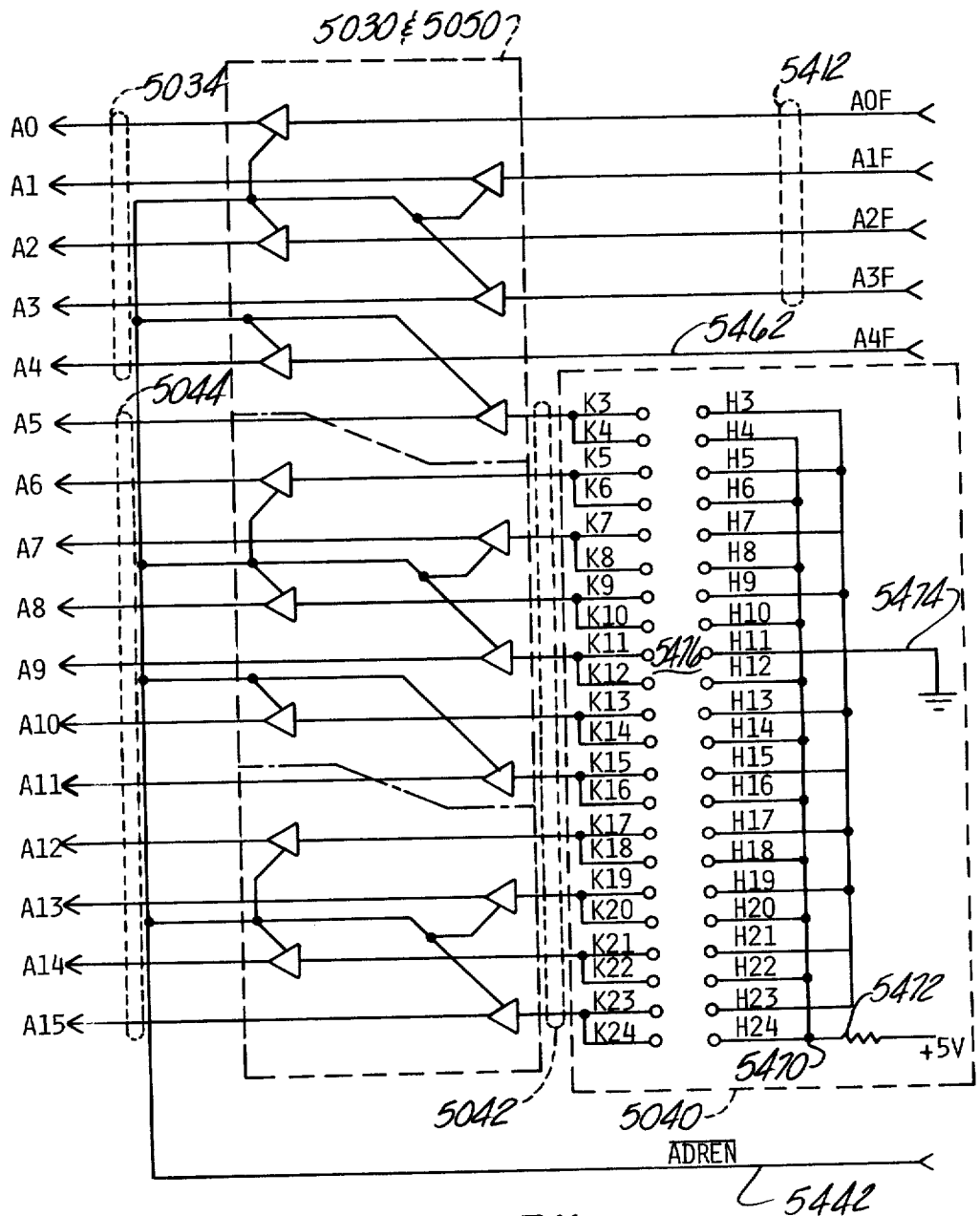

FIG. 31H illustrates in schematic detail the address block circuit 5040 and the address bus drivers 5030 and 5050.

The address block circuit 5040 produces the eleven high order address bits A5–A15 for each DMA operation from the output controller board 150a. In overview, the eleven high order bits A5–A15 represent a fixed portion of the address code for each DMA operation from the output controller board 150a.

More specifically, the address block circuit 5040 comprises an otherwise unused IC chip socket on the output controller board 150a. The chip socket has one set of terminals K3–K24, and another set of opposing terminals H3–H24. These terminals may be hard-wired by jumpers to produce a fixed code for the eleven high order address bits A5–A15. The one set of terminals K3–K24 has terminals connected in pairs, e.g. K3–K4, K5–K6, et cetera. The other set of terminals H3–H24 has every other terminal connected in common. In particular, the terminals H3, H5, H7, H9, H11, H13, H15, H17, H19, H21 and H23 are connected in common and held at ground potential by line 5474. The terminals H4, H6, H8, H10, H12, H14, H16, H18, H20, H22 and H24 are connected in common at node 5470. The node 5470 is held high by the application of +5 volts through a resistor 5472. By the use of address jumpers between the terminals K3–K24 and H3–H24, the eleven high order bits A5–A15 may be selectively encoded in a fixed manner. The output signals from the address block circuit 5040 appear on lines 5042.

The address bus drivers 5030 and 5050 comprise a group of tri-state non-inverting bus drivers. The address bus drivers 5030 and 5050 may, for example, be constructed of Harris Semiconductor HD-80C97 Three-State Hex Non-Inverting buffers. Each of the buffer amplifiers has a control terminal for conventional tri-state control. The control terminals of all the buffer amplifiers are connected in common to receive the address enable signal ADREN/ on line 5442. When the signal ADREN/ is low, the address bus will be accessible to the output controller board 150a; and when the signal ADREN/ is high, the address bus will be inaccessible.

The four low order address bits A0F–A3F are provided on line 5412. The fifth address bit A4F is provided on line 5462.

The five low order address bits A0–A4 are communicated on lines 5034. The eleven high order address bits A5–A15 are communicated on line 5044.

Figure 31I:
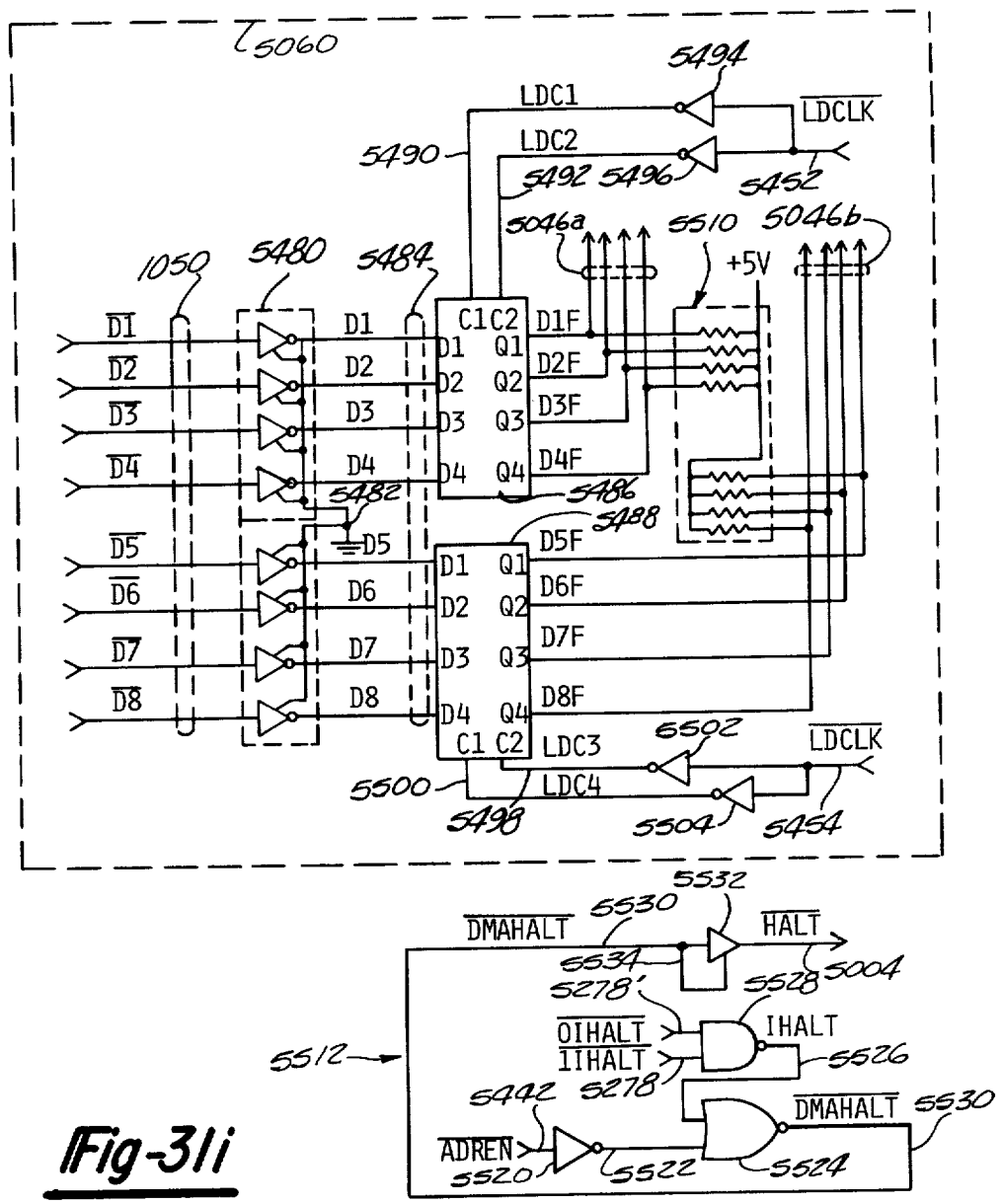

With reference to FIG. 31I, the data bus receiver is indicated generally at 5060. The basic purpose of the data bus receiver is to buffer incoming data signals on the data bus 1050 prior to loading the signals in the increment counter 5080 or the instruction register 5070.

The data signals D1/–D8/ on the data bus 1050 are received by a set of eight tri-state inverter receivers 5480. The set of inverter receivers 5480 may, for example, comprise a pair of Signetics 8T98 Tri-State Inverter Buffers. The control terminals of each individual inverter receiver are connected in common to ground at node 5482. In this manner, the tri-state control feature has been effectively disabled and the inverter receiver will simply invert and attenuate the incoming data signals D1/–D8/ into the signals D1–D8.

A pair of 4-bit latches 5486 and 5488 are provided for temporary storage of the data signals D1–D8. Each of the latches 5486 and 5488 may, for example, be a Texas Instruments 7475 4-Bit Latch.

Each of the latches 5486 and 5488 has a pair of clock terminals C1 and C2. The data input terminals are designated D1–D4, and the data output terminals are designated Q1–Q4.

The clock terminals C1 and C2 of latch 5486 receive the load signals LDC1 and LDC2 on lines 5490 and 5492. The signal LDC1 is derived by applying the load clock signal LDCLK/ on line 5452 to an inverter 5494. The signal LDC2 is derived by applying the signal LDCLK/ to inverter 5496. The clock terminals C1 and C2 of the latch 5488 receive respective load signals LDC3 and LDC4 on lines 5498 and 5500. The signal LDC3 is derived by applying the load clock signal LDCLK/ on line 5454 to an inverter 5502. The signal LDC4 is derived by applying the signal LDCLK/ to an inverter 5504.

The data output signals from the latch 5486 are designated D1F–D4F and appear on lines 5046a. The data output signals from the latch 5488 are designated D5F–D8F and appear on lines 5046b. The signals D1F–D8F are pulled up by the application of +5 volts through a parallel-resistor network, generally at 5510.

With continuing reference to FIG. 31I, a logic circuit, indicated generally at 5512, is provided to produce a processor halt signal HALT/ which informs the CPU 1000 of an impending DMA operation. More specifically, the address enable signal ADREN/ on line 5442 is applied as input to inverter 5520. The inverter output signal on line 5522 is provided as one input to a NOR gate 5524. The other input to the NOR gate is a signal designated IHALT on line 5526. The signal IHALT is derived by applying the signal 1IHALT/ on line 5278 and the signal 0IHALT/ on line 5278' as inputs to a NAND gate 5528. The NOR gate output signal on line 5530 is designated DMAHALT/. This signal is applied to a tri-state driver 5532. The control terminal of the driver is connected to its input terminal by a line 5534. The driver output signal is the HALT/ signal on line 5004.

With reference to FIG. 31G, a logic circuit for deriving the signal BAB is indicated generally at 5540. The logic circuit 5540 receives as one input the output of inverter xxxx on line xxxx whose input is ADREN on line 5456 and as another input the DMA available signal DMAVBL on line 5542. Both of these signals are applied in common to node 5544 which is pulled up by the application of +5 volts through a resistor 5550. The voltage at node 5544 is applied to an inverter 5546. The inverter output signal appears on line 5548.

The logic circuit 5540 also receives as input a bus available signal BA on line 1140. This signal is applied to an inverter 5552. The inverter output signal on line 5554 is pulled up by the application of +5 volts through the resistor 5556.

A NOR gate 5558 receives as one input the signal on line 5554, and as another input the signal on line 5548. The NOR gate output signal on line 5132 is the signal BAB.

A logic circuit for generating the read/write signal R/W and the valid memory address signal VMA needed for a DMA operation is indicated generally at 5560. The logic circuit comprises a pair of tri-state inverter drivers 5562. The control terminals of the inverter drivers are connected in common to line 5442 which carries the address enable signal ADREN/. The input terminals of each of the inverter drivers are connected to ground by respective lines 5564 and 5566. The rear/write signal R/W is taken from line 5568. The valid memory address signal VMA is taken from line 5570.

The priority logic circuit is indicated generally at 5010. The circuit 5010 implements a daisy-chain logic technique which provides priority to the control closest to the CPU 1000. It includes a NAND gate 5574 which has as one input the signal 0DM2F/ on line 5238'. The other input to the NAND gate is a signal PRTY0 on line 5012'. This signal is derived by applying the signal PRTYIN/ on line 5018 to an inverter 5576.

The NAND gate output signal on line 5578 is applied to an inverter 5580. The inverter output signal on line 5012 is designated at PRTY1. This signal is applied as one input to a NAND gate 5582. The other input to the NAND gate on line 5238 is the signal 1DM2F/. The NAND gate output signal on line 5022 is designated PRTYOUT/.

FIG. 32 is a state diagram of the various control states which the DMA state control circuit 5000 may assume. Each control state is related to the next adjacent control state by the setting or resetting of one of the J-K flip-flops 5228, 5230 and 5232.

The initial control state is designated DM0. This state is entered upon the occurrence of the initial reset signal IT which resets all of the J-K flip-flops of the DMA state control circuit 5000.

The next control state is designated DM1. The transition from state DM0 to state DM1 takes place upon the concurrence of the reference (injection or metering) signal and the 2-microsecond clock signal. In this transition between states the address counter 5020 is reset. When the state DM1 is attained, a halt signal HALT is produced to initiate the DMA operation.

The next following state is designated DM3. The transition from state DM1 to state DM3 takes place upon concurrence of the signals BA and 2USC and DMAVBL. The converse transition takes place upon the concurrence of the signal 2USC with either of the signals DMAVBL/ or PRTY/ or BA/. In state DM3, the daisy-chain priority signal DM2F is set, and the HALT signal remains high.

The next following state is designated DM2. The transition from state DM3 to state DM2 takes place upon the concurrence of the signals PRTY and BA and 2USC and DMAVBL. In state DM2, the HALT signal remains set; the address bus driver 5030 and 5050 are enabled by the signal ADREN/; the instruction register 5070 is loaded; and the four high order bits of the increment counter 5080 are loaded.

The next following state is designated DM6. The transition from state DM2 to state DM6 takes place upon the occurrence of the signal 2USC. In this transition, the address counter 5020 is incremented. When the state DM6 is attained, the signal HALT remains set; the address drivers 5030 and 5050 remain enabled; and the first eight bit positions in the increment counter 5080 are loaded.

The next following state is designated DM4. The transition from state DM6 to state DM4 takes place upon the occurrence of the signal 2USC. In this transition, the address counter 5020 is again incremented. When the state DM4 is attained, the increment counter 5080 is enabled, and is counted down to zero by either the signal CT15 or signal DEG.5PLS.

The next following state is designated DM5. The transition from state DM4 to DM5 takes place upon the concurrence of the signals CNTRZRO and EOT/. In state DM5 the instruction present loaded in the instruction register 5070 undergoes execution, i.e. the flags in the output register are set or reset. The state DM1 is reentered from the state DM5 upon the occurrence of the signal 2USC.

The state DM4 also branches through the reentry of the state DM0. This reentry takes place upon the occurrence of an end of table signal EOT.

The following is a list of logic equations relating to the events that take place in the control 152 with the signals processed by the control. The signals that appear on the right-hand side of the equations are generalized to all four of the controls 152, 154, 156 and 158. These signals were given with the prefix "1" where they appear in the detailed description of the control 152.

---

DMA STATE CONTROL LOGIC EQUATIONS

Instruction Register (5070)
    Load     = DM2 · 2USC
Increment Counter (5080)
    Load     = DM2 · 2USC (most significant four bits)
              = DM6 · 2USC (least significant eight bits)
    Count    = DM4 · 2USC · (IRA · DEG · 5PLS + IRA·CT15)
Address Counter (5020)
    Reset    = DM0 · INJREF · 2USC
    Count    = DM2 · 2USC + DM6 · 2USC
Bus Control
    Halt: HALT = DM2 + DM6 + DM1 + DM3
    Read/Write: R/W = DM2 + DM6
    Address Bus
    Driver Enable   } : ADREN = DM2 + DM6
    Priority: PRTY(M) = PRTY(M1) · DM2F/
              DMAVBL = ADREN/
Output Register (5110)
    Set Meter        = DM5 · IR9
    Reset Meter      = DM5 · IRA
    Set Meter Arm   = DM5 · IRB
    Reset Meter Arm = DM5 · IRC
    Set Inject       = DM5 · IR1
    Reset Inject     = DM5 · IR2
    Set Inject Arm   = DM5 · IR3
    Reset Inject Arm = DM5 · IR4

---

FIG. 33 is a timing diagram illustrating the significant signals processed by the control 152. The timing diagram is broken down into three exemplary DMA operations with a complete control cycle.

In line 5600, the injection reference signal INJREF is shown. This signal is a single pulse that initiates the control cycle.

In line 5610, the bus available signal BA is shown. This signal is produced by the CPU to inform the control that the address bus and the data bus are available for a DMA operation.

In line 5620, the priority signal PRTY is shown. This signal is low through the DMA retrieval of each table entry in the data output buffers in RAM.

In line 5630, the various control states are correlated with the timing of the signals. These control states are shown in the state control diagram of FIG. 32.

In line 5640, the instruction register load signal TCLDM is shown. This signal has one positive pulse each time the instruction register is to be loaded with a new instruction code.

In line 5650, the instruction register contents are shown. In the present case, in the time interval up to the leading edge of the first instruction register load signal, the contents are an end of table signal EOT. From that point to the leading edge of the next instruction register load signal, the contents are the instruction code for the set meter arm flag MTRARMF. From that point to the leading edge of the next instruction register load signal, the contents are the instruction code for the reset meter arm flag MTRARMF/. From that point the contents are the end of table signal EOT.

In line 5660, the address counter increment signal MARCN is shown. This signal appears in pairs of positive pulses; one pulse for the first byte of the table entry, and another pulse for the second byte of the table entry.

In line 5670, the HALT signal is shown. This signal is in the form of a series of positive pulses. Each pulse is high through the duration of a DMA operation. The HALT signal suspends operation of the CPU when high.

In line 5680, the increment counter load signal TCLDM and TCLDL are shown. These signals appear as a pair of positive pulses. The first signal TCLDM is used to load the four low order bits of the first byte of each data table entry. The second signal TCLDL is to load the eight bits of the second byte of each data table entry.

In line 5690, the increment counter equals zero signal CNTRZRO is shown. This signal is high when the contents of the increment counter are zero. It experiences a negative transition at the leading edge of the increment counter load signal TCLDM.

In line 5700, the meter arm flip-flop signal MTRARM is shown. This signal is set at transition point 5702 shortly after the positive transition in the increment counter count-equals-zero signal. It is reset at point 5704 shortly after the positive transition in the increment counter count-equals-zero.

In line 5710, the metering signal is shown as presently unaffected by the DMA signal processing operation thus far performed. The metering signal will subsequently appear in the form of a pulse following the DMA retrieval of the fuel metering parameter values from the metering data output buffer.

In line 5720, the injection arming flip-flop signal INJARMF is shown. This signal likewise awaits a DMA retrieval of an injection arming instruction from the injection data output buffer.

f. The Digital I/O Buffer Board

The important functions of the digital I/O buffer board 160 are threefold. First it buffers the crankshaft sensor output signal for the input controller board 140. Secondly, it provides a second decoding of the camshaft encode signals from the input controller board to develop a set of six distinct camshaft position signals. Thirdly, it provides drivers for the metering and injection signals.

Figure 34:
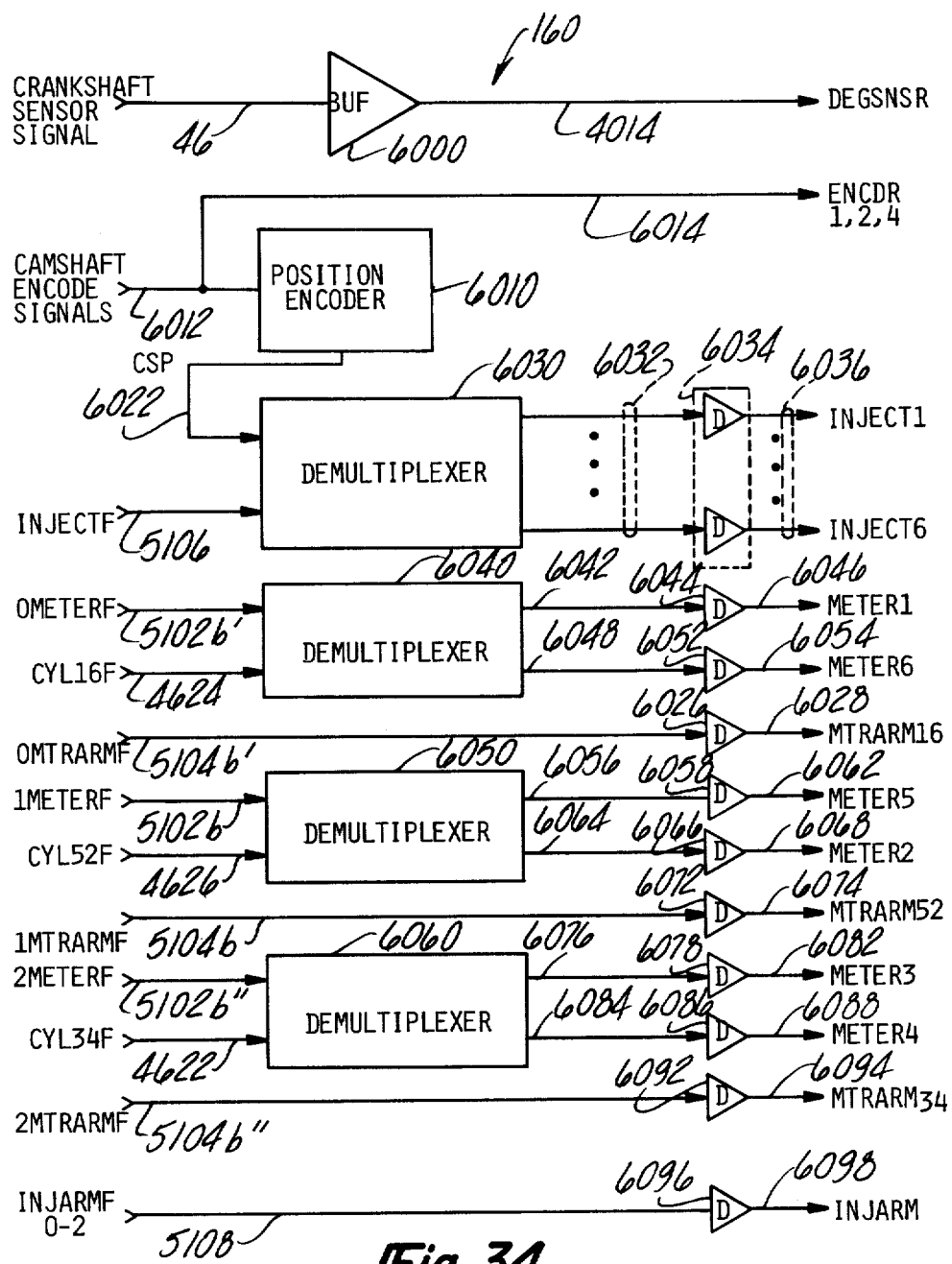
FIG. 34 is a block diagram illustration of a digital I/O buffer board of the electronic control unit.
Figure 35A:
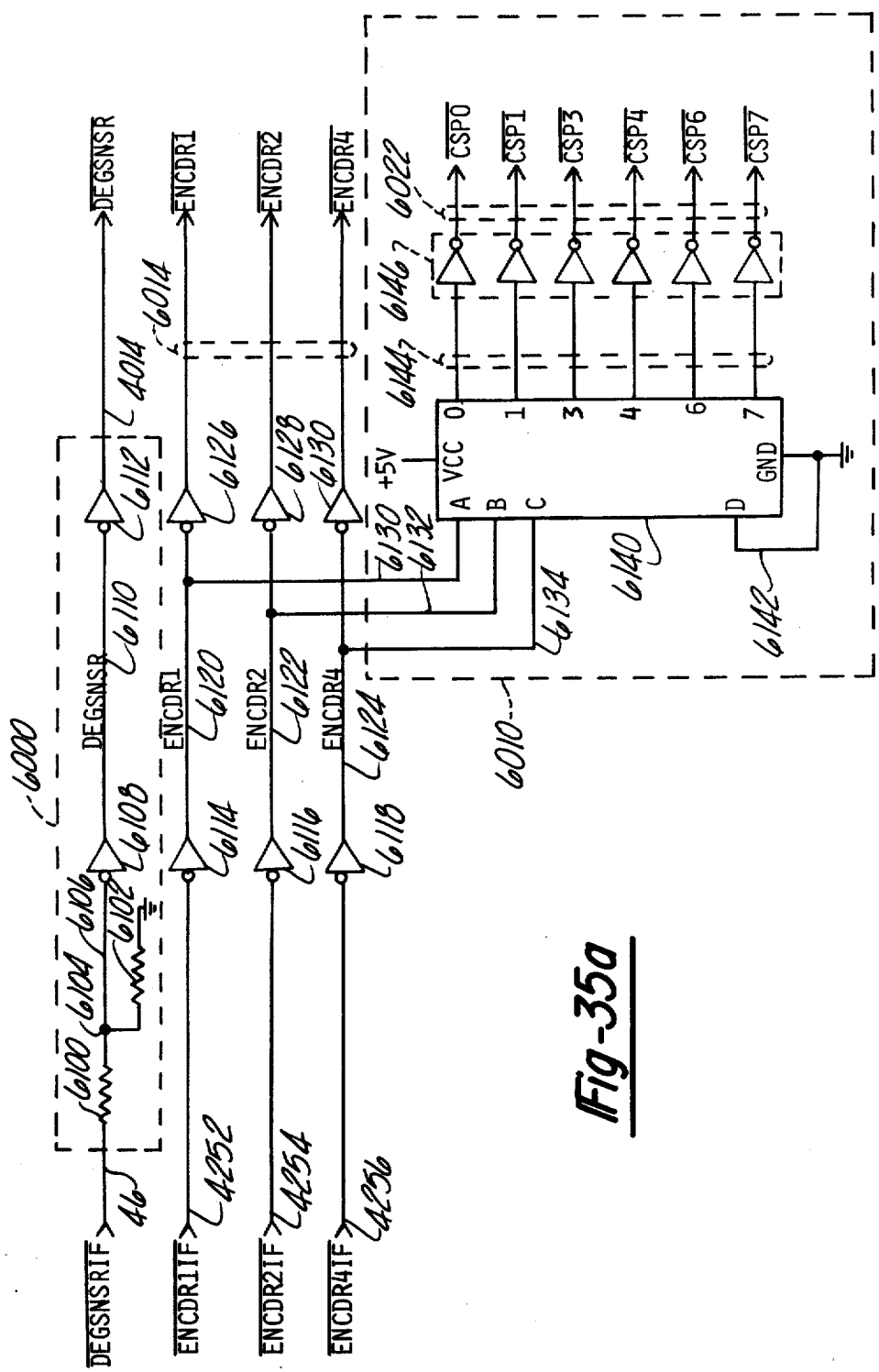
FIGS. 35A-C are detailed schematic illustrations of the digital I/O buffer board.
Figure 36:
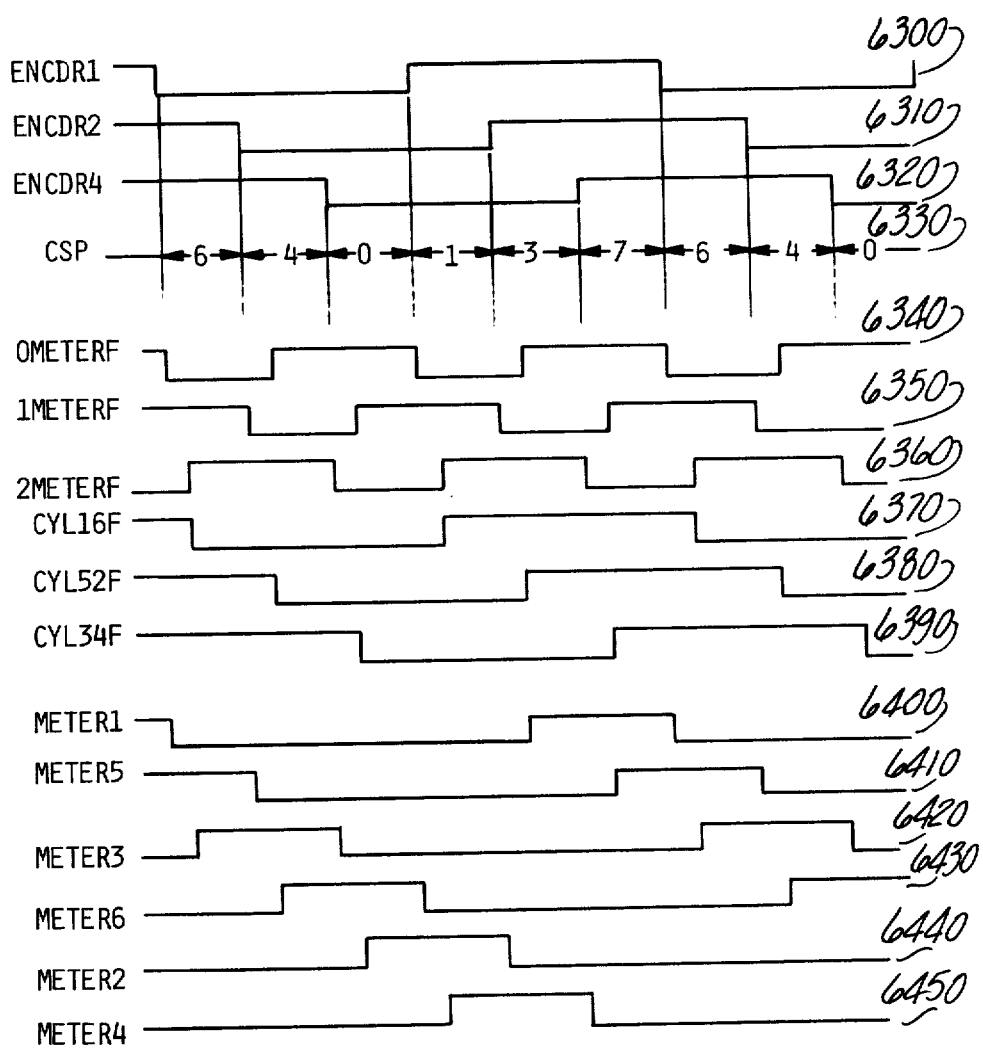
FIG. 36 is a timing diagram relating to metering signals and flags.
Figure 37:
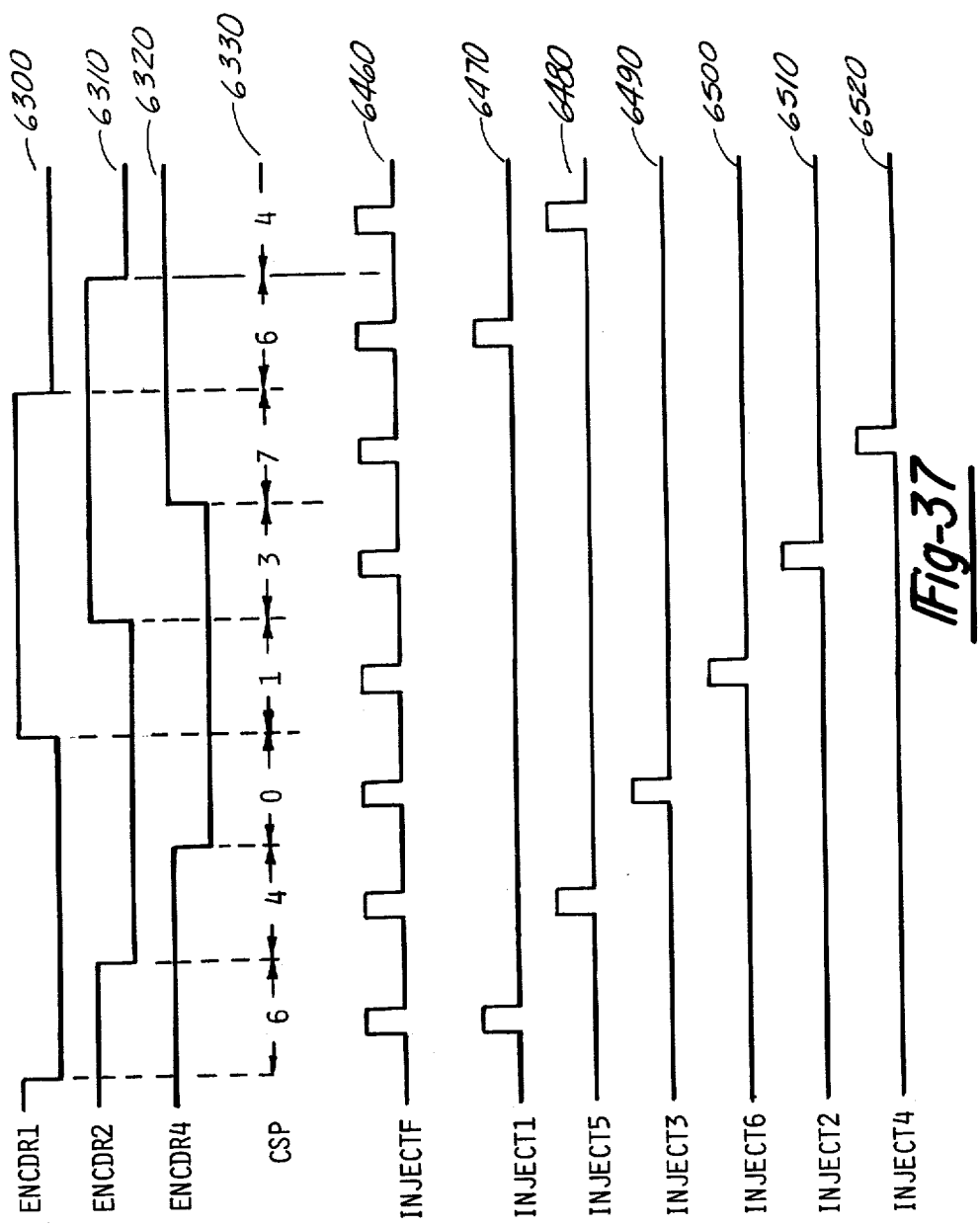
FIG. 37 is a timing diagram relating to injection signals.

FIG. 34 is a block diagram illustration of the digital I/O buffer board 160. FIGS. 35A, B and C are detailed schematic illustrations of the digital I/O buffer board. FIGS. 36 and 37 are timing diagrams of signals processed by the board.

With reference to FIG. 34, the digital I/O buffer board is indicated generally at 160. It includes a buffer driver 6000 for buffering the output signal on line 46 from the crankshaft position sensor. The buffer output signal on line 4014 is designated DEGSNSR. This signal is in the form of a pulse for each one degree of crankshaft revolution.

A position encoder 6010 is provided to make a second encoding of the once-decoded camshaft encode signals ENCDR 1, 2 and 4 into a set of six camshaft position signals CSP. Specifically, the camshaft encode signals ENCDR 1, 2 and 4 on line 6012 are taken from the first level of encoding in the position encoder 4010 of the input controller board 140. The position encoder 6010 encodes these three signals into a set of six camshaft position signals CSP. The camshaft encode signals ENCDR 1, 2 and 4 are also made available for use on line 6014.

The set of six camshaft position signals CSP are used to control the demultiplexing of the output signals and flags relating to injection, injection arming, metering and meter arming that are produced as output signals from the output controller boards 150a and b. The demultiplexing is done by a set of four demultiplexers 6030, 6040, 6050 and 6060. Each of the demultiplexers is more specifically described as follows.

The demultiplexer 6030 is concerned with the production of six inject signals INJECT 1–6 as shown in line 520 of FIG. 5. Each of these signals is spaced from the next by 120 degrees of crankshaft revolution. The demultiplexer 6030 has as one input the injection signal INJECTF on line 5106, as was output by the output controller board 150a. The other inputs to the demultiplexer are the camshaft position signals on lines 6022. The output of the demultiplexer 6030 is a set of injection signals on line 6032. These signals are applied to a set of drivers 6034 and appear as the injection signals INJECT1–6 on lines 6036.

The demultiplexer 6040 produces the metering signals METER1 and METER6 for cylinders 1 and 6. The demultiplexer 6040 has as a first input the metering signal 0METERF on lines 5102b' from the output control 154. A second input is the cylinder select flag CYL16F on line 4624 from the selection logic 4050 of the input controller board 140. A first demultiplexer output signal on line 6042 is applied to a driver 6044. The driver output signal METER1 on line 6046 is the fuel metering signal for cylinder 1. Another output signal on line 6048 is applied to a driver 6052. The driver output signal METER6 on line 6054 is the fuel metering signal for cylinder 6.

The demultiplexer 6050 produces the fuel metering signals for cylinders 2 and 5. It has as a first input the metering signal 1METERF on line 5102b from the output control 152. A second input is the cylinder select flag CYL52F on line 4626 from the selection logic 4050 of the input controller board 140. A first output signal on line 6056 is applied to a driver 6058. The driver output signal on line 6062 is the fuel metering signal METER5 for cylinder 5. Another output signal on line 6064 is applied to a driver 6066. The driver output signal on line 6068 is the fuel metering signal METER2 for cylinder 2.

The demultiplexer 6060 produces the fuel metering signals for cylinders 3 and 4. A first input to the demultiplexer 6060 is the metering signal 2METERF on line 5102b'' from the output controller board 150b. A second input is the cylinder select flag CYL34F on line 4622 from the selection logic 4050 of the input controller board 140. A first output signal on line 6076 is applied to a driver 6078. The driver output signal on line 6082 is the fuel metering signal METER3 for cylinder 3. Another output signal on line 6084 is applied to a driver 6086. The driver output signal on line 6088 is the fuel metering signal METER4 for cylinder 4.

The meter arming signal for the circuit that drives the meter solenoid of the injectors on cylinders 1 and 6 is obtained by applying the signal 0MTRARMF on line 5104b' to a driver 6026. The driver output signal on line 6028 is the meter arming signal MTRARM16 for the circuit which drives the metering solenoids in the injectors on cylinders 1 and 6. The meter arming signals MTRARM52 and MTRARM43 are obtained in a likewise manner. In particular, the signal 1MTRARMF on line 5104b is applied to a driver 6072. The driver output signal on line 6074 is the meter arming signal MTRARM52 for the circuit which drives the metering solenoids in the injectors on cylinders 5 and 2. The signal 2MTRARMF on line 5104b'' is applied to a driver 6092. The driver output signal on line 6094 is the meter arming signal MTRARM34 for the circuit which drives the metering solenoids in the injectors on cylinders 3 and 4.

The injection arming signal INJARM for the circuit which drives the inject solenoids in the injectors on all six of the cylinders is obtained in a similar manner. More specifically, the signals INJARMF0-2 on lines 5108 are successively applied to a driver 6096. The driver output signal on line 6098 is the injection arming signal INJARM.

With reference to FIG. 35A, the buffer 6000 and position encoder 6010 are shown in detailed schematic form. The buffer 6000 receives the crankshaft position sensor signal DEGSNSRIF/ on line 46. The signal DEGSNRSRIF/ is applied to a voltage divider network defined by the serial connection of resistors 6100 and 6102. The output of the voltage divider network is taken at common node 6104 and applied by way of line 6106 to an inverter-driver 6108. The inverter-driver output signal on line 6110 is designated DEGSNSR. This signal is applied to another inverter-driver 6112. The output signal of the inverter-driver 6112 on line 4014 is the buffered degree signal DEGSNSR/.

The camshaft encode signals ENCDR1IF/-ENCDR4IF/ are carried over to the digital I/O buffer board 160 from the input controller board 140 on lines 4252, 4254 and 4256. The camshaft encode signals are applied to a set of inverter-drivers 6114, 6116, and 6118. The respective inverter-driver output signals appear on line 6120, 6122, and 6124 and are designated ENCDR1, ENCDR2 and ENCDR4. These signals are again applied to a second set of inverter-drivers 6126, 6128 and 6130. The inverter-driver output signal on lines 6014 are designated ENCDR1/, ENCDR2/ and ENCDR4.

The position encoder 6010 comprises basically a BCD-to-decimal decoder 6140. The decoder 6140 may, for example, be a National Semiconductor CD4028 BCD-to-Decimal Decoder. The decoder 6140 has a power terminal VCC which receives +5 volts. A ground terminal GND is connected to system ground. The data input terminals are designated A, B, C and D. The terminal D is connected by line 6142 to ground.

The data input terminal A receives the signal ENCDR1 on line 6120 as taken off by line 6130. The data input terminal B receives the signal ENCDR2 on line 6122 as taken off by line 6132. The data input terminal C receives the signal ENCDR4 on line 6124 as taken off on line 6134.

The six data output terminals which are used are designated 0, 1, 3, 4, 6 and 7. The decoder 6140 will translate the BCD signals applied to data input terminals A, B and C into a corresponding decimal representation at one and only one of the data output terminals. This translation or decoding is similar to the decoding which was accomplished in block 4010b of FIG. 20B previously described in connection with the input controller board 140. The output signals produced by the data output terminals 0, 1, 3, 4, 6 and 7 appear on lines 6144. These signals are applied to a set of inverters 6146. The inverter output signals on lines 6022 are then the twice-decoded camshaft position signals CSP0/, CSP1/, CSP3/, CSP4/, CSP6/ and CSP7/.

Figure 35B:
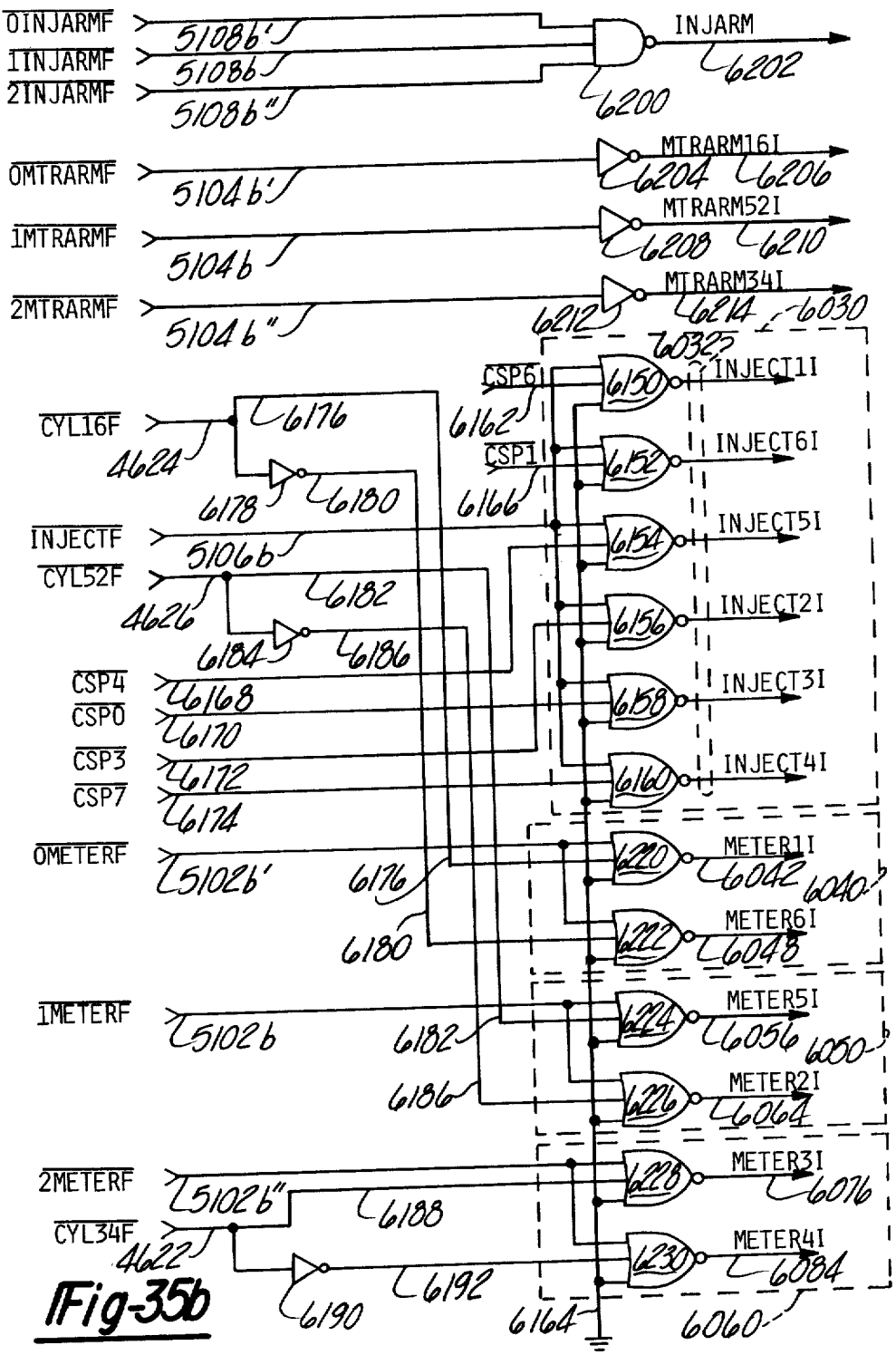

With reference to FIG. 35B, the demultiplexers 6030, 6040, 6050 and 6060 are shown in detailed schematic form. These demultiplexers are described in detail as follows.

The demultiplexer 6030 comprises a group of six NOR gates 6150, 6154, 6156, 6158 and 6160. The NOR gate 6150 has as a first input the camshaft position signal CSP6/ on line 6162, as a second input the injection signal INJECTF/ on line 5106b, and as a third input a ground connection from line 6164. The output signal of the NOR gate 6150 is designated INJECT1I.

The NOR gate 6152 has as a first input the camshaft position signal CSP1/ on line 6166, as a second input the injection signal INJECTF/ on line 5106b and as a third input the ground connection. The output signal of the NOR gate 6152 is designated INJECT6I.

The NOR gate 6154 has as a first input the camshaft position signal CSP4/ on line 6168, as a second input the injection signal INJECTF/ on line 5106b, and as a third input the ground connection. The output signal of NOR gate 6154 is designated INJECT5I.

The NOR gate 6156 has as a first input the camshaft position signal CSP3/ on line 6172, as a second input the injection signal INJECTF/ on line 5106b, and as a third input the ground connection. The output signal of NOR gate 6156 is designated INJECT2I.

The NOR gate 6158 has as a first input the camshaft position signal CSP0 on line 6170, as a second input the injection signal INJECTF/ on line 5106b, and as a third input the ground connection. The output signal of NOR gate 6158 is designated INJECT3I. The NOR gate 6160 has as a first input the camshaft position signal CSP7/ on line 6174, as a second input the injection signal INJECTF/ on line 5106b, and as a third input the ground connection. The output signal of NOR gate 6160 is designated INJECT4I. All of the NOR gate output signals are carried on the lines 6032.

The demultiplexer 6040 comprises a pair of NOR gates 6220 and 6222. The NOR gate 6220 has as a first input the signal 0METERF/ on line 5102b', as a second input the cylinder select flag CYL16F/ on line 6176, and as a third input the ground connection. The NOR gate output signal on line 6042 is designated METER1I. The NOR gate 6222 has as a first input the signal 0METERF/ on line 5102b', as a second input the non-inverted cylinder select flag CYL16F on line 6180, as a third input the ground connection. The signal CYL16F is obtained by applying the signal CYL16F/ on line 4624 to inverter 6178. The NOR gate output signal on line 6048 is designated METER6I.

The demultiplexer 6050 comprises a pair of NOR gates 6224 and 6226. The NOR gate 6224 has as its input the signal 1METERF/ on line 5102b, as a second input the cylinder select flag CYL52F/ on line 6182, and as a third input the ground connection. The NOR gate output signal on line 6056 is designated METER5I. The NOR gate 6226 has as a first input the signal 1METERF/ on line 5102b, as a second input the non-inverted cylinder select flag CYL52F, and as a third input the ground connection. The non-inverted cylinder select flag CYL52F is obtained by applying the signal CYL52F/ on line 4626 to an inverter 6184. The NOR gate output signal on line 6064 is designated METER2I.

The demultiplexer 6060 comprises a pair of NOR gates 6228 and 6230. The NOR gate 6228 has as a first input the signal 2METERF/ on line 5102b", as a second input the cylinder select flag CYL34F/ on line 6188, and as a third input the ground connection. The NOR gate output signal on line 6076 is designated METER3I. The NOR gate 6230 has a a first input the signal 2METERF/ on line 5102b", as a second input the non-inverted cylinder select flag CYL34F on line 6192, and as a third input the ground connection. The non-inverted cylinder select flag CYL34F is obtained by applying a signal CYL34F/ on line 4622 to an inverter 6190. The NOR gate output signal on line 6084 is designated METER4I.

The circuit logic for the derivation of the injection arming signal INJARM includes a NAND gate 6200. The inputs to the NAND gate 6200 are the signal 0INJARMF/ on line 5108b', the signal 1INJARMF/ on line 5108b, and the signal 2INJARMF/ on line 5108b". These input signals are carried over from the output controller boards 150a and b. The NAND gate output signal on line 6202 is an unbuffered form of the injection arming signal INJARM.

The meter arming signal for the circuit to drive the metering solenoid in the injectors on cylinders 1 and 6 is derived by applying the signal 0MTRARMF/ on line 5104b' to an inverter 6204. The inverter output signal on line 6206 is the meter arming signal MTRARM16I.

The meter arming signal for the circuit to drive the metering solenoid in the injectors on cylinders 5 and 2 is obtained by applying the signal 1MTRARMF/ on line 5104b to an inverter 6208. The inverter output signal on line 6210 is the desired meter arming signal MTRARM52I.

The meter arming signal for the circuit which drives the metering solenoid and the injectors on cylinders 3 and 4 is obtained by applying the signal 2MTRARMF/ on line 5104b" to an inverter 6212. The inverter output signal on line 6214 is the desired meter arming signal MTRARM34I.

Figure 35C:
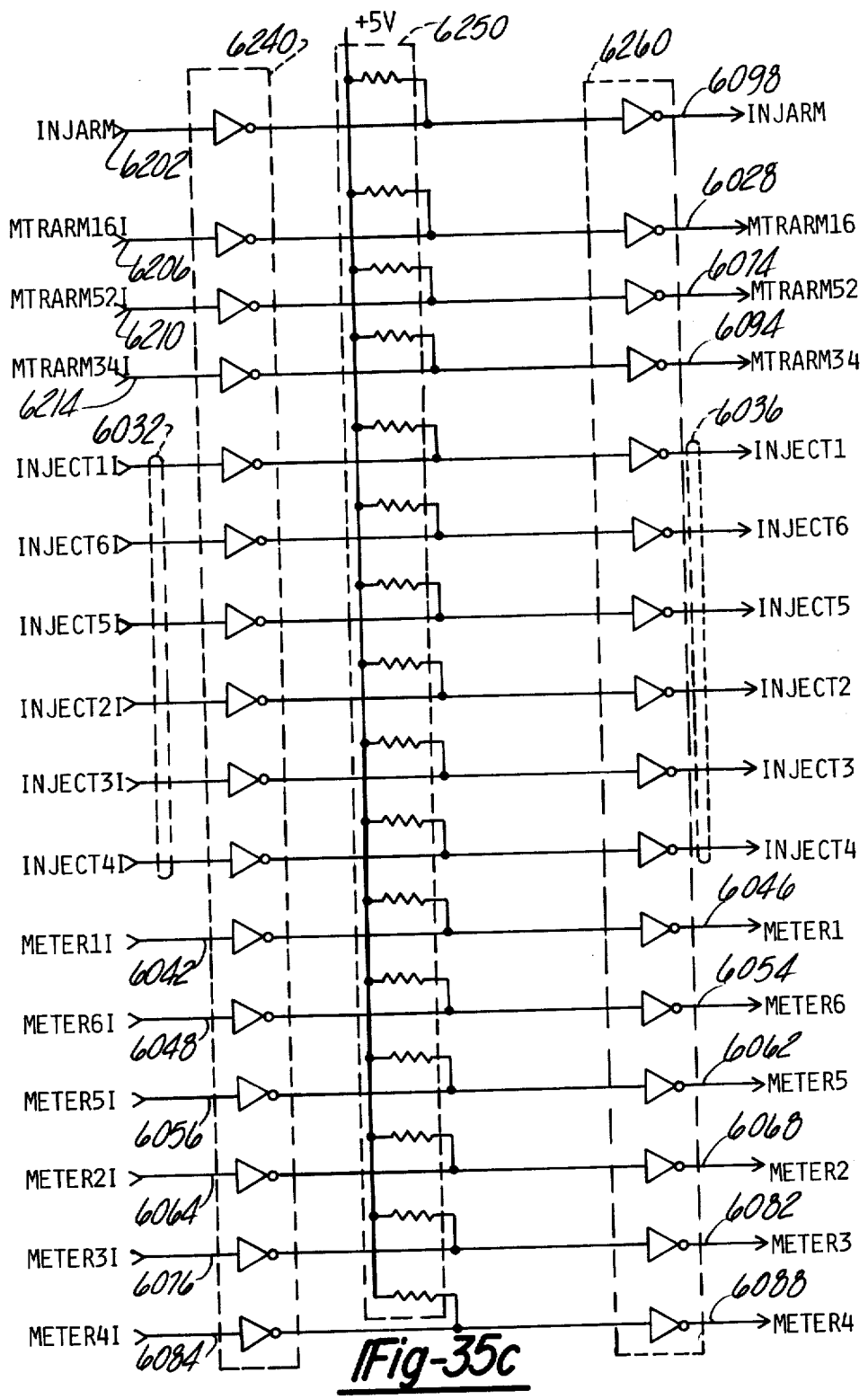

FIG. 35C illustrates in detailed schematic form the driver array for each of the output signals in FIG. 35B.

There is a direct carry-over from the signals shown on the right-hand side of FIG. 35B onto the left-hand side of FIG. 35C.

Each signal is first applied to a respective inverter in a group of inverters generally indicated at 6240. The inverter signal is then pulled up by the application of +5 volts through a resistor forming part of a resistor network, generally at 6250. The signal is then applied to a respective inverter forming a group of inverters 6260 for re-inversion.

FIG. 36 is a timing diagram that relates camshaft position to metering signals for the metering solenoids in the injectors on cylinders 1-6.

More particularly, in lines 6300, 6310 and 6320 the once-decoded camshaft decode signals ENCDR1, ENCDR2, and ENCDR4 are shown. These signals are again decoded by the position encoder 6010 to produce the set of six camshaft position signals CSP in line 6330. The relation of each individual camshaft position signal, e.g. CSP6, CSP4, et cetera, is shown by its alignment with the above three camshaft decode signals.

The meter flag signals 0METERF, 1METERF and 2METERF which are produced by the output controller boards 150a and b are shown in lines 6340, 6350 and 6360. The cylinder select flag CYL16F, CYL52F and CYL34F which are produced by the input controller board 140 are shown in lines 6370, 6380 and 6390. The signal 0METERF of line 6340 and the flag CYL16F of line 6370 are demultiplexed by the demultiplexer 6040 to product the signal METER1 in line 6400 and the signal METER6 in line 6430. These latter two signals occur at mutually exclusive time intervals.

The signal 1METERF of line 6350 and the flag CYL52F of line 6380 are demultiplexed by the demultiplexer 6050 to produce the metering signal METER5 in line 6410 and METER2 in line 6440. These latter two signals occur at mutually exclusive times.

The signal 2METERF of line 6360 and the flag CYL34F of line 6390 are demultiplexed by the demultiplexer 6060 to produce the metering signals METER3 in line 6420 and METER4 in line 6450. These latter two signals occur at mutually exclusive times.

FIG. 37 illustrates the relationship between the camshaft position signals CSP and the injection signals to each injector on the cylinder. More specifically, the camshaft encode signals and camshaft position signals are repeated in lines 6300–6330 to provide an orientation of the injection signals with the camshaft position.

The injection signal INJECTF is shown in line 6460. This signal has one pulse through each 120 degrees of crankshaft revolution, or, alternatively stated, it has one pulse for each transition between camshaft position signals CPS of line 6330. The six injection signals which are applied to the inject solenoid of the injectors on the engine cylinders are shown in lines 6470-6520. These signals occur in the sequence 1-5-3-6-2-4 as they are produced by the demultiplexer 6030.

The logic equations for the metering signals of FIG. 36 and the injection signals of FIG. 37 are presented in the following table:

LOGIC EQUATIONS

METER1=0METERF·CYL16F
METER5=1METERF·CYL52F
METER2=1METERF·CYL52F/
METER6=0METERF·CYL16F/
METER3=2METERF·CYL34F
METER4=2METERF·CYL34F/

INJECT1=INJECTF·CSP6
INJECT5=INJECTF·CSP4
INJECT3=INJECTF·CSP0
INJECT6=INJECTF·CSP1
INJECT2=INJECTF·CSP3
INJECT4=INJECT·CSP7 g. The Control Panel

The control panel facilitates operator control of the system in several important ways. First, it allows an operator to control the system in an off-line mode whereby the operator can examine the current contents of any location in RAM, including the injection output data buffer and the metering data output buffer, and can enter manually new data values in RAM at any location that he chooses. Secondly, the operator can exercise manual control over parameter values for injection advance and fuel metering when the system is operating in an on-line mode. Specifically, the control panel affords the operator a capability of overriding the system software and entering manually preselected parameter values for injection advance and fuel metering. Thirdly, the operator can select a normal, automatic on-line operating mode. In this mode, the parameter values for injection advance in fuel metering are computed by the system software on the basis of real-time engine operating conditions.

The manner in which the control panel is interfaced with the balance of the system hardware is described in the detailed description of the panel interface board to follow. In a production embodiment of the present system, the control panel and the panel interface board would likely not be included. However, their inclusion is useful in the present instance as they provide an analytical and diagnostic aid for optimizing system performance.

Figure 38:
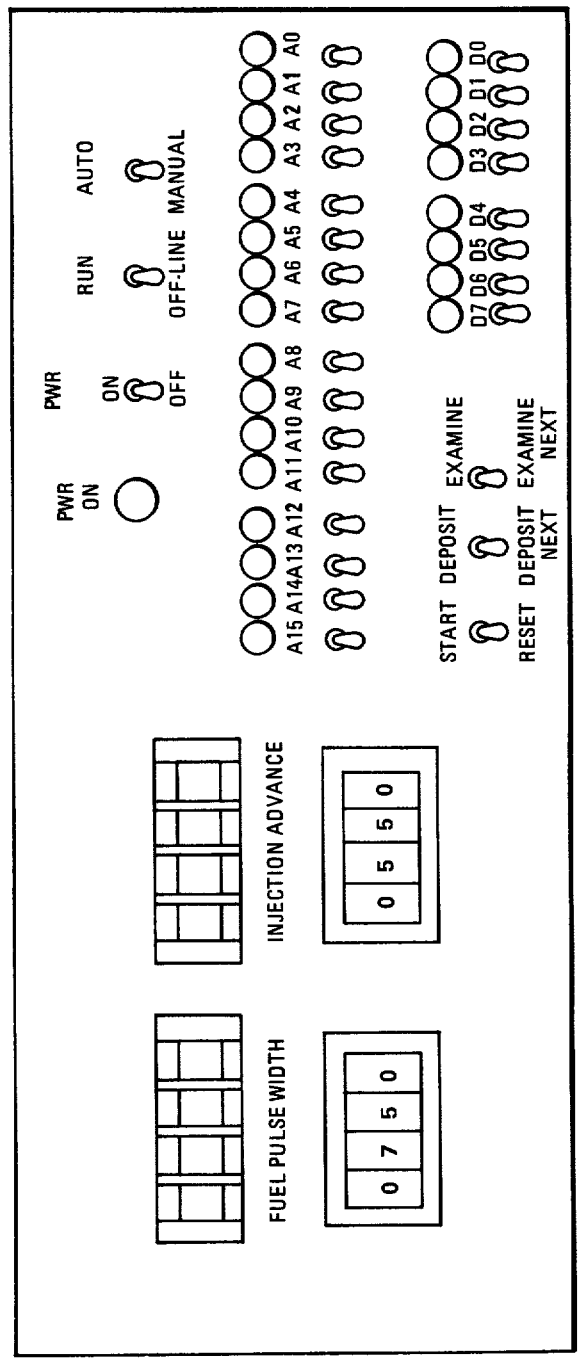
FIG. 38 is a diagrammatic view of the front of an operator control panel used in conjunction with the electronic control unit.

FIG. 38 illustrates the control panel in diagrammatic form, generally at 170. The control panel 170 is divided into the following functional parts:
Control Panel Switches and Lamp;
Data Panel Switches;
Address Bit Switches and Lamps;
Data Bit Switches and Lamps; and
Thumbwheel Switches and Digital Displays.

The control panel switches and lamp are located generally at the top right side of the control panel 170. A power switch is designated PWR. When this switch is moved from its OFF position to its ON position, it will automatically start execution by initializing the system, which will then proceed by accordance with the setting of the other control switches. The switch PWR is accompanied by a power indicator lamp designated PWR ON which lights when the system power is on.

The next control panel switch is designated RUN/OFF-LINE. When this switch is placed in its OFF-LINE position, the system is not controlling engine operation. The OFF-LINE mode is used when the operator wants to change the contents of a location in RAM, re-initialize the system software, or start a program from a given address. In this mode the data switches are enabled.

When the RUN/OFF-LINE switch is in its RUN position, it enables automatic or manual control of system operation. Specifically, in the RUN mode the system software will be enabled to update the data output buffers using either manually selected or program-computed parameter values for injection advance and fuel metering.

The next control panel switch is designated AUTO/MANUAL. When this switch is in its MANUAL position, it enables manual input of parameter values for injection advance and fuel metering. Specifically, in the MANUAL mode, the thumbwheel switch settings are read, processed, and used to update the meter and injection data output buffers. The quantities displayed in the digital displays are the parameter values actually used by the system software. Fuel pulse width is rounded to the nearest 16 usec. Injection advance is changed only in 0.5 degree increments.

When this switch is in its AUTO position, the system software has full control over the computation and use of parameter values for injection advance and fuel metering. Specifically, fuel pulse width and injection advance are computed from engine calibration tables using real-time engine operating conditions. These computed values are displayed in the digital displays for those parameter values.

When this switch is in either of its two possible positions, the address switches are read and their value is displayed in the address lamps. The contents of the location specified by the address switches are displayed in the data lamps. The operator can thus monitor changes in parameter values for injection advance and fuel metering with changes in operating conditions.

The data panel switches are located generally at the bottom center of the control panel 170. These switches are enabled only when the system is operating in the OFF-LINE mode. Each individual data panel switch is described as follows.

A system start switch is designated START/RESET. When this switch is in its START position, the address switches are read and the program begins execution from the location in the system software defined by the address switches. When this switch is in its RESET position, program execution will begin at its normal power-up location. This switch is therefore used only to reinitialize the software.

The next switch is designated DEPOSIT/DEPOSIT NEXT. When this switch is in its DEPOSIT position, the data switches are read and their value is stored in the location specified by the present setting of the address switches. The address location and the data value are displayed by the address and data lamps, respectively. When this switch is in its DEPOSIT NEXT position, it performs the identical function, except that the displayed address is first incremented by one (1). The value defined by the present setting of the data switches is then stored in the address location specified by the address switches.

The next switch is designated EXAMINE/EXAMINE NEXT. When this switch is in its EXAMINE position, the address switches are read and displayed by the address lamps. The contents of the location specified by the address switches are displayed on the data lamps. When this switch is in its EXAMINE NEXT position, it performs the identical function, except the displayed address is first incremented by one (1). The next address and data are displayed in the same manner.

The address switches and lamps are designated A1-5–A0 from left to right. When an address switch is in its down position it represents a binary zero; when in its up position, it represents a binary one. The address lamps always display the latest address processed.

The data switches and lamps are designated D7–D0 from left to right. The binary representations of the data lamps and switches and the same as those used by the address lamps and switches. The data lamps always display the contents of the location specified by the address lamps.

The thumbwheel switches for manual input of parameter values for fuel metering are located below the legend FUEL PULSE WIDTH, and the associated digital display is located directly thereabove. When the system is operating in the MANUAL mode, the digital display displays the parameter value entered by an operator through the thumbwheel switches. This value is precise to 16 usec. The system software uses this value to correctly sequence the metering data output buffer entries. A maximum value of 10.00 msec can be entered through the thumbwheel switches. When the system operates in the AUTO mode, the thumbwheel switches are ignored. In this case, the digital display will display the fuel pulse width computed by the system software engine calibration tables. The digital displays on the control panel 170 may, for example, be the commercially available Dialco 730 Series LED Read-Out, manufactured by Dialight Corporation, Brooklyn, N.Y. 11237.

The thumbwheel switches for manual entry of parameter values for injection advance are located below the legend INJECTION ADVANCE and the corresponding digital display is indicated directly thereabove. When the system is operating in the MANUAL mode, the digital display displays the parameter value entered by an operator through the thumbwheel switches. This value is precise to 0.5 degree. The system software uses this value to correctly sequence the injection data output buffer entries. The settings of the thumbwheel switches are ignored when the system is operating in the AUTO mode; in this case the digital display will display the parameter value for injection advance as computed by the system software from engine calibration tables using real-time engine operating conditions. This parameter value does not include an extra advance for a 1.5 msec lead time added to the injection signal.

h. The Panel Interface Board

The general function of the panel interface board is to buffer the panel switches and provide storage and drivers for the various panel displays. Data is transferred to and from the panel interface board by reading or writing to appropriate memory locations assigned to the board. The address locations associated with the panel interface board are presented in the following list:

| PANEL INTERFACE BOARD ADDRESSES | | |
|---|---|---|
| ADDRESS | READ/WRITE | FUNCTION |
| 3XX0 | Read | Metering time manual input thumbwheel 10 ms, 1 ms digits |
| 3XX1 | Read | Metering time manual input thumbwheel 100 μsec, 10 μs digits |
| 3XX2 | Read | Injection advance manual input thumbwheel 10 deg., 1 deg. digits |
| 3XX3 | Read | Injection advance manual input thumbwheel 0.1 deg., 0.01 deg. digits |
| 3XX7 | Read | Control panel switches |
| 3XXC | Read | Address switches A8–A15 |
| 3XXD | Read | Address switches A0–A7 |
| 3XXE | Read | Data switches D0–D7 |
| 3XXF | Read | Data panel switches |
| 3XX0 | Write | Metering time display - 10 ms, |

PANEL INTERFACE BOARD ADDRESSES

| ADDRESS | READ/WRITE | FUNCTION |
|---|---|---|
| 3XX1 | Write | 1 ms digits<br>Metering time display - 100 μsec, 10 μsec digits |
| 3XX2 | Write | Injection advance display - 10 deg., 1 deg. digits |
| 3XX3 | Write | Injection advance display - .1 deg., .01 deg. digits |
| 3XX4 | Write | Address lamps A8-A15 |
| 3XX5 | Write | Address lamps A0-A7 |
| 3XX6 | Write | Data lamps D0-D7 |

Figure 39:
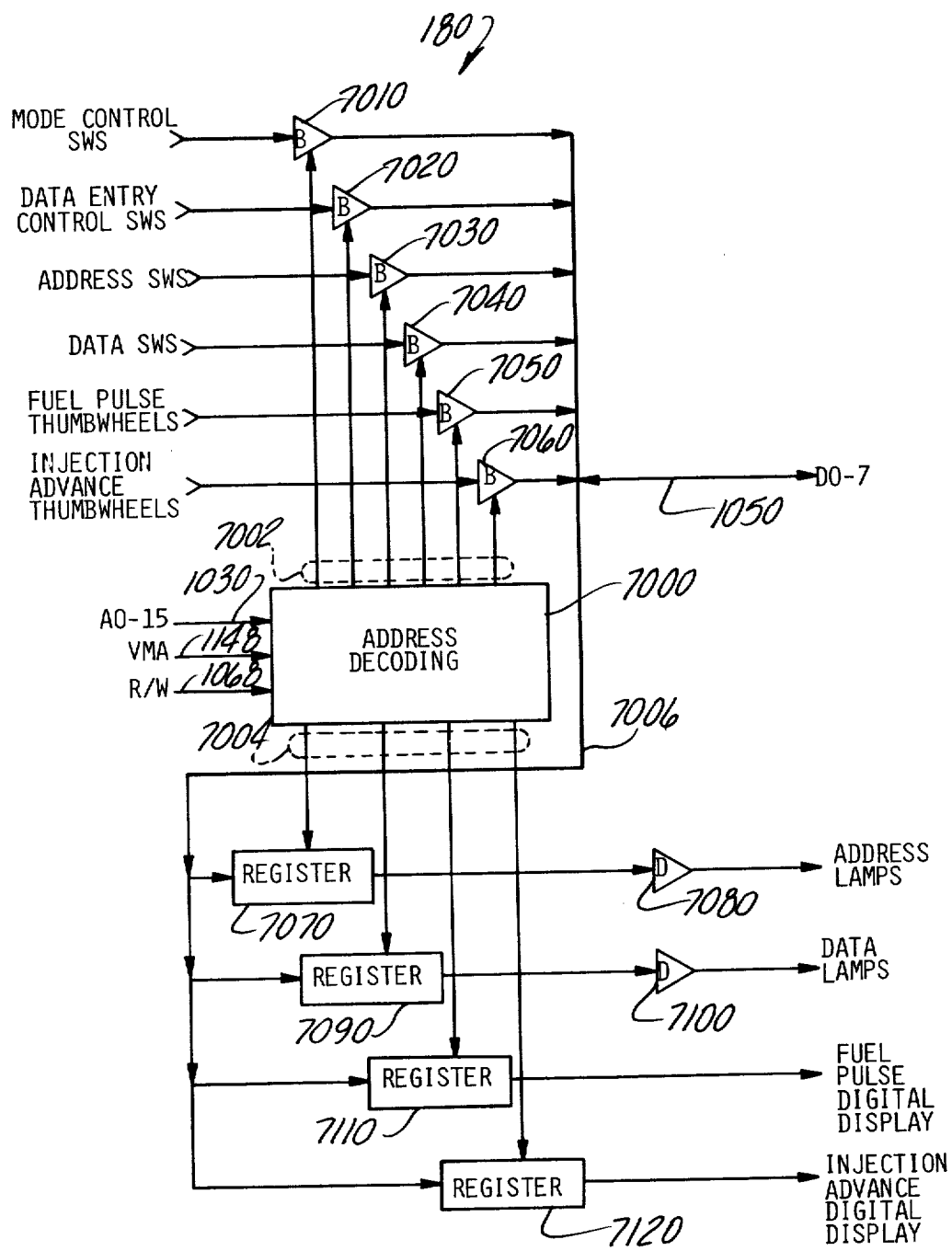
FIG. 39 is a block diagram illustration of a panel interface board which interfaces the operator control panel with the balance of the electronic control unit.

FIG. 39 illustrates the panel interface board in block diagram form. FIGS. 40A-H illustrate the panel interface board in detailed schematic form.

With specific reference to FIG. 39, the panel interface board is indicated generally at 180. The main control component of the panel interface board comprises an address decoding circuit 7000. The purpose of the address decoding circuit is to decode requests for communications with the control panel 170 placed on the address bus 1030 by the CPU 1000. The inputs to the address decoding circuit 7000 include the address bus 1030, the valid memory address signal VMA on line 1148 and the read/write signal R/W on line 1068. The address decoding circuit 7000 produces a first set of output signals on line 7002 used to control the condition of a corresponding set of tri-state drivers for the switches on the control panel. A second set of output signals on line 7004 are used to control the loading of a corresponding set of registers for the displays on the control panel.

More specifically, the settings of the mode control switches are applied as inputs to a tri-state buffer 7010. The buffer output signal can be placed onto the data bus 1050 for communication to the CPU. The settings of the data entry control switches are received as inputs by a tri-state buffer 7020. The settings of the address switches are received as inputs by a tri-state buffer 7030. The settings of the data switches are received as inputs by a tri-state buffer 7040. The settings of the fuel pulse thumbwheels are received as inputs by a tri-state buffer 7050. The settings of the injection advance thumbwheels are received as inputs to a tri-state buffer 7060. The output signals of the tri-state buffers 7020, 7030, 7040, 7050 and 7060 can in a like manner be placed onto the data bus 1050 for communication to the CPU.

A 16-bit storage register 7070 provides storage capability for the address lamps on the control panel. The register output signals are applied to a set of drivers 7080 to energize the address lamps. An 8-bit storage register 7090 is provided as storage capability for data lamps on the control panel. The output signals of the register 7090 are applied to a set of drivers 7100 to energize the data lamps. A 16-bit storage register 7110 is provided as storage capability for the digital display for fuel pulse width. A 16-bit storage register 7120 is provided as storage capability for the digital display for injection advance.

Figure 40A:
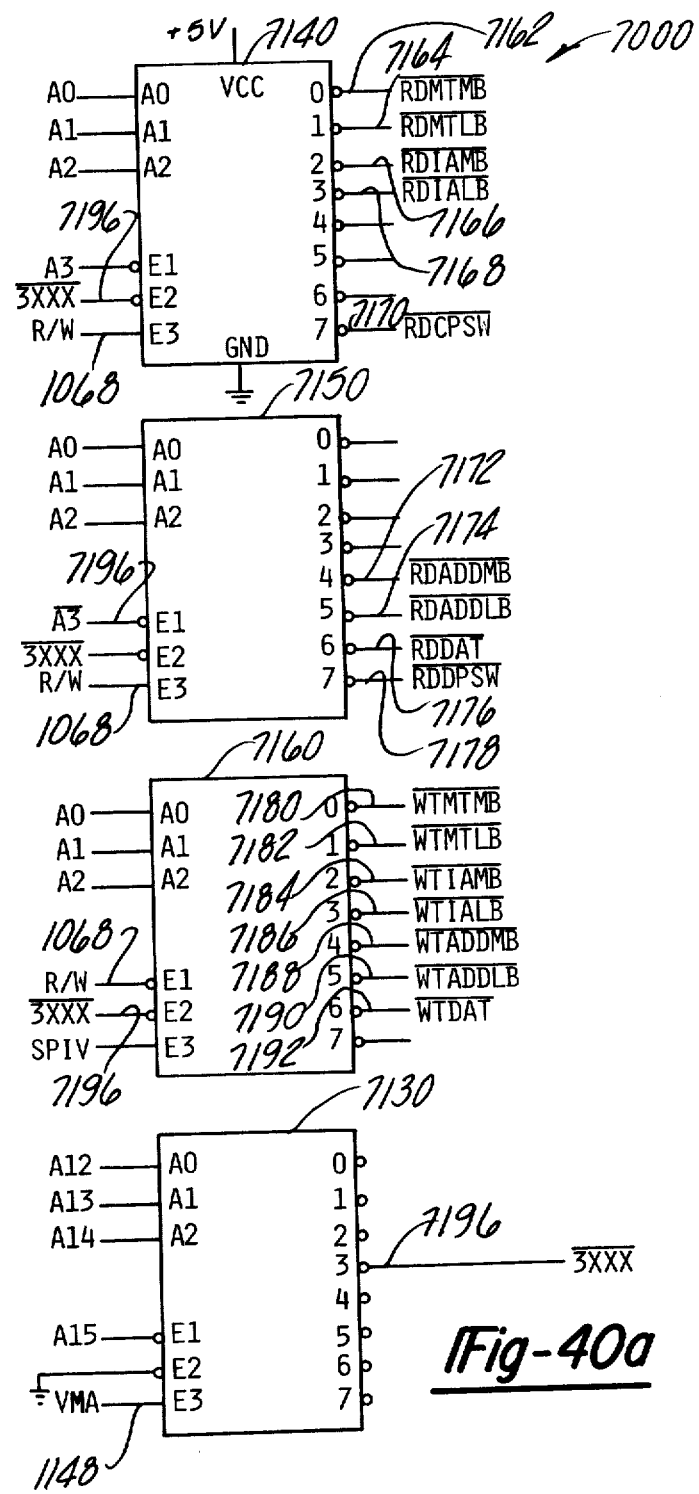

Reference is now made to FIG. 40A which illustrates in schematic detail the address decoding circuit 7000. The circuit 7000 is basically comprised of four binary decoders 7130, 7140, 7150 and 7160. Each of the decoders may, for example, be an Intel 8205 1 Out Of 8 Binary Decoder. The decoder 7140 is described as exemplary of all four decoders.

The binary decoder 7140 has a power terminal VCC which receives +5 volts, and a ground terminal GND which is connected to system ground. The data input terminals are designated A0, A1 and A2. The bit signal pattern applied to the data input terminals is interpreted as a 3-bit binary number. The decoder has three enable terminals E1, E2 and E3; the terminals E1 and E2 are inverted. The data output terminals are designated 0-7. When the decoder is enabled by the proper combination of signals applied to the enable terminals, the data output terminal which is the decimal equivalent of the 3-bit signal pattern applied to the data input terminals will go low; all other data output terminals will be high.

The binary decoder 7130 has applied to its data input terminals A12-14 and to its enable terminal E1 bit A15. This decoder is used to determine if the leftmost hexadecimal digit on the address bus is a 3. The range of addresses 300-300F are allocated to control panel functions. The enable terminal E2 is grounded. The enable terminal E3 receives the valid memory address signal VMA on line 1148. If the bit pattern of the four high order address bits A12-A15 is 0011, it indicates that the information presently on the address bus is of interest to the control panel. And, if so, the data output terminal 3 will produce a low output signal designated 3XXX/ on line 7196.

The binary decoder 7140 has applied to its data input terminals A0-A2 and its enable terminal E1 the four low order address bits A0-A3. The four low order address bits are used to identify the rightmost or low order hexadecimal digit on the address bus. The enable terminal E2 has applied to it the signal 3XXX/ on line 7196. The enable terminal E3 has the read/write signal R/W applied to it on line 1068. The data output terminal 0 produces a read metering time most significant byte signal RDMTMB/ on line 7162. The data output terminal 1 produces a read metering time least significant byte signal RDMTLB/ on line 7164. The data output terminal 2 produces a read injection advance most significant byte signal RDIAMB/ on line 7166. The data output terminal 3 produces a read injection advance least significant byte signal RDIALB/ on line 7168. The data output terminals 4, 5 and 6 are not used. The data output terminal 7 produces a read control panel switches signal RDCPSW/ on line 7170.

The binary decoder 7150 has applied to its data input terminals A0-A2 the three low order address bits A0-A2. It has the complement of the fourth address bit A3/ applied to its enable terminal E1. The enable terminal E2 receives the signal 3XXX/ on line 7196. The enable terminal E3 receives the read/write signal R/W on line 1068. The data output terminals 0-3 are not used. The data output terminal 4 produces a read address most significant byte signal RDADDMB/ on line 7172. The data output terminal 5 produces a read address least significant byte signal RDADDLB/ on line 7174. The data output terminal 6 produces a read data signal RDDAT/ on line 7176. The data output terminal 7178 produces a read data panel switches signal RDDPSW/ on line 7178.

The binary decoder 7160 has applied to its data input terminals A0-A2 the three low order address bits A0-A2. The enable terminal E1 receives the read/write signal R/W on line 1068. The enable terminal E2 receives the signal 3XXX/ on line 7196. The enable terminal E3 receives the voltage signal SPIV. The data output terminal 0 produces a write metering time most significant byte signal WTMTMB/ on line 7180. The data output terminal 1 produces a write metering time least significant byte signal WTMTLB/ on line 7182. The data output terminal 2 produces a write injection advance most significant byte signal WTIAMB/ on line 7184. The data output terminal 3 produces a write injection advance least significant byte signal WTIALB/ on line 7186. The data output terminal 4 produces a write address most significant byte signal WTADDMB on line 7188. The data output terminal 5 produces a write address least significant byte signal WTADDLB/ on line 7190. The data output terminal 6 produces a write data signal WTDAT/ on line 7192. The data output terminal 7 is not used.

FIG. 40B illustrates the tri-state buffer circuits for the control panel switches, data panel switches, address switches and data switches on the control panel 170. Specifically, the circuit 7010 provides buffering for the mode control switches RUN and AUTO. The circuit 7020 provides buffering for the data entry control switches RESET, START, EXAMINE, EXAMINE NEXT, DEPOSIT and DEPOSIT NEXT. The circuit 7030 provides buffering for the address switches A0–A15. The circuit 7040 provides buffering for the data switches D0–D7.

The sixteen address switches A0–A15 are connected to the buffer circuit 7030 by lines 7190. The eight data switches D0–D7 are connected to the buffer circuit 7040 by lines 7194. The connection of the data entry control switches to the buffer circuit 7020 is as follows. The RESET switch by line 7196; the START switch by line 7198; the EXAMINE switch by line 7200; the EXAMINE NEXT switch by line 7202; the DEPOSIT switch by line 7204; and the DEPOSIT NEXT switch by line 7026. The connection of the mode control switches to the buffer circuit 7010 is as follows: the RUN switch by line 7028 and the AUTO switch by line 7210.

All of the switch lines are connected to a parallel-resistor network, indicated generally at 7230. Each switch line is connected to one end of a resistor, with the other end of the resistor connected to +5 volts.

Each of the lines is thereafter connected to the input terminal of a tri-state driver-amplifier within a set of such amplifiers, indicated generally at 7246. Each of the tri-state driver amplifiers has a control terminal which receives a control signal from the address decoding circuit 7000.

The setting of switches A0–A3 are placed on the data buy as bits D0/-D3/. The control terminals for the tri-state drivers associated with switch settings A0–A3 are controlled by the read address least significant byte signal RDADDLB/ on line 7174. The signal RDADDLB/ is pulled up by connection of a resistor 7212 between line 7174 and +5 volts. The settings of switches A4 and A5 are placed on the data bus as bits D4/ and D5/. The drivers for these switch settings are controlled by the signal RDADDLB/ on line 7174. The settings for address switches A8–A11 are placed on the data bus as bits D0/-D3/. The drivers for these switch settings receive the read address most significant byte signal RDADDMB/ on line 7172. A pull-up resistor 7214 is connected between line 7172 and +5 volts. The settings of address switches A6 and A7 appear on the data bus as bits D6/ and D7/. The drivers for these switch settings receive the signal RDADDLB/ on line 7174. The settings of address switches A12–A15 are placed on the data bus as bits D4/-D7/. The drivers for these switch settings receive the signal RDADDMB/ on line 7172.

The settings of the data switches D0 and D1 are placed on the data bus as bits D0/ and D1/. The drivers for these switch settings receive the read data signal RDDAT/ on line 7176. The settings of data switches D2–D5 are placed on the data bus as bits D2/–D5/. The drivers for these switch settings receive the signal RDDAT/ on line 7176. A resistor 7216 is connected between lines 7176 and +5 volts. The settings of data switches D6 and D7 are placed on the data bus as bits D6/ and D7/. The drivers for these switch settings receive the signal RDDAT/ on line 7176.

The setting of the RESET switch is carried over to the reset circuit 2010 on the memory board 120. This switch is represented as switch 2112 in FIG. 9A within the description of the memory board. The setting of the START switch is placed on the data bus as bit D1/. The setting of the EXAMINE switch is placed on the data bus as bit D2/. The setting of the EXAMINE NEXT switch is placed on the data bus as bit D3/. The drivers for these last-mentioned switch settings receive the read data panel switch signal RDDPSW/ on line 7178. A pull-up resistor 7218 is connected between line 7178 and +5 volts. The setting of the DEPOSIT switch is placed on the data bus as bit D4/. The setting of the DEPOSIT NEXT switch is placed on the data bus as bit D5/. The drivers of these two last-mentioned switch settings receive the signal RDDPSW/ on line 7178.

The setting of the RUN switch is placed on the data bus as bit D0/. The setting of the AUTO switch is placed on the data bus as bit D1/. The drivers for these switch settings receive the read control panel switch signal RDCPSW/ on line 7170. A resistor 7220 is connected between the line 7170 and +5 volts.

Figure 40C:
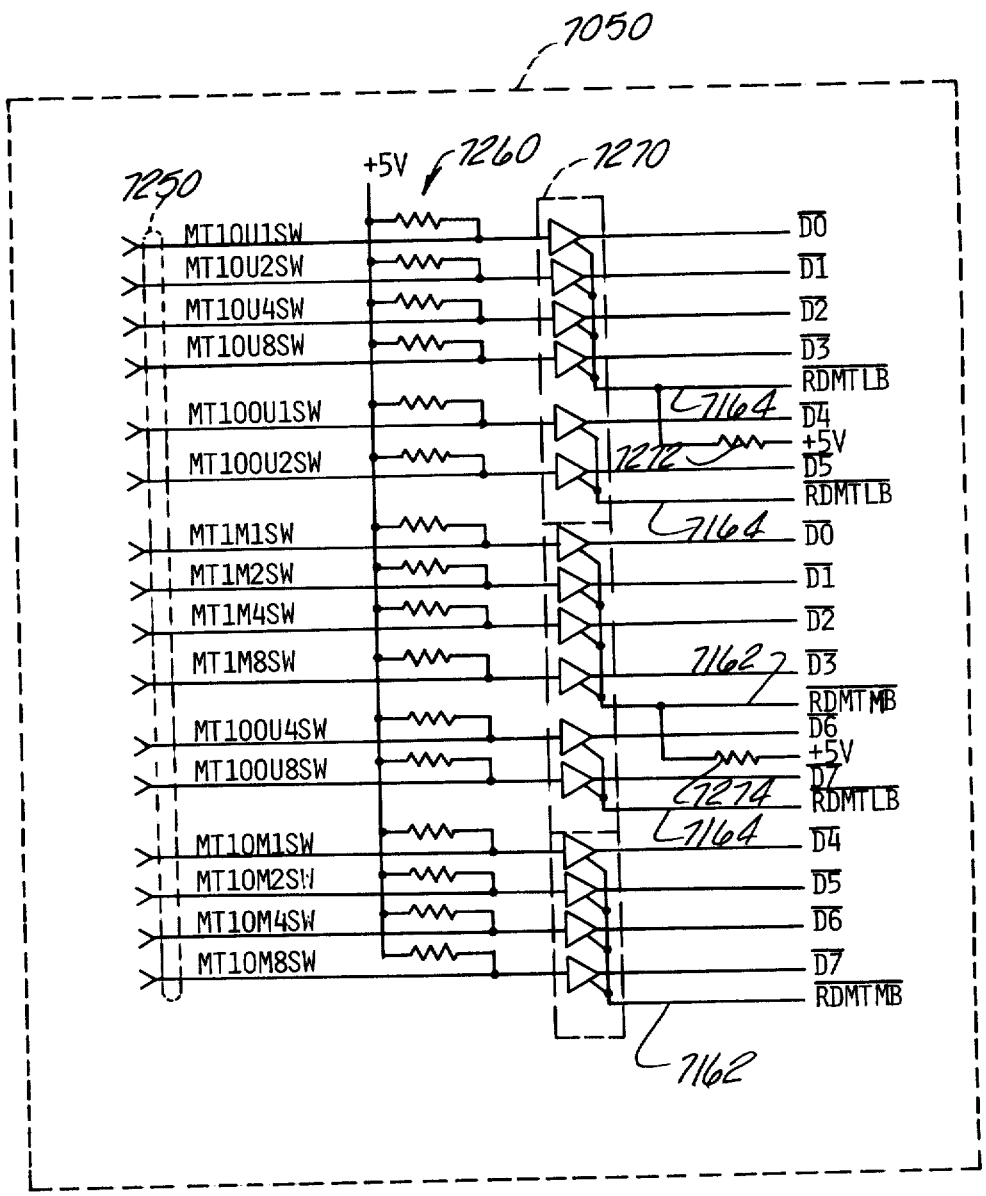

In FIG. 40C, the buffer circuit 7050 for the fuel pulse thumbwheel is shown. There are four thumbwheels whose settings are communicated on lines 7250. Each of the settings is a binary division of the time interval represented by a switch. There are metering time switches for 10 msec, 1 msec, 100 μsec and 10 μsec.

Each of the lines 7250 is connected to a parallel resistor network, indicated generally at 7260. The parallel resistor network 7260 has one resistor for each of the lines 7250. One end of the resistor is connected to a respective line and the other end is connected to +5 volts.

A group of tri-state drivers 7270 are connected to the lines out of the parallel resistor network 7260. The tri-state drivers may, for example, be Harris Semiconductor HD-80C97 Three-State Hex Non-Inverting Buffers. Each of the individual drivers in the group of tri-state drivers 7270 has a control terminal connected in common as part of a set of either four or two drivers.

The first four signals on lines 7250 are from the 10 μsec switch and are designated MT10U1SW, MT10U2SW, MT10U4SW, and MT10U8SW. These signals are placed on the data bus as respective data bits D0/-D3/. The control terminals of the drivers for these signals have applied to them the read metering time least significant byte signal RDMTLB/ on line 7164. A pull-up resistor 7272 is connected between the line 7164 and +5 volts.

The next two signals relate to the 100 μsec switch and are designated MT100U1SW and MT100U2SW. They are placed on the data bus as D4/ and D5/. The drivers for these signals have applied to their control terminals the read metering time least significant byte signal RDMTLB/ on line 7164.

The next four signals relate to the 1 msec switch and are designated MT1M1SW, MT1M2SW, MT1M4SW and MT1M8SW. These signals are placed on the data bus as bits D0/-D3/. The drivers for these signals have applied to their control terminals the read metering time most significant byte signal RDMTMB/ on line 7162. A pull-up resistor 7274 is connected between the line 7162 and +5 volts.

The next two signals again relate to the 100 μsec switch and are designated as MT100U4SW and MT100U8SW. These signals are placed on the data bus as bits D6/ and D7/. The drivers for these signals have applied to their control terminals the signal RDMTLB/ on line 7164.

The next four signals relate to the 10 msec switch and are designated MT10M1SW, MT10M2SW, MT10M4SW and MT10M8SW. These signals are placed on the data bus as bits D4/-D7/. The drivers for these signals have applied to their control terminals the signal RDMTMB/ on line 7162.

Figure 40D:
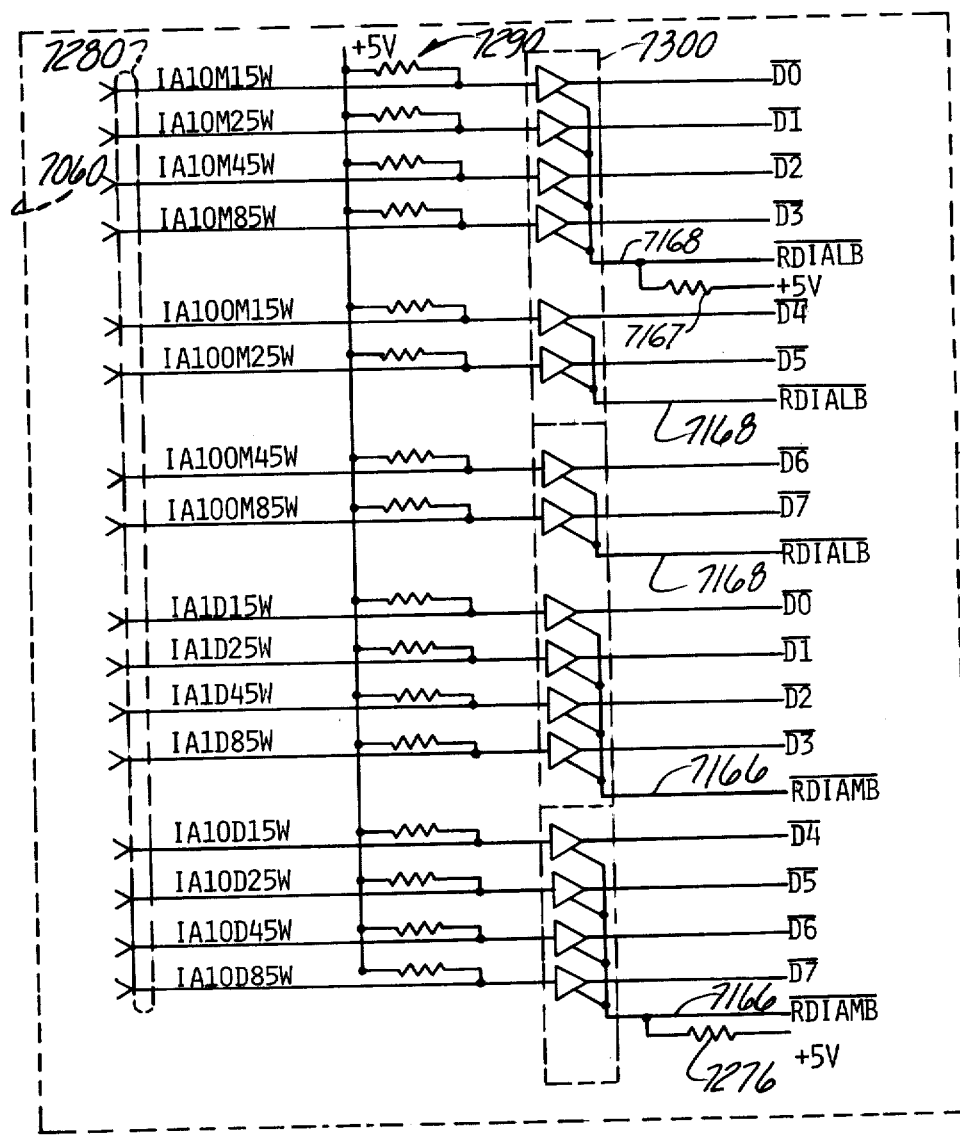
Figure 41:
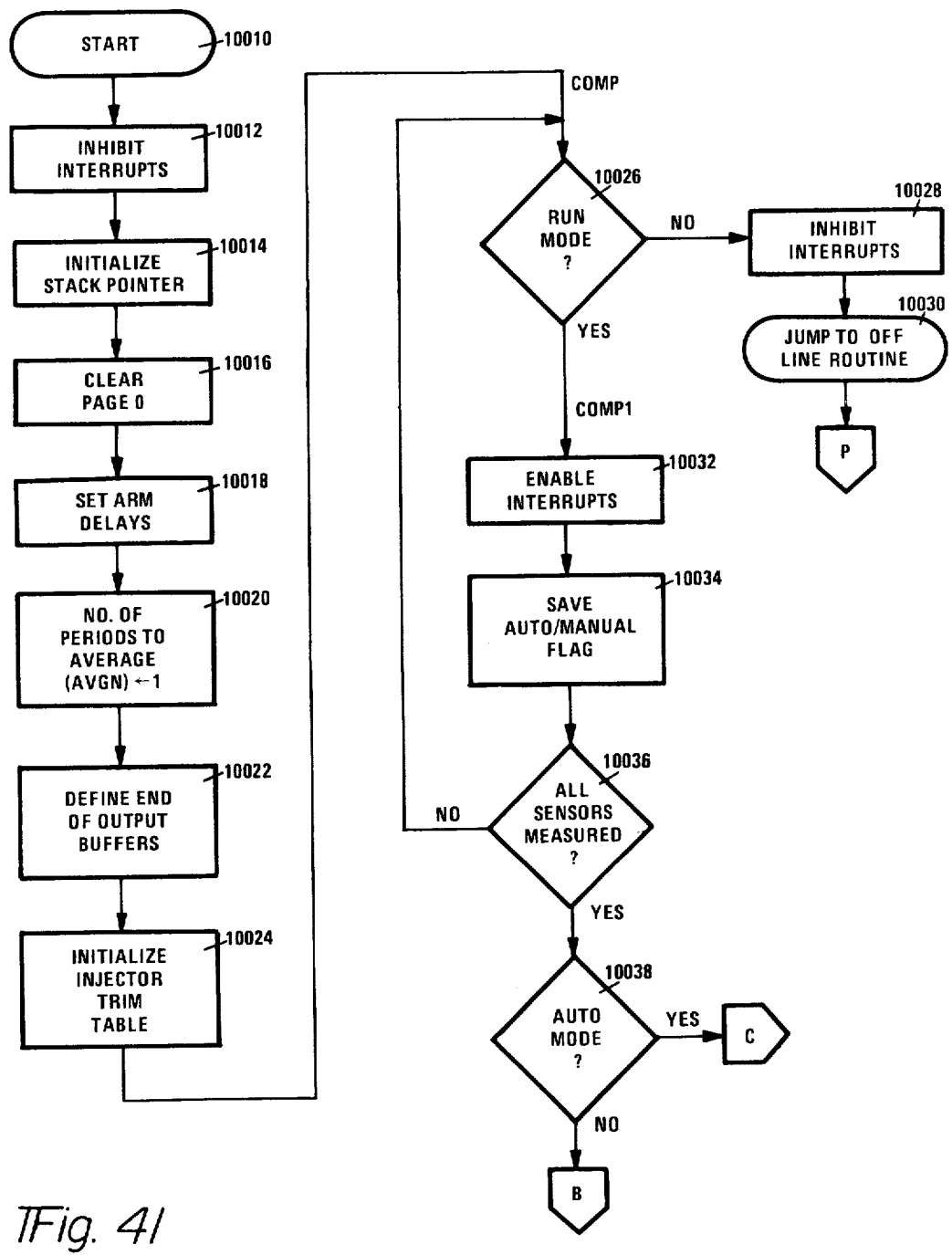
Figure 42:
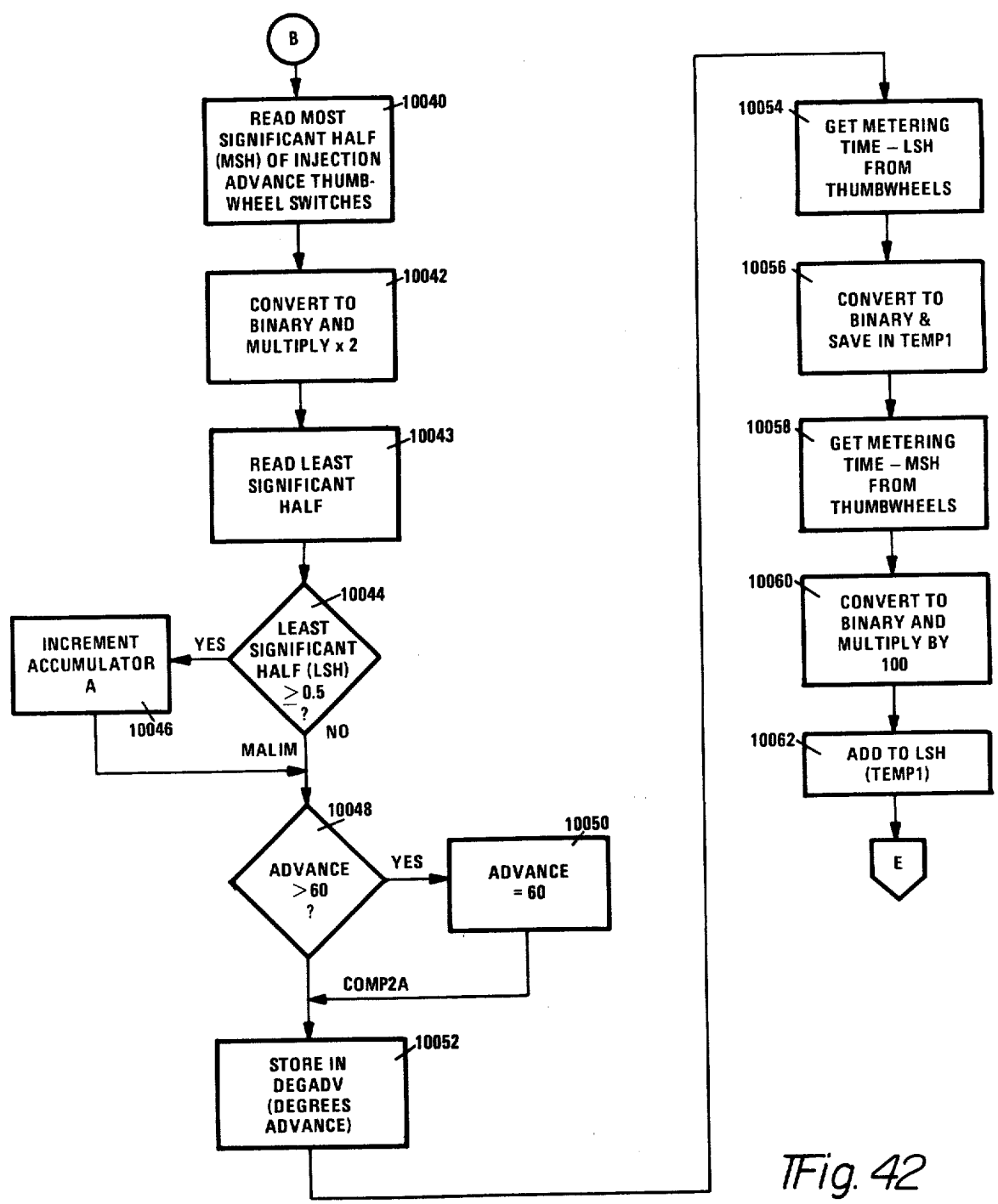
Figure 43:
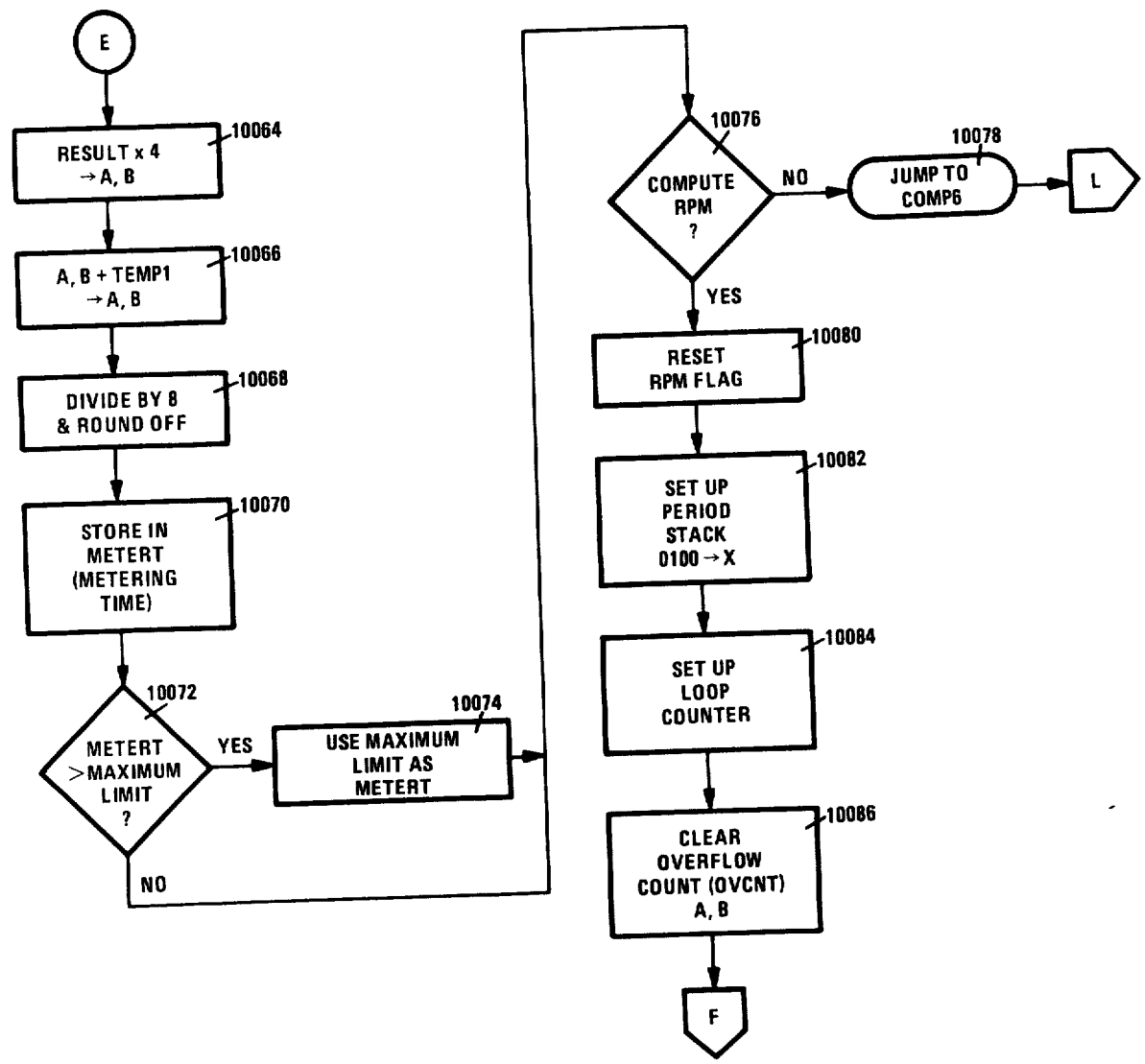
Figure 44:
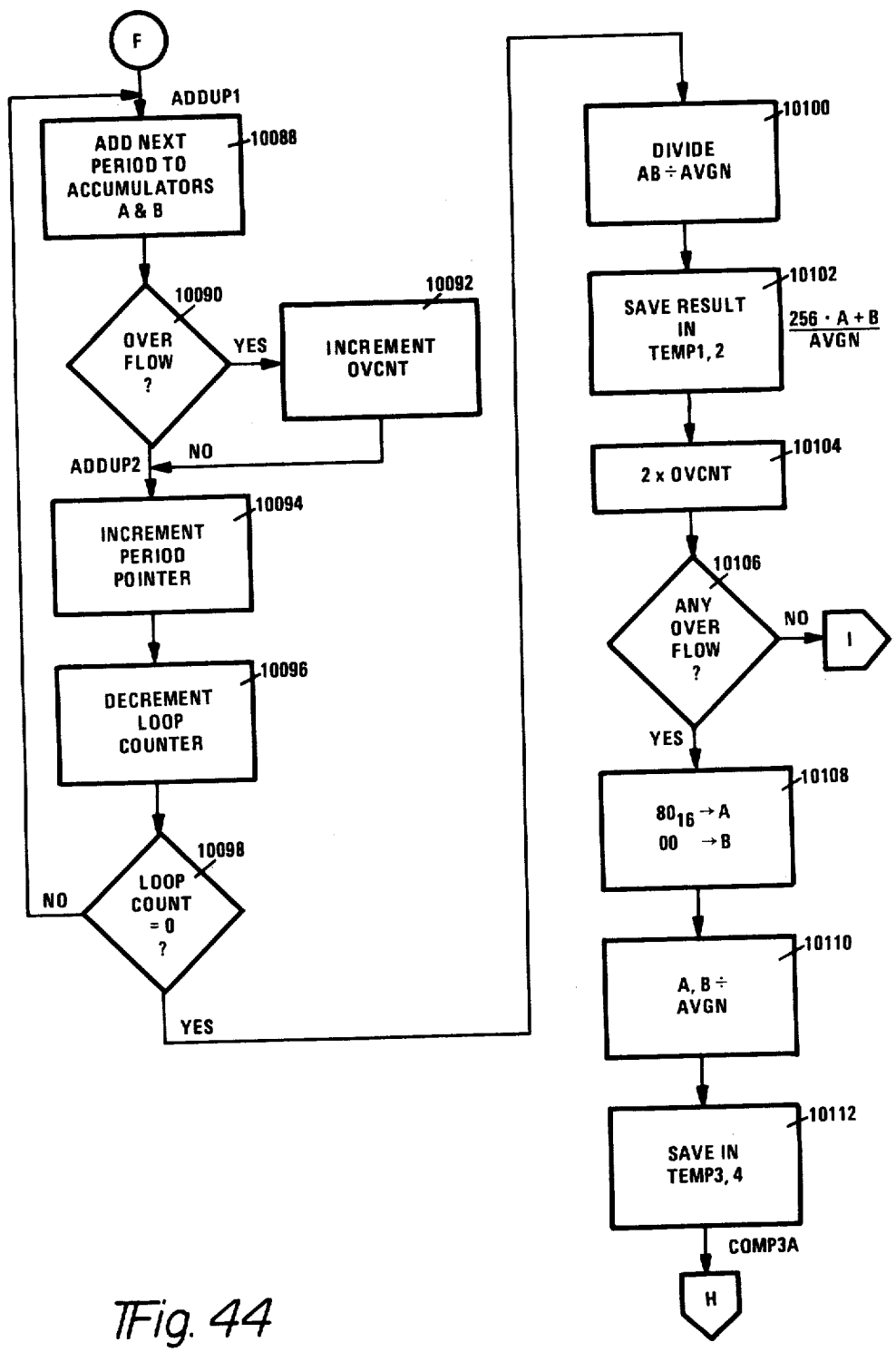
Figure 45:
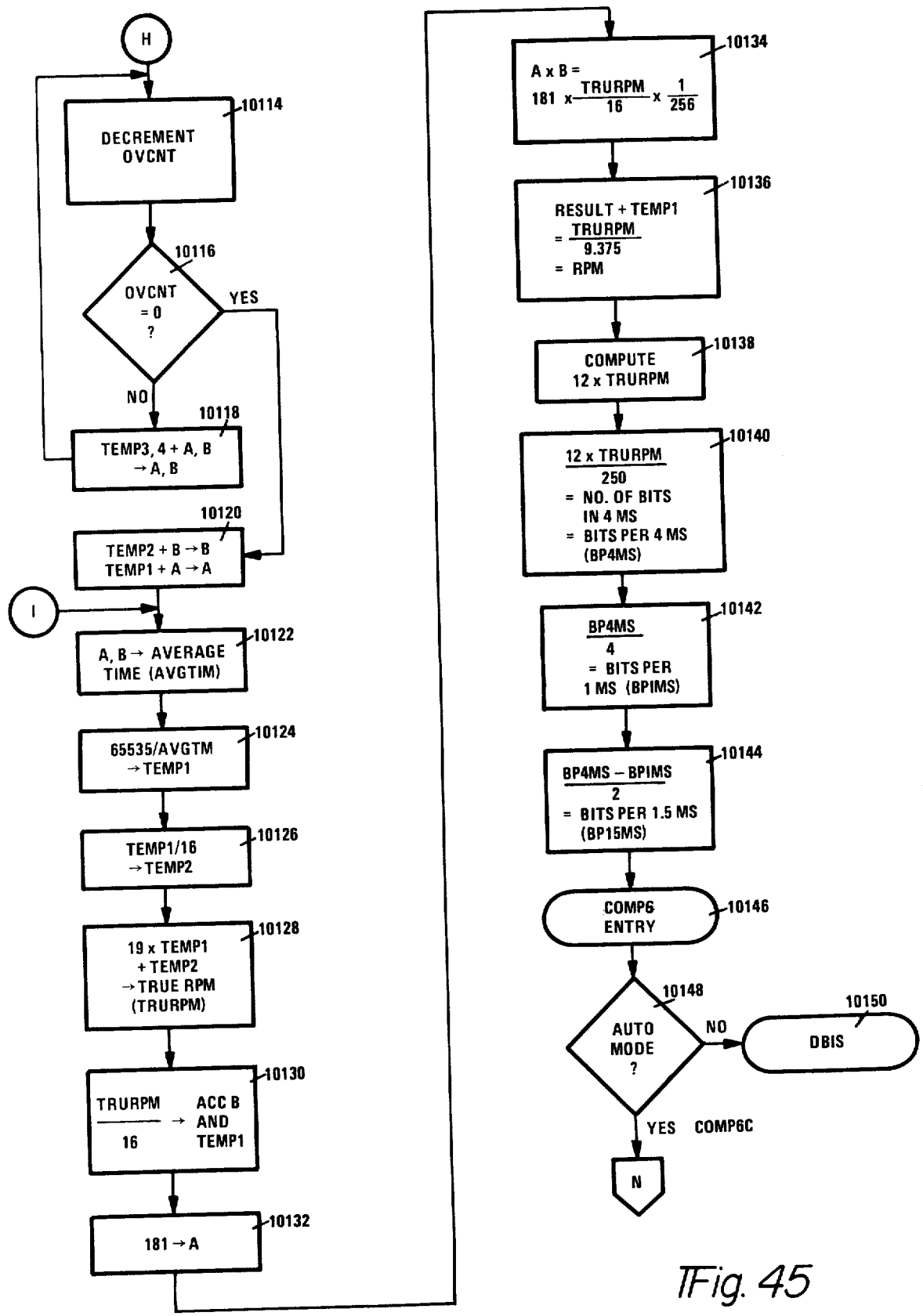
Figure 46:
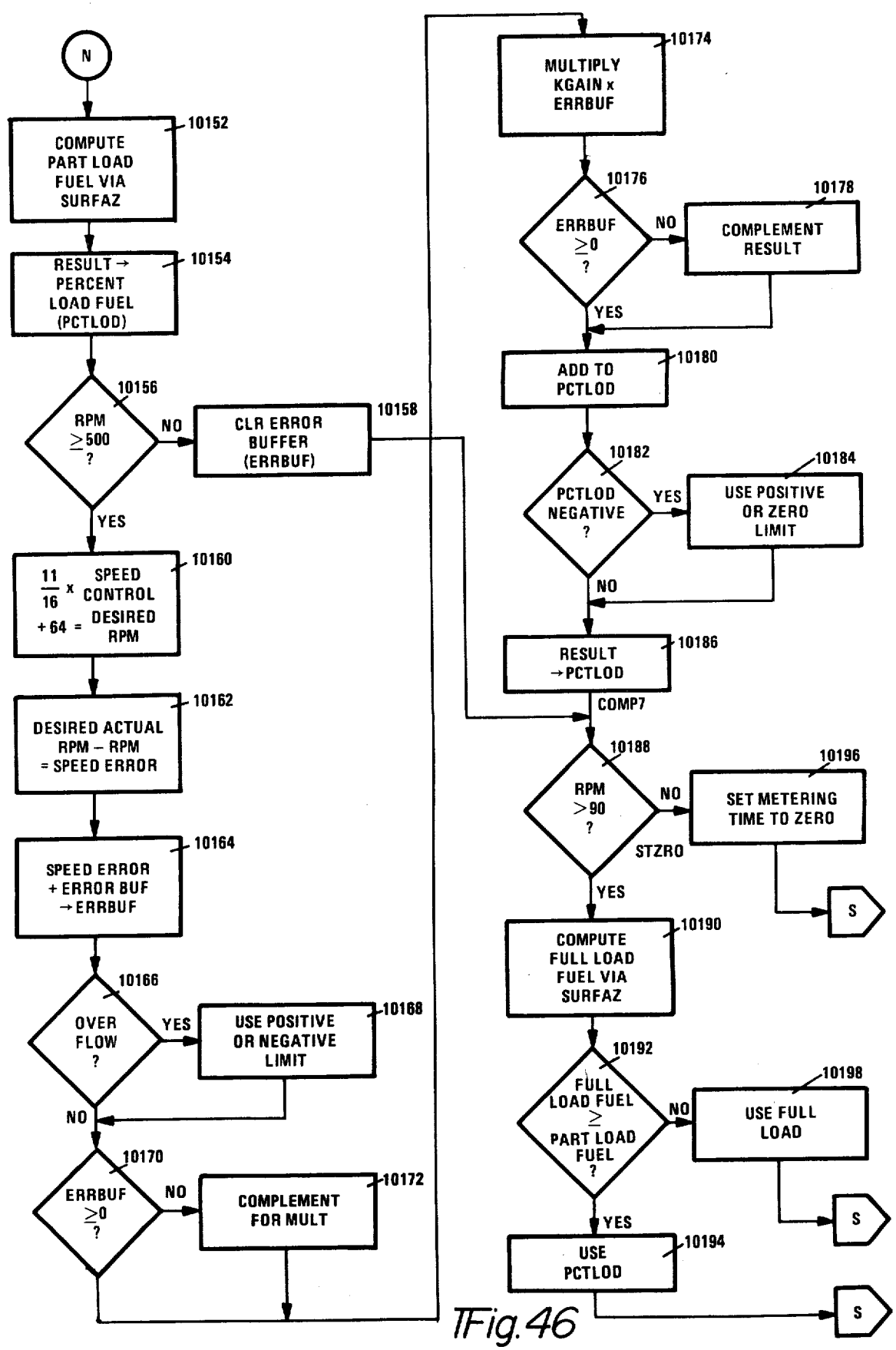
Figure 47:
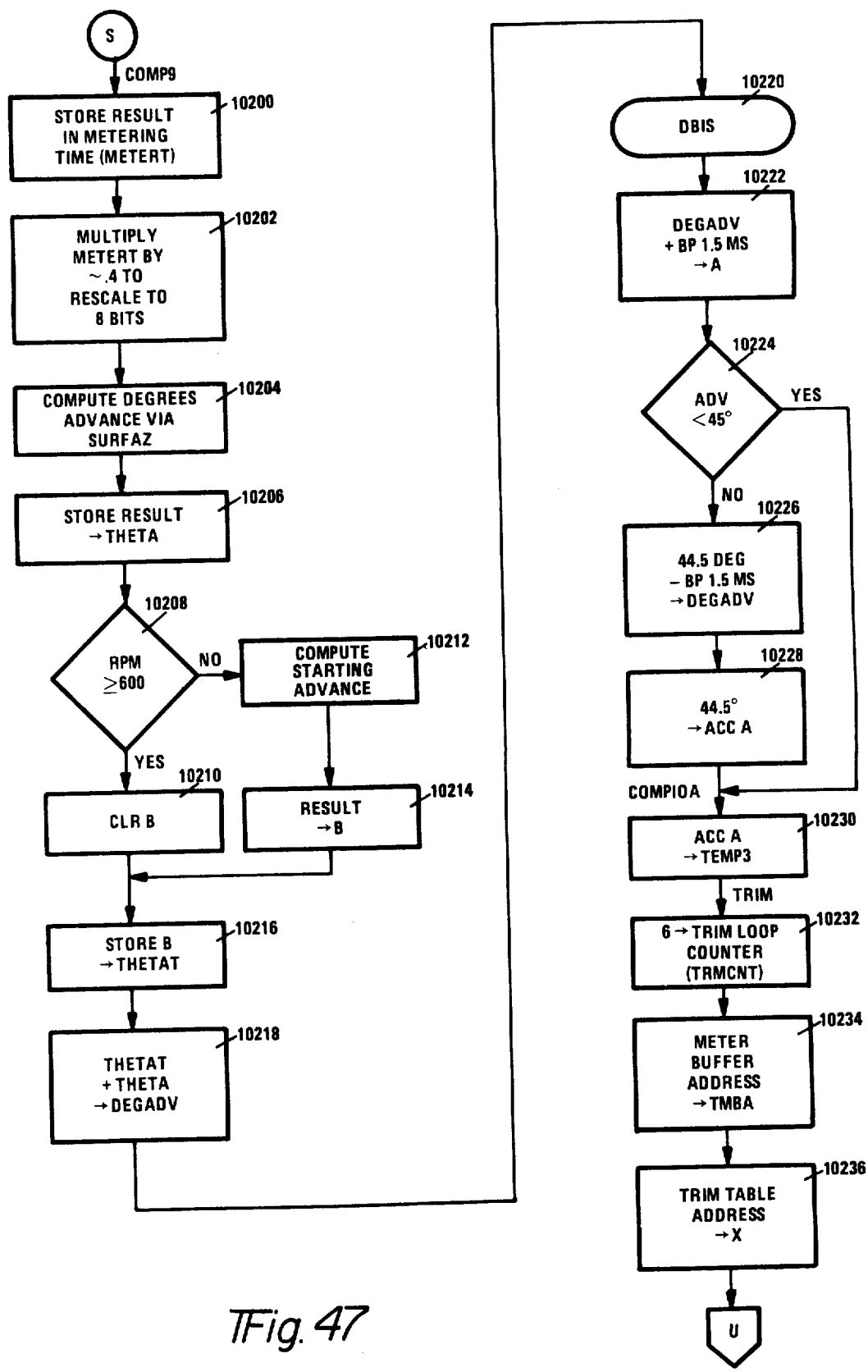
Figure 48:
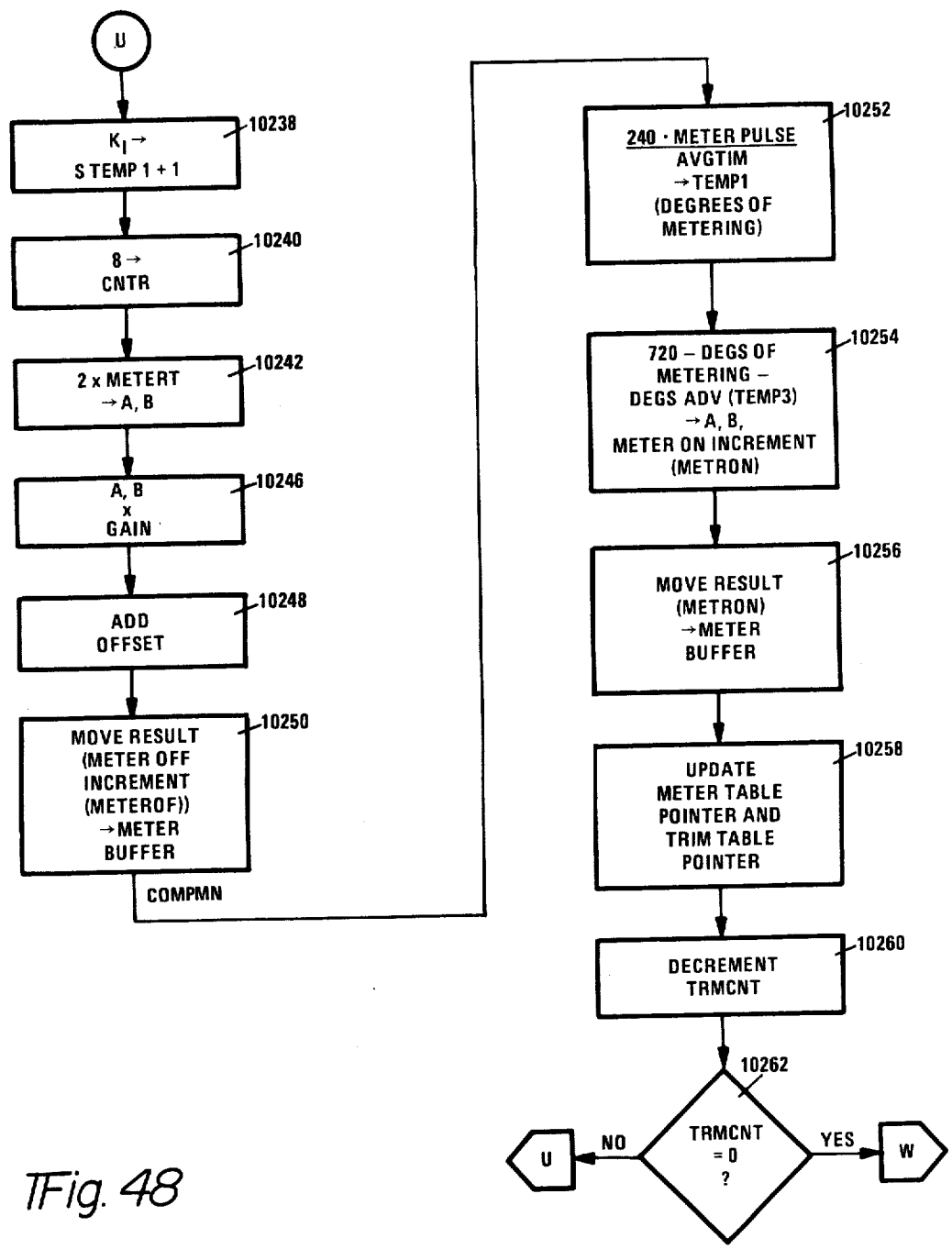
Figure 49:
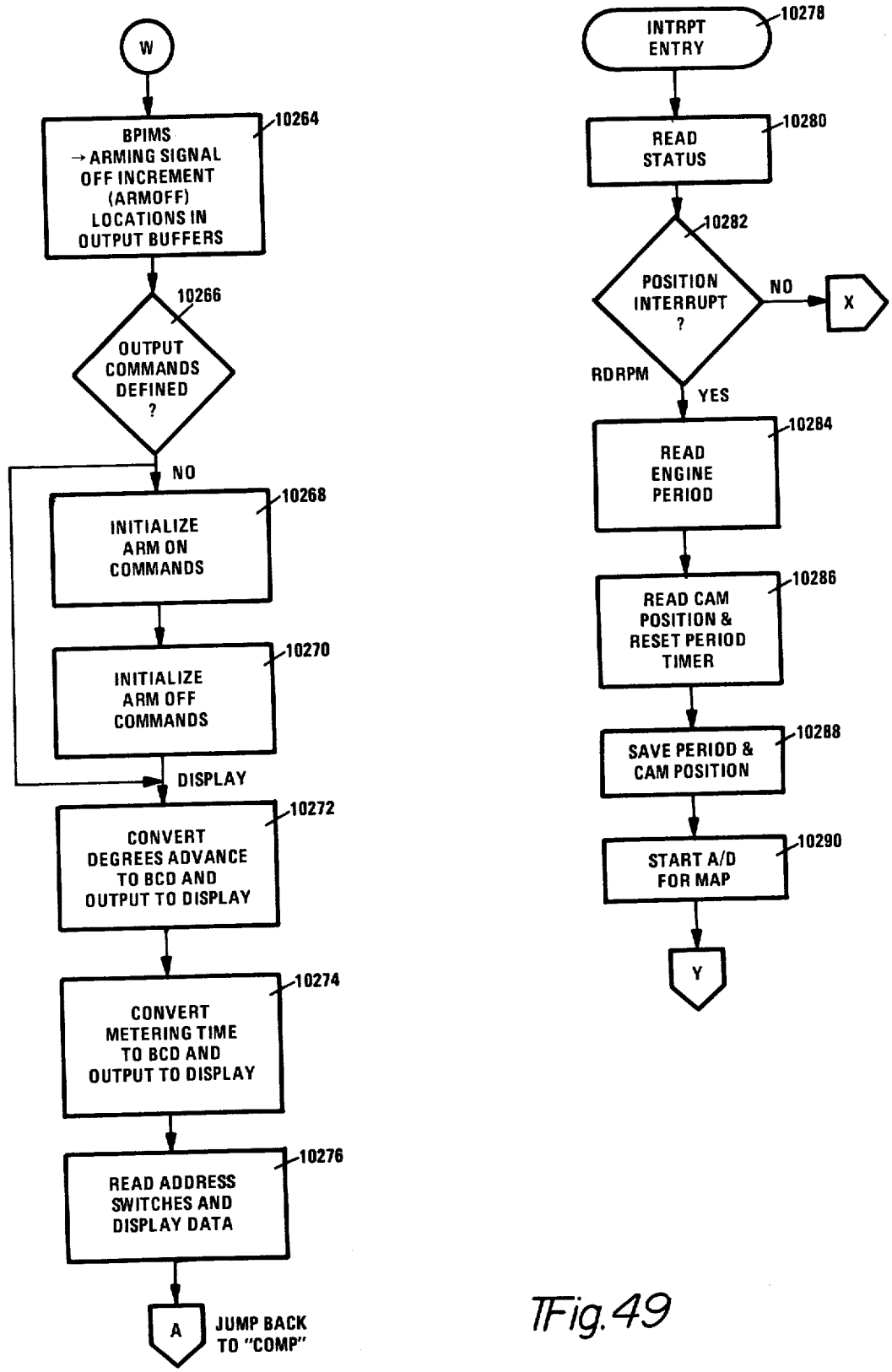
Figure 50:
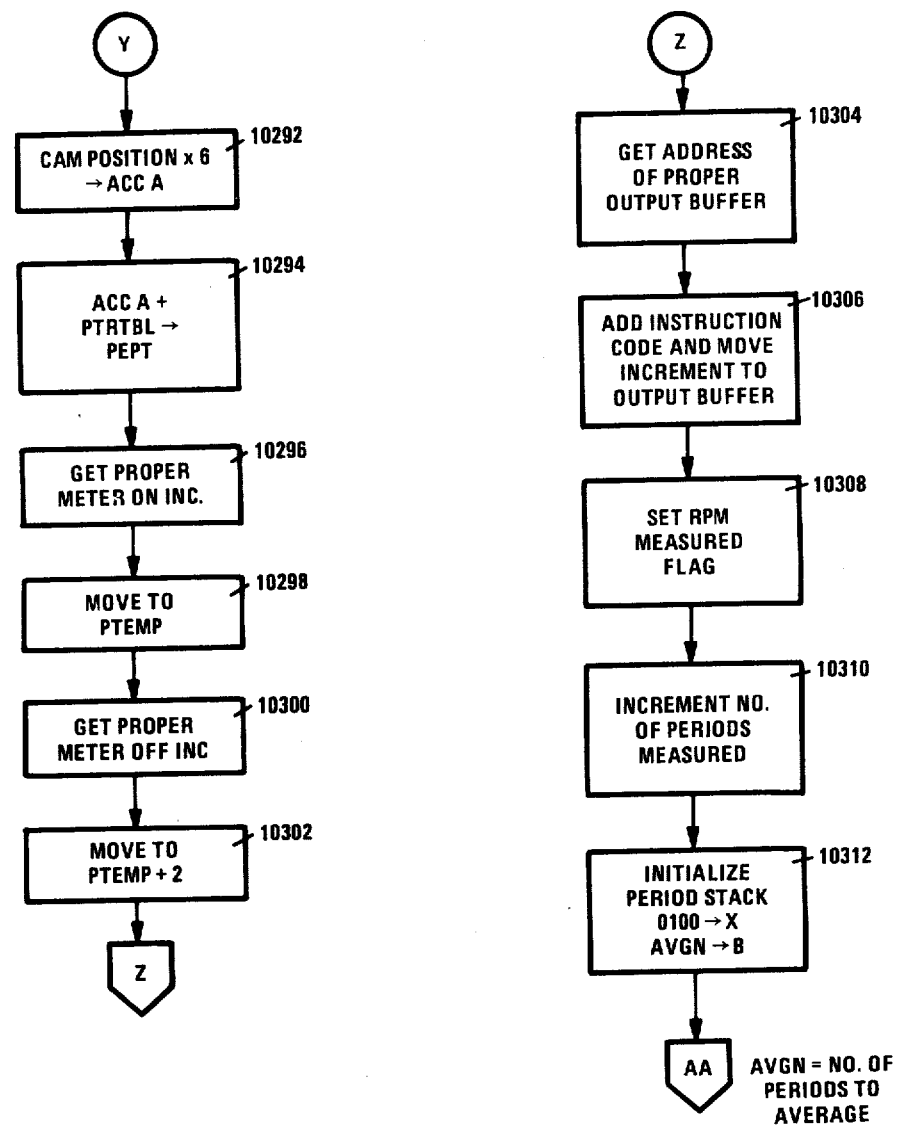
Figure 5L:
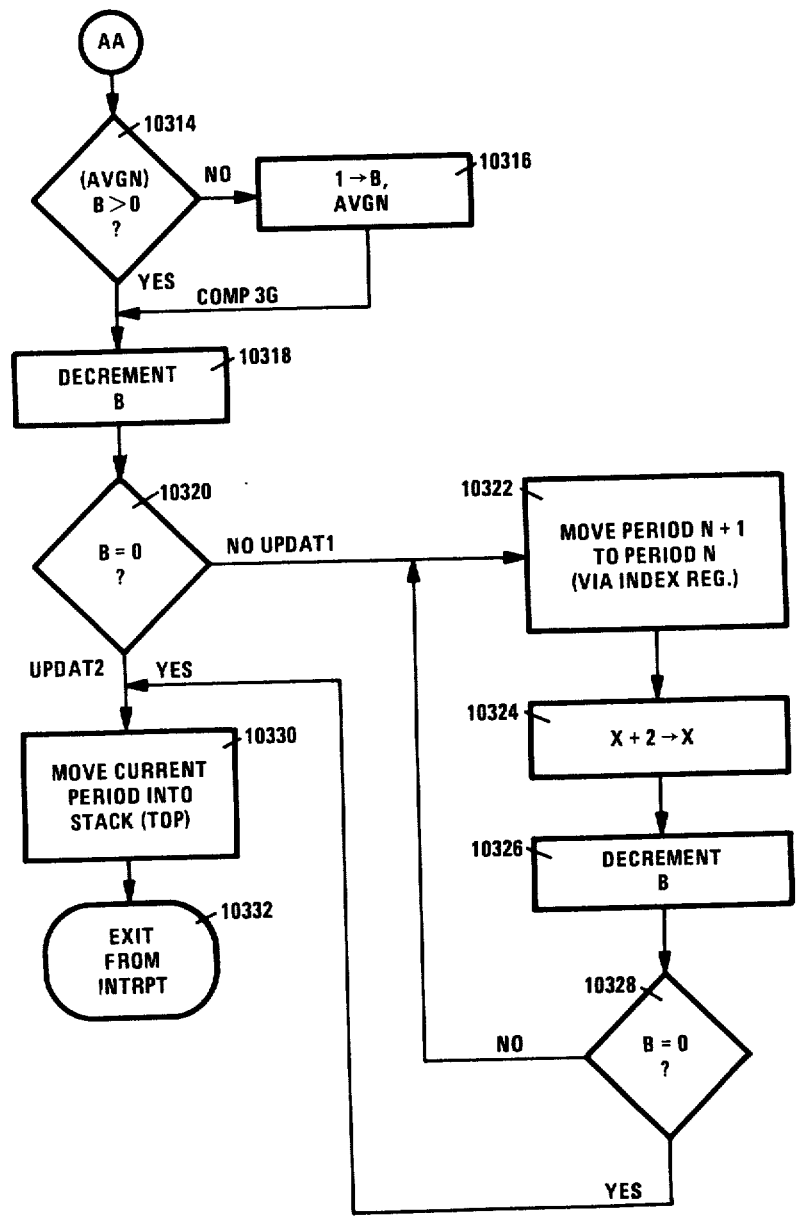
Figure 56:
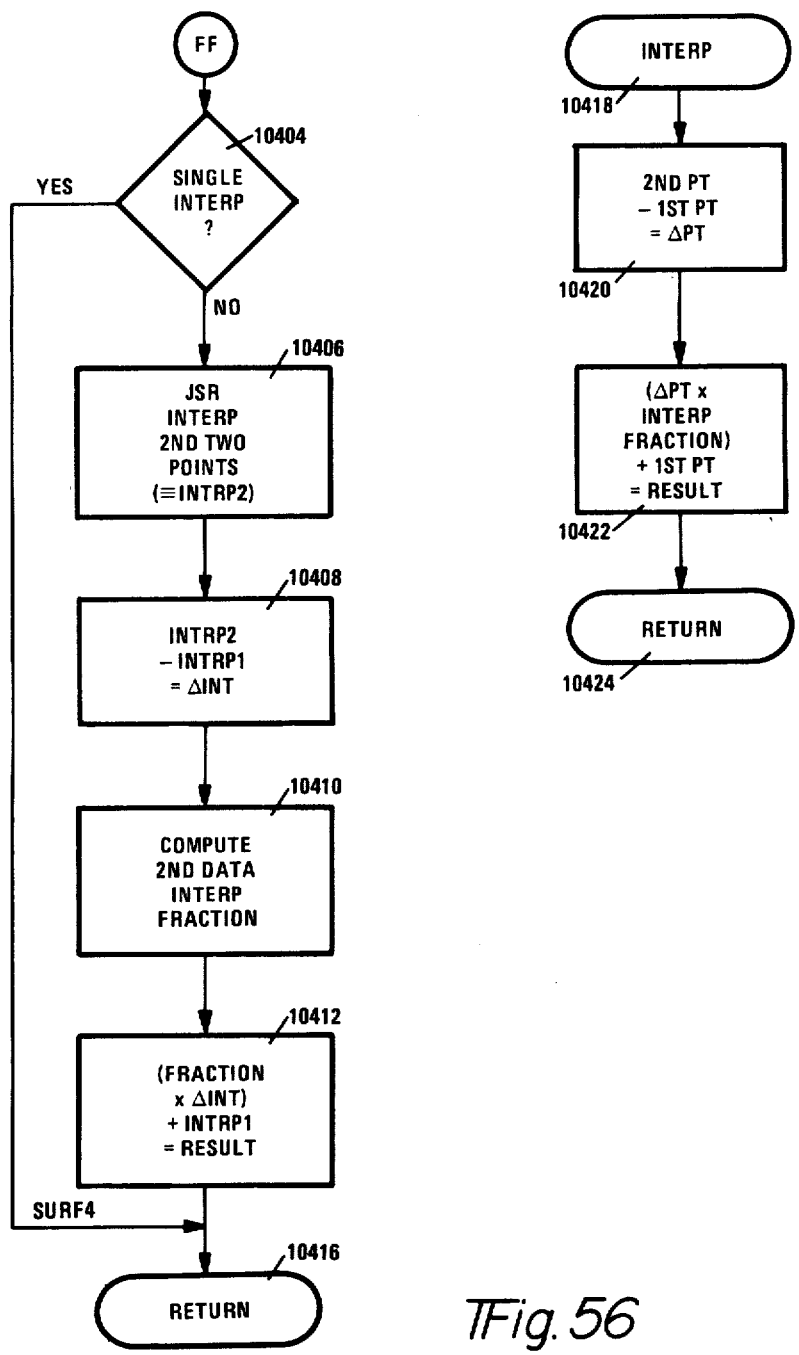
Figure 57:
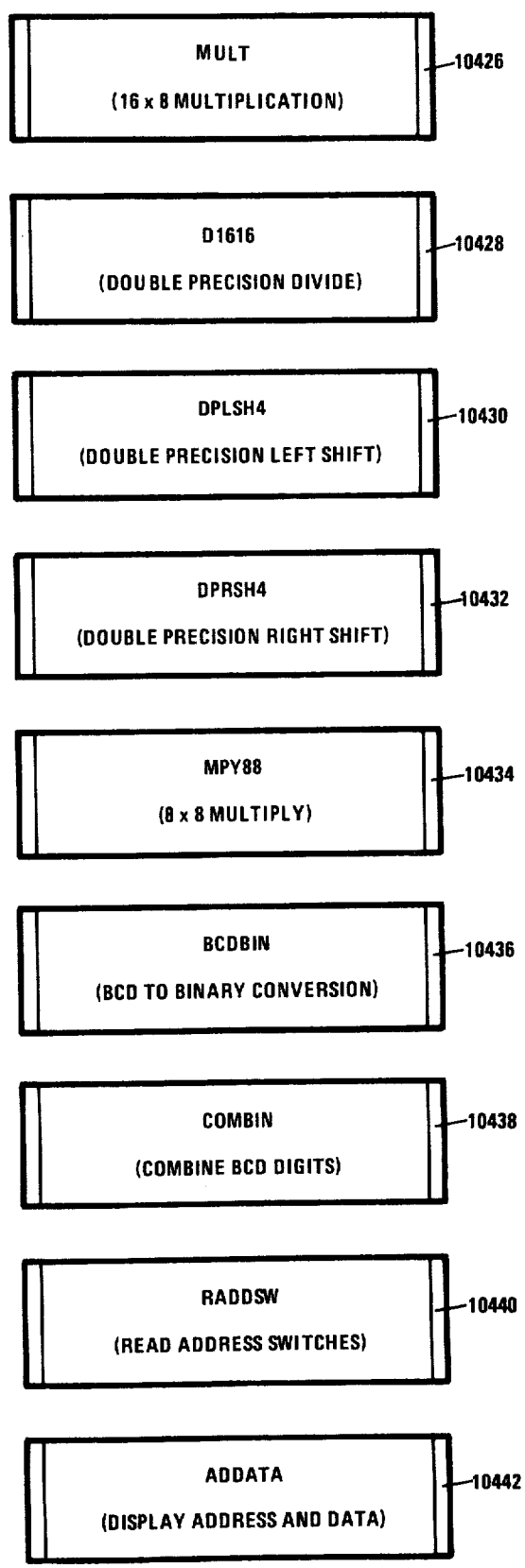

With reference to FIG. 40D, the buffer circuit for the injection advance thumbwheels is shown at 7060. There are four injection advance thumbwheels on the control panel. The thumbwheels represent advance intervals of 10 degrees, 1 degree, 0.1 degree and 0.01 degree. Within each of these angular intervals are four switch settings.

The injection thumbwheel settings are represented by signals on lines 7280. The signals on these lines are applied to a parallel resistor network, generally at 7290. The resistor network 7290 is identical to the resistor network 7260 of FIG. 40C. Following the resistor network 7290 is a group of tri-state drivers 7300. This group of drivers is similarly identical to the group of tri-state drivers 7270 of FIG. 40C.

The first four signals on lines 7280 are related to the 0.01 degree thumbwheel and are designated IA10M1SW, IA10M2SW, IA10M4SW abd IA10M8SW. These four signals are placed on the data bus as bits D0/-D3/. The drivers for these signals have applied to their control terminals the read injection advance least significant byte signal RDIALB/ on line 7168. The signal RDIALB/ is pulled up by the application of +5 volts through a resistor 7167.

The next two signals relate to the 0.1 degree switch and are designated IA100M1SW and IA100M2SW. These signals are placed on the data bus as bits D4/ and D5/. The drivers for these signals have applied to their control terminals the signal RDIALB/ on line 7168.

The next two signals again relate to the 0.1 degree switch and are designated IA100M4SW and IA100M8SW. They are placed on the data bus as bits D6/ and D7/. The drivers for these signals have applied to their control terminals the signal RDIALB/ on line 7168.

The next four signals relate to the 1 degree switch and are designated IA1D1SW, IA1D2SW, IA1D4SW and IA1D8SW. These signals are placed on the data bus as signals D0/-D3/. The drivers for these signals have applied to their control terminal the read injection advance most significant byte signal RDIAMB/ on line 7166.

The next four signals relate to the 10 degree switch and are designated IA10D1SW, IA10D2SW, IA10D4SW and IA10D8SW. These signals are placed on the data bus as bits D4/-D7/. The drivers for these signals have applied to their control terminal the signal RDIAMB/ on line 7166. A pull-up resistor 7276 is connected between the line 7166 and +5 volts.

FIGS. 40G, H and I are ancillary buffer circuits used to generate signals for the storage registers associated with the digital and lamp displays on the control panel.

With reference to FIG. 40G, a number of signals are developed for use by the digital displays on the control panel. More specifically, the signals BI/RBO, DLT and RBI are developed as follows. The signal BI/RBO on line 7308 is developed by dropping +5 volts across a resistor 7302. The signal DLT on line 7310 is obtained by dropping +5 volts across a resistor 7304. The signal RBI on line 7312 is obtained by dropping +5 volts across a resistor 7306.

With reference to FIG. 40H, the data bits D0/-D7/ are inverted into the form D0-D7 by a set of tri-state inverter drivers 7314. The control terminals of the inverter-drivers are connected in common and held at ground potential.

With reference to FIG. 40I the signal CLK∅2, IT/, A3/ are developed in the manner described as follows.

The signal CLK∅2 is developed from the second phase (TTL level) of the system clock signal ∅2T on line 1176. The signal ∅2T is applied to a tri-state inverter-driver 7318. The inverter-driver output is again applied to another tri-state inverter-driver 7320. The control terminals of the inverter-drivers 7318 and 7320 are connected in common and tied to ground potential by line 7322. The output signal CLK∅2 appears on line 7316.

The signal IT/ is derived by a simple inversion of the initial reset signal IT on line 2016. The signal IT is applied to an inverter-driver 7324 whose control terminal is held at ground potential. The inverter-driver output signal on line 7326 is the signal IT/.

The inverted address bit A3/ is obtained by applying the non-inverted address bit A3 to an inverter-driver 7328. The inverter-driver output signal is the inverted address bit A3/.

With reference to FIG. 40E, the storage registers and drivers for the address lamps and the data lamps on the control panel are illustrated. The storage register for the sixteen address lamps comprises two eight-bit input-/output ports 7070a and b. The storage register for the eight data lamps comprises another 8-bit input/output port 7090. Each of the ports may, for example, be an Intel 8212 Eight Bit Input/Output Port. A description of the terminals of the port 7070a is exemplary of all three ports.

The 8-bit input/output port 7070a has eight data input terminals designated D0–D7. Its data output terminals are designated Q0–Q7. It has a pair of device select terminals DS1/ and DS2. Both of these terminals are connected to ground to permanently enable the data output terminals. A mode control terminal is designated MD. When the signal applied to the terminal MD is low, it will transfer the signals applied to the data input terminals D0–D7 to the data output terminals Q0–Q7 in timed relation to a clock signal. A strobe terminal is designated STB. This terminal is intended to receive a strobe or clock signal. A reset or clear terminal is designated CLR/. When a low signal is applied to this terminal it will reset or clear the signals on the data output terminals Q0–Q7.

The terminals D0–D7 of the port 7070a receive the data bits D0–D7. The device select terminals DS1/ and DS2 are grounded. The mode terminal MD has applied to it the write address least significant byte signal WTADDLB/ on line 7186. The strobe terminal STB has applied to it the clock signal CLKØ2 on line 7316. The clear terminal CLR/ has applied to it the inverted initial reset signal IT/ on line 7326. The output signals produced by the output terminals Q0–Q7 are carried on lines 7342. These output signals are applied to a set of inverter-drivers 7080a which invert and amplify the signals on line 7342. The inverter-driver output signals on line 7344 are designated A0L–A7L and are applied to the address lamps A0–A7 on the control panel.

The port 7070b stores the most significant byte of information to be displayed on the address bits A8–A15 on the control panel. The data input terminals D0–D7 receive the data bits D0–D7. Its device select terminals DS1/ and DS2 are grounded. Its mode control terminal MD receives the write address most significant byte signal WTADDMB/ on line 7188. Its strobe terminal STB receives the clock signal CLKØ2 on line 7316. Its clear terminal CLR/ receives the inverted initial reset signal IT/ on line 7326. The output signals produced by the terminals Q0–Q7 appear on lines 7352. These output signals are applied to a set of inverter-drivers 7080b. The inverter-driver output signals appear on lines 7354 and are designated A8L–A15L. These signals are used to energize the address lamps A8–A15 on the control panel.

The port 7090 is used to store the byte of information to be displayed on the data lamps D0–D7 on the control panel. Its data input terminals D0–D7 receive the data bits D0–D7. Its device select terminals DS1/ and DS2 are grounded. Its mode terminal MD receives the write data signal WTDAT/ on line 7192. Its strobe terminal STB receives the clock signal CLKØ2 on line 7316. Its clear CLR/ terminal receives the inverted initial reset signal IT/ on line 7326. The output signals produced by the terminals Q0–Q7 appear on line 7362. These output signals are applied to a set of inverter-drivers 7100. The inverter-driver output signals appear on line 7364 and are designated D0L–D7L. These signals are used to energize the data lamps on the control panel.

FIG. 40F illustrates in schematic detail the storage register 7110 for the fuel pulse digital display and the storage register 7120 for the injection advance digital display. Each of the storage registers 7110 and 7120 comprises two 8-bit input/output ports of the identical type used for the address lamp display register 7070 and the data lamp display register 7090. Accordingly, terminal functions on each of the 8-bit ports in the present figure are identical.

More specifically, the storage register 7110 for the fuel pulse digital display on the control panel comprise ports 7370 and 7380. The device select terminals DS1/ and DS2 of both ports 7370 and 7380 are deactivated by connection to ground. The strobe terminal STB of both parts has applied to it the clock signal CLKØ2 on line 7316. The clear terminal CLR/ of each port has applied it to the inverted initiate reset signal IT/ on line 7326. The mode terminal MD of port 7370 has applied to it the write metering time least significant byte signal WTMTLB/ on line 7182. The mode terminal MD of port 7380 has applied to it the write metering time most significant byte signal WTMTMB/ on line 7180.

The data input terminals D0–D7 of port 7370 receive the data bits D0–D7. The output terminals Q0–Q3 of port 7370 produce on lines 7372 the respective output signals MT10U1F, MT10U2F, MT10U4F and MT10U8F. The terminals Q4–Q7 of port 7370 produce on lines 7372 the respective signals MT100U1F, MT100U2F, MT100U4F and MT100U8F.

The data input terminals D0–D7 of port 7380 receive the data bits D0–D7. The terminals Q0–Q7 of port 7380 produce on lines 7382 the respective signals MT1M1F, MT1M2F, MT1M4F and MT1M8F. The terminals Q4–Q7 produce on lines 7382 the respective signals MT10M1F, MT10M2F, MT10M4F and MT10M8F. The signal BI/RBO is output on line 7374. The signal BLT is output on line 7376. The signal RBI is output on line 7384.

The signals on lines 7372 and 7382 are used to energize the metering time ditidal display on the control panel.

The storage register 7120 for the injection advance digital display on the control panel likewise comprises two 8-bit ports 7390 and 7400. The device select terminals DS1/ and DS2 of both ports are connected in common to ground. The strobe terminals STB of the ports receive alike the clock signal CLKØ2 on line 7316. The clear terminals CLR of both ports receive the inverted initiate reset signal IT/ on line 7326. The mode terminal MD of port 7390 receives the write injection advance least significant byte signal WTIALB/ on line 7186. The mode terminal MD of port 7400 receives the write injection advance most significant byte signal WTIAMB/ on line 7184. The data input terminals D0–D7 of both the ports 7390 and 7400 receive the data bits D0–D7.

The terminals Q0–Q3 of the port 7390 produce on lines 7392 the respective signals IA10M1F, IA10M2F, IA10M4F and IA10M8F. The terminals Q4–Q7 of port 7390 produce on lines 7392 the respective signals IA100M1F, IA100M2F, IA100M4F and IA100M8F.

The terminals Q0–Q3 of the port 7400 produce on lines 7402 the respective signals IA1D1F, IA1D2F, IA1D4F, and IA1D8F. The terminals Q4–Q7 of the port 7400 produce on lines 7402 the respective signals IA10D1F, IA10D2F, IA10D4F and IA10D8F.

The signals on lines 7392 and 7402 are used to energize the injection advance digital display on the control panel.

This completes the detailed description of the system hardware.

IV-SYSTEM SOFTWARE a. Introduction

The operation of the electronic fuel injection system of the present invention is under the control of a group of programs collectively termed system software. The system software controls directly the functioning of the microprocessor in the hardware system, and controls indirectly the hardware logic external to the microprocessor.

In overview, the system software monitors the engine operating conditions that are used to control injection timing and fuel quantity. It then performs computations based on these operating conditions to derive the parameter values of injection timing and fuel quantity, and makes those parameter values available to the output control hardware that drives the injectors.

The system software is divided into two main programs or routines—an interrupt program and a computation program.

The interrupt program is used to update the current values of the engine operating conditions that are used as input variables to compute injection timing and fuel quantity. These operating conditions are engine period (i.e. RPM), speed control, manifold air pressure (MAP) and air temperature. The interrupt program reads engine period and begins A/D conversion when an engine period interrupt is detected each 120° of engine revolution. When an A/D conversion is complete, the interrupt program reads the results of the conversion. In normal operation, the interrupt program is executed four times per cylinder. The first execution is initiated by an engine position interrupt; the next three executions are initiated by an interrupt signifying the completion on an A/D conversion. The interrupt program executes in synchronism with the engine operating cycle.

The computation program uses the input variables obtained from the executions of the interrupt program to compute fuel pulse width and injection advance, and to convert these parameters into solenoid turn-on and turn-off times for the output controls. The computations use table look-up and linear interpolation to obtain the fuel pulse width in milliseconds and injection advance in degrees. The tables describe three-dimensional surfaces that are derived from system specifications appropriate for the actual engine on which the present EFI system is equipped. The table entries can be easily changed if a different engine calibration is desired.

When the computation program completes its cycle of computations, it automatically reenters the cycle, independent of whether or not it has been interrupted by the interrupt program and provided with new values for the input variables. Stated otherwise, it runs asynchronous to the engine operating cycle.

There are two basic operating modes of the system software—Off-Line and Run. The Off-Line mode is used primarily for bench testing and analysis of the EFI control system. In the Off-Line mode, the parameters of injection timing and fuel quantity are not updated concurrently with changes in engine operating conditions, but rather are maintained at constant settings. A control panel monitor routine runs continuously in the Off-Line mode to allow an operator to analyze the performance of the EFI system. The operator is able to communicate with the EFI system and monitor activity through a group of switches on the control panel designated EXAMINE/EXAMINE NEXT, DEPOSIT/DEPOSIT NEXT, and START/RESET. These switches allow the operator to examine what is stored in any memory location, to deposit new data in any RAM memory location, to start the program from any location, and to reset the program and start it from its power-up location.

The Run mode consists of two sub-modes—Manual and Auto. In the Manual sub-mode, an operator enters the fuel pulse width and injection advance with thumbwheel switches on the control panel. The system software then uses the engine period (i.e. timing signals from which RPM is determined) to compute the various time functions needed for output control.

In the Auto sub-mode, the system software uses all available input variables concerning engine operating conditions and surface data tables to compute fuel pulse width and injection advance. The Auto sub-mode, therefore, provides automated control over operation of the EFI control system.

In the following detailed description of the system software flowcharts, reference will be made to two data output buffers—a metering buffer and an injection buffer. These buffers are located in RAM, and each contains five data fields within it. The metering buffer is repeated three times in RAM; once for each pair of injectors. This is required for injector trim which makes the metering trim computations sensitive to engine position. The data fields in each of the three metering buffers are in the following order:

Δ degrees to meter solenoid on
Δ time to meter solenoid off
Δ degrees to arm meter solenoid on
Δ degrees to arm meter solenoid off
End of Buffer.

The entries in the fields of the injection buffer are in the following order:

Δ degrees to injection solenoid on
Δ degrees to injection solenoid off
Δ degrees to arm injection solenoid on
Δ degrees to arm injection solenoid off
End of Buffer The least significant bit of the degree entries has a value of 0.5 degree. The only time entry has a least significant bit representing 16 microseconds.

The three metering buffers are updated in consecutive order through each three engine time period interrupts, i.e., each metering buffer is updated twice each engine cycle. At each engine time period interrupt, cam shaft position is read and the appropriate buffer is updated. This is done to assure that the proper trimmed pulse will be received by the proper injector. The injection buffer is updated after each computation cycle is completed. All entries in the metering and data buffers are updated with the results of new computations except the "Δ degrees to arm solenoid on"; these entries are set initially to 0.5 degree and never changed.

Data transfer from the injection buffer begins at 45 degrees before top dead center and continues until the "End of buffer" entry is encountered. The meter buffer data transfer begins at top dead center. All computations affecting entries in the buffer are based on these two reference points.

Reference is now made to the flowcharts of the system software in FIGS. 41-57. The computation program being the normally executing background program will be first described, and the interrupt program being a real-time foreground program will be described secondly.

b. The Computation Program

The computation program begins at the entry point 10010 labeled START. Program execution begins at this point when power is turned on.

The following seven steps, i.e. steps 10012 through 10024, are used to perform certain initializations necessary for execution of the computation program. A more specific description of each of these seven initial steps is as follows.

In step 10012, all interrupts from external logic are effectively inhibited by disabling CPU recognition of the maskable interrupt line IRQ/. This will prevent otherwise normal interrupts from interfering with initialization of the computation program. The disabling is effected by appropriate control of the interrupt flag in the condition code register of the CPU.

In step 10014, the stack pointer is initialized. More specifically, the stack pointer is set to the highest RAM location (127). All further additions to the stack will be stored in consecutively lower locations.

In step 100116, the page of RAM that is used to store variable data in the ensuing execution of the computation program is cleared or set to zero.

In step 10018, the arming delays in the metering data buffer and injection data buffer are initialized in their appropriate fields in the buffer. As was previously indicated, the two "Δ degrees to arm solenoid on" entries are constant.

In step 10020, the program variable AVGN, representing the number of engine periods to average to compute average RPM, is set to 1. In step 10022, the "End of buffer" entries in the final field position in the metering data output buffers and injection data buffer are entered in the buffers.

In step 10024, injector trim values are initialized in an injector trim table. The injector trim table has a number of entries equal to the number of fuel injectors on the engine. Each entry represents a gain or an offset which are compensations that are used to adjust or trim the fuel pulse computation for its respective injector. The table entries of gain and offset values are determined by empirical testing of the injectors and entered into RAM by the system operator in the Off-Line mode after the system is initialized. The manner in which these gain or offset values are used to compensate or trim computed fuel quantity parameters will be hereinafter described more fully.

Once the initialization steps 100112–10024 have been executed, the program inquires as to the mode in which the EFI control system is to operate. In decision 10026, a test is made to see if the program is to run in the Run mode. If not, the flow follows the NO branch from decision 10026 to step 10028. In step 10028, the program inhibits all interrupts preparatory to entering the Off Line mode in departure point 10030.

If the test of decision 10026 is satisfied, the flow follows the YES branch through three preparatory steps before entering one of the sub-modes of the Run mode.

In step 10032, all normal interrupts to the processor are enabled by appropriate control of the interrupt flag in the condition code register of the CPU. In step 10034, a flag designating which of the sub-modes is to be entered is set. Specifically, the flag is set to one (1) if the Auto sub-mode is selected, and set to zero (0) if the Manual sub-mode is selected. In decision 10036 a flag indicating whether or not all sensors have been measured is tested. If not, the NO branch from decision 10036 is followed back to a re-entry of decision 10026, i.e. the program branches back to the effective beginning of the computation program. If the test of decision 10036 is satisfied, the YES branch is followed to decision 10038.

In decision 10038, a test is performed to determine which of the sub-modes within the Run mode has to be executed. If the Manual sub-mode is entered, then parameter values for injection timing and fuel quantity, i.e. "degrees advance" and "fuel pulse width", will originate from the operator control panel. If the Auto sub-mode is selected, then the parameter values for injection timing and fuel quantity will be computed on the basis of real-time engine operating conditions.

If the Manual sub-mode is selected, the NO branch from decision 10038 is taken to step 10040. In steps 10040–10052 the computations for Manual sub-mode injection advance are made on the basis of values for "degrees advance" and "fuel pulse width" entered manually through the thumbwheel switches on the control panel.

In step 10040, the most significant half of the "degrees advance" thumbwheel switch setting is read. In step 10042, the value read in step 10040 is converted from BCD format to binary format by calling a utility subroutine BCDBIN. The utility subroutine BCDBIN is hereinafter described. The result of the BCD-to-binary conversion is multiplied by two so that the least significant bit represents 0.5 degree.

In step 10043, the least significant half of the injection advance value from the thumbwheel switches on the control panel is read.

In decision 10044, the least significant half is compared with 0.5 degree. If the test of decision 10044 is satisfied, the YES branch is followed to step 10046. In step 10046, accumulator A which contains the number of one-half degrees of injection advance is incremented by one.

The NO branch from decision 10044 and the flow from step 10046 both enter decision 10048.

In decision 10048, the injection advance value is tested to see whether or not it is greater than a predetermined upper limit of 30 degrees (i.e. 60½ degrees). If the test of decision 10048 is satisfied, the YES branch is followed to step 10050 where the injection advance value is set equal to 30 degrees.

The NO branch from decision 10048 and the flow from step 10050 both enter step 10052 where the value to be used for the degrees of injection advance is stored in RAM at DEGADV.

The following eleven steps and decisions are concerned with computing a fuel pulse width.

In step 10054, the least significant half of the fuel metering time value set on the thumbwheel switches on the control panel is read. In step 10056, this value is converted from BCD to binary by the sub-routine BCDBIN and stored in a temporary buffer TEMP1.

In step 10058, the most significant half of the value for metering time set on the thumbwheel switches of the control panel is read. In step 10060, this value is converted from BCD to binary by the sub-routine BCDBIN and multiplied by 100. In step 10062, the value of the least significant half stored in the temporary register TEMP1 is added to the most significant half to obtain a desired fuel pulse width. The sum value has a least significant bit representing 10 microseconds.

Because fuel pulse width is output in 16 microsecond increments, the result from the addition in step 10062 must be multiplied by 5 and divided by 8 to get a least significant bit of 16 microseconds. The steps necessary to carry out this adjustment in least significant bit resolution are accomplished in steps 10064–10068.

In step 10064, the result of the addition in step 10062 is multiplied by 4 and stored in accumulators A and B. In step 10066, the contents of accumulators A and B are added to the contents of the temporary register TEMP1 and stored in accumulators A and B. At this point, the result for the sum value from the addition in step 10062 has effectively been multiplied by 5. In step 10068, the contents of the accumulators A and B are divided by 8 and rounded off to achieve a resultant value having 16 microsecond resolution in the least significant bit. In step 10070, the result from step 10068 is stored in the buffer location in RAM at METERT and represents the time duration of the pulse width that will control fuel metering.

In decision 10072, the value stored in METERT is tested against a maximum limit, nominally 10 msec, for that value. If the test of decision 10072 is satisfied and the value of the fuel pulse width is greater than the maximum limit, the YES branch is followed to step 10074. In step 10074, the value for METERT is set to the maximum limit. If the test of decision 10072 is not satisfied, the NO branch is followed to joint the flow from step 10074.

When a new measure of engine period (RPM) is available, then new values for RPM and various other time functions are recomputed.

If a RPM measured flag (RPMF) is zero, then it indicates that a new value for RPM is not yet ready to be computed, and the NO branch from decision 10076 is followed to departure point 10078. In departure point 10078 the program flow jumps to a later described module, COMP6, of the computation routine.

If the flag RPMF is one, the test of decision 10076 is satisfied, and the flow follows the YES branch from the decision.

Steps 10080-10122 are used to compute the average engine period over several preceding engine time periods.

In step 10080 the RPM measured flag RPMF is reset to zero. It will be set again to one by the interrupt program when a new value of engine period is read.

Steps 10082-10084 are three additional initialization steps that are used to prepare computation of the average engine period. Specifically, in step 10082 an engine period stack pointer is set to a memory address in RAM representing the bottom of a period stack, in this case the address being 0100. In step 10084, a loop counter is initialized. In step 10086, an overflow counter OVCNT and the accumulators A and B are cleared.

The following several steps 10088-10098 form an iterative loop that is used to sum the preceding values of engine time that will be used in the computation of average engine period. The preceding values of engine time are stored in the engine period stack and are equal in number to the initial setting of the Loop Counter.

The iterative loop is entered in step 10088 where the next awaiting engine time period value in the period stack is added to the contents of the accumulators A and B. In the first pass through the loop, the accumulators A and B are at zero (0) from having been cleared in step 10086, and the engine time period value is that contained in the location to which the initial setting of the engine period stack pointer points, in this cases 0100.

In decision 10090, a test is made to determine if the previous addition caused an overflow. If the test of decision 10090 is satisfied and there is an overflow, the YES branch is taken to step 10092. In step 10092, the overflow counter variable OVCNT is incremented. The NO branch of decision 10090 and the flow from step 10092 both enter step 10094. In step 10094 the engine period stack pointer is incremented. In step 10096, the loop counter is decremented by one (1) to count it down. In decision 10098, a test is made to see if the variable Loop Count has been counted down to zero (0). This test effectively determines if the iterative loop just described has been fully completed. If Loop Count is not equal to zero (0), the iterative loop as not been completed, and the NO branch from decision 10098 is taken to the re-entry of step 10088. If the test of decision 10098 is satisfied, i.e. Loop Count=0, the loop has been completed and the flow follows the YES branch from the decision to step 10100.

The following twelve steps and decisions are used to compute the average engine period as based on the cumulative total of engine period time from the immediately preceding iterative loop.

In step 10100, the contents of accumulators A and B representing the cumulative engine period time are divided by the number of engine periods AVGN used to total the cumulative engine period time. In practical operation, the memory address of AVGN is loaded into the index register of the microprocessor, and a utility subroutine D1616 that will hereinafter be described more fully is called to perform a double precision divide.

In step 10102, the result from the division in step 10100 is stored in temporary registers TEMP1, TEMP2 in RAM.

In step 10104 the overflow count variable OVCNT is multiplied by two. In decision 10106, the overflow count variable OVCNT is tested to determine if there has been any overflow. If not, the NO branch of decision 10106 is followed to step 10122. In step 10122, the present contents of accumulators A and B are designated as the average engine period time and stored in the location in RAM allocated to the variable AVGTIM.

If the test of decision 10106 is satisfied, i.e. if there has been overflow, the YES branch of the decision is followed to step 10108. In step 10108, the value in the accumulators A and B is set to the minimum overflow condition. Specifically, it is set to 8000 in hexadecimal code. This corresponds to loading the most significant byte into accumulator A and loading the least significant byte into accumulator B.

In step 10110, the contents of accumulators A and B are divided by AVGN, the average number of engine period times used to compute a cumulative value. In step 10112, the result of the division of step 10100 is saved in temporary registers TEMP3 and TEMP4 in RAM.

In step 10114, the overflow count variable OVCNT is decremented by one (1). In decision 10116, OVCNT is tested against zero (0) to determine if it has been counted down all the way. If not, the NO branch from decision 10116 is followed to step 10118. In step 10118, the value stored in temporary registers TEMP3 and TEMP4 are added to the present contents of accumulators A and B and the sum replaces the preceding contents of the accumulators A and B. The flow from step 10118 re-enters step 10114 to define an iterative loop that consecutively adjusts for the overflow conditions that occur in the computation of the cumulative value of engine period time.

If the test in decision 10116 is satisfied, the YES branch is followed to step 10120. In step 10120, the value stored in the temporary registers TEMP1 and TEMP2 are added to the present contents of accumulators A and B, and the sum replaces the preceding contents of accumulators A and B.

The flow from step 10120 enters step 10122 in which the average time AVGTIM is set equal to the contents of accumulators A and B.

The following three steps 10124-10128 are used to compute the true RPM or actual speed of the engine. In overview of the steps to follow, the true value of RPM is given by the equation:

$$1/RPM = (ETIME \times 16 \text{ usec/interrupt}) (3 \text{ interrupt/rev}) (10^{-6} \text{ sec/usec}) (1/60 \text{ min/sec}) \text{ or,}$$

$$RPM = 1.25 \times 10^6/ETIME,$$

where ETIME designates engine time. However, because of scaling constraints in the microprocessor, RPM is computed using:

TRURPM (true RPM) = (65535/ETIME) (19.0625).

In step 10124, the value for average engine period time AVGTIME is divided into 65535 and the quotient is stored in TEMP1. In step 10126, the contents of TEMP1 are divided by 16 and the quotient from that division is stored in TEMP2. In step 10128, the contents of TEMP1 are multiplied by 19 and added to the contents of TEMP2 to derive the true RPM, TRURPM.

In order to use RPM in the surface interpolation subroutine, the double precision value TRURPM is rescaled to a single precision quantity (RPM) so that its maximum value represents 2400 RPM. For this case, the least significant byte of RPM will represent 9.375 RPM. This is accomplished through steps 10130–10136.

In step 10130, the double precision value TRURPM is divided by 16 and the result is placed in the accumulator B and the temporary register TEMP1. In step 10132, the value 181 is loaded into accumulator A. In step 10134, the contents of accumulators A and B are multiplied together. In step 10136, the product from the multiplication in step 10134 is added to the contents of TEMP1. Specifically, this arrives at the following relationship:

RPM = TRURPM/9.375.

In addition to computing RPM, the engine time period ETIME affects three time functions. All of the output buffer data values, except for fuel pulse width, are in degree increments. However, several of these outputs have required time durations. These durations must therefore be translated into their degree equivalents. The time periods needed are 1 msec, 1.5 msec, and 4 msec. The arming time for the injection solenoids is 1 msec, injection advance needs a 1.5 msec lead time, and the injection signal is on for 4 msec. In addition, the period between meter solenoid off and injection solenoid on is also 4 msec. The number of 0.5-degree increments needed for 4 msec is obtained from:

BP4MS = (12) (TRURPM)/250.

The bits per 1 msec is simply:

BP1MS = BP4MS/4.

Because of rounding considerations, the bits per 1.5 msec is obtained from:

BP15MS = (BP4MS − BP1MS)/2.

These associated computations are carried out in steps 10138–10144.

In step 10138, TRURPM is multiplied by 12. In step 10140, the product resulting from the multiplication in step 10138 is divided by 250 to obtain the number of bits in 4 msec, i.e. BP4MS. In step 10142, the bits per 1 msec is obtained by dividing BP4MS by 4. In step 10144, the bits per 1.5 msec is obtained by dividing the difference of BP4MS and BP1MS by 2. The flow from step 10144 enters a module within the computation program designated COMP6. The point 10146 can also be entered from departure point 10078 coming out of the NO branch of decision 10076.

In overview, the COMP6 module assumes responsibility for operation of the EFI system of the present invention when the Run Mode, Auto submode, i.e. in its actual intended working environment where injection timing and fuel quantity are computed in response to real-time engine operating conditions. More specifically, when the system is in the AUTO mode, injection advance and fuel pulse width are determined by interpolating mathematical surfaces defined by various stored calibration tables. The interpolation is performed by a subroutine SURFAZ which will hereinafter be described more fully. In general, each mathematical surface which is to be interpolated has two independent axes, X and Y, and a dependent axis, Z. In calling the subroutine SURFAZ, the X and Y axis variables are loaded into accumulators A and B, respectively, and the index register contains a link to the stored calibration table defining the surface to be interpolated.

In decision 10148 a test is made to determine if the Auto sub-mode has been selected. If not, the NO branch from decision 10148 is followed to departure point 10150, which leads to the program module DBIS.

Figure 58:
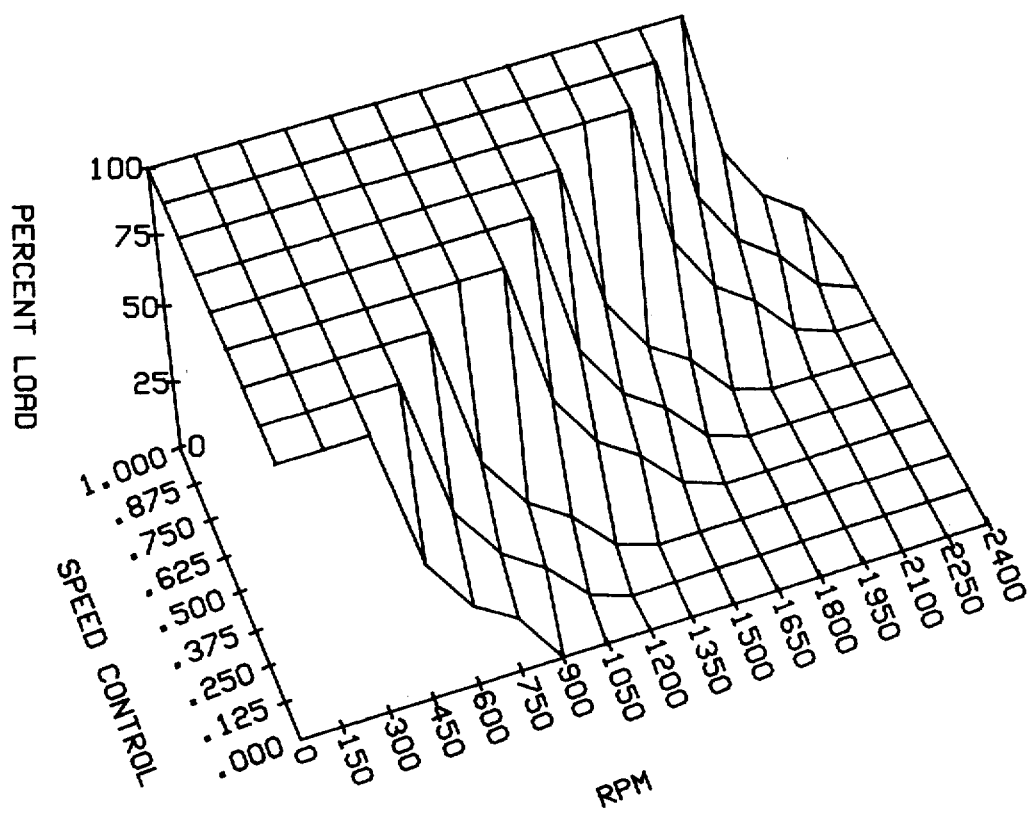
FIG. 58 is a three-dimensional surface plot which shows an exemplary relationship between the independent variables of engine RPM and speed control and the dependent variable of fuel quantity.

If the test of decision 10148 is satisfied, the YES branch is followed to step 10152. In step 10152, the subroutine SURFAZ is called to compute the part or percent-load fuel quantity. The X and Y variables, i.e. input parameters, used in the call to SURFAZ are RPM and speed command (SPEEDC), a parameter which is obtained from the interrupt program to be hereinafter described. The percent-load fuel requirement PCTLOD is defined as the required or desired fuel pulse width (least significant bit = 16 usec) permitted for a given combination of RPM and SPEEDC. The relationship between percent-load fuel quantity and the input parameters of RPM and speed command is exemplified in graphic form by the surface of FIG. 58. In step 10154, the result of the execution of the subroutine SURFAZ is stored in the register location in RAM assigned to PCTLOD.

The following sequence of steps in decision 10156–10186 are used to compute an integral component for the percent-load fuel requirement that is added to the basic value of the PCTLOD that was just previously computed to obtain an adjusted value. The integral component has proven effective to maintain smooth engine operation at all speeds and loads. It has proven particularly effective at engine operation at speeds in the range of 800–1000 RPM where undesirable effects caused by injector variation are manifest.

In decision 10156, the current value for RPM is tested to see if it is greater than or equal to 500 rev/min. If not, the NO branch of decision 10156 is taken to step 10158. In step 10158, an error buffer ERBUF is cleared or set to zero. In this instance, the integral component is not used due to relatively low engine operating speeds. The flow from step 10158 advances to the entry point of another program module COMP7 in the main computation program.

If the test or decision 10156 is satisfied, the YES branch is taken to step 10160. In step 10160, a preliminary adjustment in the scaling of the speed command byte SPEEDC is made to make it suitable for direct addition or subtraction with the RPM byte. Specifically, the SPEEDC byte has a resolution of 6.471 RPM and an offset of 600 RPM; i.e., 00 = 600 RPM, FF = 2250 RPM. Since, $$(6.47 \times \text{SPEEDC}) + 600 = 9.375 \times \text{DESIRED SPEED},$$

then we can rearrange to obtain $$\text{DESIRED SPEED} = (0.690 \times \text{SPEEDC}) + 64.$$

Due to scaling considerations in the microprocessor, the transformation becomes:

$$\text{DESIRED SPEED} = (11/16 \times \text{SPEEDC}) + 64.$$

In step 10162, the speed error SPEED ERROR is derived by subtracting ACTUAL RPM from DESIRED RPM.

In step 10164, the cumulative net speed error is built up by adding the previous contents of the error buffer to the current value for speed error and the sum is stored in the error buffer ERRBUF.

In decision 10166, a test is made to determine if the cumulative value of the speed error in the error buffer is in excess of the maximum limit. Specifically, if the overflow flag is set, the YES branch from decision 10166 is followed to step 10168. In step 10168, the cumulative speed error is set to its positive or negative limit depending upon the polarity of the cumulative speed error.

If there is no overflow, the NO branch from decision 10166 is followed to decision 10170. In decision 10170, the polarity of the cumulative speed error in ERRBUF is tested. If negative, the NO branch is followed to step 10172, where the polarity of the cumulative speed error is complemented or converted to make it compatible with an ensuing multiplication.

If the cumulative speed error is non-negative, the YES branch of decision 10170 is followed to step 10174. Also, the flow from step 10172 is to step 10174. In step 10174, the contents of ERRBUF are multiplied by KGAIN, which is a gain constant assignable by the operator after the power-on initialization of the system; it is nominally set=0 at initialization. The choice of a particular value for KGAIN allows the system operator to determine the influence the integral component will have on the percentage-load fuel requirement.

In decision 10176, the polarity of the contents of the error buffer is again tested. If negative, the NO path from decision 10176 is followed to step 10178. In step 10178, the contents of ERRBUF are complemented or converted in polarity to make it suitable for an ensuing computation. If the contents of ERRBUF are non-negative, the YES branch of decision 10176 is followed to step 10180. Also, the flow from step 10176 is to step 10180. In step 10180, the integral component obtained from the multiplication in step 10174 is added to the previously determined value for percentage-load fuel requirement PCTLOD. This yields an adjusted percentage-load requirement value which is stored in the location in RAM assigned to PCTLOD.

In decision 10182, a test is made to see if the result of the addition in step 10180 yields a negative PCTLOD. If PCTLOD is negative, the YES path from decision 10182 is followed to step 10184. In step 10184, the value for PCTLOD is set to its upper or zero limit.

If PCTLOD is non-negative, the NO branch of decision 10182 is followed to step 10186. Also, the flow from step 10184 enters step 10186. In step 10186, the value in the location in RAM for PCTLOD is adjusted for the integral component and is set by the result of decision 10182.

The computation program includes a feature which sets the fuel pulse width to zero (0) if the engine RPM is below cranking speed, nominally 90 RPM. In decision 10188, the previously determined value for RPM is tested to see if it is greater than 90. If not, the NO branch from decision 10188 is followed to step 10196. In step 10196, the metering time for fuel pulse width is set to zero. The flow from step 10196 is to step 10200. In step 10200, the result determined for metering time for fuel pulse width is stored in the memory location in RAM allocated to the output parameter METERT. In the present instance, the path from step 10196 will cause the value of METERT to be zero (0).

If the test of decision 10188 is satisfied, i.e. if engine RPM is greater than 90, the YES branch of the decision is followed to step 10190.

Figure 59:
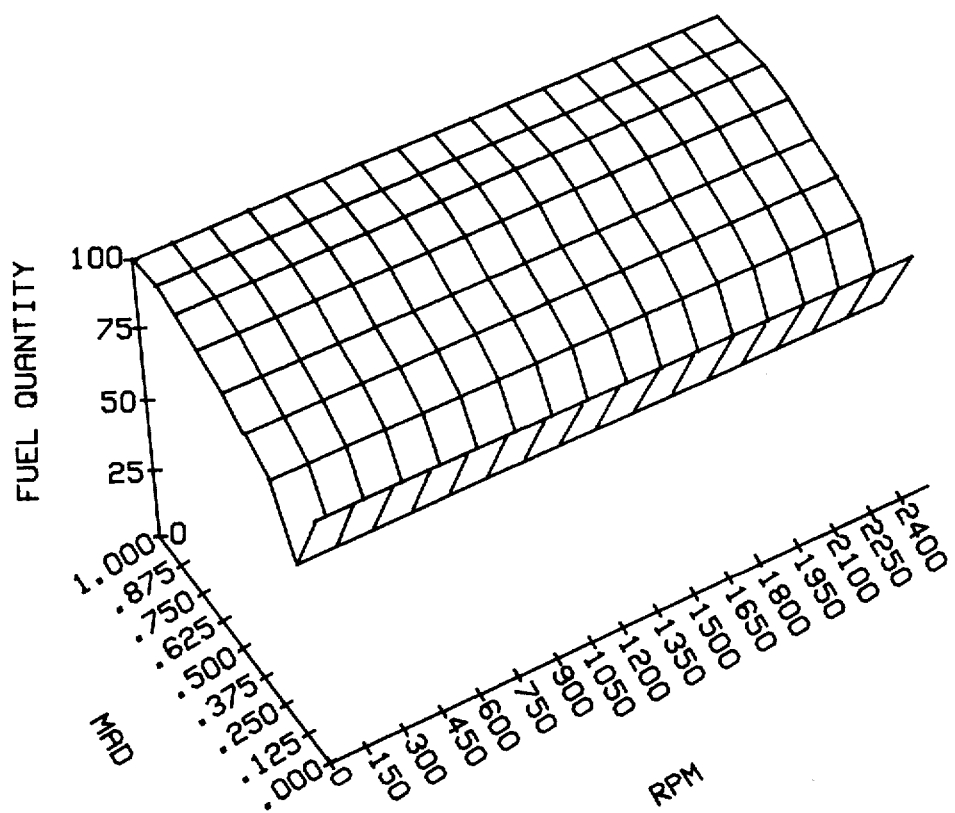
FIG. 59 is a three dimensional surface plot which shows an exemplary relationship between the independent variables of engine RPM and manifold air density and the dependent variable of fuel quantity.

In the following four steps and decision 10190–10198, computations are made to obtain the full-load requirement. Specifically, in step 10190, the subroutine SURFAZ is called. The input parameters for the subroutine are engine RPM and manifold air density MAD, the latter of which is obtained through execution of the interrupt routine. The index register on the microprocessor contains a data link to the calibration tables defining the surface representing full-load fuel requirement. The relation between full-load requirement and the input parameters RPM and MAD is exemplified in graphic form by the surface of FIG. 59.

Once having obtained the full-load fuel requirement for present values of engine RPM and manifold air density, the flow enters decision 10192. In decision 10192, a comparison is made of the relative magnitude of the full-load fuel requirement (FULLD) and the percent-load fuel requirement (PCTLOD). Specifically, whichever is the smaller of the two fuel requirements is used as the actual requirement. If FULLD is less than PCTLOD, the no branch of decision 10192 is followed to step 10198. In step 10198, the full-load fuel requirement, being the lesser of the two computed fuel requirements, is used as the actual fuel requirement.

If FULLD is greater than or equal to PCTLOD, the YES branch of decision 10192 is followed to step 10194. In step 10194, the percent-load fuel requirement, being the lesser of the two computed fuel requirements, is used as the actual fuel requirement.

Both steps 10194 and 10198 flow to step 10200, which stores in the location in RAM allocated to METERT the actual fuel requirement parameter to be used as based on the path taken to the entry of step 10200.

The following steps and decision 10202–10218 are used to compute degrees of injection advance; first, as a function of fuel quantity and engine RPM, and secondly, as function of air temperature. In overview, the degrees of injection advance (THETA) is obtained from a surface interpolation using RPM and METERT as input parameters. However, before a surface interpolation subroutine SURFAZ is called, METERT is rescaled to eight bits so that its maximum value represents 10 msec. The calibration table entries accessed by the surface interpolation routine give degrees advance (least significant bit=0.5degrees) for a given combination of RPM and METERT. An additional advance due to temperature is obtained from a linear interpolation of a curve using air temperature (AIRTEMP) as the input parameter. There the calibration table entries give the advance due to air temperature (least significant bit=0.5 degree) for given AIRTEMP.

Total degree advance (DEGADV) is obtained from:

DEGADV=THETA+THETAT, where THETAT is the injection advance in degrees due to air temperature.

In step 10202, the previously determined value for fuel pulse width, i.e. METERT, is rescaled to 8 bits by multiplying it by 0.4. This rescaling is necessary to adapt the variable METERT for use as an input parameter in the subroutine SURFAZ.

Figure 60:
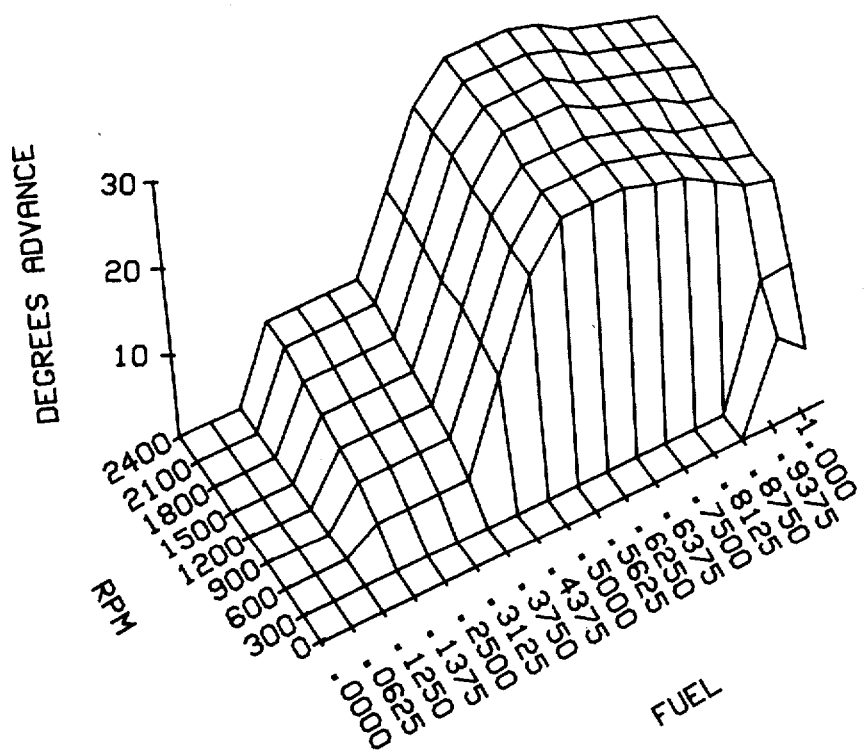
FIG. 60 is a three-dimensional plot which shows an exemplary relationship between the independent variables of fuel quantity and engine RPM and the dependent variable of injection advance.

In step 10204, the subroutine SURFAZ is called to interpolate a surface defined by a calibration table stored in PROM. The input parameters for the subroutine SURFAZ are RPM and METERT. The index register on the microprocessor contains a data link to the calibration table. The relationship between injection advance and the input parameters of fuel quantity and RPM is exemplified in graphic form by the surface of FIG. 60.

In step 10206, the result obtained from execution of the surface interpolation subroutine SURFAZ is stored in the memory location in RAM allocated to the variable THETA.

In decision 10208, a check is made to determine if the RPM is greater than or equal to 600. This is a predetermined threshold for deciding whether or not injection advance compensation will be made for air temperature. Typically, when the engine is running at speeds below 600 RPM, it has just been started and the temperature of the air is relatively cool.

Figure 61:
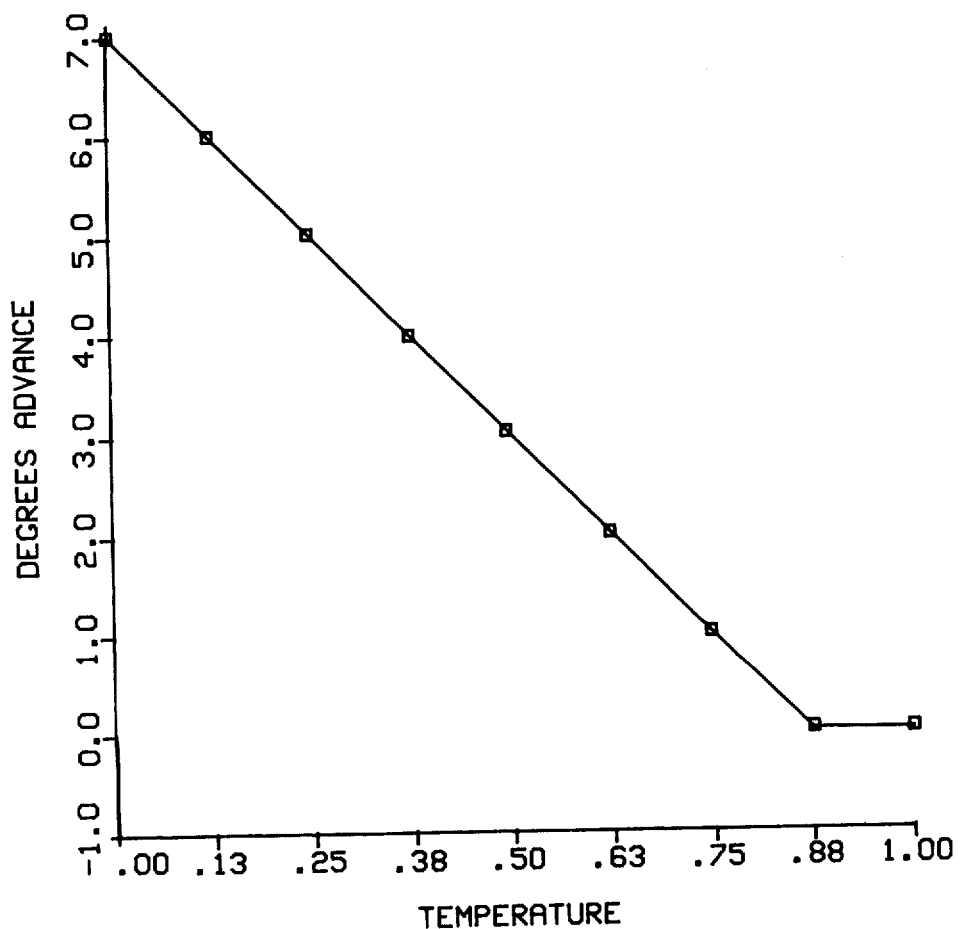
FIG. 61 is a two-dimensional plot which shows an exemplary relationship between the independent variable of manifold air temperature and the dependent variable of injection advance.

If the test of decision 10208 is not satisified, the NO branch is taken to step 10212. In step 10212, the injection advance due to air temperature is computed by calling a utility subroutine INTERP, which will hereinafter be describe more fully, that performs a linear interpolation of a curve. The curve is represented by a calibration table stored in PROM. The single input parameter used to call the subroutine INTERP is air temperature. The index register in the microprocessor contains a data link to the subroutine. The relationship between injection advance and air temperature is exemplified in graphic form by the curve shown in FIG. 61.

In step 10214, the result obtained from calling the subroutine INTERP is stored in accumulator B.

If the test of decision 10208 is satisfied, then no injection advance compensation need be made on the basis of air temperature, and the YES branch of the decision is followed to step 10210. In step 10210, the accumulator B is cleared or set to zero.

The flow from both steps 10210 and 10214 enter step 10216. In step 10216, the contents of accumulator B is stored in the memory location in RAM allocated to the variable THETAT. Depending upon the path by which step 10216 was entered, THETAT will have a zero or non-zero entry.

In step 10218, the total amount of injection advance DEGADV is obtained by summing the injection advance due to fuel quantity and RPM, i.e. THETA, and the injection advance due to air temperature, THETAT.

The flow enters point 10220 labeled DBIS. This is also entered from departure point 10150 coming out of the NO branch of decision 10148.

In step 10222, compensation is made to the just determined value for degrees of advance DEGADV to account for inherent injector delay. This is a constant compensation offset that assumes a 1.5 msec delay for each injection. The number of bits per 1.5 msec (BP15MS) having previously been determined is added to DEGADV and the sum is loaded into accumulator A.

The following three decision and steps are used to test the computed value for the degrees of advance DEGADV against a maximum limit of 45 degrees. Specifically, in decision 10224, the computed value for DEGADV is tested to determine if it less than 45 degrees. If the test is satisfied, the YES branch of decision 10224 is taken around steps 10226 and 10228 to the entry of step 10230.

If the test of decision 10224 is not satisfield, the NO branch is taken to step 10226. In step 10226, the degrees of advance DEGADV is set to a maximum limit. The maximum limit is obtained by subtracting the bits per 1.5 msec BP15MS from 44.5 degrees. In step 10228, the accumulator A is loaded with the value 44.5. In step 10230, the contents of accumulator A are stored in a temporary register in RAM designated TEMP3.

The following three steps 10232–10236 are used to prepare for entry into an iterative loop that makes correction for individual injector and cylinder variation. These corrections are generally known as trimming. The trimming is performed to make sure that, given a nominal METERT signal for all injectors, a trimmed metering signal will result in the same amount of fuel being injected by each injector.

Injector trimming is accomplished by modifying the fuel pulse width METERT to each injector according to a linear equation whose constants are functions of the flow characteristics of a particular injector and whose variable is the nominal fuel pulse width.

The derivation of a relationship between an ideal injector and an actual injector is described as follows. First, it is assumed that an ideal injector has a fuel/injection vs. pulse width curve of a form $Q = A \times TP$ and the actual injector has a curve of the form $Q = A' \times TP' + B'$, where A and A' are scale factors that may be different in value from one another; B' is an offset which may be zero, plus, or minus; and TP and TP' are pulse width times, with TP' being the pulse width time that must be applied to the actual injector to obtain the same Q as the ideal injector would produce. Equating the two expressions and rearranging terms yields:

$$TP' = (A \times TP - B')/A'$$

or $$TP' = K1 \times TP + K2.$$

The constants $K_1$ and $K_2$ can be obtained from empirical testing of each individual injector. The results of the testing are tabulated and placed in a trim table in buffer memory. The values for $K_1$ and $K_2$ for each injector are entered into buffer memory prior to system operation and after system initialization. The default values for $K_1$ and $K_2$ are 1 and 0, respectively.

The fuel trimming routine executes asynchronously with the engine operating cycle. The trimming routine computes from values for the fuel pulses for all injectors and stores them in a temporary buffer. At an engine time period interrupt, camshaft position is read, and, on the basis of camshaft position, a transfer of a trim value is made from the temporary buffer to the appropriate (one of three) metering data output buffer.

In step 10232, a temporary count variable TRMCNT is set to 6. In this case, 6 represents the number of engine cylinders. In step 10234, another temporary program variable TMBA is set to the meter buffer address. In step 10236, the index register on the CPU is loaded with the beginning address in a trim table containing the trimming constants $K_1$ and $K_2$.

The following steps and decision are used to trim the fuel quantity METERT on the basis of the trimming constants $K_1$ and $K_2$.

The first step in the trimming routine is step 10238, where the appropriate value of $K_1$ for the cylinder to be presently serviced is fetched from the trim table and stored in a temporary storage register in RAM designated STEMP1+1. In step 10240, a temporary count variable CNTR is set to 8. In step 10242, the previously determined value for the fuel pulse width or metering time METERT is multiplied by two and the product is loaded into accumulators A and B. In step 10246, the contents of accumulators A and B are multiplied by the scale factor K1 stored in the temporary register STEMP1+1. In step 10248, the corresponding offset constant K2 is accessed from the trim table and added to the product resulting from the multiplication in step 10246. In step 10250, the result of the computations in steps 10246 and 10248 is stored in RAM. More factually, this resultant value is designated METROF and represents the time at which the fuel metering pulse is turned off. In effect, the trimming routine will increase or decrease the value of METROF in an amount commensurate with the trim required for that particular injector.

In step 10252, the fuel pulse width in terms of time is converted into an equivalent expression in terms of the number of degrees between an injection reference pulse and the beginning of metering. Specifically, the metering pulse METERT is multiplied by 10240, and the resultant product is divided by the average engine period time AVTIM. The result of the computation is stored in the temporary register TEMP1 and represents the number of degrees between the occurrence of the injection reference pulse and the start of metering.

In step 10254, the degree measure of when metering starts METRON is computed. Specifically, the following computation is made: the previously determined values for DEGREES OF METERING (from step 10252) and degrees advanced DEGADV (contained in temporary register TEMP3) are subtracted from 720 (the number of half degrees in one engine revolution) and the difference is stored in accumulators A and B as METRON.

In step 10256, the contents of accumulators A and B which represent the meter or increment METRON are stored in the meter buffer in Ram. In step 10258, certain housekeeping operations for the injector trim loop are made. Specifically, the meter table pointer and trim table pointer are both updated. In step 10260, the count variable TRMCNT is decremented by one.

In decision 10262, the present value of the count variable TRMCNT is tested to determine if the iterative loop has been completed. If TRMCNT is greater than zero, then the NO branch from decision 10262 is taken to reentry of step 10238 where another path through the iterative loop is begun. If the present value of TRMCNT is equal to zero, the YES branch of decision 10262 is taken to the entry point of step 10264.

In step 10264, the "Δ degrees to arm meter solenoid off" and "Δ degrees to arm injection solenoid off" are both changed to reflect any changes in RPM.

In decision 10266, a test is made to determine if all output commands have been defined, i.e. if the output instruction codes have been concatenated to the output increments for arming signals. If the test is satisfied, the YES branch from decision 10266 is taken to the entry point of step 10272. In other words, all computations have been made and are stored in memory at appropriate locations.

If the test of decision 10266 is not satisfied, the NO branch of the decision is taken to step 10268. In step 10268, the arming commands for both metering and injection are initialized. In step 10270, the arming off commands for both metering and injection are initalized.

Step 10272 is entered by either the flow from step 10270 or by the YES branch from decision 10266. In step 10272, the computed value for degrees advance DEGADV is translated from binary format to BCD format and output to the display on the control panel. In step 10274, the metering time of METERT is converted from binary format to BCD format by the output to the display panel. In step 10276 a subroutine RADDSW, to be hereinafter more fully described, reads the address which is on the display panel and outputs the data specified by the address switches to the panel for display. At this point, the computation routine has effectively completed its entire cycle. The flow from this point reenters decision 10026 for a recycling of the computation program.

c. The Interrupt Program

The other main program in the system software—the interrupt program—is next described. The basic function of the interrupt program is to respond to a hardware interrupt signifying that information concerning an engine operating condition is available. The interrupt program executes synchronously with the engine operating cycle and interrupts the execution of the computation program as needed to handle newly available information on engine operating conditions. The interrupt program is entered at 10278 at the entry point labeled INTRPT.

There are two sources of interrupts with which the interrupt program is concerned. First, an interrupt is generated when the hardware detects the engine position is at 45 degrees BTDC, and secondly, when an A/D conversion process is complete. These are the only legal interrupts in the present system. The interrupt program must decode the interrupt and perform the appropriate operation in response to it. The information needed for decoding is obtained by a status inquiry. The address of the interrupt status word STATUS is 2000 (in hexadecimal format). In step 10280, the status of an interrupt is decoded by reading STATUS at memory location 2000 and testing for which bit of the status word is set. Depending upon the contents of the status word, an appropriate branch is made to correctly service the interrupt.

In decision 10282, a test is made to determine if the source of the interrupt is a position interrupt. As indicated, a hardware interrupt is generated when it is detected that the engine position is at 45 degrees BTDC. If not, it indicates that the source of the interrupt was an A/D complete, and the NO branch is taken from decision 10282 to the entry of decision 10334.

If the test of decision 10282 is satisfied the source of the interrupt was an engine position interrupt, and the YES branch of the decision is taken to step 10284.

In step 10284 the engine period is read. The value for engine period is obtained by counting through a number of clock pulses for 120 degrees of engine rotation. At the completion of the 120 degrees, the counter is read to determine the engine time period.

In step 10286, the cam position sensor is read and the engine period timer is reset. In step 10288 the engine time period is stored in RAM at the location allocated to the variable ETIME, and the camshaft position is stored in RAM at the memory location allocated to the variable CAMPOS.

In step 10290, the analog-to-digital conversion process for manifold air pressure MAP is initiated.

In step 10292, a sequence is begun to update the metering data output buffer with new trimmed fuel pulses. Specifically, the camshaft position CAMPOS is multiplied by six (6) and loaded into accumulator A. In step 10294, an entry pointer is computed for the trimmed fuel pulse table. This is accomplished by first loading the data link pointer to the trimmed fuel pulse table PTRTBL into the index register. The data link pointer PTRTBL is summed with the contents of accumulator A to obtain a pointer to the trimmed fuel pulse table PEPT. In step 10296, the proper increment for the beginning of metering time METRON is obtained from the trimmed fuel pulse table. In step 10298, the incremented METRON is stored in a temporary register PTEMP. In step 10300, the proper increment metering off time METROF is obtained. In step 10302, the value for METROF is stored in the temporary register PTEMP+2. In step 10304, the address of the proper output buffer for the incremented metering value is obtained. In step 10306, the instruction codes are added and the result is moved to the metering data output buffer. In step 10308, the RPM measured flag RPMF is set to signify the completion of the measurement of RPM. In step 10310, the number of engine time periods AVGN is incremented by one (1). In step 10312 certain manipulations to the engine time period stack are made. Specifically, the stack pointer is initialized by loading the beginning address, in this case 0100, into the index register. Also, the number of engine time periods measured AVGN is loaded into accumulator B.

In decision 10314, a test is made to determine if the number of engine time periods that has been measured AVGN is greater than zero. If not, the NO branch is followed from decision 10314 to step 10316. In step 10316, the value for AVGN is set to a nominal one by loading that value into accumulator B and storing the contents of accumulator B in AVGN.

If the test of decision 10314 is satisfied, the YES branch from the decision is taken to step 10318. Also, the flow from step 10316 enters step 10318. In step 10318, the value of accumulator B is decremented by one.

In decision 10320, the value of accumulator B is tested to determine if it is equal to zero. If the test of decision 10320 is satisfied, the YES branch is followed to step 10330. In step 10330, the current value for the engine time period is pushed onto the top of the engine time period stack. The flow from step 10330 is to step 10332 which is an exit from the interrupt program.

If the test of decision 10320 is not satisfied, the NO branch is followed to step 10322. In step 10322, an interative loop is begun to push down the engine time period stack. Specifically, the stack entry for the N+1'st engine time period is pushed down to the entry in the stack for the N'th engine time period. In step 10324, the index register containing the data link to the engine time period stack is incremented by 2. In step 10326, the contents of accumulator B, which initially represented the number of engine time periods tested AVGN, is decremented by one. In decision 10328, the contents of accumulator B is tested to determine if it has been decremented to zero (0). If not, the NO branch is taken to re-entry of step 10322 and another path is made through the interative loop. If the test is satisfied, the YES branch from decision 10328 is taken to the entry of step 10330. After execution of step 10330, the interrupt program is exited through departure point 10332.

This completes the sequence of operations in the interrupt program that occur in response to an engine position interrupt every 120 degrees of engine rotation. The other form of legal interrupt is an A/D interrupt signifying the completion of analog-to-digital conversion. The sequence of program steps that are executed in response to an A/D interrupt are described as follows.

More specifically, if the test imposed by decision 10282 is not satisfied, the NO branch is taken to the entry of decision 10334. In decision 10334, a test is made to determine if the interrupt was caused by the completion of an A/D conversion. If the test of decision 10334 is not satisfied, the interrupt was a false interrupt, and the NO branch is taken from the decision to departure point 10336 from which the interrupt program is exited.

If the interrupt was a legal A/D interrupt, the test of decision 10334 is satisfied, and the YES branch is taken to step 10338.

In step 10338, the A/D code ADCODE indicating the type of conversion that initiated the interrupt is read. ADCODE has assigned the following values for the various types of A/D interrupts: MAP=0, speed command=1 and air temperature=2.

In decision 10340, a test is made to determine if AD-CODE indicates a MAP interrupt, i.e. if its value is zero. If the test of decision 10340 is satisfied, the YES branch is taken to step 10342. In step 10342, the result of the A/D conversion is stored in RAM at the memory location allocated to MAP.

If the test of decision 10340 is not satisfied, i.e. if the source of the interrupt was not an A/D conversion for MAP, the NO branch of decision 10340 is taken to decision 10344. In decision 10344, a test is made to determine if the source of the interrupt was completion of an A/D conversion for speed control.

If the test of decision 10344 is satisfied, i.e. the value of ADCODE equals 1, the YES branch from the decision is taken to step 10346. In step 10346, the result of the A/D conversion is stored in RAM at the memory location allocated to SPEEDC.

If the test of decision 10344 is not satisfied, then by default, the source of the interrupt is assumed to be the completion of an A/D conversion for air temperature. Consequently, the NO branch from decision 10344 is taken to step 10348. In step 10348, the result of the A/D conversion is stored in RAM at the memory location allocated to AIRTMP.

In decision 10350, a test is made to determine if all of the analog variables—MAP, speed control and air temperature—have been converted to digital format. Specifically, the value of ADCODE is tested to see if it is 2. The A/D conversions are performed in regular order with MAP first, speed command second, and air temperature third. If the value of ADCODE is 2, the test of decision 10350 is satisfied, and the YES branch is taken to decision 10352.

In decision 10352, a test is imposed to determine if RPM has been measured. Specifically, the flag RPMF is tested to determine if it is set. If not, the NO branch is taken to departure point 10364 from which the interrupt routine is exited.

If the flag RPMF is set, the test of decision 10352 is satisfied, and the YES branch is taken to decision 10360. In decision 10360, a test is made to determine if a sufficient number of engine time periods have been measured. Specifically, the number of engine time periods thus far measured AVGN is compared against a predetermined minimum number of engine time periods NPRD. If an insufficient number of periods have been measured, the test decision 10360 is failed, and the NO branch is taken to departure point 10364. If the test is satisfied, i.e. a sufficient number of time period has been measured, the YES branch is taken to step 10362.

In step 10362 a flag is set indicating that all of the input sensors have been measured. The flow from step 10362 is to the departure point 10364 from the interrupt program.

If the test of decision 10350 is not satisfied, i.e. if there are additional analog signals to be converted to digital form, the NO branch is taken to step 10354. In step 10354 the variable ADCODE is incremented by one, to indicate to the hardware multiplexer that the next successive analog variable is to be converted. In step 10356, the conversion for the next analog variable is started.

The flow from step 10356 is to departure point 10358 which provides an exit from the interrupt program.

d. The Utility Subroutines

The main computation and interrupt programs call on a number of utility subroutines to carry out certain functions. The following is a detailed description of the two utility subroutines—SURFAZ and INTERP—used to perform surface and linear interpolations, respectively. An abbreviated description is given of a number of smaller, more general utility routines following the detailed descriptions of SURFAZ and INTERP.

The surface interpolation routine starts at the entry point 10366 labeled SURFAZ. In overview, the subroutine SURFAZ is called to determine the height of a three-dimensional surface given the (x,y) coordinates of the axes defining the independent variables. The quantities represented by x and y are eight bit numerical values loaded by the calling program into accumulators A and B. The calling program also loads the index register with the address of the parameter list containing the data defining the desired surface.

Each surface is defined by a calibration table containing double-precision values of the height of the surface corresponding to a point of an x-y grid. Table entries are arranged to step through the full range of x values for a given y value. The number of breakpoints in each axis is given by $2^n + 1$, where n is the number of high-order bits of x or y used to identify a breakpoint. The remaining 8-n bits of x or y are interpreted as an interpolation fraction between two breakpoints. For example, suppose the value of x in accumulator A is 10101010 and the three high-order bits define the breakpoint number, then the surface value for that x value falls 10/32 of the distance between breakpoints 5 and 6. The appropriate table entries are obtained by also knowing which y breakpoints are involved, as well as the y interpolation fraction. The surface value is then obtained by an elementary linear interpolation for each of the x and y axes.

The parameter list for the subroutine SURFAZ consists of eight entries. They are defined as follows:
(1) Interpolation fraction mask for data in accumulator A.
(2) Breakpoint mask for data in accumulator A.
(3) Interpolation fraction mask for data in accumulator B.
(4) Table offset adjustment
(5) Address of surface calibration data table
(6) Number of bytes per block of x data
(7) Number of multiplied interations used for data in accumulator A.
(8) Number of multiplied iterations used for data in accumulator B.

In step 10368, the interpolation fraction IF1 is computed for the first data entry to the subroutine, normally the x axis coordinate. In step 10370, the data breakpoint BP1 is computed for the same coordinate value. In both steps 10368 and 10370, the computations may be effected by "AND-ing" the input data words with an appropriate mask.

Step 10372 and decision 10374 define an iterative loop that is used to execute a consecutive shift right of the x-axis data input word along with the complement of the x-axis data input word along with the complement of the first value in the x-axis breakpoint mask. Specifically, in decision 10374, a test is made to determine if the loop has been completed by testing the complement of the first value in the x-axis breakpoint mask to determine if it is zero. If not, the NO branch is taken to the re-entry of step 10372. If the test is satisfied, the YES branch is taken to step 10376, where the results of the iterative loop are stored in the first n bits of the x-axis bit input word. The value of n is a function of table size. In the present case, $n_x = 3$ and $n_y = 3$. However, both $n_x$ or $n_y$ may equal as much as 8 when x or y ranges to 255.

Step 10378 and decision 10380 define another iterative loop that performs the same function as the immediately preceding iterative loop, but performs it on the y-axis data input word. After the loop has been completed, the YES branch from decision 10380 is taken to step 10382. In step 10382, the first n bits of the y-axis of the data input word are stored.

In step 10384, the first n bits of the x-axis data input word are added to the first n bits of the y-axis data input word.

Step 10386 and decision 10388 define an iterative loop in which the first n bits in the y-axis data word are shifted left along with the breakpoint mask for the x-axis data input word.

When the iterative loop of step 10386 and decision 10388 is completed, the YES branch is taken to step 10390. In step 10390, the result of the immediately preceding iterative loop and the sum from the addition of step 10384 are added together to produce an offset to accommodate different size surface tables. In step 10392, the offset value OFSET is multiplied by two to adapt it for double precision use. In step 10394, the value of OFSET is added to the table address to obtain a properly offset table address.

In step 10396, the sum obtained in step 10394 is saved in RAM at the memory location allocated to the address of the first table element AIJ. In step 10398, the other end point for interpolation along the x-axis is obtained by adding AIJ plus an x-y array increment. In step 10400, the sum obtained in step 10398 is stored in the memory location in RAM allocated to AIJ1.

Having determined the two end points from which the linear interpolation along the x-axis can be performed, in step 10402 the subroutine INTERP is called to execute a linear interpolation. This subroutine will be hereinafter described in greater detail.

In decision 10404, a test is made to determine if only a single linear interpolation was required to obtain the desired surface value. If the test is satisfied, the YES branch is taken to departure point 10416 where control is returned to the calling program.

If two linear interpolations are required, then the test or decision 10404 is not satisfied, and the NO branch is taken to step 10406. In step 10406, the linear interpolation subroutine INTERP is called for the two y-axis end points. In step 10408, the result obtained from step 10402 INTRP1 is subtracted from the result obtained from the execution of step 10406 INTRP2 to yield a difference designated ΔINT. In step 10410, the interpolation fraction of the y-axis data input word is computed. In step 10412, the fraction computed in step 10410 is multiplied by ΔINT and the product is added to the result obtained from step 10402 INTRP1.

The flow from step 10412 is to departure point 10416 where control is returned to the calling program.

The linear interpolation subroutine INTERP is called to linearly interpolate between two points. The address of the first point is loaded in the index register by the calling program. The calling program must also store the interpolation fraction in STEMP1+1 and the number of bits in the fraction of COUNTR. The equation used is:

RESULT = Point 1 + (Interpolation
Fraction) × (Point 2 − Point 1).

More specifically, the linear interpolation subroutine INTERP is entered through entry point 10418. In step 10420, a preliminary computation is made to obtain the displacement between the first and second points. More factually, the value of the first point is subtracted from the second point to obtain ΔPT. In step 10422, the basic equation used for interpolation is executed. Specifically, a first quantity is obtained by multiplying ΔPT by the interpolation fraction for the axis along which the linear interpolation is taking place. The first quantity is added to the value of the first point and the result is the sum of the two quantities. The flow from step 10422 is to departure point 10424 where control is returned to the calling program.

A number of smaller utility subroutines are used to carry out certain basic functions within the main computation and interrupt programs. Each of these utility subroutines will be described in a separate paragraph to follow.

The subroutine MULT 10426 is called to multiply a sixteen bit number in the A and B accumulators by an eight bit number in the temporary register STEMP+1 to get a sixteen bit result. Multiplication is accomplished by successively adding the value in accumulators A and B multiplied by the power of two represented by each one bit in STEMP1+1 and adding it to the accumulator result. The result is then divided by two after each iteration to maintain the sixteen bit scaling. COUNTER contains the number of iterations necessary.

The subroutine D1616 10428 is called to divide a sixteen bit quantity in the A and B accumulators by a sixteen bit value in the location specified by the index register. The sixteen bit result is loaded into accumulators A and B when the subroutine returns. All of the operations are done through a stack.

Division is accomplished by successively subtracting the divisor from the dividend, setting a bit to one (1) if the result is greater than zero (0) or to zero (0) if negative, shifting the dividend right one bit, and subtracting again. When a negative result is obtained, the last positive value is restored before shifting the dividend. This process continues for 16 iterations. If the carry bit is set in the final iteration, the quotient is rounded off by one bit.

The subroutine DPLSH4 10430 is called to shift the double precision value in the A and B accumulators left four bits. There are two alternate entries to the subroutine, DPLSH3 and DPLSH2, which will shift left by three and two bits, respectively.

The subroutine DPRSH4 10432 is called to shift a double precision value in the A and B accumulators right four bits. There are two alternate entries to this subroutine, DPRSH3 and DPRSH2, which will shift right by three and two bits, respectively.

The subroutine MPY88 10434 multiplies a value in the A accumulator by a value in the B accumulator and stores the 16-bit product in accumulators A and B. The input values are saved on the stack.

Multiplication is performed by successively adding the saved value of accumulator A and shifting the result one bit for each one (1) bit in accumulator B. Only a shift is performed for each zero (0) bit in accumulator B. This add-and-shift sequence is executed eight times. When complete, a sixteen bit product will remain in accumulators A and B.

The subroutine BCDBIN 10436 takes two BDC numbers in acccumulator A and converts them to a single binary number in accumulator A. The subroutine first separates the two values and stores the least significant half in accumulator B. The binary value is obtained from the equation:

VALUE = (8 × MSH) + (2 × MSH) + LSH.

The subroutine COMBIN 10438 takes BCD values stored in accumulators A and B and combines them in a single BCD value in accumulator A. The most significant digit is stored in accumulator A. The combined value is given simply by:

VALUE = (MSH × 16) + LSH.

The subroutine RADDSW 10440 reads the state of the address switches on the control panel and stores them as the panel address (PANLAD). The most significant half of the address is read from ADDSWH and the least significant half from ADDSWL.

The subroutine ADDATA 10442 is called to display the panel address PANLAD and the data stored in that location in the address and data lamps on the control panel. The most significant half of the address PANLAD is stored in ADDSWH and the least significant half (PANLAD+1) in ADDSWL. The data referenced by that location is stored in DATASW.

This completes the description of the system software.

V. APPENDIX a. ECU - Signal Glossery
b. ECU - Memory Map
c. ECU - System Software Source Code Listing a. ECU - SIGNAL GLOSSARY
SIGNALS ON BOARD CONNECTORS

| SIGNAL | FUNCTION |
|---|---|
| IT | Initial reset; resets system when at 5 v. |
| ø2TTL | Phase 2 clock, 1MHz, for system I/O. |
| VMA | Valid Memory Address; memory address valid when at 5 v. |
| Aø-A15 | Address lines, Aø is least significant; line = logical 1 when at 5 v. |
| R/W | Read/Write; read into accumulators when at 5 v. |
| BA | Bus available; address and data bus available for I/O use when at 5 v. |
| $\overline{HALT}$ | Halt; CPU is requested to halt execution when at 0 v. |
| $\overline{NMI}$ | Non-maskable interrupt request; not used by ECU. |
| $\overline{D0-D7}$ | Data lines; Dø is least significant; line = logical 1 when at 0 v. |
| $\overline{IRQ}$ | Maskable interrupt request; I/O requesting interrupt when at 0 v. |
| ø2USC | 2 us clock in sync with ø2TTL. |
| DMAVBL | DMA Available; when at 5 v, indicates that the CPU busses are available for DMA. |
| $\overline{PRTY\ IN,OUT}$ | Priority in (out); a daisy chain signal to resolve DMA conflicts; when $\overline{PRTYIN}$ = 0 v, indicates a higher priority DMA controller is executing a DMA; if a controller is executing a DMA or if $\overline{PRTYIN}$ = 0 v, then that controller forces $\overline{PRTYOUT}$ = 0 v. $\overline{PRTYOUT}$ from one control is tied to $\overline{PRTYIN}$ of the next control. |
| $\overline{DEG\cdot 5PLS}$ | Half degree pulse from the synchronizer & differentiator circuit; 2 us pulse from +5 v to 0 v every ½ degree of cam or crankshaft rotation. |
| $\overline{CT15}$ | 16 us clock, going from +5 v to 0 v for 2 us duration; used in fuel metering primarily. |
| $\overline{ENCDR1,2,4}$ | Outputs from the absolute position encoder, indicating camshaft position by their decode. |
| $\overline{MTREF0,1,2}$ | Meter Reference signal; a 2 us pulse occurring at top dead center for the appropriate cylinder. |
| $\overline{DEGSNSR}$ | Degree sensor. |
| $\overline{CYLXXF}$ | Cylinder flags; to indicate which cylinder (or injector) is to be serviced on a particular revolution of the crankshaft. |
| $\overline{CAMREF}$ | Camshaft reference; this pulse occurs at top dead center for cylinder 1 to provide a reference for the absolute position encoding logic. |

-continued
a. ECU - SIGNAL GLOSSARY
SIGNALS ON BOARD CONNECTORS

| SIGNAL | FUNCTION |
|---|---|
| $\overline{MTRARMF}$ | The arming signal for the meter solenoid driver. |
| $\overline{METERF}$ | The metering signal. |
| $\overline{INJARMF}$ | The arming signal for the inject solenoid driver. |
| $\overline{INJECTF}$ | The injection signal. |
| METER 1-6 | Metering signal for a given cylinder. |
| MTRARM xy | Arming signal for the appropriate cylinder pair. | b. ECU - MEMORY MAP

| ADDRESS | FUNCTION | |
|---|---|---|
| 0000-0008 | Meter Buffer - Cylinders 3,4 | ↑ |
| 0009-0055 | System RAM | ↑ |
| 0056-007F | Stack | ↑ |
| 0080-00FF | Spare RAM | ↑ |
| 0100-01FF | Engine Period Stack | ↑ |
| 0200-0208 | Meter Buffer - Cylinders 1,6 | ↑ |
| 0209-020F | System RAM | ↑ |
| 0210-0218 | Meter Buffer - Cylinders 2,5 | ↑ |
| 0219-0231 | Trimmed Fuel Pulse Buffer | RAM |
| 0232-02FF | Spare RAM | (1K) |
| 0300-030F | Trim Parameters | ↓ |
| 0310-0317 | System RAM | ↓ |
| 0318-03FF | Spare RAM | ↓ |
| 0400-1FFF | Not used | |
| 2000 | System Status | ↑ |
| 2001-2002 | Engine Period | ↑ |
| 2003 | A/D Converter Output | CONTROL |
| 2004-2005 | Not used, reserved for I/O | I/O |
| 2006 | Period Reset/Cam Position | ↓ |
| 2007 | Load A/D Converter Multiplexer and Start | ↓ |
| 2008-2FFF | Not used nor available | ↓ |
| 3000-3001 | Metering Time Displays and Switches | ↓ |
| 3002-3003 | Injection Advance Displays and Switches | ↓ |
| 3004-3005 | Address Lamps | ↓ |
| 3006 | Data Lamps | ↑ |
| 3007 | Control Panel Switches | FRONT |
| 3008-300B | Not used nor available | PANEL |
| 300C-300D | Address Switches | I/O |
| 300E | Data Switches | ↓ |
| 300F | Data Panel Switches | ↓ |
| 3010-3FFF | Not used nor available | ↓ |
| 4000-43FF | Not used | |
| 4400-47FF | Spare RAM | RAM(1K) |
| 4800-7BFF | Not used | ↑ |
| 7C00-7CBF | Interrupt Handler Routine | ↑ |
| 7CC0-7D06 | Start-Up Routine | ↑ |
| 7D07-8030 | Computation Routine | PROGRAM |
| 8031-808B | Off-Line Routine | PROMS |
| 808C-8132 | Surface Interpolation Routine | (2-1K) |
| 8133-8237 | System Subroutines | ↓ |
| 8238-83FF | Spare PROM | ↓ |
| 8400-FBFF | Not used | ↓ |
| FC00-FFA7 | Surface Data Tables | DATA |
| FFA8-FFF7 | Spare PROM | PROM |
| FFF8-FFFF | Interrupt Vectors | (1K) ↑ |

C. ECU - SYSTEM SOFTWARE SOURCE CODE LISTING

PAGE 001   DIESEL

```
00001                          NAM    DIESEL
00002                          OPT    O
00003                          OPT    S
00004              *DIESEL ECU
00005              *REVISION D
00006              *
00007              *           I/O ADDRESS AS
00008              *
00009      2000  A STATUS EQU  $2000
00010      2001  A ETIMEH EQU  $2001
00011      2002  A ETIMEL EQU  $2002
00012      2003  A ADIN   EQU  $2003
00013      2006  A CONTRL EQU  $2006
00014      2007  A BGINAD EQU  $2007
00015      3000  A MTIMEH EQU  $3000
00016      3001  A MTIMEL EQU  $3001
00017      3002  A IADVH  EQU  $3002
00018      3003  A IADVL  EQU  $3003
00019      3004  A ALAMPH EQU  $3004
00020      3005  A ALAMPL EQU  $3005
00021      3006  A DLAMPS EQU  $3006
00022      3007  A CPSW   EQU  $3007
00023      300C  A ADDSWH EQU  $300C
00024      300D  A ADDSWL EQU  $300D
00025      300E  A DATASW EQU  $300E
00026      300F  A DPSW   EQU  $300F
00027A 0000                    ORG    0
00028A 0000 0002  A METRON RMB  2
00029A 0002 0002  A METROF RMB  2
00030A 0004 0002  A ARMMON RMB  2
00031A 0006 0002  A ARMMOF RMB  2
00032A 0008 0001  A ENDMBF RMB  1
00033A 0009 0001  A ADCODE RMB  1
00034A 000A 0002  A AIJ    RMB  2
00035A 000C 0002  A AIJ1   RMB  2
00036A 000E 0001  A AIRTMP RMB  1
00037A 000F 0001  A ALLSEN RMB  1
00038A 0010 0002  A INJON  RMB  2
00039A 0012 0002  A INJOFF RMB  2
00040A 0014 0002  A ARMION RMB  2
00041A 0016 0002  A ARMIOF RMB  2
00042A 0018 0001  A ENDIBF RMB  1
00043A 0019 0001  A AUTO   RMB  1
00044A 001A 0001  A BP1MS  RMB  1
00045A 001B 0001  A BP15MS RMB  1
00046A 001C 0001  A BP4MS  RMB  1
00047A 001D 0001  A COUNTR RMB  1
00048A 001E 0001  A DEGADV RMB  1
00049A 001F 0002  A ETIME  RMB  2
00050A 0021 0002  A FUEL   RMB  2
00051A 0023 0001  A MAD    RMB  1
00052A 0024 0001  A MAP    RMB  1
00053A 0025 0002  A METERT RMB  2
00054A 0027 0002  A PANLAD RMB  2
```

PAGE 002 DIESEL

```
00055A 0029      0002  A PCTLOD RMB  2
00056A 002B      0001  A RPM    RMB  1
00057A 002C      0001  A RPMF   RMB  1
00058A 002D      0001  A SERVED RMB  1
00059A 002E      0001  A SPEEDC RMB  1
00060A 002F      0002  A STEMP1 RMB  2
00061A 0031      0002  A STEMP2 RMB  2
00062A 0033      0002  A STEMP3 RMB  2
00063A 0035      0002  A STEMP4 RMB  2
00064A 0037      0002  A STEMP5 RMB  2
00065A 0039      0002  A TEMP1  RMB  2
00066A 003B      0002  A TEMP2  RMB  2
00067A 003D      0002  A TEMP3  RMB  2
00068A 003F      0002  A TEMP4  RMB  2
00069A 0041      0001  A THETA  RMB  1
00070A 0042      0001  A THETAT RMB  1
00071A 0043      0002  A TRURPM RMB  2
00072A 0045      0001  A NREV   RMB  1
00073A 0046      0001  A NWAIT  RMB  1
00074A 0047      0002  A NPRD   RMB  2
00075A 0049      0001  A AVGN   RMB  1
00076A 004A      0001  A LOOPN  RMB  1
00077A 004B      0001  A DVCNT  RMB  1
00078A 004C      0001  A TMP1   RMB  1
00079A 004D      0001  A TMP2   RMB  1
00080A 004E      0001  A TMP3   RMB  1
00081A 004F      0001  A TMP4   RMB  1
00082A 0050      0002  A AVGTIM RMB  2
00083A 0052      0001  A CAMPOS RMB  1
00084A 0053      0002  A ERRBUF RMB  2
00085A 0055      0001  A KGAIN  RMB  1
00086A 007F                       ORG  $7F
00087A 007F      0001  A STACK  RMB  1
00088A 0200                       ORG  $0200
00089A 0200      0002  A MTRON1 RMB  2
00090A 0202      0002  A MTROF1 RMB  2
00091A 0204      0002  A ARMON1 RMB  2
00092A 0206      0002  A ARMOF1 RMB  2
00093A 0208      0001  A ENDBF1 RMB  1
00094A 0209      0002  A TRMCNT RMB  2
00095A 020B      0002  A TMBA   RMB  2
00096A 020D      0003  A        RMB  3
00097A 0210      0002  A MTRON2 RMB  2
00098A 0212      0002  A MTROF2 RMB  2
00099A 0214      0002  A ARMON2 RMB  2
00100A 0216      0002  A ARMOF2 RMB  2
00101A 0218      0001  A ENDBF2 RMB  1
00102A 0219      0018  A MTRBUF RMB  24
00103A 0300                       ORG  $0300
00104A 0300      0010  A TRMTBL RMB  16
00105A 0310      0004  A PTEMP  RMB  4
00106A 0314      0002  A TTTP   RMB  2
00107A 0316      0002  A PEPT   RMB  2
00108                          *
00109                          *
00110                          *   INTERRUPT HAND
```

PAGE  003   DIESEL

```
00111A 7C00                              ORG    $7C00
00112A 7C00 B6 2000   A INTRPT LDAA      STATUS
00113A 7C03 44                    LSRA
00114A 7C04 25 03 7C09            BCS    RDRPM
00115A 7C06 7E 7C3E   A           JMP    INT2
00116A 7C09 FE 2001   A RDRPM  LDX       ETIMEH
00117A 7C0C B6 2006   A           LDAA   CONTRL
00118A 7C0F DF 1F     A           STX    ETIME
00119A 7C11 97 52     A           STAA   CAMPOS
00120A 7C13 5F                    CLRB
00121A 7C14 D7 09     A           STAB   ADCODE
00122A 7C16 F7 2007   A           STAB   BGINAD
00123A 7C19 96 52     A           LDAA   CAMPOS
00124A 7C1B 48                    ASLA
00125A 7C1C 16                    TAB
00126A 7C1D 48                    ASLA
00127A 7C1E 1B                    ABA
00128A 7C1F 5F                    CLRB
00129A 7C20 CE 8209   A           LDX    #PTRTBL
00130A 7C23 FF 0310   A           STX    PTEMP
00131A 7C26 BB 0311   A           ADDA   PTEMP+1
00132A 7C29 F9 0310   A           ADCB   PTEMP
00133A 7C2C B7 0317   A           STAA   PEPT+1
00134A 7C2F F7 0316   A           STAB   PEPT
00135A 7C32 FE 0316   A           LDX    PEPT
00136A 7C35 EE 00     A           LDX    0,X
00137A 7C37 EE 00     A           LDX    0,X
00138A 7C39 FF 0310   A           STX    PTEMP
00139A 7C3C FE 0316   A           LDX    PEPT
00140A 7C3F EE 02     A           LDX    2,X
00141A 7C41 EE 00     A           LDX    0,X
00142A 7C43 FF 0312   A           STX    PTEMP+2
00143A 7C46 FE 0316   A           LDX    PEPT
00144A 7C49 EE 04     A           LDX    4,X
00145A 7C4B B6 0310   A           LDAA   PTEMP
00146A 7C4E 8B 90     A           ADDA   #$90
00147A 7C50 A7 00     A           STAA   0,X
00148A 7C52 B6 0311   A           LDAA   PTEMP+1
00149A 7C55 A7 01     A           STAA   1,X
00150A 7C57 B6 0312   A           LDAA   PTEMP+2
00151A 7C5A 8B A0     A           ADDA   #$A0
00152A 7C5C A7 02     A           STAA   2,X
00153A 7C5E B6 0313   A           LDAA   PTEMP+3
00154A 7C61 A7 03     A           STAA   3,X
00155A 7C63 86 02     A           LDAA   #2
00156A 7C65 97 2C     A           STAA   RPMF
00157A 7C67 7C 0047   A           INC    NPRD
00158A 7C6A CE 0100   A           LDX    #$100
00159A 7C6D D6 49     A           LDAB   AVGN
00160A 7C6F 2E 04 7C75            BGT    COMP3G
00161A 7C71 C6 01     A           LDAB   #1
00162A 7C73 D7 49     A           STAB   AVGN
00163A 7C75 5A              COMP3G DECB
00164A 7C76 27 0D 7C85            BEQ    UPDAT2
00165A 7C78 A6 02     A UPDAT1 LDAA     2,X
00166A 7C7A A7 00     A           STAA   0,X
```

PAGE  004    DIESEL

```
00167A 7C7C A6 03      A              LDAA    3,X
00168A 7C7E A7 01      A              STAA    1,X
00169A 7C80 08                        INX
00170A 7C81 08                        INX
00171A 7C82 5A                        DECB
00172A 7C83 26 F3 7C78                BNE     UPDAT1
00173A 7C85 96 1F      A  UPDAT2 LDAA ETIME
00174A 7C87 A7 00      A              STAA    0,X
00175A 7C89 96 20      A              LDAA    ETIME+1
00176A 7C8B A7 01      A              STAA    1,X
00177                                 *
00178A 7C8D 3B                 INT1   RTI
00179A 7C8E 44                 INT2   LSRA
00180A 7C8F 25 01 7C92                BCS     INT3
00181A 7C91 3B                        RTI
00182A 7C92 B6 2003   A  INT3   LDAA  ADIN
00183A 7C95 D6 09     A         LDAB  ADCODE
00184A 7C97 26 04 7C9D               BNE      INT4
00185A 7C99 97 24     A               STAA    MAP
00186A 7C9B 20 09 7CA6               BRA      INT6
00187A 7C9D 57                 INT4   ASRB
00188A 7C9E 24 04 7CA4                BCC     INT5
00189A 7CA0 97 2E     A                STAA   SPEEDC
00190A 7CA2 20 02 7CA6                BRA     INT6
00191A 7CA4 97 0E     A  INT5   STAA  AIRTMP
00192A 7CA6 96 09     A  INT6   LDAA  ADCODE
00193A 7CA8 81 02     A               CMPA    #2
00194A 7CAA 27 07 7CB3                BEQ     INT7
00195A 7CAC 4C                        INCA
00196A 7CAD 97 09     A                STAA   ADCODE
00197A 7CAF B7 2007   A                STAA   BGINAD
00198A 7CB2 3B                        RTI
00199A 7CB3 91 2C     A  INT7   CMPA  RPMF
00200A 7CB5 26 08 7CBF                BNE     INT9
00201A 7CB7 D6 47     A                LDAB   NPRD
00202A 7CB9 D1 49     A                CMPB   AVGN
00203A 7CBB 2D 02 7CBF                BLT     INT9
00204A 7CBD 97 0F     A                STAA   ALLSEN
00205A 7CBF 3B                 INT9   RTI
00206                          *START PROGRAM
00207A 7CC0 0F                 START  SEI
00208A 7CC1 7F 2006   A                CLR    CONTRL
00209A 7CC4 8E 007F   A                LDS    #$7F
00210A 7CC7 4F                         CLRA
00211A 7CC8 CE 007F   A                LDX    #$7F
00212A 7CCB A7 00     A  START1 STAA   0,X
00213A 7CCD 09                         DEX
00214A 7CCE 26 FB 7CCB                 BNE    START1
00215A 7CD0 97 00     A                STAA   0
00216A 7CD2 4C                         INCA
00217A 7CD3 97 05     A                STAA   ARMMON+1
00218A 7CD5 B7 0205   A                STAA   ARMON1+1
00219A 7CD8 B7 0215   A                STAA   ARMON2+1
00220A 7CDB 97 49     A                STAA   AVGN
00221A 7CDD 86 F0     A                LDAA   #$F0
00222A 7CDF 97 18     A                STAA   ENDIBF
```

PAGE 005 - DIESEL

```
00223A 7CE1 97 08      A              STAA   ENDMBF
00224A 7CE3 97 00      A              STAA   METRON
00225A 7CE5 B7 0200    A              STAA   MTRON1
00226A 7CE8 B7 0210    A              STAA   MTRON2
00227A 7CEB B7 0208    A              STAA   ENDBF1
00228A 7CEE B7 0218    A              STAA   ENDBF2
00229A 7CF1 C6 06      A              LDAB   #6
00230A 7CF3 86 80      A              LDAA   #$80
00231A 7CF5 F7 0209    A              STAB   TRMCNT
00232A 7CF8 5F                        CLRB
00233A 7CF9 CE 0300    A              LDX    #TRMTBL
00234A 7CFC A7 00      A  START3      STAA   0,X
00235A 7CFE E7 01      A              STAB   1,X
00236A 7D00 08                        INX
00237A 7D01 08                        INX
00238A 7D02 7A 0209    A              DEC    TRMCNT
00239A 7D05 26 F5 7CFC                BNE    START3
00240                                 *COMPUTATION
00241A 7D07 B6 3007    A  COMP        LDAA   CPSW
00242A 7D0A 44                        LSRA
00243A 7D0B 25 04 7D11                BCS    COMP1
00244A 7D0D 0F                        SEI
00245A 7D0E 7E 8031    A              JMP    OFFLIN
00246A 7D11 0E            COMP1       CLI
00247A 7D12 84 01      A              ANDA   #1
00248A 7D14 97 19      A              STAA   AUTO
00249A 7D16 D6 0F      A              LDAB   ALLSEN
00250A 7D18 27 ED 7D07               BEQ    COMP
00251A 7D1A 44                        LSRA
00252A 7D1B 25 58 7D75               BCS    COMP3
00253A 7D1D B6 3002    A              LDAA   IADVH
00254A 7D20 BD 81D9    A              JSR    BCDBIN
00255A 7D23 48                        ASLA
00256A 7D24 F6 3003    A              LDAB   IADVL
00257A 7D27 54                        LSRB
00258A 7D28 C1 28      A              CMPB   #$28
00259A 7D2A 2D 01 7D2D                BLT    MALIM
00260A 7D2C 4C                        INCA
00261A 7D2D 81 3C      A  MALIM       CMPA   #60
00262A 7D2F 2F 02 7D33                BLE    COMP2A
00263A 7D31 86 3C      A              LDAA   #60
00264A 7D33 97 1E      A  COMP2A      STAA   DEGADV
00265A 7D35 B6 3001    A              LDAA   MTIMEL
00266A 7D38 BD 81D9    A              JSR    BCDBIN
00267A 7D3B 97 39      A              STAA   TEMP1
00268A 7D3D B6 3000    A              LDAA   MTIMEH
00269A 7D40 BD 81D9    A              JSR    BCDBIN
00270A 7D43 F6 302A    A              LDAB   C100+1
00271A 7D46 BD 81C5    A              JSR    MPY88
00272A 7D49 DB 39      A              ADDB   TEMP1
00273A 7D4B 89 00      A              ADCA   #0
00274A 7D4D 97 39      A              STAA   TEMP1
00275A 7D4F D7 3A      A              STAB   TEMP1+1
00276A 7D51 BD 81B7    A              JSR    DPLSH2
00277A 7D54 DB 3A      A              ADDB   TEMP1+1
00278A 7D56 99 39      A              ADCA   TEMP1
```

PAGE 006  DIESEL

```
00279A 7D58 BD 81BE    A             JSR    DPRSH3
00280A 7D5B C9 00      A             ADCB   #0
00281A 7D5D 89 00      A             ADCA   #0
00282A 7D5F 97 25      A             STAA   METERT
00283A 7D61 D7 26      A             STAB   METERT+1
00284A 7D63 F0 802E    A             SUBB   MAXTIM+1
00285A 7D66 B2 802D    A             SBCA   MAXTIM
00286A 7D69 2D 0A 7D75              BLT    COMP3
00287A 7D6B B6 802D    A             LDAA   MAXTIM
00288A 7D6E F6 802E    A             LDAB   MAXTIM+1
00289A 7D71 97 25      A             STAA   METERT
00290A 7D73 D7 26      A             STAB   METERT+1
00291A 7D75 96 2C      A    COMP3    LDAA   RPMF
00292A 7D77 26 03 7D7C              BNE    COMP6B
00293A 7D79 7E 7E32    A             JMP    COMP6
00294A 7D7C 7F 002C    A    COMP6B   CLR    RPMF
00295A 7D7F CE 0100    A             LDX    #$100
00296A 7D82 96 49      A             LDAA   AVGN
00297A 7D84 97 4A      A             STAA   LOOPN
00298A 7D86 7F 004B    A             CLR    OVCNT
00299A 7D89 4F                       CLRA
00300A 7D8A 5F                       CLRB
00301A 7D8B EB 01      A    ADDUP1   ADDB   1,X
00302A 7D8D A9 00      A             ADCA   0,X
00303A 7D8F 24 03 7D94              BCC    ADDUP2
00304A 7D91 7C 004B    A             INC    OVCNT
00305A 7D94 08              ADDUP2   INX
00306A 7D95 08                       INX
00307A 7D96 7A 004A    A             DEC    LOOPN
00308A 7D99 26 F0 7D8B              BNE    ADDUP1
00309A 7D9B CE 0048    A             LDX    #AVGN-1
00310A 7D9E BD 815E    A             JSR    D1616
00311A 7DA1 97 4C      A             STAA   TMP1
00312A 7DA3 D7 4D      A             STAB   TMP2
00313A 7DA5 78 004B    A             ASL    OVCNT
00314A 7DA8 27 1C 7DC6              BEQ    COMP3C
00315A 7DAA 5F                       CLRB
00316A 7DAB 86 80      A             LDAA   #$80
00317A 7DAD CE 0048    A             LDX    #AVGN-1
00318A 7DB0 BD 815E    A             JSR    D1616
00319A 7DB3 97 4E      A             STAA   TMP3
00320A 7DB5 D7 4F      A             STAB   TMP4
00321A 7DB7 7A 004B    A    COMP3A   DEC    OVCNT
00322A 7DBA 27 06 7DC2              BEQ    COMP3B
00323A 7DBC DB 4F      A             ADDB   TMP4
00324A 7DBE 99 4E      A             ADCA   TMP3
00325A 7DC0 20 F5 7DB7              BRA    COMP3A
00326A 7DC2 DB 4D      A    COMP3B   ADDB   TMP2
00327A 7DC4 99 4C      A             ADCA   TMP1
00328A 7DC6 97 50      A    COMP3C   STAA   AVGTIM
00329A 7DC8 D7 51      A             STAB   AVGTIM+1
00330A 7DCA CE 0050    A             LDX    #AVGTIM
00331A 7DCD 86 FF      A    COMP3F   LDAA   #$FF
00332
00333A 7DCF 16                       TAB
00334A 7DD0 BD 815E    A             JSR    D1616
```

PAGE 007. DIESEL

```
00335A 7DD3 97 39     A           STAA   TEMP1
00336A 7DD5 D7 3A     A           STAB   TEMP1+1
00337A 7DD7 BD 81BC   A           JSR    DPRSH4
00338A 7DDA 97 3B     A           STAA   TEMP2
00339A 7DDC D7 3C     A           STAB   TEMP2+1
00340A 7DDE 96 39     A           LDAA   TEMP1
00341A 7DE0 D6 3A     A           LDAB   TEMP1+1
00342A 7DE2 BD 81B3   A           JSR    DPLSH4
00343A 7DE5 DB 3C     A           ADDB   TEMP2+1
00344A 7DE7 99 3B     A           ADCA   TEMP2
00345A 7DE9 DB 3A     A           ADDB   TEMP1+1
00346A 7DEB 99 39     A           ADCA   TEMP1
00347A 7DED DB 3A     A           ADDB   TEMP1+1
00348A 7DEF 99 39     A           ADCA   TEMP1
00349A 7DF1 DB 3A     A           ADDB   TEMP1+1
00350A 7DF3 99 39     A           ADCA   TEMP1
00351A 7DF5 97 43     A           STAA   TRURPM
00352A 7DF7 D7 44     A           STAB   TRURPM+1
00353A 7DF9 BD 81BC   A           JSR    DPRSH4
00354A 7DFC C9 00     A           ADCB   #0
00355A 7DFE D7 39     A           STAB   TEMP1
00356A 7E00 86 B5     A           LDAA   #$B5
00357A 7E02 BD 81C5   A           JSR    MPY88
00358A 7E05 99 39     A           ADCA   TEMP1
00359A 7E07 97 2B     A           STAA   RPM
00360A 7E09 96 43     A           LDAA   TRURPM
00361A 7E0B D6 44     A           LDAB   TRURPM+1
00362A 7E0D 58                    ASLB
00363A 7E0E 49                    ROLA
00364A 7E0F DB 44     A           ADDB   TRURPM+1
00365A 7E11 99 43     A           ADCA   TRURPM
00366A 7E13 BD 81B7   A           JSR    DPLSH2
00367A 7E16 CE 802F   A           LDX    #C250
00368A 7E19 BD 815E   A           JSR    D1616
00369A 7E1C D7 1C     A           STAB   BP4MS
00370A 7E1E 57                    ASRB
00371A 7E1F 57                    ASRB
00372A 7E20 C9 00     A           ADCB   #0
00373A 7E22 26 01 7E25            BNE    COMP4
00374A 7E24 5C                    INCB
00375A 7E25 D7 1A     A  COMP4    STAB   BP1MS
00376A 7E27 50                    NEGB
00377A 7E28 DB 1C     A           ADDB   BP4MS
00378A 7E2A 57                    ASRB
00379A 7E2B C9 00     A           ADCB   #0
00380A 7E2D 26 01 7E30            BNE    COMP5
00381A 7E2F 5C                    INCB
00382A 7E30 D7 1B     A  COMP5    STAB   BP15MS
00383A 7E32 96 19     A  COMP6    LDAA   AUTO
00384A 7E34 26 03 7E39            BNE    COMP6C
00385A 7E36 7E 7F1B   A           JMP    DBIS
00386A 7E39 96 2B     A  COMP6C   LDAA   RPM
00387A 7E3B D6 2E     A           LDAB   SPEEDC
00388A 7E3D CE 808C   A           LDX    #LODPCT
00389A 7E40 BD 80B0   A           JSR    SURFAZ
00390A 7E43 97 29     A           STAA   PCTLOD
```

PAGE 008 DIESEL

```
00391A 7E45 D7 2A    A           STAB   PCTLOD+1
00392A 7E47 96 2B    A   INTGR   LDAA   RPM
00393A 7E49 81 35    A           CMPA   #$35
00394A 7E4B 22 09 7E56           BHI    INTGR1
00395A 7E4D 7F 0053  A           CLR    ERRBUF
00396A 7E50 7F 0054  A           CLR    ERRBUF+1
00397A 7E53 7E 7EC0  A           JMP    COMP7
00398A 7E56 D6 2E    A   INTGR1  LDAB   SPEEDC
00399A 7E58 86 0B    A           LDAA   #$B
00400A 7E5A BD 81C5  A           JSR    MPY88
00401A 7E5D BD 81BC  A           JSR    DPRSH4
00402A 7E60 CB 40    A           ADDB   #64
00403A 7E62 4F                   CLRA
00404A 7E63 D0 2B    A           SUBB   RPM
00405A 7E65 82 00    A           SBCA   #0
00406A 7E67 DB 54    A   INTGR2  ADDB   ERRBUF+1
00407A 7E69 99 53    A           ADCA   ERRBUF
00408A 7E6B 28 0B 7E78           BVC    INTGR3
00409A 7E6D 25 06 7E75           BCS    INTGR4
00410A 7E6F 86 7F    A           LDAA   #$7F
00411A 7E71 C6 FF    A           LDAB   #$FF
00412A 7E73 20 03 7E78           BRA    INTGR3
00413A 7E75 86 80    A   INTGR4  LDAA   #$80
00414A 7E77 5F                   CLRB
00415A 7E78 97 53    A   INTGR3  STAA   ERRBUF
00416A 7E7A D7 54    A           STAB   ERRBUF+1
00417A 7E7C 7D 0053  A           TST    ERRBUF
00418A 7E7F 2C 06 7E87           BGE    INTGR8
00419A 7E81 43                   COMA
00420A 7E82 53                   COMB
00421A 7E83 CB 01    A           ADDB   #1
00422A 7E85 89 00    A           ADCA   #0
00423A 7E87 97 37    A   INTGR8  STAA   STEMP5
00424A 7E89 86 08    A           LDAA   #$8
00425A 7E8B 97 1D    A           STAA   COUNTR
00426A 7E8D 96 55    A           LDAA   KGAIN
00427A 7E8F 97 30    A           STAA   STEMP1+1
00428A 7E91 96 37    A           LDAA   STEMP5
00429A 7E93 BD 8143  A           JSR    MULT
00430A 7E96 4D              INTG8A TSTA
00431A 7E97 2A 04 7E9D          BPL    INTG8B
00432A 7E99 86 7F    A           LDAA   #$7F
00433A 7E9B C6 FF    A           LDAB   #$FF
00434A 7E9D 7D 0053  A   INTG8B  TST    ERRBUF
00435A 7EA0 2A 06 7EA8  INTG8C  BPL    INTGR5
00436A 7EA2 43                   COMA
00437A 7EA3 53                   COMB
00438A 7EA4 CB 01    A           ADDB   #1
00439A 7EA6 89 00    A           ADCA   #0
00440A 7EA8 DB 2A    A   INTGR5  ADDB   PCTLOD+1
00441A 7EAA 99 29    A           ADCA   PCTLOD
00442A 7EAC 28 0A 7EB8          BVC    INTGR6
00443A 7EAE 25 06 7EB6          BCS    INTGR7
00444A 7EB0 86 02    A           LDAA   #2
00445A 7EB2 C6 71    A           LDAB   #$71
00446A 7EB4 20 02 7EB8          BRA    INTGR6
```

```
00447A 7EB6 4F              INTGR7 CLRA
00448A 7EB7 5F                     CLRB
00449A 7EB8 97 29     A      INTGR6 STAA   PCTLOD
00450A 7EBA D7 2A     A             STAB   PCTLOD+1
00451A 7EBC D6 24     A             LDAB   MAP
00452A 7EBE D7 23     A             STAB   MAD
00453A 7EC0 96 2B     A      COMP7  LDAA   RPM
00454A 7EC2 81 0A     A             CMPA   #$A
00455A 7EC4 23 05 7ECB               BLS   STZRO
00456A 7EC6 CE 3095   A             LDX    #FUELQT
00457A 7EC9 20 04 7ECF               BRA   COMP7A
00458A 7ECB 4F               STZRO  CLRA
00459A 7ECC 5F                      CLRB
00460A 7ECD 20 17 7EE6               BRA   COMP9
00461A 7ECF BD 80B0   A      COMP7A JSR    SURFAZ
00462A 7ED2 97 21     A             STAA   FUEL
00463A 7ED4 D7 22     A             STAB   FUEL+1
00464A 7ED6 D0 2A     A             SUBB   PCTLOD+1
00465A 7ED8 92 29     A             SBCA   PCTLOD
00466A 7EDA 2D 06 7EE2               BLT   COMP8
00467A 7EDC 96 29     A             LDAA   PCTLOD
00468A 7EDE D6 2A     A             LDAB   PCTLOD+1
00469A 7EE0 20 04 7EE6               BRA   COMP9
00470A 7EE2 96 21     A      COMP8  LDAA   FUEL
00471A 7EE4 D6 22     A             LDAB   FUEL+1
00472A 7EE6 97 25     A      COMP9  STAA   METERT
00473A 7EE8 D7 26     A             STAB   METERT+1
00474A 7EEA BD 81C0   A             JSR    DPRSH2
00475A 7EED C9 00     A             ADCB   #0
00476A 7EEF 86 D2     A             LDAA   #$D2
00477A 7EF1 BD 81C5   A             JSR    MPY88
00478A 7EF4 58                      ASLB
00479A 7EF5 49                      ROLA
00480A 7EF6 16                      TAB
00481A 7EF7 96 2B     A             LDAA   RPM
00482A 7EF9 CE 809E   A             LDX    #ADVTAB
00483A 7EFC BD 80B0   A             JSR    SURFAZ
00484A 7EFF D7 41     A             STAB   THETA
00485A 7F01 96 2B     A      STRADV LDAA   RPM
00486A 7F03 81 3F     A             CMPA   #$3F
00487A 7F05 22 05 7F0C               BHI   COMP9A
00488A 7F07 96 0E     A             LDAA   AIRTMP
00489A 7F09 5F                      CLRB
00490A 7F0A 20 03 7F0F               BRA   COMP9B
00491A 7F0C 5F               COMP9A CLRB
00492A 7F0D 20 06 7F15               BRA   COMP9C
00493A 7F0F CE 80A7   A      COMP9B LDX    #TEMPT
00494A 7F12 BD 80B0   A             JSR    SURFAZ
00495A 7F15 D7 42     A      COMP9C STAB   THETAT
00496A 7F17 DB 41     A             ADDB   THETA
00497A 7F19 D7 1E     A             STAB   DEGADV
00498A 7F1B 96 1E     A      DBIS   LDAA   DEGADV
00499A 7F1D 9B 1B     A             ADDA   BP15MS
00500A 7F1F 81 5A     A      DALIM  CMPA   #90
00501A 7F21 2D 07 7F2A               BLT   CMP10A
00502A 7F23 86 59     A             LDAA   #89
```

PAGE 010   DIESEL

```
00503A 7F25 16                         TAB
00504A 7F26 D0 1B      A               SUBB    BP15MS
00505A 7F28 D7 1E      A               STAB    DEGADV
00506A 7F2A 97 3D      A  CMP10A       STAA    TEMP3
00507A 7F2C 86 06      A  TRIM         LDAA    #6
00508A 7F2E B7 0209    A               STAA    TRMCNT
00509A 7F31 CE 0219    A               LDX     #MTRBUF
00510A 7F34 FF 020B    A               STX     TMBA
00511A 7F37 CE 0300    A               LDX     #TRMTBL
00512A 7F3A A6 00      A  TRMLP        LDAA    0,X
00513A 7F3C 97 30      A               STAA    STEMP1+1
00514A 7F3E 86 08      A               LDAA    #8
00515A 7F40 97 1D      A               STAA    COUNTR
00516A 7F42 96 25      A               LDAA    METERT
00517A 7F44 D6 26      A               LDAB    METERT+1
00518A 7F46 58                         ASLB
00519A 7F47 49                         ROLA
00520A 7F48 BD 8143   A                JSR     MULT
00521A 7F4B 6D 01     A                TST     1,X
00522A 7F4D 2C 06 7F55                 BGE     TRIM1
00523A 7F4F EB 01     A                ADDB    1,X
00524A 7F51 89 FF     A                ADCA    #$FF
00525A 7F53 20 04 7F59                 BRA     TRIM2
00526A 7F55 EB 01     A  TRIM1         ADDB    1,X
00527A 7F57 89 00     A                ADCA    #0
00528A 7F59 FF 0314   A  TRIM2         STX     TTTP
00529A 7F5C FE 020B   A                LDX     TMBA
00530A 7F5F A7 02     A                STAA    2,X
00531A 7F61 E7 03     A                STAB    3,X
00532A 7F63 BD 81B3   A  COMPMN        JSR     DPLSH4
00533A 7F66 BD 81B7   A                JSR     DPLSH2
00534A 7F69 CE 0050   A                LDX     #AVGTIM
00535A 7F6C BD 815E   A                JSR     D1616
00536A 7F6F 86 0F     A                LDAA    #$F
00537A 7F71 BD 81C5   A                JSR     MPY88
00538A 7F74 BD 81C0   A                JSR     DPRSH2
00539A 7F77 C9 00     A                ADCB    #0
00540A 7F79 89 00     A                ADCA    #0
00541A 7F7B 97 39     A                STAA    TEMP1
00542A 7F7D D7 3A     A  DBMS          STAB    TEMP1+1
00543A 7F7F 86 02     A                LDAA    #2
00544A 7F81 C6 D0     A                LDAB    #$D0
00545A 7F83 D0 3A     A                SUBB    TEMP1+1
00546A 7F85 92 39     A                SBCA    TEMP1
00547A 7F87 D0 3D     A                SUBB    TEMP3
00548A 7F89 82 00     A                SBCA    #0
00549A 7F8B FE 020B   A                LDX     TMBA
00550A 7F8E A7 00     A                STAA    0,X
00551A 7F90 E7 01     A                STAB    1,X
00552A 7F92 08                         INX
00553A 7F93 08                         INX
00554A 7F94 08                         INX
00555A 7F95 08                         INX
00556A 7F96 FF 020B   A                STX     TMBA
00557A 7F99 FE 0314   A                LDX     TTTP
00558A 7F9C 08                         INX
```

```
00559A 7F9D 08                          INX
00560A 7F9E 7A 0209   A                 DEC    TRMCNT
00561A 7FA1 26 97 7F3A                  BNE    TRMLP
00562A 7FA3 96 1A     A                 LDAA   BP1MS
00563A 7FA5 97 07     A                 STAA   ARMMOF+1
00564A 7FA7 B7 0207   A                 STAA   ARMOF1+1
00565A 7FAA B7 0217   A                 STAA   ARMOF2+1
00566A 7FAD 96 04     A                 LDAA   ARMMON
00567A 7FAF 2E 14 7FC5                  BGT    DISPLY
00568A 7FB1 86 B0     A                 LDAA   #$B0
00569A 7FB3 97 04     A                 STAA   ARMMON
00570A 7FB5 B7 0204   A                 STAA   ARMON1
00571A 7FB8 B7 0214   A                 STAA   ARMON2
00572A 7FBB 86 C0     A                 LDAA   #$C0
00573A 7FBD 97 06     A                 STAA   ARMMOF
00574A 7FBF B7 0206   A                 STAA   ARMOF1
00575A 7FC2 B7 0216   A                 STAA   ARMOF2
00576A 7FC5 5F            DISPLY        CLRB
00577A 7FC6 96 1E     A                 LDAA   DEGADV
00578A 7FC8 44                          LSRA
00579A 7FC9 24 02 7FCD                  BCC    COMP12
00580A 7FCB CB 50     A                 ADDB   #$50
00581A 7FCD F7 3003   A   COMP12        STAB   IADVL
00582A 7FD0 5F                          CLRB
00583A 7FD1 80 0A     A   COMP13        SUBA   #10
00584A 7FD3 25 03 7FD8                  BCS    COMP14
00585A 7FD5 5C                          INCB
00586A 7FD6 20 F9 7FD1                  BRA    COMP13
00587A 7FD8 8B 0A     A   COMP14        ADDA   #10
00588A 7FDA 58                          ASLB
00589A 7FDB 58                          ASLB
00590A 7FDC 58                          ASLB
00591A 7FDD 58                          ASLB
00592A 7FDE 1B                          ABA
00593A 7FDF B7 3002   A                 STAA   IADVH
00594A 7FE2 96 25     A                 LDAA   METERT
00595A 7FE4 D6 26     A                 LDAB   METERT+1
00596A 7FE6 BD 31B3   A                 JSR    DPLSH4
00597A 7FE9 CE 3025   A                 LDX    #K10
00598A 7FEC 7F 0039   A   COMP15        CLR    TEMP1
00599A 7FEF E0 01     A   COMP16        SUBB   1,X
00600A 7FF1 A2 00     A                 SBCA   0,X
00601A 7FF3 25 05 7FFA                  BCS    COMP17
00602A 7FF5 7C 0039   A                 INC    TEMP1
00603A 7FF8 20 F5 7FEF                  BRA    COMP16
00604A 7FFA EB 01     A   COMP17        ADDB   1,X
00605A 7FFC A9 00     A                 ADCA   0,X
00606A 7FFE 97 3B     A                 STAA   TEMP2
00607A 8000 96 39     A                 LDAA   TEMP1
00608A 8002 36                          PSHA
00609A 8003 96 3B     A                 LDAA   TEMP2
00610A 8005 08                          INX
00611A 8006 08                          INX
00612A 8007 8C 802D   A                 CPX    #K10+8
00613A 800A 26 E0 7FEC                  BNE    COMP15
00614A 800C 33                          PULB
```

PAGE 012    DIESEL

```
00615A 800D 32                         PULA
00616A 800E BD 81E6    A               JSR     COMBIN
00617A 8011 B7 3001    A               STAA    MTIMEL
00618A 8014 33                         PULB
00619A 8015 32                         PULA
00620A 8016 BD 81E6    A               JSR     COMBIN
00621A 8019 B7 3000    A               STAA    MTIMEH
00622A 801C BD 81EC    A               JSR     RADDSW
00623A 801F BD 81F7    A               JSR     ADDATA
00624A 8022 7E 7D07    A               JMP     COMP
00625A 8025    2710    A K10           FDB     10000
00626A 8027    03E8    A               FDB     1000
00627A 8029    0064    A C100          FDB     100
00628A 802B    000A    A               FDB     10
00629A 802D    0271    A MAXTIM        FDB     625
00630A 802F    00FA    A C250          FDB     250
00631A 8031 B6 300F    A OFFLIN        LDAA    DPSW
00632A 8034 84 3F      A               ANDA    #$3F
00633A 8036 26 05 803D                 BNE     OFFL2
00634A 8038 97 2D      A               STAA    SERVED
00635A 803A 7E 7D07    A OFFL1         JMP     COMP
00636A 803D CE 03E8    A OFFL2         LDX     #1000
00637A 8040 09           OFFL3         DEX
00638A 8041 26 FD 8040                 BNE     OFFL3
00639A 8043 B6 300F    A               LDAA    DPSW
00640A 8046 84 3F      A               ANDA    #$3F
00641A 8048 27 F0 803A                 BEQ     OFFL1
00642A 804A D6 2D      A               LDAB    SERVED
00643A 804C 26 EC 803A                 BNE     OFFL1
00644A 804E 97 2D      A               STAA    SERVED
00645A 8050 44                         LSRA
00646A 8051 24 03 8056                 BCC     OFFL4
00647A 8053 7E 7CC0    A               JMP     START
00648A 8056 47           OFFL4         ASRA
00649A 8057 24 07 8060                 BCC     OFFL5
00650A 8059 BD 81EC    A               JSR     RADDSW
00651A 805C DE 27      A               LDX     PANLAD
00652A 805E 6E 00      A               JMP     0,X
00653A 8060 47           OFFL5         ASRA
00654A 8061 24 05 8068                 BCC     OFFL6
00655A 8063 BD 81EC    A               JSR     RADDSW
00656A 8066 20 1E 8086                 BRA     OFFL10
00657A 8068 47           OFFL6         ASRA
00658A 8069 24 07 8072                 BCC     OFFL7
00659A 806B DE 27      A               LDX     PANLAD
00660A 806D 08                         INX
00661A 806E DF 27      A               STX     PANLAD
00662A 8070 20 14 8086                 BRA     OFFL10
00663A 8072 47           OFFL7         ASRA
00664A 8073 24 05 807A                 BCC     OFFL8
00665A 8075 BD 81EC    A               JSR     RADDSW
00666A 8078 20 05 807F                 BRA     OFFL9
00667A 807A DE 27      A OFFL8         LDX     PANLAD
00668A 807C 08                         INX
00669A 807D DF 27      A               STX     PANLAD
00670A 807F DE 27      A OFFL9         LDX     PANLAD
```

PAGE 013  DIESEL

```
00671A 8081 B6 300E    A          LDAA   DATASW
00672A 8084 A7 00      A          STAA   0,X
00673A 8086 BD 81F7    A OFFL10   JSR    ADDATA
00674A 8089 7E 7D07    A          JMP    COMP
00675A 808C    0F      A LODPCT   FCB    $F
00676A 808D    F0      A          FCB    $F0
00677A 808E    E0      A          FCB    $E0
00678A 808F    00      A          FCB    0
00679A 8090    FC00    A          FDB    PCENTL
00680A 8092    22      A          FCB    $22
00681A 8093    04      A          FCB    4
00682A 8094    05      A          FCB    5
00683A 8095    0F      A FUELQT   FCB    $F
00684A 8096    F0      A          FCB    $F0
00685A 8097    E0      A          FCB    $E0
00686A 8098    00      A          FCB    0
00687A 8099    FD32    A          FDB    FUELQ
00688A 809B    22      A          FCB    $22
00689A 809C    04      A          FCB    4
00690A 809D    05      A          FCB    5
00691A 809E    1F      A ADVTAB   FCB    $1F
00692A 809F    E0      A          FCB    $E0
00693A 80A0    F0      A          FCB    $F0
00694A 80A1    00      A          FCB    0
00695A 80A2    FE64    A          FDB    ADVTBL
00696A 80A4    12      A          FCB    $12
00697A 80A5    05      A          FCB    5
00698A 80A6    04      A          FCB    4
00699A 80A7    1F      A TEMPT    FCB    $1F
00700A 80A8    E0      A          FCB    $E0
00701A 80A9    F0      A          FCB    $F0
00702A 80AA    00      A          FCB    0
00703A 80AB    FF96    A          FDB    TEMPTB
00704A 80AD    00      A          FCB    0
00705A 80AE    05      A          FCB    5
00706A 80AF    00      A          FCB    0
00707                             *SURFACE
00708                             *INTERPOLATION
00709A 80B0 D7 2F      A SURFAZ   STAB   STEMP1
00710A 80B2 D7 35      A          STAB   STEMP4
00711A 80B4 16                    TAB
00712A 80B5 A4 00      A          ANDA   0,X
00713A 80B7 97 30      A          STAA   STEMP1+1
00714A 80B9 97 36      A          STAA   STEMP4+1
00715A 80BB E4 01      A          ANDB   1,X
00716A 80BD A6 00      A          LDAA   0,X
00717A 80BF 54           SURF1    LSRB
00718A 80C0 44                    LSRA
00719A 80C1 26 FC 80BF          BNE    SURF1
00720A 80C3 D7 31      A          STAB   STEMP2
00721A 80C5 D6 2F      A          LDAB   STEMP1
00722A 80C7 A6 02      A          LDAA   2,X
00723A 80C9 43                    COMA
00724A 80CA 54           SURF2    LSRB
00725A 80CB 44                    LSRA
00726A 80CC 26 FC 80CA          BNE    SURF2
```

PAGE 014  DIESEL

```
00727A 30CE 17                        TBA
00728A 30CF 9B 31      A              ADDA   STEMP2
00729A 30D1 97 31      A              STAA   STEMP2
00730A 30D3 A6 01      A              LDAA   1,X
00731A 30D5 58              SURF2A    ASLB
00732A 30D6 48                        ASLA
00733A 30D7 26 FC 30D5                BNE    SURF2A
00734A 30D9 DB 31      A              ADDB   STEMP2
00735A 30DB 89 00      A              ADCA   #0
00736A 30DD 58                        ASLB
00737A 30DE 49                        ROLA
00738A 30DF EB 05      A              ADDB   5,X
00739A 30E1 A9 04      A              ADCA   4,X
00740A 30E3 97 0A      A              STAA   AIJ
00741A 30E5 D7 0B      A              STAB   AIJ+1
00742A 30E7 EB 06      A              ADDB   6,X
00743A 30E9 89 00      A              ADCA   #0
00744A 30EB 97 0C      A              STAA   AIJ1
00745A 30ED D7 0D      A              STAB   AIJ1+1
00746A 30EF A6 07      A              LDAA   7,X
00747A 30F1 97 1D      A              STAA   COUNTR
00748A 30F3 DF 31      A              STX    STEMP2
00749A 30F5 DE 0A      A              LDX    AIJ
00750A 30F7 BD 3133    A              JSR    INTERP
00751A 30FA 7D 0035    A              TST    STEMP4
00752A 30FD 27 33 3132                BEQ    SURF4
00753A 30FF 97 33      A              STAA   STEMP3
00754A 3101 D7 34      A              STAB   STEMP3+1
00755A 3103 DE 31      A              LDX    STEMP2
00756A 3105 96 36      A              LDAA   STEMP4+1
00757A 3107 97 30      A              STAA   STEMP1+1
00758A 3109 A6 07      A              LDAA   7,X
00759A 310B 97 1D      A              STAA   COUNTR
00760A 310D DE 0C      A              LDX    AIJ1
00761A 310F BD 3133    A              JSR    INTERP
00762A 3112 DE 31      A              LDX    STEMP2
00763A 3114 D0 34      A              SUBB   STEMP3+1
00764A 3116 92 33      A              SBCA   STEMP3
00765A 3118 97 35      A              STAA   STEMP4
00766A 311A D7 36      A              STAB   STEMP4+1
00767A 311C A6 08      A              LDAA   8,X
00768A 311E 97 1D      A              STAA   COUNTR
00769A 3120 A6 02      A              LDAA   2,X
00770A 3122 43                        COMA
00771A 3123 94 2F      A              ANDA   STEMP1
00772A 3125 97 30      A              STAA   STEMP1+1
00773A 3127 96 35      A              LDAA   STEMP4
00774A 3129 D6 36      A              LDAB   STEMP4+1
00775A 312B BD 3143    A              JSR    MULT
00776A 312E DB 34      A              ADDB   STEMP3+1
00777A 3130 99 33      A              ADCA   STEMP3
00778A 3132 39              SURF4     RTS
00779                                 *LINEAR
00780                                 *INTERPOLATION
00781A 3133 A6 02      A    INTERP    LDAA   2,X
00782A 3135 E6 03      A              LDAB   3,X
```

```
PAGE   015   DIESEL 00783A 8137 E0 01      A             SUBB    1,X
00784A 8139 A2 00      A             SBCA    0,X
00785A 813B BD 8143    A             JSR     MULT
00786A 813E EB 01      A             ADDB    1,X
00787A 8140 A9 00      A             ADCA    0,X
00788A 8142 39                       RTS
00789                           *16 X 8
00790                           *MULTIPLY
00791A 8143 97 37      A MULT        STAA    STEMP5
00792A 8145 D7 38      A             STAB    STEMP5+1
00793A 8147 4F                       CLRA
00794A 8148 5F                       CLRB
00795A 8149 76 0030   A MULT1        ROR     STEMP1+1
00796A 814C 24 04 8152              BCC     MULT2
00797A 814E DB 38      A             ADDB    STEMP5+1
00798A 8150 99 37      A             ADCA    STEMP5
00799A 8152 47            MULT2      ASRA
00800A 8153 56                       RORB
00801A 8154 7A 001D    A             DEC     COUNTR
00802A 8157 26 F0 8149              BNE     MULT1
00803A 8159 C9 00      A             ADCB    #0
00804A 815B 89 00      A             ADCA    #0
00805A 815D 39                       RTS
00806                           *16 X16
00807                           *DIVIDE
00808A 815E 37            D1616      PSHB
00809A 815F 36                       PSHA
00810A 8160 A6 00      A             LDAA    0,X
00811A 8162 E6 01      A             LDAB    1,X
00812A 8164 37                       PSHB
00813A 8165 36                       PSHA
00814A 8166 34                       DES
00815A 8167 30                       TSX
00816A 8168 86 01      A             LDAA    #1
00817A 816A 6D 01      A             TST     1,X
00818A 816C 2B 0B 8179              BMI     D1616B
00819A 816E 4C            D1616A     INCA
00820A 816F 68 02      A             ASL     2,X
00821A 8171 69 01      A             ROL     1,X
00822A 8173 2B 04 8179              BMI     D1616B
00823A 8175 81 11      A             CMPA    #17
00824A 8177 26 F5 816E              BNE     D1616A
00825A 8179 A7 00      A D1616B      STAA    0,X
00826A 817B A6 03      A             LDAA    3,X
00827A 817D E6 04      A             LDAB    4,X
00828A 817F 6F 03      A             CLR     3,X
00829A 8181 6F 04      A             CLR     4,X
00830A 8183 E0 02      A D1616C      SUBB    2,X
00831A 8185 A2 01      A             SBCA    1,X
00832A 8187 24 07 8190              BCC     D1616D
00833A 8189 EB 02      A             ADDB    2,X
00834A 818B A9 01      A             ADCA    1,X
00835A 818D 0C                       CLC
00836A 818E 20 01 8191              BRA     D1616E
00837A 8190 0D            D1616D     SEC
00838A 8191 69 04      A D1616E     ROL     4,X
```

```
PAGE  016    DIESEL 00339A 8193 69 03    A              ROL    3,X
00340A 8195 64 01    A              LSR    1,X
00341A 8197 66 02    A              ROR    2,X
00342A 8199 6A 00    A              DEC    0,X
00343A 819B 26 E6 8183             BNE    D1616C
00344A 819D 31                      INS
00345A 819E 31                      INS
00346A 819F 31                      INS
00347A 81A0 7F 003F  A              CLR    TEMP4
00348A 81A3 E2 02    A              SBCB   2,X
00349A 81A5 A2 01    A              SBCA   1,X
00350A 81A7 2D 03 81AC              BLT    D1616F
00351A 81A9 7C 003F  A              INC    TEMP4
00352A 81AC 32           D1616F    PULA
00353A 81AD 33                      PULB
00354A 81AE DB 3F    A              ADDB   TEMP4
00355A 81B0 89 00    A              ADCA   #0
00356A 81B2 39                      RTS
00357A 81B3 58           DPLSH4    ASLB
00358A 81B4 49                      ROLA
00359A 81B5 58           DPLSH3    ASLB
00360A 81B6 49                      ROLA
00361A 81B7 58           DPLSH2    ASLB
00362A 81B8 49                      ROLA
00363A 81B9 58                      ASLB
00364A 81BA 49                      ROLA
00365A 81BB 39                      RTS
00366A 81BC 44           DPRSH4    LSRA
00367A 81BD 56                      RORB
00368A 81BE 44           DPRSH3    LSRA
00369A 81BF 56                      RORB
00370A 81C0 44           DPRSH2    LSRA
00371A 81C1 56                      RORB
00372A 81C2 44                      LSRA
00373A 81C3 56                      RORB
00374A 81C4 39                      RTS
00375                               *8 X 8
00376                               *MULTIPLY
00377A 81C5 36           MPY88     PSHA
00378A 81C6 86 08    A              LDAA   #8
00379A 81C8 36                      PSHA
00380A 81C9 30                      TSX
00381A 81CA 4F                      CLRA
00382A 81CB 56                      RORB
00383A 81CC 24 02 81D0 MPY88A    BCC    MPY88B
00384A 81CE AB 01    A              ADDA   1,X
00385A 81D0 46           MPY88B    RORA
00386A 81D1 56                      RORB
00387A 81D2 6A 00    A              DEC    0,X
00388A 81D4 26 F6 81CC             BNE    MPY88A
00389A 81D7 31                      INS
00390A 81D8 31                      INS
00391A 81D9 39                      RTS
00392A 81DA 16           BCDBIN    TAB
00393A 81DB C4 0F    A              ANDB   #$F
00394A 81DD 84 F0    A              ANDA   #$F0
```

```
00895A 81DC  4                        LSRA
00896A 81DF  6                        PSHA
00897A 81E0  B                        ABA
00898A 81E1  3                        PULB
00899A 81E2  4                        LSRB
00900A 81E3  4                        LSRB
00901A 81E4  1B                       ABA
00902A 81E5  9                        RTS
00903A 81E6  48         COMBIN        ASLA
00904A 81E7  48                       ASLA
00905A 81E8  48                       ASLA
00906A 81E9  48                       ASLA
00907A 81EA  1B                       ABA
00908A 81EB  39                       RTS
00909A 81EC  86 300C  A  RADDSW LDAA  ADDSWH
00910A 81EF  F6 300D  A         LDAB  ADDSWL
00911A 81F2  97 27    A         STAA  PANLAD
00912A 81F4  D7 28    A         STAB  PANLAD+1
00913A 81F6  39                       RTS
00914A 81F7  DE 27    A  ADDATA LDX   PANLAD
00915A 81F9  A6 00    A         LDAA  0,X
00916A 81FB  B7 300E  A         STAA  DATASW
00917A 81FE  96 27    A         LDAA  PANLAD
00918A 8200  D6 28    A         LDAB  PANLAD+1
00919A 8202  B7 300C  A         STAA  ADDSWH
00920A 8205  F7 300D  A         STAB  ADDSWL
00921A 8208  39                       RTS
00922A 8209       0229  A  PTRTBL FDB  MTRBUF+16
00923A 820B       022F  A         FDB  MTRBUF+22
00924A 820D       0000  A         FDB  METRON
00925A 820F       021D  A         FDB  MTRBUF+4
00926A 8211       021B  A         FDB  MTRBUF+2
00927A 8213       0200  A         FDB  MTRON1
00928A 8215       0000  A         FDB  0
00929A 8217       0000  A         FDB  0
00930A 8219       0000  A         FDB  0
00931A 821B       0225  A         FDB  MTRBUF+12
00932A 821D       0223  A         FDB  MTRBUF+10
00933A 821F       0210  A         FDB  MTRON2
00934A 8221       0221  A         FDB  MTRBUF+8
00935A 8223       0227  A         FDB  MTRBUF+14
00936A 8225       0210  A         FDB  MTRON2
00937A 8227       0000  A         FDB  0
00938A 8229       0000  A         FDB  0
00939A 822B       0000  A         FDB  0
00940A 822D       0219  A         FDB  MTRBUF
00941A 822F       021F  A         FDB  MTRBUF+6
00942A 8231       0200  A         FDB  MTRON1
00943A 8233       022D  A         FDB  MTRBUF+20
00944A 8235       022B  A         FDB  MTRBUF+18
00945A 8237       0000  A         FDB  METRON
00946A FC00                            ORG   $FC00
01417A FFF8       7C00  A  INTREQ FDB  INTRPT
01418A FFFA       7C00  A  SWINT  FDB  INTRPT
01419A FFFC       7C00  A  NMINT  FDB  INTRPT
01420A FFFE       7CC0  A  POWRUP FDB  START
```

The embodiments of the invention in which an exclusive property or privilege is claimed are defined as follows:

1. In the operation of an internal combustion engine having at least one cylinder and means for delivering a quantity of fuel to the at least one cylinder in response to a control signal, the method of generating the control signal controlling the quantity of fuel to be delivered to the cylinder comprising the steps of:

generating an actual speed signal indicative of the engine's actual speed;

generating a commanded speed signal indicative of the engine's commanded speed;

integrating the difference between the actual engine speed signal and the commanded speed signal to generate an integral fuel quantity signal indicative of the engines fuel requirements;

generating from said actual speed signal and said commanded speed signal a proportional fuel quantity signal indicative of the fuel needed to bring the actual engine speed into agreement with the commanded engine speed;

summing said integral fuel quantity signal with said proportional fuel quantity signal to generate a percent load signal;

generating an air quantity signal indicative of the quantity of air being supplied to the engine;

generating from said air quantity signal a full load signal indicative of the maximum quantity of fuel to be delivered as a function of the quantity of air being delivered to the engine;

selecting from between said percent load signal and said full load signal, the signal having the lowest value to generate a fuel quantity signal, indicative of the quantity of fuel to be delivered to the engine; and activating the means for delivering a quantity of fuel with said fuel quantity signal to deliver to the engine a quantity of fuel corresponding to the value of said fuel quantity signal;

wherein the control signal comprises at least said fuel quantity signal.

2. The method of claim 1 wherein step of generating said proportional fuel quantity signal comprises the steps of:

storing in a proportional fuel quantity schedule memory a plurality of discrete values for said proportional fuel quantity signal corresponding to discrete values of said actual speed and commanded speed signals; and interrogating said proportional fuel quantity schedule memory with said actual speed and commanded speed signals to output a value of said proportional fuel quantity signal corresponding to the values of said actual speed and commanded speed signals.

3. The method of claim 1 wherein said step of generating an air quantity signal includes the step of generating an air pressure signal indicative of the air pressure in the engines air intake manifold, wherein the air quantity being supplied to the engine is a function of said actual speed signal and said air pressure signal.

4. The method of claim 3 wherein step of generating a full load signal comprises the steps of:

storing in a full load schedule memory a plurality of discrete values of said full load signal corresponding to discrete values of said actual speed signal and said air pressure signal; and interrogating said full load schedule memory with said actual speed and air pressure signals to output a value of said full load signal corresponding to the values of said actual speed and air pressure signals.

5. The method of claim 3 wherein said step of generating an air quantity signal further includes the steps of:

generating an air temperature signal indicative of the temperature of the air in the engine's air intake manifold;

dividing said air pressure signal by said air temperature signal to generate an air density signal wherein the air quantity being supplied to the engine is a function of said actual speed signal and said air density signal.

6. The method of claim 3 wherein said step of generating a full load signal includes storing in a full load schedule memory a plurality of discrete values of said full load signal corresponding to discrete values of said actual speed signal and said air density signal; and interrogating said full load schedule memory with said actual speed and air density signals to output the corresponding discrete value of said full load signal.

7. The method of claim 1 wherein said step of generating a proportional fuel quantity signal comprises the steps of:

storing in a proportion fuel quantity schedule memory a plurality of discrete values of said proportional fuel quantity signal corresponding to discrete values of said actual and commanded speed signals; and interrogating said proportional fuel quantity schedule memory with said actual and commanded speed signals to output a value of said proportional fuel quantity signal corresponding to the values of said actual and commanded speed signals; and wherein said step of generating an air quantity signal includes the step of generating an air pressure signal indicative of the air pressure in the engine's air intake manifold wherein said air quantity signal is a function of said air pressure signal and said actual speed signal; and wherein said step of generating a full load signal comprises the steps of:

storing in a full load schedule memory a plurality of discrete values of said full load signal corresponding to discrete values of said actual speed signal and said air pressure signal; and interrogating said full load schedule memory with said actual speed signal and said air pressure signal to output a value of said full load signal corresponding to the values of actual speed and said air pressure signals.

8. The method of claim 7 wherein said step of generating n air quantity signal further includes the steps of:

generating an air temperature signal indicative of the temperature of the air in the engine's air intake manifold; and dividing said air pressure signal by said air temperature signal to generate an air density signal; and wherein said step of storing in said full load schedule memory stores said plurality of discrete full load signals corresponding to discrete values of said actual speed signal and said air density signal; and wherein said step of interrogating said full load schedule memory is interrogated by said actual speed signal and said air density signal to output said value of said full load signal corresponding to the values of said actual speed and air density signals.

9. The method of claim 1 or 7 wherein said at least one cylinder includes a piston and a rotable member rotably connected to the piston said method further includes the steps of:
generating a reference signal indicative of an angular position of said rotable member when said piston is in a predetermined position;
generating from said fuel quantity signal and said actual speed signal an injection advance signal indicative of an angle of said rotable member in advance of said reference signal at which the fuel is to be injected into said cylinder by said means for delivering a quantity of fuel; and
combining said injection advance signal with said reference signal to generate an injection signal; and
wherein said control signal comprises said fuel quantity signal and said injection signal.

10. The method of claim 9 wherein said step of generating an injection advance signal comprises the steps of:
storing in an injection advance schedule memory a plurality of discrete values for the injection advance signal corresponding to discrete values of said fuel quantity signal and said actual speed signal;
interrogating said injection advance schedule memory with said fuel quantity signal and said actual speed signal to output the corresponding injection advance signal.

11. The method of claim 10 wherein said step of generating an injection advance signal further includes the steps of:
generating an air temperature signal indicative of the temperature of the air in the engine's air intake manifold;
generating a correction advance signal having a value which is a function of said air temperature signal when said air temperature signal is indicative of a temperature below a predetermined value; and
summing said injection advance signal with said correction advance signal to generate an injection advance signal corrected for the air temperature.

12. The method of claim 8 wherein said at least one cylinder further includes a piston and a rotable member rotably connected to the piston said method further includes the steps of:
generating a reference signal indicative of an angular position of said rotable member when said piston is in a predetermined position;
storing in an injection advance schedule memory a plurality of discrete values for an injection advance signal corresponding to discrete values of said fuel quantity signal and said actual speed signal; and
interrogating said injection advance schedule memory with said fuel quantity signal and said actual speed signal to output said corresponding injection advance signal; and
combining said injection advance signal with said reference signal to generate and injection signal; and
wherein said control signal comprises said fuel quantity signal and said injection signal.

13. The method of claim 12 further including the steps of:
generating a correction advance signal having a value which is a function of said air temperature when said air temperature signal is indicative of a temperature below a predetermined temperature; and
summing said injection advance signal with said correction advance signal to generate an injection advance signal corrected for the air temperature.

14. The method of claims 9 or 13 wherein said means for delivering a quantity of fuel includes a first means for metering a quantity of fuel corresponding to said fuel quantity signal and second means for injecting the metered quantity of fuel into the cylinder in response to said injection signal, said method includes the steps of:
activating said first means with said fuel quantity signal to meter a quantity of fuel into said means for delivering corresponding to the value of said fuel quantity signal; and
activating said second means to inject said metered quantity of fuel into said cylinder in response to said injection signal.

15. An electronic control system for controlling the delivery of fuel to a compression ignition engine having plural cylinders, a crankshaft, air intake means for the cylinders, an injector for each cylinder for delivering the fuel to the cylinders sequentially, and a manual speed control means, said electronic control system comprising:
programmable logic means adapted to be operated under the control of a stored program,
memory means operatively coupled with the logic means and including first, second and third registers and including a first, second and third memory parts,
a computation program stored in said first memory part and being adapted to control said logic means,
first means including a first sensor adapted to be operatively coupled with the crankshaft for generating an actual speed signal and for storing it in the first register,
second means including a second sensor adapted to be coupled with said manual speed control means for generating a commanded speed signal and for storing it in the second register,
said second memory part containing a first set of data which defines a functional relationship representing a percent load fuel quantity signal for each different set of correlated values of actual speed signal and commanded speed signal,
said logic means being operatively coupled, under the control of said computation program, to said first and second registers and said second memory part for deriving a percent load fuel quantity signal corresponding to said actual speed signal and said commanded speed signal,
third means including a third sensor adapted to be operatively coupled with said air intake means for generating an air intake signal indicative of a selected condition of the air being supplied to the engine and for storing the air intake signal in said third register,
said third memory part containing a second set of data which defines a functional relationship representing a full load fuel quantity signal for each different set of correlated values of actual speed signal and air intake signal,
said logic means being operatively coupled, under the control of said computation program, to said first and third registers and said third memory part for deriving a full load fuel quantity signal corresponding to the actual speed signal and the air intake signal, said logic means being operative, under the control of said computation program, for comparing the percent load fuel quantity signal and the full load fuel quantity signal and for producing a fuel metering control signal corresponding in value to the lesser of the fuel quantity signals, and output means for applying the fuel metering control signal to the fuel injector for the cylinder which is next in the sequence of said cylinders.

16. The invention as defined in claim 15 wherein said second and third memory parts are, respective, first and second read only memories with said first set of data being in a first look-up table stored in said first read only memory and said second set of data being in a second look-up table stored in said second read only memory.

17. The invention as defined in claim 16 wherein said memory means also includes fourth and fifth registers, said logic means being operative under control of said computation program to put said fuel metering control signal in the fourth register, said logic means being operatively coupled, under the control of said computation program, to said first register and said fourth register for computing an injection advance signal corresponding to said actual speed signal and said fuel metering control signal and for putting the injection advance signal in said fifth register, said output means being operatively coupled with said fourth and fifth registers for applying the fuel metering control signal and the injection advance signal to the fuel injector for the cylinder which is next in the sequence of said cylinders.

18. The invention as defined in claim 17 wherein said memory means also includes a third read only memory;

said third read only memory containing a third set of data in a third look-up table stored in said third read only memory representing an injection advance signal for each different set of correlated values of actual speed signal and fuel metering control signal;

said logic means being operatively coupled, under the control of said computation program, to said first register, said fourth register and said third look-up table for deriving an injection advance signal corresponding to the actual speed signal and the fuel metering control signal and for putting the injection advance signal is said fifth register.

19. The invention as defined in claim 18 wherein said memory means includes sixth and seventh registers, said logic means being operative under the control of said computation program to put said percent load fuel quantity signal in said sixth register, said logic means being operatively coupled, under the control of said computation program, to said first and second registers for deriving a speed error signal corresponding to the difference between the actual engine speed and the commanded speed and for integrating said speed error signal to obtain speed error integral signal and putting it in said seventh register, said logic means being operatively coupled, under the control of the computation program, to said sixth and seventh registers for adding said integral signal to said percent load fuel quantity signal to adjust the value of said percent load fuel quantity signal.

20. The invention as defined in claim 18 wherein, said memory means includes a fifth register, said third sensor is responsive to air pressure and said third means produces an intake air pressure signal, fourth means including a fourth sensor adapted to be operatively coupled with said air intake means for generating a temperature signal indicative of the temperature of the air being supplied to the engine and for storing the temperature signal in said fifth register, said logic means being operatively coupled, under the control of said computation program, to the third and fifth registers for computing said intake air signal as a function of said air pressure signal and said air temperature signal.

21. The invention as defined in claim 18 wherein, said memory means comprises a fifth register, fourth means including a fourth sensor adapted to be operatively coupled with said air intake means for generating a temperature signal indicative of the temperature of the air being supplied to the engine and for storing the temperature signal in said fifth register, said logic means being operatively coupled, under the control of said computation program, to said fifth register for deriving an injection advance adjustment signal as a function of the temperature signal, said logic means being operative under the control of the computation program to add the adjustment signal to the injection advance signal for adjusting the value of the advance signal.

22. The invention as defined in claim 15 wherein said memory means also includes a fourth memory part and fourth and fifth registers, an interrupt program stored in said fourth memory part and being adapted to control said logic means, a table of trim data signals stored in said fourth register, said trim data signals representing data for computing an adjustment for said fuel metering control signals to produce the desired fuel quantity according to a calibration of each individual injector, said logic means being operatively coupled, under the control of one of said programs, to said fourth register for modifying the fuel metering control signal in accordance with a predetermined function of said trim data signals and for storing the modified fuel metering control signal in said fifth register, said output means being coupled with said fifth register for applying the modified fuel metering control signal to the fuel injector for the cylinder which is next in the sequence of said cylinders.

23. An electronic control system for controlling the delivery of fuel to a compression ignition engine having plural cylinders, a crankshaft, air intake means for the cylinders, an injector for each cylinder for delivering the fuel to the cylinders sequentially, and a manual speed control means, said electronic control system comprising:

programmable logic means adapted to be operated under the control of a stored program, memory means operatively coupled with the logic means and including first, second, third, fourth and fifth registers, and including first, second and third memory parts, a computation program stored in said first memory part and being adapted to control said logic means, first means including a first sensor adapted to be operatively coupled with the crankshaft for generating an actual speed signal and for storing it in said first register, second means including a second sensor adapted to be coupled with said manual speed control means for generating a commanded speed signal and for storing it in said second register, said logic means being operatively coupled, under the control of said computation program, to said first and second registers for computing a fuel metering control signal as a function of said actual speed signal and said commanded speed signal and for storing the fuel metering control signal in said third register, said second memory part containing a set of data which defines a functional relationship representing an injection advance signal for each different set of correlated values of the actual speed signal and the fuel metering control signal, said logic means being operatively coupled, under the control of the computation program, to said first register and said fourth register for deriving an injection advance signal corresponding to the actual speed signal and the fuel metering control signal and for putting the injection advance signal in said fifth register, and output means operatively coupled with the third and fifth registers for applying the fuel metering control signal and the injection advance signal to the fuel injector for the cylinder which is next in the sequence of said cylinders.

24. The invention as defined in claim 23 wherein said second memory part is a read only memory with the set of data being in a look-up table stored in said read only memory.

25. An electronic control system for controlling the delivery of fuel to a compression ignition engine having plural cylinders, a crankshaft, air intake means for the cylinders, an injector for each cylinder for delivering the fuel to the cylinders sequentially, and a manual speed control means, said electronic control system comprising:

programmable logic means adapted to be operated under the control of a stored program, memory means operatively coupled with the logic means and including first, second, third, fourth and fifth registers, and first, second, third and fourth memory parts, a computation program stored in said first memory part and being adapted to control said logic means, first means including a first sensor adapted to be operatively coupled with the crankshaft for generating an actual speed signal and for storing it in said first register, second means including a second sensor adapted to be coupled with said manual speed control means for generating a commanded speed signal and for storing it in said second register, said second memory part containing a first set of data which defines a functional relationship representing a percent load fuel quantity signal for each different set of correlated values of actual speed signal and commanded speed signal, said logic means being operatively coupled, under the control of said computation program, to said first and second registers and to said second memory part for deriving a percent load fuel quantity signal corresponding to said actual speed signal and said commanded speed signal, third means including a third sensor adapted to be operatively coupled with said air intake means for generating an air intake signal indicative of a selected condition of the air being supplied to the engine and for storing the air intake signal in said third register, said third memory part containing a second set of data which defines a functional relationship representing a full load fuel quantity signal for each different set of correlated values of actual speed signal and air intake signal, said logic means being operatively coupled, under the control of said computation program, to said first and third registers and said third memory part for deriving a full load fuel quantity signal corresponding to the actual speed signal and the air intake signal, said logic means being operative, under the control of said computation program, for comparing the percent load fuel quantity signal and the full load fuel quantity signal and for producing a fuel metering control signal corresponding in values to the lesser of the fuel quantity signals and for putting the fuel metering control signal in said fourth register, said fourth memory part containing a third set of data which defines a functional relationship representing an injection advance signal for each different set of correlated values of the actual speed signal and the fuel metering control signal, said logic means being operatively coupled, under the control of the computation program, to said first register and said fourth register for deriving an injection advance signal corresponding to the actual speed signal and the fuel metering control signal and for putting the injection advance signal in the fifth register, and output means operatively coupled with the fourth and fifth registers for applying the fuel metering control signal and the injection advance signal to the fuel injector for the cylinder which is next in the sequence of said cylinders.

26. The invention as defined in claim 25 wherein said memory means includes sixth and seventh registers, said logic means being operative under the control of said computation program to put said percent load fuel quantity signal in said sixth register, said logic means being operatively coupled, under the control of said computation program, to said first and second registers for deriving a speed error signal corresponding to the difference between the actual engine speed and the commanded speed and for integrating said speed error signal to obtain speed error integral signal and putting it in said sixth register, said logic means being operatively coupled, under the control of the computation program, to said fifth and sixth registers for adding said integral signal to said percent load fuel quantity signal to adjust the value of said percent load fuel quantity signal.

27. The invention as defined in claim 25 wherein, said memory means includes a sixth register, said third sensor is responsive to air pressure and said third means produces an intake air pressure signal, fourth means including a fourth sensor adapted to be operatively coupled with said air intake means for generating a temperature signal indicative of the temperature of the air being supplied to the engine and for storing the temperature signal in said sixth register, said logic means being operatively coupled, under the control of said computation program, to the third and sixth registers for computing said intake air signal as a function of said air pressure signal and said air temperature signal.

28. The invention as defined in claim 25 wherein, said memory means comprises a sixth register, fourth means including a fourth sensor adapted to be operatively coupled with said air intake means for generating a temperature signal indicative of the temperature of the air being supplied to the engine and for storing the temperature signal in said sixth register, said logic means being operatively coupled, under the control of said computation program, to said sixth register for deriving an injection advance adjustment signal as a function of the temperature signal, said logic means being operative under the control of the computation program to add the adjustment signal to the injection advance signal for adjusting the value of the advance signal.

29. An electronic control system for controlling the delivery of fuel to a compression ignition engine having plural cylinders, a crankshaft, air intake means for the cylinders, an injector for each cylinder for delivering the fuel to the cylinders sequentially, and a manual speed control means, said electronic control system comprising:

programmable logic means adapted to be operated under the control of a stored program, memory means operatively coupled with the logic means and including first, second, third and fourth registers, a plurality of other registers, and including first and second memory parts, a computation program stored in said first memory part and being adapted to control said logic means, an interrupt program stored in said second memory part and being adapted to control said logic means, signal developing means including a plurality of sensors adapted to be connected with said engine for generating a plurality of condition signals each corresponding with a given operating condition of the engine, said logic means being operatively coupled, under the control of said interrupt program, to said signal developing means for putting the plurality of condition signals respectively in said plurality of registers, one of said sensors being adapted to be operatively coupled to said crankshaft for generating an interrupt signal at a predetermined angular position of the crankshaft to initiate said interrupt program to update the signals in said plurality of registers, said logic means being operatively coupled, under the control of said computation program, to selected ones of said plurality of registers for computing a fuel metering control signal and storing it in said first register, said control signal having a value representing the time duration of a fuel pulse for the fuel injector for a given cylinder in the sequence of said cylinders and for computing an injection advance signal and storing it in said second register, said advance signal having a value representing the angular position of said crankshaft for the initiation of fuel injection, a table of trim data signals stored in said third register, said trim data signals representing data for computing an adjustment for said fuel metering control signal to produce the desired fuel quantity according to a calibration of each individual injector, said logic means being operatively coupled, under the control of one of said programs, to said third register and to said first register for modifying the fuel metering control signal in accordance with a predetermined function of said trim data signals and for storing the modified fuel metering control signal in said fourth register, and output means for applying the modified fuel metering control signal to the fuel injector for the cylinder which is next in the sequence of said cylinders.

30. An electronic control system for controlling the delivery of fuel to a compression ignition engine having plural cylinders, a crankshaft, air intake means for the cylinders, an injector for each cylinder for delivering the fuel to the cylinders sequentially, and a manual speed control means, said electronic control system comprising:

programmable logic means adapted to be operated under the control of a stored program, memory means operatively coupled with the logic means and including first and second memory parts, first and second registers and a plurality of registers, a computation program stored in said first memory part and being adapted to control said logic means, an interrupt program stored in said second memory part and being adapted to control said logic means, signal developing means including a plurality of sensors adapted to be connected with said engine for generating a plurality of condition signals each corresponding with a given operating condition of the engine, said logic means being operative to start the computation program, said logic means being operatively coupled under the control of said interrupt program to said signal developing means for putting the plurality of condition signals, respectively, in said plurality of registers, one of said sensors being adapted to be operatively coupled to said crankshaft for generating an interrupt signal at a predetermined angular position of the crankshaft to initiate said interrupt program synchronously with engine operation to update the signals in said plurality of registers, said logic means being operative in response to completion of the interrupt program for resuming execution of said computation program, said logic means being operatively coupled, under the control of said computation program, to selected ones of said plurality of registers for computing a fuel metering control signal and storing it in said register and for computing an injection advance signal and storing it in said second register, whereby the computation and storage of the fuel metering control signal and the injection advance signal are performed asynchronously with respect to the operation of the engine, said logic means being operative under the control of said computation program to repeat the execution of the computation program when the execution thereof is complete, and output means adapted to be operatively coupled with the crankshaft and being operatively coupled with first and second registers for applying the fuel metering control signal and the injection advance signal to the fuel injector for the cylinder which is next in the sequence of said cylinders.

31. The invention as defined in claim 30 wherein said memory means also includes third and fourth memory parts and third, fourth and fifth registers, said signal developing means being responsive to said one of said sensors for generating an actual speed signal and for storing it in the third register, said signal developing means comprising a second sensor adapted to be coupled with said manual speed control means for generating a commanded speed signal and for storing it in the fourth register, said third memory part containing a first set of data which defines a functional relationship representing a percent load fuel quantity signal for each different set of correlated values of actual speed signal and commanded speed signal, said logic means being operatively coupled, under the control of said computation program, to said third and fourth registers and said third memory part for deriving a percent load fuel quantity signal corresponding to said actual speed signal and said commanded speed signal, said signal developing means also comprising a third sensor adapted to be operatively coupled with said air intake means for generating an air intake signal indicative of a selected condition of the air being supplied to the engine and for storing the air intake signal in said fifth register, said fourth memory part containing a second set of data which defines a functional relationship representing a full load fuel quantity signal for each different set of correlated values of actual speed signal and air intake signal, said logic means being operatively coupled, under the control of said computation program, to said third and fifth registers and said fourth memory part for deriving a full load fuel quantity signal corresponding to the actual speed signal and the air intake signal, said logic means being operative, under the control of said computation program, for comparing the percent load fuel quantity signal and the full load fuel quantity signal and for producing said fuel metering control signal corresponding in value to the lesser of the fuel quantity signals and for storing it in said first register.

32. The invention as defined in claim 31 wherein said third and fourth memory parts are, respectively, first and second read only memories with said first set of data being in a first look-up table stored in said first read only memory and said second set of data being in a second look-up table stored in said second read only memory.

33. The invention as defined in claim 32 wherein, said logic means being operatively coupled under the control of said computation program, to said third register and said first register for computing the injection advance signal corresponding to said actual speed signal and said fuel metering control signal and for putting the injection advance signal in said second register.

34. The invention as defined in claim 33 wherein;
said memory means also includes a third read only memory;
said third read only memory containing a third set of data in a third look-up table stored in said third read only memory representing an injection advance signal for each different set of correlated values of actual speed and fuel metering control signal;

said logic means being operatively coupled, under the control of said computation program, to said third register, said first register and said third look-up table for deriving said injection advance signal corresponding to the actual speed signal and the fuel metering control signal and for putting the injection advance signal in said second register.

35. The invention as defined in claim 34 wherein, said memory means includes sixth and seventh registers, said logic means being operative under the control of said computation program to put said percent load fuel quantity signal in said sixth register, said logic means being operatively coupled, under the control of said computation program, to said third and fourth registers for deriving a speed error signal corresponding to the difference between actual engine speed signal and the commanded speed signal and for integrating said speed error signal to obtain the speed error integral signal and putting it in said seventh register, said logic means being operatively coupled, under the control of the computation program, to said sixth and seventh registers for adding said integral signal to said percent load fuel quantity signal to adjust the value of said percent load fuel quantity signal.

36. The invention as defined in claim 34 wherein, said memory means includes a sixth register, said third sensor is responsive to air pressure and produces an air intake pressure signal, said signal developing means comprising a fourth sensor adapted to be operatively coupled with said air intake means for generating a temperature signal indicative of the temperature of the air being supplied to the engine and for storing the temperature signal in said sixth register, said logic means being operatively coupled, under the control of said computation program, to the fifth and the sixth registers for computing said air intake signal as a function of said air intake pressure signal and said air temperature signal.

37. The invention as defined in claim 34 wherein, said memory means includes a sixth register, said signal developing means comprising a fourth sensor adapted to be operatively coupled with said air intake means for generating a temperature signal indicative of the temperature of the air being supplied to the engine and for storing the temperature signal in said sixth register, said logic means being operatively coupled, under the control of said computation program, to said sixth register for deriving an injection advance adjustment signal as a function of the temperature signal, said logic means being operative, under the control of the computation program, to add the adjustment signal to the injection advance signal for adjusting the value of the injection advance signal.

* * * * *